United States Patent
Engelke et al.

(10) Patent No.: US 11,368,581 B2
(45) Date of Patent: *Jun. 21, 2022

(54) SEMIAUTOMATED RELAY METHOD AND APPARATUS

(71) Applicant: Ultratec, Inc., Madison, WI (US)

(72) Inventors: Robert M. Engelke, Madison, WI (US); Kevin R. Colwell, MIddleton, WI (US); Christopher Engelke, Verona, WI (US)

(73) Assignee: Ultratec, Inc., Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/018,634

(22) Filed: Sep. 11, 2020

(65) Prior Publication Data

US 2020/0412869 A1 Dec. 31, 2020

Related U.S. Application Data

(63) Continuation of application No. 16/537,196, filed on Aug. 9, 2019, now Pat. No. 10,917,519, which is a (Continued)

(51) Int. Cl.
*H04M 3/42* (2006.01)
*H04M 1/247* (2021.01)
(Continued)

(52) U.S. Cl.
CPC ......... *H04M 3/42391* (2013.01); *G10L 15/22* (2013.01); *G10L 25/48* (2013.01);
(Continued)

(58) Field of Classification Search
CPC ......... H04M 3/42391; H04M 1/72591; H04M 1/2475; H04M 2201/40; H04M 1/7255;
(Continued)

(56) References Cited

U.S. PATENT DOCUMENTS

| | | |
|---|---|---|
| 3,372,246 A | 3/1968 | Knuepfer et al. |
| 3,507,997 A | 4/1970 | Weitbrecht |

(Continued)

FOREIGN PATENT DOCUMENTS

| | | |
|---|---|---|
| DE | 2647097 | 4/1978 |
| DE | 2749923 | 5/1979 |

(Continued)

OTHER PUBLICATIONS

CaptionCall L.L.C. Petition for Inter Partes Review of Claims 1 and 2 of U.S. Pat. No. 7,555,104 Under 35 U.S.C. 311-319 and 37 C.F.R. 42.100 Et Seq., Aug. 30, 2013, 65 pages.

(Continued)

*Primary Examiner* — Lisa Hashem
(74) *Attorney, Agent, or Firm* — Quarles & Brady LLP

(57) ABSTRACT

A method to transcribe communications includes obtaining an audio message from a first device during a voice communication session with a second device including a display screen, providing the message to a first speech recognition system to generate a first message transcript, providing the transcript to the second device for presentation on the screen, obtaining an indication that a transcript quality is below a threshold, providing, in response, the message to a second system to generate a second transcript while still providing it to the first system to generate the first transcript and providing the first transcript to the second device for presentation on the display screen, and in response to an event occurring that indicates the second transcript is to be provided to the second device instead of the first transcript, providing the second transcript to the second device for presentation on the screen instead of the first transcript.

75 Claims, 45 Drawing Sheets

Related U.S. Application Data continuation-in-part of application No. 15/729,069, filed on Oct. 10, 2017, which is a continuation-in-part of application No. 15/171,720, filed on Jun. 2, 2016, now Pat. No. 10,748,523, which is a continuation-in-part of application No. 14/953,631, filed on Nov. 30, 2015, now Pat. No. 10,878,721, which is a continuation-in-part of application No. 14/632,257, filed on Feb. 26, 2015, now Pat. No. 10,389,876.

(60) Provisional application No. 61/946,072, filed on Feb. 28, 2014.

(51) Int. Cl.
| | |
|---|---|
| *G10L 25/48* | (2013.01) |
| *G10L 15/22* | (2006.01) |
| *H04W 4/06* | (2009.01) |
| *H04W 4/16* | (2009.01) |
| *H04W 4/12* | (2009.01) |
| *H04M 1/72478* | (2021.01) |
| *H04M 3/533* | (2006.01) |
| *G10L 15/26* | (2006.01) |
| *G10L 21/10* | (2013.01) |
| *H04M 1/72433* | (2021.01) |

(52) U.S. Cl.
CPC ..... *H04M 1/2475* (2013.01); *H04M 1/72478* (2021.01); *H04W 4/06* (2013.01); *H04W 4/12* (2013.01); *H04W 4/16* (2013.01); *G10L 15/26* (2013.01); *G10L 21/10* (2013.01); *H04M 1/72433* (2021.01); *H04M 3/53366* (2013.01); *H04M 2201/18* (2013.01); *H04M 2201/40* (2013.01)

(58) Field of Classification Search
CPC ......... H04M 3/53366; H04M 2201/18; H04M 1/72478; H04M 1/72433; G10L 15/22; G10L 25/48; G10L 15/26; G10L 21/10; H04W 4/16; H04W 4/06; H04W 4/12
See application file for complete search history.

(56) References Cited

U.S. PATENT DOCUMENTS

| | | |
|---|---|---|
| 3,515,814 A | 6/1970 | Morgan et al. |
| 3,585,303 A | 6/1971 | Chieffo et al. |
| 3,598,920 A | 8/1971 | Fischer et al. |
| 3,800,089 A | 3/1974 | Reddick |
| 3,896,267 A | 7/1975 | Sachs et al. |
| 3,959,607 A | 5/1976 | Vargo |
| 3,976,995 A | 8/1976 | Sebestyen |
| 4,012,599 A | 3/1977 | Meyer |
| 4,039,768 A | 8/1977 | O'Maley |
| 4,126,768 A | 11/1978 | Grenzow |
| 4,151,380 A | 4/1979 | Blomeyer et al. |
| 4,160,136 A | 7/1979 | McGough |
| 4,188,665 A | 2/1980 | Nagel et al. |
| 4,191,854 A | 3/1980 | Coles |
| 4,201,887 A | 5/1980 | Burns |
| 4,254,308 A | 3/1981 | Blomeyer et al. |
| D259,348 S | 5/1981 | Sakai et al. |
| 4,268,721 A | 5/1981 | Nielson et al. |
| 4,289,931 A | 9/1981 | Baker |
| 4,302,629 A | 11/1981 | Foulkes et al. |
| 4,307,266 A | 12/1981 | Messina |
| 4,354,252 A | 10/1982 | Lamb |
| 4,415,065 A | 11/1983 | Sandstedt |
| 4,426,555 A | 1/1984 | Underkoffler |
| 4,430,726 A | 2/1984 | Kasday |
| D273,110 S | 3/1984 | Genaro et al. |
| 4,451,701 A | 5/1984 | Bendig |
| 4,471,165 A | 9/1984 | DeFino et al. |
| D275,857 S | 10/1984 | Moraine |
| 4,490,579 A | 12/1984 | Godoshian |
| 4,503,288 A | 3/1985 | Kessler |
| D278,435 S | 4/1985 | Hikawa |
| 4,524,244 A | 6/1985 | Faggin |
| D280,099 S | 8/1985 | Topp |
| 4,533,791 A | 8/1985 | Read et al. |
| 4,568,803 A | 2/1986 | Frola |
| 4,569,421 A | 2/1986 | Sandstedt |
| D283,421 S | 4/1986 | Brier |
| 4,625,080 A | 11/1986 | Scott |
| RE32,365 E | 3/1987 | Sebestyen |
| 4,650,927 A | 3/1987 | James |
| 4,659,876 A | 4/1987 | Sullivan et al. |
| 4,713,808 A | 12/1987 | Gaskill |
| 4,754,474 A | 6/1988 | Feinson |
| D296,894 S | 7/1988 | Chen |
| 4,777,469 A | 10/1988 | Engelke et al. |
| 4,799,254 A | 1/1989 | Dayton |
| 4,815,121 A | 3/1989 | Yoshida |
| 4,817,135 A | 3/1989 | Winebaum |
| 4,839,919 A | 6/1989 | Borges |
| 4,849,750 A | 7/1989 | Andros |
| 4,866,778 A | 9/1989 | Baker |
| 4,868,860 A | 9/1989 | Andros et al. |
| 4,879,738 A | 11/1989 | Petro |
| 4,897,868 A | 1/1990 | Engelke et al. |
| D306,727 S | 3/1990 | Fritzsche |
| 4,908,866 A | 3/1990 | Goldwasser et al. |
| 4,918,723 A | 4/1990 | Iggulden et al. |
| 4,926,460 A | 5/1990 | Gutman et al. |
| 4,951,043 A | 8/1990 | Minami |
| 4,959,847 A | 9/1990 | Engelke et al. |
| D312,457 S | 11/1990 | Inatomi |
| 4,995,077 A | 2/1991 | Malinowski |
| 5,025,442 A | 6/1991 | Lynk et al. |
| 5,027,406 A | 6/1991 | Roberts et al. |
| 5,033,088 A | 7/1991 | Shipman |
| 5,051,924 A | 9/1991 | Bergeron et al. |
| D322,785 S | 12/1991 | Wu |
| 5,081,673 A | 1/1992 | Engelke et al. |
| 5,086,453 A | 2/1992 | Senoo et al. |
| 5,091,906 A | 2/1992 | Reed et al. |
| 5,095,307 A | 3/1992 | Shimura et al. |
| 5,099,507 A | 3/1992 | Mukai et al. |
| 5,121,421 A | 6/1992 | Alheim |
| 5,128,980 A | 7/1992 | Choi |
| 5,134,633 A | 7/1992 | Werner |
| 5,146,502 A | 9/1992 | Davis |
| 5,163,081 A | 11/1992 | Wycherley et al. |
| 5,192,948 A | 3/1993 | Neustein |
| 5,199,077 A | 3/1993 | Wilcox et al. |
| 5,210,689 A | 5/1993 | Baker et al. |
| 5,214,428 A | 5/1993 | Allen |
| 5,216,702 A | 6/1993 | Ramsden |
| 5,249,220 A | 9/1993 | Moskowitz et al. |
| 5,280,516 A | 1/1994 | Jang |
| 5,289,523 A | 2/1994 | Vasile et al. |
| 5,294,982 A | 3/1994 | Salomon et al. |
| 5,307,399 A | 4/1994 | Dai et al. |
| 5,311,516 A | 5/1994 | Kuznicki et al. |
| 5,318,340 A | 6/1994 | Henry |
| 5,325,417 A | 6/1994 | Engelke et al. |
| 5,327,479 A | 7/1994 | Engelke et al. |
| 5,339,358 A | 8/1994 | Danish et al. |
| 5,343,519 A | 8/1994 | Feldman |
| 5,351,288 A | 9/1994 | Engelke et al. |
| D351,185 S | 10/1994 | Matsuda et al. |
| 5,359,651 A | 10/1994 | Draganoff |
| 5,375,160 A | 12/1994 | Guidon et al. |
| 5,377,263 A | 12/1994 | Bazemore et al. |
| 5,392,343 A | 2/1995 | Davitt et al. |
| 5,393,236 A | 2/1995 | Blackmer et al. |
| 5,396,650 A | 3/1995 | Terauchi |
| D357,253 S | 4/1995 | Wong |
| 5,410,541 A | 4/1995 | Hotto |
| 5,423,555 A | 6/1995 | Kidrin |
| 5,424,785 A | 6/1995 | Orphan |
| 5,426,706 A | 6/1995 | Wood |

(56) References Cited

U.S. PATENT DOCUMENTS

| | | |
|---|---|---|
| 5,432,837 A | 7/1995 | Engelke et al. |
| 5,459,458 A | 10/1995 | Richardson et al. |
| 5,463,665 A | 10/1995 | Millios et al. |
| D364,865 S | 12/1995 | Engelke et al. |
| 5,475,733 A | 12/1995 | Eisdorfer et al. |
| 5,475,798 A | 12/1995 | Handlos |
| 5,477,274 A | 12/1995 | Akiyoshi et al. |
| 5,487,102 A | 1/1996 | Rothschild et al. |
| 5,487,671 A | 1/1996 | Shpiro |
| 5,497,373 A | 3/1996 | Hulen et al. |
| 5,508,754 A | 4/1996 | Orphan |
| 5,517,548 A | 5/1996 | Engelke et al. |
| 5,519,443 A | 5/1996 | Salomon et al. |
| 5,519,808 A | 5/1996 | Benton, Jr. et al. |
| 5,521,960 A | 5/1996 | Aronow |
| 5,522,089 A | 5/1996 | Kikinis et al. |
| 5,537,436 A | 7/1996 | Bottoms et al. |
| 5,559,855 A | 9/1996 | Dowens et al. |
| 5,559,856 A | 9/1996 | Dowens |
| 5,574,776 A | 11/1996 | Leuca et al. |
| 5,574,784 A | 11/1996 | LaPadula et al. |
| 5,581,593 A | 12/1996 | Engelke et al. |
| 5,604,786 A | 2/1997 | Engelke et al. |
| D379,181 S | 5/1997 | Sawano et al. |
| 5,649,060 A | 7/1997 | Ellozy et al. |
| 5,671,267 A | 9/1997 | August et al. |
| 5,680,443 A | 10/1997 | Kasday et al. |
| 5,687,222 A | 11/1997 | McLaughlin et al. |
| 5,701,338 A | 12/1997 | Leyen et al. |
| 5,710,806 A | 1/1998 | Lee et al. |
| 5,712,901 A | 1/1998 | Meermans |
| 5,724,405 A | 3/1998 | Engelke et al. |
| 5,745,550 A | 4/1998 | Eisdorfer et al. |
| 5,751,338 A | 5/1998 | Ludwig, Jr. |
| 5,787,148 A | 7/1998 | August |
| 5,799,273 A | 8/1998 | Mitchell et al. |
| 5,799,279 A | 8/1998 | Gould et al. |
| 5,809,112 A | 9/1998 | Ryan |
| 5,809,425 A | 9/1998 | Colwell et al. |
| 5,815,196 A | 9/1998 | Alshawi |
| 5,826,102 A | 10/1998 | Escobar et al. |
| 5,850,627 A | 12/1998 | Gould et al. |
| 5,855,000 A | 12/1998 | Waibel et al. |
| D405,793 S | 2/1999 | Engelke et al. |
| 5,867,817 A | 2/1999 | Catallo et al. |
| 5,870,709 A | 2/1999 | Bernstein |
| 5,883,986 A | 3/1999 | Kopec et al. |
| 5,893,034 A | 4/1999 | Hikuma et al. |
| 5,899,976 A | 5/1999 | Rozak |
| 5,905,476 A | 5/1999 | McLaughlin et al. |
| 5,909,482 A | 6/1999 | Engelke |
| 5,915,379 A | 6/1999 | Wallace et al. |
| 5,917,888 A | 6/1999 | Giuntoli |
| 5,926,527 A | 7/1999 | Jenkins et al. |
| 5,940,475 A | 8/1999 | Hansen |
| 5,974,116 A | 10/1999 | Engelke et al. |
| 5,978,014 A | 11/1999 | Martin et al. |
| 5,978,654 A | 11/1999 | Colwell et al. |
| 5,982,853 A | 11/1999 | Liebermann |
| 5,982,861 A | 11/1999 | Holloway et al. |
| 5,991,291 A | 11/1999 | Asai et al. |
| 5,991,723 A | 11/1999 | Duffin |
| 5,995,590 A | 11/1999 | Brunet et al. |
| 6,002,749 A | 12/1999 | Hansen et al. |
| 6,067,516 A | 5/2000 | Levay et al. |
| 6,072,860 A | 6/2000 | Kek et al. |
| 6,075,534 A | 6/2000 | VanBuskirk et al. |
| 6,075,841 A | 6/2000 | Engelke et al. |
| 6,075,842 A | 6/2000 | Engelke et al. |
| 6,100,882 A | 8/2000 | Sharman et al. |
| 6,141,341 A | 10/2000 | Jones et al. |
| 6,141,415 A | 10/2000 | Rao |
| 6,173,259 B1 | 1/2001 | Bijl et al. |
| 6,175,819 B1 | 1/2001 | Van Alstine |
| 6,181,736 B1 | 1/2001 | McLaughlin et al. |
| 6,181,778 B1 | 1/2001 | Ohki et al. |
| 6,188,429 B1 | 2/2001 | Martin et al. |
| 6,233,314 B1 | 5/2001 | Engelke |
| 6,243,684 B1 | 6/2001 | Stuart et al. |
| 6,278,772 B1 | 8/2001 | Bowater et al. |
| 6,298,326 B1 | 10/2001 | Feller |
| 6,307,921 B1 | 10/2001 | Engelke et al. |
| 6,314,396 B1 | 11/2001 | Monkowski |
| 6,317,716 B1 | 11/2001 | Braida et al. |
| 6,324,507 B1 | 11/2001 | Lewis et al. |
| 6,345,251 B1 | 2/2002 | Jansson et al. |
| 6,366,882 B1 | 4/2002 | Bijl et al. |
| 6,374,221 B1 | 4/2002 | Haimi-Cohen |
| 6,377,925 B1 | 4/2002 | Greene, Jr. et al. |
| 6,381,472 B1 | 4/2002 | LaMedica, Jr. et al. |
| 6,385,582 B1 | 5/2002 | Iwata |
| 6,385,586 B1 | 5/2002 | Dietz |
| 6,389,114 B1 | 5/2002 | Dowens et al. |
| 6,424,935 B1 | 7/2002 | Taylor |
| 6,430,270 B1 | 8/2002 | Cannon et al. |
| 6,445,799 B1 | 9/2002 | Taenzer et al. |
| 6,457,031 B1 | 9/2002 | Hanson |
| 6,473,778 B1 | 10/2002 | Gibbon |
| 6,493,426 B2 | 12/2002 | Engelke et al. |
| 6,493,447 B1 | 12/2002 | Goss et al. |
| 6,504,910 B1 | 1/2003 | Engelke et al. |
| 6,507,735 B1 | 1/2003 | Baker et al. |
| 6,510,206 B2 | 1/2003 | Engelke et al. |
| 6,549,611 B2 | 4/2003 | Engelke et al. |
| 6,549,614 B1 | 4/2003 | Zebryk et al. |
| 6,567,503 B2 | 5/2003 | Engelke et al. |
| 6,594,346 B2 | 7/2003 | Engelke |
| 6,603,835 B2 | 8/2003 | Engelke et al. |
| 6,625,259 B1 | 9/2003 | Hollatz et al. |
| 6,633,630 B1 | 10/2003 | Owens et al. |
| 6,661,879 B1 | 12/2003 | Schwartz et al. |
| 6,668,042 B2 | 12/2003 | Michaelis |
| 6,668,044 B1 | 12/2003 | Schwartz et al. |
| 6,701,162 B1 | 3/2004 | Everett |
| 6,704,709 B1 | 3/2004 | Kahn et al. |
| 6,748,053 B2 | 6/2004 | Engelke et al. |
| 6,763,089 B2 | 7/2004 | Feigenbaum |
| 6,775,360 B2 | 8/2004 | Davidson et al. |
| 6,778,824 B2 | 8/2004 | Wonak et al. |
| 6,813,603 B1 | 11/2004 | Groner et al. |
| 6,816,468 B1 | 11/2004 | Cruickshank |
| 6,816,469 B1 | 11/2004 | Kung et al. |
| 6,816,834 B2 | 11/2004 | Jaroker |
| 6,831,974 B1 | 12/2004 | Watson et al. |
| 6,850,609 B1 | 2/2005 | Schrage |
| 6,865,258 B1 | 3/2005 | Polcyn |
| 6,876,967 B2 | 4/2005 | Goto et al. |
| 6,882,707 B2 | 4/2005 | Engelke et al. |
| 6,885,731 B2 | 4/2005 | Engelke et al. |
| 6,894,346 B2 | 5/2005 | Onose et al. |
| 6,934,366 B2 | 8/2005 | Engelke et al. |
| 6,934,376 B1 | 8/2005 | McLaughlin et al. |
| 6,947,896 B2 | 9/2005 | Hanson |
| 6,948,066 B2 | 9/2005 | Hind et al. |
| 6,950,500 B1 | 9/2005 | Chaturvedi et al. |
| 6,980,953 B1 | 12/2005 | Kanevsky et al. |
| 7,003,082 B2 | 2/2006 | Engelke et al. |
| 7,003,463 B1 | 2/2006 | Maes et al. |
| 7,006,604 B2 | 2/2006 | Engelke |
| 7,016,479 B2 | 3/2006 | Flathers et al. |
| 7,016,844 B2 | 3/2006 | Othmer et al. |
| 7,035,383 B2 | 4/2006 | ONeal |
| 7,042,718 B2 | 5/2006 | Aoki et al. |
| 7,088,832 B1 | 8/2006 | Cooper |
| 7,117,152 B1 | 10/2006 | Mukherji et al. |
| 7,117,438 B2 | 10/2006 | Wallace et al. |
| 7,130,790 B1 | 10/2006 | Flanagan et al. |
| 7,142,642 B2 | 11/2006 | McClelland et al. |
| 7,142,643 B2 | 11/2006 | Brooksby |
| 7,164,753 B2 | 1/2007 | Engelke et al. |
| 7,191,135 B2 | 3/2007 | O'Hagan |
| 7,199,787 B2 | 4/2007 | Lee et al. |
| 7,221,405 B2 | 5/2007 | Basson et al. |
| 7,233,655 B2 | 6/2007 | Gailey et al. |

(56) References Cited

U.S. PATENT DOCUMENTS

| | | | |
|---|---|---|---|
| 7,287,009 B1 | 10/2007 | Liebermann | |
| 7,295,663 B2 | 11/2007 | McLaughlin et al. | |
| 7,313,231 B2 | 12/2007 | Reid | |
| 7,315,612 B2 | 1/2008 | McClelland | |
| 7,319,740 B2 | 1/2008 | Engelke et al. | |
| 7,330,737 B2 | 2/2008 | Mahini | |
| 7,346,506 B2 | 3/2008 | Lueck et al. | |
| 7,363,006 B2 | 4/2008 | Mooney | |
| 7,406,413 B2 | 7/2008 | Geppert et al. | |
| 7,428,702 B1 | 9/2008 | Cervantes et al. | |
| 7,430,283 B2 | 9/2008 | Steel, Jr. | |
| 7,480,613 B2 | 1/2009 | Kellner | |
| 7,519,536 B2 | 4/2009 | Maes et al. | |
| 7,555,104 B2 | 6/2009 | Engelke | |
| 7,573,985 B2 | 8/2009 | McClelland et al. | |
| 7,606,718 B2 | 10/2009 | Cloran | |
| 7,613,610 B1 | 11/2009 | Zimmerman et al. | |
| 7,660,398 B2 | 2/2010 | Engleke et al. | |
| 7,747,434 B2 | 6/2010 | Flanagan et al. | |
| 7,792,701 B2 | 9/2010 | Basson et al. | |
| 7,831,429 B2 | 11/2010 | O'Hagan | |
| 7,836,412 B1 | 11/2010 | Zimmerman | |
| 7,844,454 B2 | 11/2010 | Coles et al. | |
| 7,848,358 B2 | 12/2010 | LaDue | |
| 7,881,441 B2 | 2/2011 | Engelke et al. | |
| 7,904,113 B2 | 3/2011 | Ozluturk et al. | |
| 7,962,339 B2 | 6/2011 | Pieraccini et al. | |
| 8,019,608 B2 | 9/2011 | Carraux et al. | |
| 8,180,639 B2 | 5/2012 | Pieraccini et al. | |
| 8,213,578 B2 | 7/2012 | Engelke et al. | |
| 8,249,878 B2 | 8/2012 | Carraux et al. | |
| 8,259,920 B2 | 9/2012 | Abramson et al. | |
| 8,265,671 B2 | 9/2012 | Gould et al. | |
| 8,286,071 B1 | 10/2012 | Zimmerman et al. | |
| 8,325,883 B2 | 12/2012 | Schultz et al. | |
| 8,332,212 B2 | 12/2012 | Wittenstein et al. | |
| 8,332,227 B2 | 12/2012 | Maes et al. | |
| 8,335,689 B2 | 12/2012 | Wittenstein et al. | |
| 8,352,883 B2 | 1/2013 | Kashik et al. | |
| 8,369,488 B2 | 2/2013 | Sennett et al. | |
| 8,370,142 B2 | 2/2013 | Frankel et al. | |
| 8,379,801 B2 | 2/2013 | Romriell et al. | |
| 8,407,052 B2 | 3/2013 | Hager | |
| 8,416,925 B2 | 4/2013 | Engelke et al. | |
| 8,447,366 B2 | 5/2013 | Ungari et al. | |
| 8,473,003 B2 | 6/2013 | Jung et al. | |
| 8,504,372 B2 | 8/2013 | Carraux et al. | |
| 8,526,581 B2 | 9/2013 | Charugundla | |
| 8,538,324 B2 | 9/2013 | Hardacker et al. | |
| 8,605,682 B2 | 12/2013 | Efrati et al. | |
| 8,626,249 B2 | 1/2014 | Ungari et al. | |
| 8,645,136 B2 | 2/2014 | Milstein | |
| 8,682,672 B1 | 3/2014 | Ha et al. | |
| 8,781,510 B2 | 7/2014 | Gould et al. | |
| 8,806,455 B1 | 8/2014 | Katz | |
| 8,867,532 B2 | 10/2014 | Wozniak et al. | |
| 8,868,425 B2 | 10/2014 | Maes et al. | |
| 8,874,070 B2 | 10/2014 | Basore et al. | |
| 8,892,447 B1 | 11/2014 | Srinivasan et al. | |
| 8,908,838 B2 | 12/2014 | Engelke et al. | |
| 8,917,821 B2 | 12/2014 | Engelke et al. | |
| 8,917,822 B2 | 12/2014 | Engelke et al. | |
| 8,930,194 B2 | 1/2015 | Newman et al. | |
| 8,972,261 B2 | 3/2015 | Milstein | |
| 9,069,377 B2 | 6/2015 | Wilson et al. | |
| 9,124,716 B1 | 9/2015 | Charugundla | |
| 9,161,166 B2 | 10/2015 | Johansson et al. | |
| 9,183,843 B2 | 11/2015 | Fanty et al. | |
| 9,185,211 B2 | 11/2015 | Roach et al. | |
| 9,191,789 B2 | 11/2015 | Pan | |
| 9,215,406 B2 | 12/2015 | Paripally et al. | |
| 9,215,409 B2 | 12/2015 | Montero et al. | |
| 9,218,808 B2 | 12/2015 | Milstein | |
| 9,231,902 B2 | 1/2016 | Brown et al. | |
| 9,245,522 B2 | 1/2016 | Hager | |
| 9,247,052 B1 | 1/2016 | Walton | |
| 9,277,043 B1 | 3/2016 | Bladon et al. | |
| 9,305,552 B2 | 4/2016 | Kim et al. | |
| 9,318,110 B2 | 4/2016 | Roe | |
| 9,324,324 B2 | 4/2016 | Knighton | |
| 9,336,689 B2 | 5/2016 | Romriell et al. | |
| 9,344,562 B2 | 5/2016 | Moore et al. | |
| 9,355,611 B1 | 5/2016 | Wang et al. | |
| 9,380,150 B1 | 6/2016 | Bullough et al. | |
| 9,392,108 B2 | 7/2016 | Milstein | |
| 9,460,719 B1 | 10/2016 | Antunes et al. | |
| 9,495,964 B2 | 11/2016 | Kim et al. | |
| 9,502,033 B2 | 11/2016 | Carraux et al. | |
| 9,535,891 B2 | 1/2017 | Raheja et al. | |
| 9,536,567 B2 | 1/2017 | Garland et al. | |
| 9,571,638 B1 | 2/2017 | Knighton et al. | |
| 9,576,498 B1 | 2/2017 | Zimmerman et al. | |
| 9,628,620 B1 | 4/2017 | Rae et al. | |
| 9,632,997 B1 | 4/2017 | Johnson et al. | |
| 9,633,657 B2 | 4/2017 | Svendsen et al. | |
| 9,633,658 B2 | 4/2017 | Milstein | |
| 9,633,696 B1 | 4/2017 | Miller et al. | |
| 9,653,076 B2 | 5/2017 | Kim | |
| 9,672,825 B2 | 6/2017 | Arslan et al. | |
| 9,704,111 B1 | 7/2017 | Antunes et al. | |
| 9,715,876 B2 | 7/2017 | Hager | |
| 9,761,241 B2 | 9/2017 | Maes et al. | |
| 9,774,747 B2 | 9/2017 | Garland et al. | |
| 9,805,118 B2 | 10/2017 | Ko et al. | |
| 9,858,256 B2 | 1/2018 | Hager | |
| 9,858,929 B2 | 1/2018 | Milstein | |
| 9,886,956 B1 | 2/2018 | Antunes et al. | |
| 9,916,295 B1 | 3/2018 | Crawford | |
| 9,947,322 B2 | 4/2018 | Kang et al. | |
| 9,953,653 B2 | 4/2018 | Newman et al. | |
| 10,032,455 B2 | 7/2018 | Newman et al. | |
| 10,044,854 B2 | 8/2018 | Rae et al. | |
| 10,049,669 B2 | 8/2018 | Newman et al. | |
| 10,051,120 B2 | 8/2018 | Engelke et al. | |
| 10,389,876 B2 | 8/2019 | Engelke et al. | |
| 10,469,660 B2 | 11/2019 | Engelke et al. | |
| 10,491,746 B2 | 11/2019 | Engelke et al. | |
| 10,587,751 B2 | 3/2020 | Engelke et al. | |
| 10,742,805 B2 | 8/2020 | Engelke et al. | |
| 11,011,157 B2 * | 5/2021 | Dernoncourt | G10L 15/26 |
| 11,017,778 B1 * | 5/2021 | Thomson | H04M 3/42382 |
| 2001/0005825 A1 | 6/2001 | Engelke et al. | |
| 2002/0007275 A1 | 1/2002 | Goto et al. | |
| 2002/0049589 A1 | 4/2002 | Poirier | |
| 2002/0055351 A1 | 5/2002 | Elsey et al. | |
| 2002/0085685 A1 | 7/2002 | Engelke et al. | |
| 2002/0085703 A1 | 7/2002 | Proctor | |
| 2002/0094800 A1 | 7/2002 | Trop et al. | |
| 2002/0101537 A1 | 8/2002 | Basson et al. | |
| 2002/0103008 A1 | 8/2002 | Rahn et al. | |
| 2002/0114429 A1 | 8/2002 | Engelke et al. | |
| 2002/0119800 A1 | 8/2002 | Jaggers et al. | |
| 2002/0161578 A1 | 10/2002 | Saindon et al. | |
| 2002/0178001 A1 | 11/2002 | Balluff et al. | |
| 2002/0178002 A1 * | 11/2002 | Boguraev | G06F 40/284 704/235 |
| 2002/0193076 A1 | 12/2002 | Rogers et al. | |
| 2003/0045329 A1 | 3/2003 | Kinoshita | |
| 2003/0063731 A1 | 4/2003 | Woodring | |
| 2003/0097262 A1 | 5/2003 | Nelson | |
| 2004/0066926 A1 | 4/2004 | Brockbank et al. | |
| 2004/0083105 A1 | 4/2004 | Jaroker | |
| 2004/0143430 A1 | 7/2004 | Said et al. | |
| 2005/0025290 A1 | 2/2005 | Doherty et al. | |
| 2005/0063520 A1 | 3/2005 | Michaelis | |
| 2005/0094776 A1 | 5/2005 | Haldeman et al. | |
| 2005/0094777 A1 | 5/2005 | McClelland | |
| 2005/0129185 A1 | 6/2005 | McClelland et al. | |
| 2005/0144012 A1 | 6/2005 | Afrashteh et al. | |
| 2005/0180553 A1 | 8/2005 | Moore | |
| 2005/0183109 A1 | 8/2005 | Basson et al. | |
| 2005/0225628 A1 | 10/2005 | Antoniou | |
| 2005/0226394 A1 | 10/2005 | Engelke et al. | |
| 2005/0226398 A1 | 10/2005 | Bojeun | |

(56) References Cited

U.S. PATENT DOCUMENTS

| | | | |
|---|---|---|---|
| 2005/0232169 A1 | 10/2005 | McLaughlin et al. |
| 2005/0277431 A1 | 12/2005 | White |
| 2006/0026003 A1 | 2/2006 | Carus et al. |
| 2006/0089857 A1 | 4/2006 | Zimmerman et al. |
| 2006/0105712 A1 | 5/2006 | Glass et al. |
| 2006/0133583 A1 | 6/2006 | Brooksby |
| 2006/0140354 A1 | 6/2006 | Engelke |
| 2006/0149558 A1 | 7/2006 | Kahn et al. |
| 2006/0167686 A1 | 7/2006 | Kahn |
| 2006/0172720 A1 | 8/2006 | Islam et al. |
| 2006/0190249 A1 | 8/2006 | Kahn et al. |
| 2006/0285652 A1 | 12/2006 | McClelland et al. |
| 2006/0285662 A1 | 12/2006 | Yin et al. |
| 2007/0011012 A1 | 1/2007 | Yurick et al. |
| 2007/0024583 A1 | 2/2007 | Gettemy et al. |
| 2007/0036282 A1 | 2/2007 | Engelke et al. |
| 2007/0118373 A1 | 5/2007 | Wise et al. |
| 2007/0153989 A1 | 7/2007 | Howell et al. |
| 2007/0208570 A1 | 9/2007 | Bhardwaj et al. |
| 2007/0282597 A1 | 12/2007 | Cho et al. |
| 2008/0005440 A1 | 1/2008 | Li et al. |
| 2008/0043936 A1 | 2/2008 | Liebermann |
| 2008/0064326 A1 | 3/2008 | Foster et al. |
| 2008/0129864 A1 | 6/2008 | Stone et al. |
| 2008/0152093 A1 | 6/2008 | Engelke et al. |
| 2008/0187108 A1 | 8/2008 | Engelke et al. |
| 2008/0215323 A1 | 9/2008 | Shaffer et al. |
| 2008/0319745 A1 | 12/2008 | Caldwell et al. |
| 2009/0037171 A1 | 2/2009 | McFarland et al. |
| 2009/0174759 A1 | 7/2009 | Yeh et al. |
| 2009/0276215 A1 | 11/2009 | Hager |
| 2009/0299743 A1 | 12/2009 | Rogers |
| 2009/0306981 A1 | 12/2009 | Cromack et al. |
| 2009/0326939 A1 | 12/2009 | Toner et al. |
| 2010/0007711 A1 | 1/2010 | Bell |
| 2010/0027765 A1 | 2/2010 | Schultz et al. |
| 2010/0030738 A1 | 2/2010 | Geer |
| 2010/0063815 A1 | 3/2010 | Cloran et al. |
| 2010/0076752 A1 | 3/2010 | Zweig et al. |
| 2010/0141834 A1 | 6/2010 | Cuttner |
| 2010/0145729 A1 | 6/2010 | Katz |
| 2010/0228548 A1 | 9/2010 | Liu et al. |
| 2010/0323728 A1 | 12/2010 | Gould et al. |
| 2011/0013756 A1 | 1/2011 | Davies et al. |
| 2011/0022387 A1 | 1/2011 | Hager |
| 2011/0087491 A1 | 4/2011 | Wittenstein et al. |
| 2011/0123003 A1 | 5/2011 | Romriell et al. |
| 2011/0128953 A1 | 6/2011 | Wozniak et al. |
| 2011/0170672 A1 | 7/2011 | Engelke et al. |
| 2011/0231184 A1 | 9/2011 | Kerr |
| 2011/0289134 A1 | 11/2011 | de los Reyes et al. |
| 2012/0016671 A1 | 1/2012 | Jaggi et al. |
| 2012/0062791 A1 | 3/2012 | Thakolsri et al. |
| 2012/0108196 A1 | 5/2012 | Musgrove et al. |
| 2012/0178064 A1 | 7/2012 | Katz |
| 2012/0214447 A1 | 8/2012 | Russell et al. |
| 2012/0245936 A1 | 9/2012 | Treglia |
| 2012/0250837 A1 | 10/2012 | Engleke et al. |
| 2012/0284015 A1 | 11/2012 | Drewes |
| 2013/0013904 A1 | 1/2013 | Tran |
| 2013/0017800 A1 | 1/2013 | Gouvia et al. |
| 2013/0045720 A1 | 2/2013 | Madhavapeddl et al. |
| 2013/0086293 A1 | 4/2013 | Bosse et al. |
| 2013/0171958 A1 | 7/2013 | Goodson et al. |
| 2013/0219098 A1 | 8/2013 | Turnpenny et al. |
| 2013/0254264 A1 | 9/2013 | Hankinson et al. |
| 2013/0262563 A1 | 10/2013 | Lu |
| 2013/0289971 A1 | 10/2013 | Parkinson et al. |
| 2013/0308763 A1 | 11/2013 | Engleke et al. |
| 2013/0317818 A1 | 11/2013 | Bigham et al. |
| 2013/0331056 A1 | 12/2013 | McKown et al. |
| 2013/0340003 A1 | 12/2013 | Davis et al. |
| 2014/0018045 A1 | 1/2014 | Tucker |
| 2014/0039871 A1 | 2/2014 | Crawford |
| 2014/0099909 A1 | 4/2014 | Daly et al. |
| 2014/0153705 A1 | 6/2014 | Moore et al. |
| 2014/0180667 A1 | 6/2014 | Johansson |
| 2014/0270101 A1 | 9/2014 | Maxwell et al. |
| 2014/0314220 A1 | 10/2014 | Charugundla |
| 2014/0341359 A1 | 11/2014 | Engelke et al. |
| 2015/0032450 A1 | 1/2015 | Hussain et al. |
| 2015/0073790 A1 | 3/2015 | Steuble et al. |
| 2015/0088508 A1 | 3/2015 | Bharadwaj et al. |
| 2015/0094105 A1 | 4/2015 | Pan |
| 2015/0106091 A1 | 4/2015 | Wetjen et al. |
| 2015/0130887 A1 | 5/2015 | Thelin et al. |
| 2015/0131786 A1 | 5/2015 | Roach et al. |
| 2015/0288815 A1 | 10/2015 | Charugundla |
| 2015/0341486 A1* | 11/2015 | Knighton ............... G10L 15/26 455/414.1 |
| 2015/0358461 A1 | 12/2015 | Klaban |
| 2016/0012751 A1 | 1/2016 | Hirozawa |
| 2016/0119571 A1 | 4/2016 | Ko |
| 2016/0133251 A1 | 5/2016 | Kadirkamanathan et al. |
| 2016/0155435 A1 | 6/2016 | Mohideen |
| 2016/0179831 A1 | 6/2016 | Gruber et al. |
| 2016/0277709 A1 | 9/2016 | Stringham et al. |
| 2016/0295293 A1 | 10/2016 | McLaughlin |
| 2017/0085506 A1 | 3/2017 | Gordon |
| 2017/0178182 A1 | 6/2017 | Kuskey et al. |
| 2017/0187826 A1 | 6/2017 | Russell et al. |
| 2017/0187876 A1 | 6/2017 | Hayes et al. |
| 2017/0206808 A1 | 7/2017 | Engelke et al. |
| 2018/0013886 A1 | 1/2018 | Rae et al. |
| 2018/0081869 A1 | 3/2018 | Hager |
| 2018/0102130 A1 | 4/2018 | Holm et al. |
| 2018/0197545 A1 | 7/2018 | Willett et al. |
| 2018/0270350 A1 | 9/2018 | Engelke et al. |
| 2018/0315417 A1 | 11/2018 | Flaks et al. |
| 2019/0108834 A1* | 4/2019 | Nelson .................... G10L 15/22 |
| 2019/0295542 A1 | 9/2019 | Huang et al. |
| 2020/0143820 A1* | 5/2020 | Donofrio ................. G06F 3/167 |
| 2020/0364067 A1* | 11/2020 | Accame ................. G06F 9/453 |
| 2021/0210115 A1* | 7/2021 | Kothari ................ H04L 12/282 |
| 2021/0233530 A1* | 7/2021 | Thomson ............. G10L 15/187 |

FOREIGN PATENT DOCUMENTS

| | | |
|---|---|---|
| DE | 3410619 | 10/1985 |
| DE | 3632233 | 4/1988 |
| DE | 10328884 | 2/2005 |
| EP | 0016281 A1 | 10/1980 |
| EP | 0029246 A1 | 5/1981 |
| EP | 0651372 A2 | 5/1995 |
| EP | 0655158 A1 | 5/1995 |
| EP | 0664636 A2 | 7/1995 |
| EP | 0683483 A2 | 11/1995 |
| EP | 1039733 A2 | 9/2000 |
| EP | 1330046 A1 | 7/2003 |
| EP | 1486949 A1 | 12/2004 |
| EP | 2093974 A1 | 8/2009 |
| EP | 2373016 A2 | 10/2011 |
| FR | 2403697 A | 4/1979 |
| FR | 2432805 A | 2/1980 |
| FR | 2538978 A | 7/1984 |
| GB | 2183880 A | 6/1987 |
| GB | 2285895 A | 7/1995 |
| GB | 2327173 A | 1/1999 |
| GB | 2335109 A | 9/1999 |
| GB | 2339363 A | 1/2000 |
| GB | 2334177 B | 12/2002 |
| JP | S5544283 A | 3/1980 |
| JP | S5755649 A | 4/1982 |
| JP | S58134568 A | 8/1983 |
| JP | S60259058 A | 12/1985 |
| JP | S63198466 A | 8/1988 |
| JP | H04248596 A | 9/1992 |
| KR | 20050004503 A | 12/2005 |
| WO | 9323947 A1 | 11/1993 |
| WO | 9405006 A1 | 3/1994 |
| WO | 9500946 A1 | 1/1995 |
| WO | 9519086 A1 | 7/1995 |
| WO | 9750222 A1 | 12/1997 |
| WO | 9839901 A1 | 9/1998 |

(56) References Cited

FOREIGN PATENT DOCUMENTS

| | | |
|---|---|---|
| WO | 9913634 A1 | 3/1999 |
| WO | 9952237 A1 | 10/1999 |
| WO | 0049601 A1 | 8/2000 |
| WO | 0155914 A1 | 8/2001 |
| WO | 0158165 A2 | 8/2001 |
| WO | 0180079 A2 | 10/2001 |
| WO | 0225910 A2 | 3/2002 |
| WO | 02077971 A1 | 10/2002 |
| WO | 03026265 A1 | 3/2003 |
| WO | 03030018 A1 | 4/2003 |
| WO | 03071774 A1 | 8/2003 |
| WO | 2005081511 A1 | 9/2005 |
| WO | 2008053306 A2 | 5/2008 |
| WO | 2015131028 A1 | 9/2015 |
| WO | 2015148037 A1 | 10/2015 |

OTHER PUBLICATIONS

CaptionCall L.L.C. Petition for Inter Partes Review of Claims 1 and 2 of U.S. Pat. No. 6,233,314 Under 35 U.S.C. 311-319 and 37 C.F.R. 42.100 Et Seq., Aug. 30, 2013, 39 pages.
CaptionCall L.L.C. Petition for Inter Partes Review of Claims 1 and 2 of U.S. Pat. No. 6,594,346 Under 35 U.S.C. 311-319 and 37 C.F.R. 42.100 Et Seq., Aug. 30, 2013, 67 pages.
CaptionCall L.L.C. Petition for Inter Partes Review of Claims 1-15 of U.S. Pat. No. 5,909,482 Under 35 U.S.C. 311-319 and 37 C.F.R. 42.100 Et Seq., Aug. 30, 2013, 67 pages.
CaptionCall L.L.C. Petition for Inter Partes Review of Claims 7-11 of U.S. Pat. No. 8,213,578 Under 35 U.S.C. 311-319 and 37 C.F.R. 42.100 Et Seq., Aug. 30, 2013, 67 pages.
CaptionCall L.L.C. Petition for Inter Partes Review of Claims 1-8 of U.S. Pat. No. 6,603,835 Under 35 U.S.C. 311-319 and 37 C.F.R. 42.100 Et Seq., Aug. 30, 2013, 66 pages.
CaptionCall L.L.C. Petition for Inter Partes Review of Claims 1 of U.S. Pat. No. 7,003,082 Under 35 U.S.C. 311-319 and 37 C.F.R. 42.100 Et Seq., Aug. 30, 2013, 51 pages.
CaptionCall L.L.C. Petition for Inter Partes Review of Claims 1 and 2 of U.S. Pat. No. 7,319,740 Under 35 U.S.C. 311-319 and 37 C.F.R. 42.100 Et Seq., Aug. 30, 2013, 67 pages.
United States Patent and Trademark Office Before the Patent Trial and Appeal Board, Decision—Institution of Inter Partes Review, *CaptionCall LLC v. Ultratec Inc.*, Case IPR2013-00550, U.S. Pat. No. 7,003,082 B2, Mar. 5, 2014, 13 pages.
United States Patent and Trademark Office Before the Patent Trial and Appeal Board, Decision—Institution of Inter Partes Review, *CaptionCall LLC v. Ultratec Inc.*, Case IPR2013-00543, U.S. Pat. No. 7,555,104, Mar. 5, 2014, 16 pages.
United States Patent and Trademark Office Before the Patent Trial and Appeal Board, Decision—Institution of Inter Partes Review, *CaptionCall LLC v. Ultratec Inc.*, Case IPR2013-00540, U.S. Pat. No. 6,233,314, Mar. 5, 2014, 17 pages.
United States Patent and Trademark Office Before the Patent Trial and Appeal Board, Decision—Institution of Inter Partes Review, *CaptionCall LLC v. Ultratec Inc.*, Case IPR2013-00545, U.S. Pat. No. 6,594,346, Mar. 5, 2014, 21 pages.
United States Patent and Trademark Office Before the Patent Trial and Appeal Board, Decision—Institution of Inter Partes Review, *CaptionCall LLC v. Ultratec Inc.*, Case IPR2013-00541, U.S. Pat. No. 5,909,482, Mar. 5, 2014, 32 pages.
United States Patent and Trademark Office Before the Patent Trial and Appeal Board, Decision—Institution of Inter Partes Review, *CaptionCall LLC v. Ultratec Inc.*, Case IPR2013-00544, U.S. Pat. No. 8,213,578, Mar. 5, 2014, 22 pages.
United States Patent and Trademark Office Before the Patent Trial and Appeal Board, Decision—Institution of Inter Partes Review, *CaptionCall LLC v. Ultratec Inc.*, Case IPR2013-00542, U.S. Pat. No. 7,319,740, Mar. 5, 2014, 17 pages.
United States Patent and Trademark Office Before the Patent Trial and Appeal Board, Decision—Institution of Inter Partes Review, *CaptionCall LLC v. Ultratec Inc.*, Case IPR2013-00549, U.S. Pat. No. 6,603,835 B2, Mar. 5, 2014, 26 pages.
CaptionCall L.L.C. Petition for Inter Partes Review of Claims 6 and 8 of U.S. Pat. No. 6,603,835 Under 35 U.S.C. 311-319 and 37 C.F.R. 42.100 Et Seq., May 19, 2014, 67 pages.
CaptionCall L.L.C. Petition for Inter Partes Review of Claims 11-13 of U.S. Pat. No. 7,660,398 Under 35 U.S.C. 311-319 and 37 C.F.R. 42.100 Et Seq., Aug. 13, 2014, 64 pages.
Prosecution History of the U.S. Pat. No. 7,660,398, 489 pages.
Declaration of Benedict J. Occhiogrosso, In Re: U.S. Pat. No. 7,660,398, United States Patent and Trademark Office Before the Patent Trial and Appeal Board, Aug. 13, 2014, 62 pages.
Choi, et al., Employing Speech Recognition Through Common Telephone Equipment, IBM Technical Disclosure Bulletin, Dec. 1995, pp. 355-356.
Choi, et al., Splitting and Routing Audio Signals in Systems with Speech Recognition, IBM Technical Disclosure Bulletin, Dec. 1995, 38(12):503-504.
Cook, A First Course in Digital Electronics, Published by Prentice-Hall, Inc., 1999, pp. 692-693.
Cooper, R. J., Break Feature for Half-Duplex Modem, IBM Technical Disclosure Bulletin, vol. 17, No. 8, pp. 2386-2387, Jan. 1975.
De Gennaro, et al., (Cellular) Telephone Steno Captioning Service, IBM Technical Disclosure Bulletin, Jul. 1992, pp. 346-349.
Goodrich, et al., Engineering Education for Students with Disabilities: Technology, Research and Support, in Frontiers in Education Conference, 1993, 23rd Annual Conference 'Engineering Education: Renewing America's Technology' Proceedings, IEEE, pp. 92-97.
Gopalakrishnan, Effective Set-Up for Performing Phone Conversations by the Hearing Impaired, IBM Technical Disclosure Bulletin, vol. 34, No. 78, pp. 423-426, 1991.
IBM, Software Verification of Microcode Transfer Using Cyclic Redundancy Code Algorithm, IBM Technical Disclosure Bulletin, Dec. 1988, 31(7):149-153.
IBM, Use of Cyclic Redundancy Code for Testing ROM and RAM in a Writeable Control Store, IBM Technical Disclosure Bulletin, Nov. 1990, 33(6A):219-220.
Karjalainen, et al., Applications for the Hearing-Impaired: Evaluation of Finnish Phoneme Recognition Methods, Eurospeech, 1997, 4 pages.
Kitai, et al., Trends of ASR and Its Applications in Japan, Third IEEE Workshop on Interactive Voice Technology for Telecommunications Applications, 1996, pp. 21-24.
Kukich, Spelling Correction for the Telecommunications Network for the Deaf, Communications of the ACM, 1992, 35(5):80-90.
Makhoul, et al., State of the Art in Continuous Speech Recognition, Proc. Natl. Acad. Sci. USA, 1995, 92:9956-9963.
Microchip Technology, Inc., MCRF250, Contactless Programmable Passive RFID Device With Anti-Collision, 1998, DS21267C, pp. 1-12.
Moskowitz, Telocator Alphanumeric Protocol, Version 1.8, Feb. 4, 1997.
Oberteuffer, Commercial Applications of Speech Interface Technology: An Industry at the Threshold, Proc. Natl. Acad. Sci. USA, 1995, 92:10007-10010.
Osman-Allu, Telecommunication Interfaces for Deaf People, IEE Colloquium on Special Needs and the Interface, IET, 1993, pp. 811-814.
Paul, et al., The Design for the Wall Street Journal-based CSR Corpus, Proceedings of the Workshop on Speech and Natural Language, Association for Computational Linguistics, 1992, pp. 357-362.
Rabiner, et al., Fundamentals of Speech Recognition, Copyright 1993 by AT&T, Published by Prentice Hall PTR, pp. 1, 6-9, 284-285, 482-488.
Rabiner, Applications of Speech Recognition in the Area of Telecommunications, IEEE Workshop on Automatic Speech Recognition and Understanding, IEEE, 1997, pp. 501-510.
Schmitt, et al., An Experimental Study of Synthesized Speech Intelligibility Using Text Created by Telecommunication Device for the Deaf (TDD) Users, IEEE Global Telecommunications Conference & Exhibition, 1990, pp. 996-999.

(56) References Cited

OTHER PUBLICATIONS

Scott, Understanding Cyclic Redundancy Check, ACI Technical Support, Technical Note 99-11, 1999, 13 pages.
Seltzer, et al., Expediting the Turnaround of Radiology Reports in a Teaching Hospital Setting, AJR, 1997, 168:889-893.
Smith, R. L., ASCII to Baudot, Radio Electronics, pp. 51-58, Mar. 1976.
Supnik, et al., Can You Hear Me?—DragonDictate for Windows Minces Words for Your Office, Originally Published in Computer Counselor Column of the May 1995 Issue of the Los Angeles Lawyer Magazine, http://www.supnik.com/voice.htm, accessed Aug. 7, 2012.
Vaseghi, Chapter 14: Echo Cancellation, Advanced Digital Signal Processing and Noise Reduction, Second Edition, John Wiley & Sons, Ltd., 2000, pp. 396-415.
Wactlar, et al., Informedia(TM): News-On-Demand Experiments in Speech Recognition, Proceedings of ARPA Speech Recognition Workshop, 1996, pp. 18-21.
Wegmann, Final Technical Report on Phase I SBIR Study on "Semi-Automated Speech Transcription System" at Dragon Systems, Advanced Research Projects Agency Order No. 5916, 1994, 21 pages.
Williams, A Painless Guide to CRC Error Detection Algorithms, 1993, 35 pages.
Yamamoto, et al., Special Session (New Developments in Voice Recognition) (Invited Presentation), New Applications of Voice Recognition, Proceedings of the Acoustical Society of Japan, Spring 1996 Research Presentation Conference, pp. 33-36.
Young, A Review of Large-Vocabulary Continuous-Speech Recognition, IEEE Signal Processing Magazine, 1996, pp. 45-57.
Cyclic Redundancy Check, Source: http://utopia.knoware.nl/users/eprebel/Communication/CRC/index.html, 1998, 4 pages.
PCT International Search Report and Written Opinion, PCT/US2015/017954, dated Aug. 17, 2015, 15 pages.
Declaration of Benedict J. Occhiogrosso, In Re: U.S. Pat. No. 7,003,082, United States Patent and Trademark Office Before the Patent Trial and Appeal Board, Aug. 30, 2013.
Declaration of Benedict J. Occhiogrosso, In Re: U.S. Pat. No. 6,603,835, United States Patent and Trademark Office Before the Patent Trial and Appeal Board, Aug. 30, 2013.
Declaration of Benedict J. Occhiogrosso, In Re: U.S. Pat. No. 6,233,314, United States Patent and Trademark Office Before the Patent Trial and Appeal Board, Aug. 30, 2013.
Declaration of Benedict J. Occhiogrosso, In Re: U.S. Pat. No. 5,909,482, United States Patent and Trademark Office Before the Patent Trial and Appeal Board, Aug. 30, 2013.
Declaration of Benedict J. Occhiogrosso, In Re: U.S. Pat. No. 7,319,740, United States Patent and Trademark Office Before the Patent Trial and Appeal Board, Aug. 30, 2013.
Declaration of Benedict J. Occhiogrosso, In Re: U.S. Pat. No. 6,594,346, United States Patent and Trademark Office Before the Patent Trial and Appeal Board, Aug. 30, 2013.
Declaration of Benedict J. Occhiogrosso, In Re: U.S. Pat. No. 7,555,104, United States Patent and Trademark Office Before the Patent Trial and Appeal Board, Aug. 30, 2013.
Declaration of Benedict J. Occhiogrosso, In Re: U.S. Pat. No. 8,213,578, United States Patent and Trademark Office Before the Patent Trial and Appeal Board, Aug. 30, 2013.
Request for Rehearing Under 37 C.F.R. 42.71(d), In Re: U.S. Pat. No. 6,603,835, Case IPR2013-00549, United States Patent and Trademark Office Before the Patent Trial and Appeal Board, Mar. 19, 2014.
Patent Owner Response Under 37 C.F.R. 42.120 (to the Institution of Inter Partes Review), In Re: U.S. Pat. No. 6,594,346, Case IPR2013-00545, in the United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 7,003,082, Case IPR2013-00550, in the United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 7,555,104, Case IPR2013-00543, in the United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 7,319,740, Case IPR2013-00542, in the United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 6,603,835, Case IPR2013-00549, in the United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 8,213,578, Case IPR2013-00544, in the United States Patent and Trademark Office Before the Patent Trial and Appeal Board, May 30, 2014.
Patent Owner Response Under 37 C.F.R. 42.120 (to the Institution of Inter Partes Review), In Re: U.S. Pat. No. 5,909,482, Case IPR2013-00541, in the United States Patent and Trademark Office Before the Patent Trial and Appeal Board, May 30, 2014.
Patent Owner Response Under 37 C.F.R. 42.120 (to the Institution of Inter Partes Review), In Re: U.S. Pat. No. 6,233,314, Case IPR2013-00540, in the United States Patent and Trademark Office Before the Patent Trial and Appeal Board, May 30, 2014.
Declaration of Brenda Battat, In Re: U.S. Pat. No. 8,231,578, Case IPR2013-00544, in the United States Patent and Trademark Office Before the Patent Trial and Appeal Board, May 8, 2014.
Declaration of Constance Phelps, In Re: U.S. Pat. No. 6,233,314, Case IPR2013-00540, in the United States Patent and Trademark Office Before the Patent Trial and Appeal Board, May 9, 2014.
Declaration of Benedict J. Occhiogrosso, In Re: U.S. Pat. No. 6,603,835, United States Patent and Trademark Office Before the Patent Trial and Appeal Board, May 19, 2014.
Declaration of James A. Steel, Jr., In Re: U.S. Pat. No. 7,319,740, Case IPR2013-00542, United States Patent and Trademark Office Before the Patent Trial and Appeal Board, May 10, 2014.
Declaration of James A. Steel, Jr., In Re: U.S. Pat. No. 7,003,082, Case IPR2013-00550, United States Patent and Trademark Office Before the Patent Trial and Appeal Board, May 10, 2014.
Declaration of James A. Steel, Jr., In Re: U.S. Pat. No. 6,603,835, Case IPR2013-00549, United States Patent and Trademark Office Before the Patent Trial and Appeal Board, May 11, 2014.
Declaration of James A. Steel, Jr., In Re: U.S. Pat. No. 7,555,104, Case IPR2013-00543, United States Patent and Trademark Office Before the Patent Trial and Appeal Board, May 12, 2014.
CaptionCall L.L.C. Petition for Inter Partes Review of Claims 1-30 of U.S. Pat. No. 8,908,838 Under 35 U.S.C. 311-319 and 37 C.F.R. 42.100 Et Seq., Jan. 29, 2015, 67 pages.
Declaration of Benedict J. Occhiogrosso, In Re: U.S. Pat. No. 8,908,838, Case IPR2015-00637, in the United States Patent and Trademark Office Before the Patent Trial and Appeal Board, Jan. 28, 2015, 62 pages.
CaptionCall L.L.C. Petition for Inter Partes Review of Claims 1-29 of U.S. Pat. No. 8,917,822 Under 35 U.S.C. 311-319 and 37 C.F.R. 42.100 Et Seq., Jan. 29, 2015, 67 pages.
Declaration of Benedict J. Occhiogrosso, In Re: U.S. Pat. No. 8,917,822, Case IPR2015-00636, in the United States Patent and Trademark Office Before the Patent Trial and Appeal Board, Jan. 28, 2015, 65 pages.
In the United States Patent and Trademark Office Before the Patent Trial and Appeal Board, Decision—Institution of Inter Partes Review, *CaptionCall LLC* v. *Ultratec Inc.*, Case IPR2014-00780, U.S. Pat. No. 6,603,835, Dec. 4, 2014, 14 pages.
In the United States Patent and Trademark Office Before the Patent Trial and Appeal Board, Patent Owner Response Under 37 C.F.R. 42.120, *CaptionCall LLC* v. *Ultratec Inc.*, Case IPR2014-00780, U.S. Pat. No. 6,603,835, Feb. 11, 2015, 68 pages.
In the United States Patent and Trademark Office Before the Patent Trial and Appeal Board, Final Written Decision, *CaptionCall LLC* v. *Ultratec Inc.*, Case IPR2014-00540, U.S. Pat. No. 6,233,314, Mar. 3, 2015, 55 pages.

(56) References Cited

OTHER PUBLICATIONS

In the United States Patent and Trademark Office Before the Patent Trial and Appeal Board, Final Written Decision, *CaptionCall LLC v. Ultratec Inc.*, Case IPR2014-00541, U.S. Pat. No. 5,909,482, Mar. 3, 2015, 77 pages.
In the United States Patent and Trademark Office Before the Patent Trial and Appeal Board, Final Written Decision, *CaptionCall LLC v. Ultratec Inc.*, Case IPR2014-00542, U.S. Pat. No. 7,319,740, Mar. 3, 2015, 31 pages.
In the United States Patent and Trademark Office Before the Patent Trial and Appeal Board, Final Written Decision, *CaptionCall LLC v. Ultratec Inc.*, Case IPR2014-00543, U.S. Pat. No. 7,555,104, Mar. 3, 2015, 29 pages.
In the United States Patent and Trademark Office Before the Patent Trial and Appeal Board, Final Written Decision, *CaptionCall LLC v. Ultratec Inc.*, Case IPR2014-00544, U.S. Pat. No. 8,213,578, Mar. 3, 2015, 56 pages.
In the United States Patent and Trademark Office Before the Patent Trial and Appeal Board, Final Written Decision, *CaptionCall LLC v. Ultratec Inc.*, Case IPR2014-00545, U.S. Pat. No. 6,594,346, Mar. 3, 2015, 41 pages.
In the United States Patent and Trademark Office Before the Patent Trial and Appeal Board, Final Written Decision, *CaptionCall LLC v. Ultratec Inc.*, Case IPR2014-00549, U.S. Pat. No. 6,603,835, Mar. 3, 2015, 35 pages.
In the United States Patent and Trademark Office Before the Patent Trial and Appeal Board, Final Written Decision, *CaptionCall LLC v. Ultratec Inc.*, Case IPR2014-00550, U.S. Pat. No. 7,003,082, Mar. 3, 2015, 25 pages.
In the United States Patent and Trademark Office Before the Patent Trial and Appeal Board, Petition for Inter Partes Review of Claims 1-29 of U.S. Pat. No. 8,917,822, *CaptionCall LLC v. Ultratec Inc.*, Case IPR2015-00636, U.S. Pat. No. 8,917,822, Jan. 29, 2015, 67 pages.
In the United States Patent and Trademark Office Before the Patent Trial and Appeal Board, Patent Owner's Preliminary Response, *CaptionCall LLC v. Ultratec Inc.*, Case IPR2015-00636, U.S. Pat. No. 8,917,822, Jun. 9, 2015, 66 pages.
In the United States Patent and Trademark Office Before the Patent Trial and Appeal Board, Decision Instituting Review, *CaptionCall LLC v. Ultratec Inc.*, Case IPR2015-00636, U.S. Pat. No. 8,917,822, Sep. 8, 2015, 20 pages.
In the United States Patent and Trademark Office Before the Patent Trial and Appeal Board, Patent Owner Response, *CaptionCall LLC v. Ultratec Inc.*, Case IPR2015-00636, U.S. Pat. No. 8,917,822, Nov. 23, 2015, 65 pages.
In the United States Patent and Trademark Office Before the Patent Trial and Appeal Board, Patent Owner's Contingent Motion to Amend, *CaptionCall LLC v. Ultratec Inc.*, Case IPR2015-00636, U.S. Pat. No. 8,917,822, Nov. 23, 2015, 39 pages.
In the United States Patent and Trademark Office Before the Patent Trial and Appeal Board, Petitioner's Reply to Patent Owner Response, *CaptionCall LLC v. Ultratec Inc.*, Case IPR2015-00636, U.S. Pat. No. 8,917,822, Jan. 26, 2016, 29 pages.
In the United States Patent and Trademark Office Before the Patent Trial and Appeal Board, Petitioner's Opposition to Patent Owner's Contingent Motion to Amend, *CaptionCall LLC v. Ultratec Inc.*, Case IPR2015-00636, U.S. Pat. No. 8,917,822, Jan. 26, 2016, 28 pages.
Declaration of Benedict J. Occhiogrosso, In Re: U.S. Pat. No. 8,917,822, Case IPR2015-00636, in the United States Patent and Trademark Office Before the Patent Trial and Appeal Board, Jan. 29, 2015, 65 pages.
Supplemental Declaration of Benedict J. Occhiogrosso, In Re: U.S. Pat. No. 8,917,822, Case IPR2015-00636, in the United States Patent and Trademark Office Before the Patent Trial and Appeal Board, Jan. 26, 2016, 60 pages.
Declaration of Ivan Zatkovich, In Re: U.S. Pat. No. 8,917,822, Case IPR2015-00636, in the United States Patent and Trademark Office Before the Patent Trial and Appeal Board, Nov. 23, 2015, 108 pages.
Declaration of Paul Ludwick Regarding Secondary Considerations of Non-Obviousness, In Re: U.S. Pat. No. 8,917,822, Case IPR2015-00636, in the United States Patent and Trademark Office Before the Patent Trial and Appeal Board, Nov. 23, 2015, 37 pages.
Declaration of Brenda Battat Regarding Secondary Considerations of Non-Obviousness, In Re: U.S. Pat. No. 8,917,822, Case IPR2015-00636, in the United States Patent and Trademark Office Before the Patent Trial and Appeal Board, Nov. 23, 2015, 61 pages.
Declaration of Katie Kretschman, In Re: U.S. Pat. No. 8,917,822, Case IPR2015-00636, in the United States Patent and Trademark Office Before the Patent Trial and Appeal Board, Nov. 23, 2015, 5 pages.
In the United States Patent and Trademark Office Before the Patent Trial and Appeal Board, Petition for Inter Partes Review of Claims 1-30 of U.S. Pat. No. 8,908,838, *CaptionCall LLC v. Ultratec Inc.*, Case IPR2015-00637, U.S. Pat. No. 8,908,838, Jan. 29, 2015, 67 pages.
In the United States Patent and Trademark Office Before the Patent Trial and Appeal Board, Patent Owner's Preliminary Response, *CaptionCall LLC v. Ultratec Inc.*, Case IPR2015-00637, U.S. Pat. No. 8,908,838, Jun. 9, 2015, 65 pages.
In the United States Patent and Trademark Office Before the Patent Trial and Appeal Board, Decision Instituting Review, *CaptionCall LLC v. Ultratec Inc.*, Case IPR2015-00637, U.S. Pat. No. 8,908,838, Sep. 8, 2015, 25 pages.
In the United States Patent and Trademark Office Before the Patent Trial and Appeal Board, Patent Owner Response, *CaptionCall LLC v. Ultratec Inc.*, Case IPR2015-00637, U.S. Pat. No. 8,908,838, Nov. 23, 2015, 65 pages.
In the United States Patent and Trademark Office Before the Patent Trial and Appeal Board, Patent Owner's Contingent Motion to Amend, *CaptionCall LLC v. Ultratec Inc.*, Case IPR2015-00637, U.S. Pat. No. 8,908,838, Nov. 23, 2015, 38 pages.
In the United States Patent and Trademark Office Before the Patent Trial and Appeal Board, Petitioner's Reply to Patent Owner Response, *CaptionCall LLC v. Ultratec Inc.*, Case IPR2015-00637, U.S. Pat. No. 8,908,838, Jan. 26, 2016, 29 pages.
In the United States Patent and Trademark Office Before the Patent Trial and Appeal Board, Petitioner's Opposition to Patent Owner's Contingent Motion to Amend, *CaptionCall LLC v. Ultratec Inc.*, Case IPR2015-00637, U.S. Pat. No. 8,908,838, Jan. 26, 2016, 28 pages.
Declaration of Benedict J. Occhiogrosso, In Re: U.S. Pat. No. 8,908,838, Case IPR2015-00637, in the United States Patent and Trademark Office Before the Patent Trial and Appeal Board, Jan. 29, 2015, 62 pages.
Supplemental Declaration of Benedict J. Occhiogrosso, In Re: U.S. Pat. No. 8,908,838, Case IPR2015-00637, in the United States Patent and Trademark Office Before the Patent Trial and Appeal Board, Jan. 26, 2016, 62 pages.
Declaration of Ivan Zatkovich, In Re: U.S. Pat. No. 8,908,838, Case IPR2015-00637, in the United States Patent and Trademark Office Before the Patent Trial and Appeal Board, Nov. 23, 2015, 110 pages.
Declaration of Paul Ludwick Regarding Secondary Considerations of Non-Obviousness, In Re: U.S. Pat. No. 8,908,838, Case IPR2015-00637, in the United States Patent and Trademark Office Before the Patent Trial and Appeal Board, Nov. 23, 2015, 37 pages.
Declaration of Brenda Battat Regarding Secondary Considerations of Non-Obviousness, In Re: U.S. Pat. No. 8,908,838, Case IPR2015-00637, in the United States Patent and Trademark Office Before the Patent Trial and Appeal Board, Nov. 24, 2015, 61 pages.
Declaration of Katie Kretschman, In Re: U.S. Pat. No. 8,908,838, Case IPR2015-00637, in the United States Patent and Trademark Office Before the Patent Trial and Appeal Board, Nov. 23, 2015, 5 pages.
In the United States Patent and Trademark Office Before the Patent Trial and Appeal Board, Petition for Inter Partes Review of Claims 1-74 of U.S. Pat. No. 9,131,045, *CaptionCall LLC v. Ultratec Inc.*, Case IPR2015-01889, U.S. Pat. No. 9,131,045, Sep. 9, 2015, 66 pages.
In the United States Patent and Trademark Office Before the Patent Trial and Appeal Board, Patent Owner's Preliminary Response,

(56) References Cited

OTHER PUBLICATIONS

*CaptionCall LLC* v. *Ultratec Inc.*, Case IPR2015-01889, U.S. Pat. No. 9,131,045, Dec. 18, 2015, 26 pages.
Declaration of Benedict J. Occhiogrosso, In Re: U.S. Pat. No. 9,131,045, Case IPR2015-01889, in the United States Patent and Trademark Office Before the Patent Trial and Appeal Board, Sep. 9, 2015, 63 pages.
In the United States Patent and Trademark Office Before the Patent Trial and Appeal Board, Petition for Inter Partes Review of Claims 1-18 of U.S. Pat. No. 5,974,116, *CaptionCall LLC* v. *Ultratec Inc.*, Case IPR2015-01355, U.S. Pat. No. 5,974,116, Jun. 8, 2015, 65 pages.
In the United States Patent and Trademark Office Before the Patent Trial and Appeal Board, Patent Owner's Preliminary Response, *CaptionCall LLC* v. *Ultratec Inc.*, Case IPR2015-01355, U.S. Pat. No. 5,974,116, Sep. 18, 2015, 43 pages.
In the United States Patent and Trademark Office Before the Patent Trial and Appeal Board, Decision Instituting Review, *CaptionCall LLC* v. *Ultratec Inc.*, Case IPR2015-01355, U.S. Pat. No. 5,974,116, Dec. 16, 2015, 34 pages.
Declaration of Benedict J. Occhiogrosso, In Re: U.S. Pat. No. 5,974,116, Case IPR2015-001355, in the United States Patent and Trademark Office Before the Patent Trial and Appeal Board, Jun. 8, 2015, 45 pages.
In the United States Patent and Trademark Office Before the Patent Trial and Appeal Board, Petition for Inter Partes Review of Claim 1 of U.S. Pat. No. 6,934,366, *CaptionCall LLC* v. *Ultratec Inc.*, Case IPR2015-01357, U.S. Pat. No. 6,934,366, Jun. 8, 2015, 65 pages.
In the United States Patent and Trademark Office Before the Patent Trial and Appeal Board, Patent Owner's Preliminary Response, *CaptionCall LLC* v. *Ultratec Inc.*, Case IPR2015-01357, U.S. Pat. No. 6,934,366, Sep. 22, 2015, 37 pages.
In the United States Patent and Trademark Office Before the Patent Trial and Appeal Board, Decision Instituting Review, *CaptionCall LLC* v. *Ultratec Inc.*, Case IPR2015-01357, U.S. Pat. No. 6,934,366, Dec. 18, 2015, 16 pages.
Declaration of Benedict J. Occhiogrosso, In Re: U.S. Pat. No. 6,934,366, Case IPR2015-001357, in the United States Patent and Trademark Office Before the Patent Trial and Appeal Board, Jun. 8, 2015, 46 pages.
In the United States Patent and Trademark Office Before the Patent Trial and Appeal Board, Petition for Inter Partes Review of Claim 1 of U.S. Pat. No. 7,006,604, *CaptionCall LLC* v. *Ultratec Inc.*, Case IPR2015-01358, U.S. Pat. No. 7,006,604, Jun. 8, 2015, 65 pages.
In the United States Patent and Trademark Office Before the Patent Trial and Appeal Board, Patent Owner's Preliminary Response, *CaptionCall LLC* v. *Ultratec Inc.*, Case IPR2015-01358, U.S. Pat. No. 7,006,604, Sep. 22, 2015, 34 pages.
In the United States Patent and Trademark Office Before the Patent Trial and Appeal Board, Decision Instituting Review, *CaptionCall LLC* v. *Ultratec Inc.*, Case IPR2015-01358, U.S. Pat. No. 7,006,604, Dec. 18, 2015, 12 pages.
Declaration of Benedict J. Occhiogrosso, In Re: U.S. Pat. No. 7,006,604, Case IPR2015-001358, in the United States Patent and Trademark Office Before the Patent Trial and Appeal Board, Jun. 8, 2015, 45 pages.
In the United States Patent and Trademark Office Before the Patent Trial and Appeal Board, Petition for Inter Partes Review of Claims 1-3 and 5-7 of U.S. Pat. No. 6,493,426, *CaptionCall LLC* v. *Ultratec Inc.*, Case IPR2015-01359, U.S. Pat. No. 6,493,426, Jun. 8, 2015, 65 pages.
In the United States Patent and Trademark Office Before the Patent Trial and Appeal Board, Patent Owner's Preliminary Response, *CaptionCall LLC* v. *Ultratec Inc.*, Case IPR2015-01359, U.S. Pat. No. 6,493,426, Sep. 22, 2015, 40 pages.
In the United States Patent and Trademark Office Before the Patent Trial and Appeal Board, Decision Instituting Review, *CaptionCall LLC* v. *Ultratec Inc.*, Case IPR2015-01359, U.S. Pat. No. 6,493,426, Dec. 18, 2015, 17 pages.
Declaration of Benedict J. Occhiogrosso, In Re: U.S. Pat. No. 6,493,426, Case IPR2015-001359, in the United States Patent and Trademark Office Before the Patent Trial and Appeal Board, Jun. 8, 2015, 47 pages.
In the United States Patent and Trademark Office Before the Patent Trial and Appeal Board, Petition for Inter Partes Review of Claims 1-4 of U.S. Pat. No. 8,515,024, *CaptionCall LLC* v. *Ultratec Inc.*, Case IPR2015-01885, U.S. Pat. No. 8,515,024, Sep. 8, 2015, 35 pages.
In the United States Patent and Trademark Office Before the Patent Trial and Appeal Board, Patent Owner's Preliminary Response, *CaptionCall LLC* v. *Ultratec Inc.*, Case IPR2015-01885, U.S. Pat. No. 8,515,024, Dec. 17, 2015, 25 pages.
Declaration of Benedict J. Occhiogrosso, In Re: U.S. Pat. No. 8,515,024, Case IPR2015-01885, in the United States Patent and Trademark Office Before the Patent Trial and Appeal Board, Sep. 8, 2015, 23 pages.
In the United States Patent and Trademark Office Before the Patent Trial and Appeal Board, Petition for Inter Partes Review of Claims 1, 3, 6, 9-11, 13, 15, 19-23, 25-27, 34, and 36-38 of U.S. Pat. No. 7,881,441, *CaptionCall LLC* v. *Ultratec Inc.*, Case IPR2015-01886, U.S. Pat. No. 7,881,441, Sep. 8, 2015, 61 pages.
Declaration of Benedict J. Occhiogrosso, In Re: U.S. Pat. No. 7,881,441, Case IPR2015-01886, in the United States Patent and Trademark Office Before the Patent Trial and Appeal Board, Sep. 8, 2015, 29 pages.
In the United States Patent and Trademark Office Before the Patent Trial and Appeal Board, Petitioner's Reply to Patent Owner's Response, *CaptionCall LLC* v. *Ultratec Inc.*, Case IPR2014-00780, U.S. Pat. No. 6,603,835, Apr. 20, 2015, 30 pages.
In the United States Patent and Trademark Office Before the Patent Trial and Appeal Board, Final Written Decision, *CaptionCall LLC* v. *Ultratec Inc.*, Case IPR2014-00780, U.S. Pat. No. 6,603,835, Dec. 1, 2015, 56 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2014-00780, U.S. Pat. No. 6,603,835, Dec. 31, 2015, 20 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2013-00540, U.S. Pat. No. 6,233,314, Apr. 2, 2015, 19 pages.
In the United States Patent and Trademark Office Before the Patent Trial and Appeal Board, Decision Denying Patent Owner's Request for Rehearing, *CaptionCall LLC* v. *Ultratec Inc.*, Case IPR2013-00540, U.S. Pat. No. 6,233,314, Dec. 1, 2015, 18 pages.
In the United States Patent and Trademark Office Before the Patent Trial and Appeal Board, Patent Owner's Notice of Appeal, *CaptionCall LLC* v. *Ultratec Inc.*, Case IPR2013-00540, U.S. Pat. No. 6,233,314, Feb. 2, 2016, 19 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2013-00541, U.S. Pat. No. 5,909,482, Apr. 2, 2015, 19 pages.
In the United States Patent and Trademark Office Before the Patent Trial and Appeal Board, Decision Denying Patent Owner's Request for Rehearing, *CaptionCall LLC* v. *Ultratec Inc.*, Case IPR2013-00541, U.S. Pat. No. 5,909,482, Dec. 1, 2015, 18 pages.
In the United States Patent and Trademark Office Before the Patent Trial and Appeal Board, Patent Owner's Notice of Appeal, *CaptionCall LLC* v. *Ultratec Inc.*, Case IPR2013-00541, U.S. Pat. No. 5,909,482, Feb. 2, 2016, 19 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2013-00542, U.S. Pat. No. 7,319,470, Apr. 2, 2015, 19 pages.
In the United States Patent and Trademark Office Before the Patent Trial and Appeal Board, Decision Denying Patent Owner's Request

(56) References Cited

OTHER PUBLICATIONS for Rehearing, *CaptionCall LLC* v. *Ultratec Inc.*, Case IPR2013-00542, U.S. Pat. No. 7,319,470, Dec. 1, 2015, 15 pages.
In the United States Patent and Trademark Office Before the Patent Trial and Appeal Board, Patent Owner's Notice of Appeal, *CaptionCall LLC* v. *Ultratec Inc.*, Case IPR2013-00542, U.S. Pat. No. 7,319,470, Feb. 2, 2016, 12 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2013-00543, U.S. Pat. No. 7,555,104, Apr. 2, 2015, 19 pages.
In the United States Patent and Trademark Office Before the Patent Trial and Appeal Board, Decision Denying Patent Owner's Request for Rehearing, *CaptionCall LLC* v. *Ultratec Inc.*, Case IPR2013-00543, U.S. Pat. No. 7,555,104, Dec. 1, 2015, 15 pages.
In the United States Patent and Trademark Office Before the Patent Trial and Appeal Board, Patent Owner's Notice of Appeal, *CaptionCall LLC* v. *Ultratec Inc.*, Case IPR2013-00543, U.S. Pat. No. 7,555,104, Feb. 2, 2016, 11 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2013-00544, U.S. Pat. No. 8,213,578, Apr. 2, 2015, 19 pages.
In the United States Patent and Trademark Office Before the Patent Trial and Appeal Board, Decision Denying Patent Owner's Request for Rehearing, *CaptionCall LLC* v. *Ultratec Inc.*, Case IPR2013-00544, U.S. Pat. No. 8,213,578, Dec. 1, 2015, 19 pages.
In the United States Patent and Trademark Office Before the Patent Trial and Appeal Board, Patent Owner's Notice of Appeal, *CaptionCall LLC* v. *Ultratec Inc.*, Case IPR2013-00544, U.S. Pat. No. 8,213,578, Feb. 2, 2016, 11 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2013-00545, U.S. Pat. No. 6,594,346, Apr. 2, 2015, 16 pages.
In the United States Patent and Trademark Office Before the Patent Trial and Appeal Board, Decision Denying Patent Owner's Request for Rehearing, *CaptionCall LLC* v. *Ultratec Inc.*, Case IPR2013-00545, U.S. Pat. No. 6,594,346, Dec. 1, 2015, 15 pages.
In the United States Patent and Trademark Office Before the Patent Trial and Appeal Board, Patent Owner's Notice of Appeal, *CaptionCall LLC* v. *Ultratec Inc.*, Case IPR2013-00545, U.S. Pat. No. 6,594,346, Feb. 2, 2016, 11 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2013-00549, U.S. Pat. No. 6,603,835, Apr. 2, 2015, 19 pages.
In the United States Patent and Trademark Office Before the Patent Trial and Appeal Board, Decision Denying Patent Owner's Request for Rehearing, *CaptionCall LLC* v. *Ultratec Inc.*, Case IPR2013-00549, U.S. Pat. No. 6,603,835, Dec. 1, 2015, 15 pages.
In the United States Patent and Trademark Office Before the Patent Trial and Appeal Board, Patent Owner's Notice of Appeal, *CaptionCall LLC* v. *Ultratec Inc.*, Case IPR2013-00549, U.S. Pat. No. 6,603,835, Feb. 2, 2016, 11 pages.
In the United States Patent and Trademark Office Before the Patent Trial and Appeal Board, Patent Owner's Request for Rehearing by Expanded Panel, *CaptionCall LLC* v. *Ultratec Inc.*, Case IPR2013-00550, U.S. Pat. No. 7,003,082, Apr. 2, 2015, 19 pages.
In the United States Patent and Trademark Office Before the Patent Trial and Appeal Board, Decision Denying Patent Owner's Request for Rehearing, *CaptionCall LLC* v. *Ultratec Inc.*, Case IPR2013-00550, U.S. Pat. No. 7,003,082, Dec. 1, 2015, 10 pages.
In the United States Patent and Trademark Office Before the Patent Trial and Appeal Board, Patent Owner's Notice of Appeal, *CaptionCall LLC* v. *Ultratec Inc.*, Case IPR2013-00550, U.S. Pat. No. 7,003,082, Feb. 2, 2016, 11 pages.
In the United States Patent and Trademark Office Before the Patent Trial and Appeal Board, Decision Denying Institution of Inter Partes Review, *CaptionCall LLC* v. *Ultratec Inc.*, Case IPR2014-01287, U.S. Pat. No. 7,660,398, Feb. 12, 2015, 15 pages.
In the United States Patent and Trademark Office Before the Patent Trial and Appeal Board, Request for Rehearing, *CaptionCall LLC* v. *Ultratec Inc.*, Case IPR2014-01287, U.S. Pat. No. 7,660,398, Mar. 13, 2015, 18 pages.
In the United States Patent and Trademark Office Before the Patent Trial and Appeal Board, Decision Denying Request for Rehearing, *CaptionCall LLC* v. *Ultratec Inc.*, Case IPR2014-01287, U.S. Pat. No. 7,660,398, Nov. 5, 2015, 7 pages.
Petition for Inter Partes Review for U.S. Pat. No. 10,469,660, *CaptionCall, LLC* v. *Ultratec, Inc.*, United States Patent and Trademark Office Before the Patent Trial and Appeal Board, Jul. 1, 2020, 68 pages.
Declaration of Benedict J. Occhiogrosso for U.S. Pat. No. 10,469,660, *CaptionCall, LLC* v. *Ultratec, Inc.*, United States Patent and Trademark Office Before the Patent Trial and Appeal Board, Jun. 23, 2020, 113 pages.
U.S. Appl. No. 60/562,795 to McLaughlin et al., filed Apr. 16, 2004, 126 pages.
Blackberry, RIM Introduces New Color BlackBerry Handheld for CDMA2000 1X Wireless Networks, BlackBerry Press Release, Mar. 22, 2004, 2 pages.
BLACKBERRY Wireless Handheld User Guide, 7750, Mar. 16, 2004, 144 pages.
Federal Communications Commission, Telecommunication Relay Services and Speech-to-Speech Services for Individuals With Hearing and Speech Disabilities, 68 Fed. Reg. 50973-50978 (Aug. 25, 2003).
PhoneDb, RIM BlackBerry 7750 Device Specs, Copyright 2006-2020 PhoneDB, 6 pages.
Phonesdata, Nokia 6620 Specs, Review, Opinions, Comparisons, Copyright 2020, 9 pages.
Sundgot, Nokia Unveils the 6600, InfoSync World, Jun. 16, 2003, 2 pages.
Wikipedia, Dell Axim, https://en.wikipedia.org/wiki/Dell_Axim, Last Edited on Feb. 23, 2020, 4 pages.
Wikipedia, Palm Tungsten, https://en.wikipedia.org/wiki/Palm_Tungsten, Last Edited on Oct. 6, 2019, 10 pages.
Final Written Decision, U.S. Pat. No. 9,131,045, Case IPR2015-01889, *CaptionCall, LLC* v. *Ultratec, Inc.*, United States Patent and Trademark Office Before the Patent Trial and Appeal Board, Apr. 11, 2017, 118 pages.
Judgment, U.S. Pat. No. 7,881,441, Case IPR2015-01886, *CaptionCall, LLC* v. *Ultratec, Inc.*, United States Patent and Trademark Office Before the Patent Trial and Appeal Board, Jun. 9, 2016, 4 pages.
Petition for Inter Partes Review for U.S. Pat. No. 10,491,746, *CaptionCall, LLC* v. *Ultratec, Inc.*, United States Patent and Trademark Office Before the Patent Trial and Appeal Board, Jul. 1, 2020, 61 pages.
Declaration of Benedict J. Occhiogrosso for U.S. Pat. No. 10,491,746, *CaptionCall, LLC* v. *Ultratec, Inc.*, United States Patent and Trademark Office Before the Patent Trial and Appeal Board, Jun. 23, 2020, 79 pages.
Arlinger, Negative Consequences of Uncorrected Hearing Loss—A Review, International Journal of Audiology, 2003, 42:2S17-2S20.
Petition for Inter Partes Review for U.S. Pat. No. 10,587,751, *CaptionCall, LLC* v. *Ultratec, Inc.*, United States Patent and Trademark Office Before the Patent Trial and Appeal Board, Jul. 1, 2020, 64 pages.
Declaration of Benedict J. Occhiogrosso for U.S. Pat. No. 10,587,751, *CaptionCall, LLC* v. *Ultratec, Inc.*, United States Patent and Trademark Office Before the Patent Trial and Appeal Board, Jun. 23, 2020, 106 pages.
Curtis et al., Doctor-Patient Communication on the Telephone, Can Fam Physician, 1989, 35:123-128.
United States Patent and Trademark Office Before the Patent Trial and Appeal Board, Decision Denying Institution of Inter Partes Review, *CaptionCall LLC* v. *Ultratec Inc.*, Case IPR2020-01215, U.S. Pat. No. 10,469,660, Jan. 27, 2021, 24 pages.
United States Patent and Trademark Office Before the Patent Trial and Appeal Board, Petitioner's Request for Rehearing Pursuant to

(56) References Cited

OTHER PUBLICATIONS

37 C.F.R. 42.71(d), *CaptionCall LLC* v. *Ultratec Inc.*, Case IPR2020-01215, U.S. Pat. No. 10,469,660, Feb. 18, 2021, 19 pages.
Declaration of Paul W. Ludwick, In Re: U.S. Pat. No. 6,594,346, Case IPR2013-00545, in the United States Patent and Trademark Office Before the Patent Trial and Appeal Board, May 11, 2014.
Declaration of Paul W. Ludwick, In Re: U.S. Pat. No. 7,555,104, Case IPR2013-00542 and IPR2013-00543, in the United States Patent and Trademark Office Before the Patent Trial and Appeal Board, May 12, 2014.
Declaration of Paul W. Ludwick, In Re: U.S. Pat. No. 7,319,740, Case IPR2013-00542 and IPR2013-00543, in the United States Patent and Trademark Office Before the Patent Trial and Appeal Board, May 12, 2014.
Declaration of Paul W. Ludwick, In Re: U.S. Pat. No. 6,233,314, Case IPR2013-00540, in the United States Patent and Trademark Office Before the Patent Trial and Appeal Board, May 30, 2014.
Declaration of Paul W. Ludwick, In Re: U.S. Pat. No. 5,909,482, Case IPR2013-00541, in the United States Patent and Trademark Office Before the Patent Trial and Appeal Board, May 30, 2014.
Declaration of Paul W. Ludwick, In Re: U.S. Pat. No. 8,213,578, Case IPR2013-00544, in the United States Patent and Trademark Office Before the Patent Trial and Appeal Board, May 30, 2014.
Declaration of Paul W. Ludwick Regarding Secondary Considerations of Non-Obviousness, In Re: U.S. Pat. No. 7,555,104, Case IPR2013-00543, in the United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 7,319,740, Case IPR2013-00542, in the United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 6,603,835, Case IPR2013-00545, in the United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 6,594,346, Case IPR2013-00545, in the United States Patent and Trademark Office Before the Patent Trial and Appeal Board, May 12, 2014.
Declaration of Paul W. Ludwick Regarding Secondary Considerations of Non-Obviousness, In Re: U.S. Pat. No. 6,233,314, Case IPR2013-00540, in the United States Patent and Trademark Office Before the Patent Trial and Appeal Board, May 30, 2014.
Declaration of Paul W. Ludwick Regarding Secondary Considerations of Non-Obviousness, In Re: U.S. Pat. No. 5,909,482, Case IPR2013-00541, in the United States Patent and Trademark Office Before the Patent Trial and Appeal Board, May 30, 2014.
Declaration of Paul W. Ludwick Regarding Secondary Considerations of Non-Obviousness, In Re: U.S. Pat. No. 8,213,578, Case IPR2013-00544, in the United States Patent and Trademark Office Before the Patent Trial and Appeal Board, May 30, 2014.
Declaration of Kelby Brick, Esq., CDI, In Re: U.S. Pat. No. 7,555,104, Case IPR2013-00543, in the United States Patent and Trademark Office Before the Patent Trial and Appeal Board, Jul. 7, 2014.
Supplemental Declaration of Benedict J. Occhiogrosso, In Re: U.S. Pat. No. 7,003,082, Case IPR2013-00550, in the United States Patent and Trademark Office Before the Patent Trial and Appeal Board, Jul. 7, 2014.
Supplemental Declaration of Benedict J. Occhiogrosso, In Re: U.S. Pat. No. 7,555,104, Case IPR2013-00543, in the United States Patent and Trademark Office Before the Patent Trial and Appeal Board, Jul. 7, 2014.
Supplemental Declaration of Benedict J. Occhiogrosso, In Re: U.S. Pat. No. 6,594,346, Case IPR2013-00545, in the United States Patent and Trademark Office Before the Patent Trial and Appeal Board, Jul. 7, 2014.
Supplemental Declaration of Benedict J. Occhiogrosso, In Re: U.S. Pat. No. 6,603,835, Case IPR2013-00549, in the United States Patent and Trademark Office Before the Patent Trial and Appeal Board, Jul. 7, 2014.
Supplemental Declaration of Benedict J. Occhiogrosso, In Re: U.S. Pat. No. 7,319,740, Case IPR2013-00542, in the United States Patent and Trademark Office Before the Patent Trial and Appeal Board, Jul. 7, 2014.
Supplemental Declaration of Benedict J. Occhiogrosso, In Re: U.S. Pat. No. 6,233,314, Case IPR2013-00540, in the United States Patent and Trademark Office Before the Patent Trial and Appeal Board, Jul. 7, 2014.
Supplemental Declaration of Benedict J. Occhiogrosso, In Re: U.S. Pat. No. 5,909,482, Case IPR2013-00541, in the United States Patent and Trademark Office Before the Patent Trial and Appeal Board, Jul. 7, 2014.
Supplemental Declaration of Benedict J. Occhiogrosso, In Re: U.S. Pat. No. 8,213,578, Case IPR2013-00544, in the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 7,003,082, Case IPR2013-00550, in the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 6,594,346, Case IPR2013-00545, in the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 8,213,578, Case IPR2013-00544, in the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 7,555,104, Case IPR2013-00543, in the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 5,909,482, Case IPR2013-00541, in the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 7,319,740, Case IPR2013-00542, in the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 6,233,314, Case IPR2013-00540, in the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 6,603,835, Case IPR2013-00549, in the United States Patent and Trademark Office Before the Patent Trial and Appeal Board, Jul. 7, 2014.
Decision, CaptionCall's Request for Rehearing, In Re: U.S. Pat. No. 6,603,835, Case IPR2013-00549, in the United States Patent and Trademark Office Before the Patent Trial and Appeal Board, Apr. 28, 2014.
In the United States Patent and Trademark Office Before the Patent Trial and Appeal Board, Petition for Inter Partes Review of U.S. Pat. No. 10,742,805, *CaptionCall LLC* v. *Ultratec Inc.*, Case IPR2021-01337, Aug. 24, 2021, 65 pages.
In the United States Patent and Trademark Office Before the Patent Trial and Appeal Board, Declaration of Benedict J. Occhiogrosso, Re: U.S. Pat. No. 10,742,805, *CaptionCall LLC* v. *Ultratec Inc.*, Case No. to be Assigned, Jul. 29, 2021, 83 pages.
Rodman, The Effect of Bandwidth on Speech Intelligibility, White Paper, Jan. 16, 2003, Copyright 2003 Polycom, Inc., 9 pages.
In the United States Patent and Trademark Office Before the Patent Trial and Appeal Board, Decision Granting Institution of Inter Partes Review of U.S. Pat. No. 10,587,751, *CaptionCall LLC* v. *Ultratec Inc.*, Case IPR2020-01217, Jan. 27, 2021, 24 pages.
In the United States Patent and Trademark Office Before the Patent Trial and Appeal Board, Judgment Granting Request for Entry of

(56) References Cited

OTHER PUBLICATIONS

Adverse Judgment After Institution of Trial, U.S. Pat. No. 10,587,751, *CaptionCall LLC* v. *Ultratec Inc.*, Case IPR2020-01217, Apr. 28, 2021, 3 pages.
In the United States Patent and Trademark Office Before the Patent Trial and Appeal Board, Decision Denying Institution of Inter Partes Review, U.S. Pat. No. 10,491,746, *CaptionCall LLC* v. *Ultratec Inc.*, Case IPR2020-01216, Jan. 27, 2021, 22 pages.

\* cited by examiner

SEMIAUTOMATED RELAY METHOD AND APPARATUS

CROSS-REFERENCE TO RELATED APPLICATIONS

This application is a continuation of U.S. patent application Ser. No. 16/537,196, filed on Aug. 9, 2019, and titled "SEMIAUTOMATED RELAY METHOD AND APPARATUS," which is a continuation of U.S. patent application Ser. No. 15/729,069, filed on Oct. 10, 2017, and titled "SEMIAUTOMATED RELAY METHOD AND APPARATUS," which is a continuation-in-part of U.S. patent application Ser. No. 15/171,720, filed on Jun. 2, 2016, issued as U.S. Pat. No. 10,748,523 on Aug. 18, 2020, and titled "SEMIAUTOMATED RELAY METHOD AND APPARATUS," which is a continuation-in-part of U.S. patent application Ser. No. 14/953,631, filed on Nov. 30, 2015, and titled "SEMIAUTOMATED RELAY METHOD AND APPARATUS," which is a continuation-in-part of U.S. patent application Ser. No. 14/632,257, filed on Feb. 26, 2015, issued as U.S. Pat. No. 10,389,876 on Aug. 20, 2019, and titled "SEMIAUTOMATED RELAY METHOD AND APPARATUS," which claims the benefit of priority to U.S. provisional patent application Ser. No. 61/946,072, filed on Feb. 28, 2014, and titled "SEMIAUTOMATED RELAY METHOD AND APPARATUS," each of which is incorporated herein in its entirety by reference. This application claims priority to each of the above references applications.

STATEMENT REGARDING FEDERALLY SPONSORED RESEARCH OR DEVELOPMENT

Not applicable.

BACKGROUND OF THE DISCLOSURE

The present invention relates to relay systems for providing voice-to-text captioning for hearing impaired users and more specifically to a relay system that uses automated voice-to-text captioning software to transcribe voice-to-text.

Many people have at least some degree of hearing loss. For instance, in the United states, about 3 out of every 1000 people are functionally deaf and about 17 percent (36 million) of American adults report some degree of hearing loss which typically gets worse as people age. Many people with hearing loss have developed ways to cope with the ways their loss effects their ability to communicate. For instance, many deaf people have learned to use their sight to compensate for hearing loss by either communicating via sign language or by reading another person's lips as they speak.

When it comes to remotely communicating using a telephone, unfortunately, there is no way for a hearing impaired person (e.g., an assisted user (AU)) to use sight to compensate for hearing loss as conventional telephones do not enable an assisted user to see a person on the other end of the line (e.g., no lip reading or sign viewing). For persons with only partial hearing impairment, some simply turn up the volume on their telephones to try to compensate for their loss and can make do in most cases. For others with more severe hearing loss conventional telephones cannot compensate for their loss and telephone communication is a poor option.

An industry has evolved for providing communication services to assisted users whereby voice communications from a person linked to an assisted user's communication device are transcribed into text and displayed on an electronic display screen for the assisted user to read during a communication session. In many cases the assisted user's device will also broadcast the linked person's voice substantially simultaneously as the text is displayed so that an assisted user that has some ability to hear can use their hearing sense to discern most phrases and can refer to the text when some part of a communication is not understandable from what was heard.

U.S. Pat. No. 6,603,835 (hereinafter "the '835 patent) titled "System For Text Assisted Telephony" teaches several different types of relay systems for providing text captioning services to assisted users. One captioning service type is referred to as a single line system where a relay is linked between an AU's device and a telephone used by the person communicating with the AU. Hereinafter, unless indicated otherwise the other person communicating with the assisted user will be referred to as a hearing user (HU) even though the AU may in fact be communicating with another assisted user. In single line systems, one line links an HU device to the relay and one line (e.g., the single line) links the relay to the AU device. Voice from the HU is presented to a relay call assistant (CA) who transcribes the voice-to-text and then the text is transmitted to the AU device to be displayed. The HU's voice is also, in at least some cases, carried or passed through the relay to the AU device to be broadcast to the AU.

The other captioning service type described in the '835 patent is a two line system. In a two line system a hearing user's telephone is directly linked to an assisted user's device for voice communications between the AU and the HU. When captioning is required, the AU can select a captioning control button on the AU device to link to the relay and provide the HU's voice to the relay on a first line. Again, a relay CA listens to the HU voice message and transcribes the voice message into text which is transmitted back to the AU device on a second line to be displayed to the AU. One of the primary advantages of the two line system over one line systems is that the AU can add captioning to an on-going call. This is important as many AUs are only partially impaired and may only want captioning when absolutely necessary. The option to not have captioning is also important in cases where an AU device can be used as a normal telephone and where non-assisted users (e.g., a spouse living with an AU that has good hearing capability) that do not need captioning may also use the AU device.

With any relay system, the primary factors for determining the value of the system are accuracy, speed and cost to provide the service. Regarding accuracy, text should accurately represent voice messages from hearing users so that an AU reading the text has an accurate understanding of the meaning of the message. Erroneous words provide inaccurate messages and also can cause confusion for an AU reading transcribed text.

Regarding speed, ideally text is presented to an AU simultaneously with the voice message corresponding to the text so that an AU sees text associated with a message as the message is heard. In this regard, text that trails a voice message by several seconds can cause confusion. Current systems present captioned text relatively quickly (e.g. 1-3 seconds after the voice message is broadcast) most of the time. However, at times a CA can fall behind when captioning so that longer delays (e.g., 10-15 seconds) occur.

Regarding cost, existing systems require a unique and highly trained CA for each communication session. In known cases CAs need to be able to speak clearly and need to be able to type quickly and accurately. CA jobs are also relatively high pressure jobs and therefore turnover is relatively high when compared jobs in many other industries which further increases the costs associated with operating a relay.

One innovation that has increased captioning speed appreciably and that has reduced the costs associated with captioning at least somewhat has been the use of voice-to-text transcription software by relay CAs. In this regard, early relay systems required CAs to type all of the text presented via an AU device. To present text as quickly as possible after broadcast of an associated voice message, highly skilled typists were required. During normal conversations people routinely speak at a rate between 110 and 150 words per minute. During a conversation between an AU and an HU, typically only about half the words voiced have to be transcribed (e.g., the AU typically communicates to the HU during half of a session). This means that to keep up with transcribing the HU's portion of a typical conversation a CA has to be able to type at around 55 to 75 words per minute. To this end, most professional typists type at around 50 to 80 words per minute and therefore can keep up with a normal conversation for at least some time. Professional typists are relatively expensive. In addition, despite being able to keep up with a conversation most of the time, at other times (e.g., during long conversations or during particularly high speed conversations) even professional typists fall behind transcribing real time text and more substantial delays can occur.

In relay systems that use voice-to-text transcription software trained to a CA's voice, a CA listens to an HU's voice and revoices the HU's voice message to a computer running the trained software. The software, being trained to the CA's voice, transcribes the re-voiced message much more quickly than a typist can type text and with only minimal errors. In many respects revoicing techniques for generating text are easier and much faster to learn than high speed typing and therefore training costs and the general costs associated with CA's are reduced appreciably. In addition, because revoicing is much faster than typing in most cases, voice-to-text transcription can be expedited appreciably using revoicing techniques.

At least some prior systems have contemplated further reducing costs associated with relay services by replacing CA's with computers running voice-to-text software to automatically convert HU voice messages to text. In the past there have been several problems with this solution which have resulted in no one implementing a workable system. First, most voice messages (e.g., an HU's voice message) delivered over most telephone lines to a relay are not suitable for direct voice-to-text transcription software. In this regard, automated transcription software on the market has been tuned to work well with a voice signal that includes a much larger spectrum of frequencies than the range used in typical phone communications. The frequency range of voice signals on phone lines is typically between 300 and 3000 Hz. Thus, automated transcription software does not work well with voice signals delivered over a telephone line and large numbers of errors occur. Accuracy further suffers where noise exists on a telephone line which is a common occurrence.

Second, most automated transcription software has to be trained to the voice of a speaker to be accurate. When a new HU calls an AU's device, there is no way for a relay to have previously trained software to the HU voice and therefore the software cannot accurately generate text using the HU voice messages.

Third, many automated transcription software packages use context in order to generate text from a voice message. To this end, the words around each word in a voice message can be used by software as context for determining which word has been uttered. To use words around a first word to identify the first word, the words around the first word have to be obtained. For this reason, many automated transcription systems wait to present transcribed text until after subsequent words in a voice message have been transcribed so that context can be used to correct prior words before presentation. Systems that hold off on presenting text to correct using subsequent context cause delay in text presentation which is inconsistent with the relay system need for real time or close to real time text delivery.

BRIEF SUMMARY OF THE DISCLOSURE

It has been recognized that a hybrid semi-automated system can be provided where, when acceptable accuracy can be achieved using automated transcription software, the system can automatically use the transcription software to transcribe HU voice messages to text and when accuracy is unacceptable, the system can patch in a human CA to transcribe voice messages to text. Here, it is believed that the number of CAs required at a large relay facility may be reduced appreciably (e.g., 30% or more) where software can accomplish a large portion of transcription to text. In this regard, not only is the automated transcription software getting better over time, in at least some cases the software may train to an HU's voice and the vagaries associated with voice messages received over a phone line (e.g., the limited 300 to 3000 Hz range) during a first portion of a call so that during a later portion of the call accuracy is particularly good. Training may occur while and in parallel with a CA manually (e.g., via typing, revoicing, etc.) transcribing voice-to-text and, once accuracy is at an acceptable threshold level, the system may automatically delink from the CA and use the text generated by the software to drive the AU display device.

It has been recognized that in a relay system there are at least two processors that may be capable of performing automated voice recognition processes and therefore that can handle the automated voice recognition part of a triage process involving a call assistant. To this end, in most cases either a relay processor or an assisted user's device processor may be able to perform the automated transcription portion of a hybrid process. For instance, in some cases an assisted user's device will perform automated transcription in parallel with a relay assistant generating call assistant generated text where the relay and assisted user's device cooperate to provide text and assess when the call assistant should be cut out of a call with the automated text replacing the call assistant generated text.

In other cases where a hearing user's communication device is a computer or includes a processor capable of transcribing voice messages to text, a hearing user's device may generated automated text in parallel with a call assistant generating text and the hearing user's device and the relay may cooperate to provide text and determine when the call assistant should be cut out of the call.

Regardless of which device is performing automated captioning, the call assistant generated text may be used to assess accuracy of the automated text for the purpose of determining when the call assistant should be cut out of the call. In addition, regardless of which device is performing automated text captioning, the call assistant generated text may be used to train the automated voice-to-text software or engine on the fly to expedite the process of increasing accuracy until the call assistant can be cut out of the call.

It has also been recognized that there are times when a hearing impaired person is listening to a hearing user's voice without an assisted user's device providing simultaneous text when the hearing user is confused and would like transcription of recent voice messages of the hearing user. For instance, where an assisted user uses an assisted user's device to carry on a non-captioned call and the assisted user has difficulty understanding a voice message so that the assisted user initiates a captioning service to obtain text for subsequent voice messages. Here, while text is provided for subsequent messages, the assisted user still cannot obtain an understanding of the voice message that prompted initiation of captioning. As another instance, where call assistant generated text lags appreciably behind a current hearing user's voice message, an assisted user may request that the captioning catch up to the current message.

To provide captioning of recent voice messages in these cases, in at least some embodiments of this disclosure an assisted user's device stores a hearing user's voice messages and, when captioning is initiated or a catch up request is received, the recorded voice messages are used to either automatically generate text or to have a call assistant generate text corresponding to the recorded voice messages.

In at least some cases when automated software is trained to a hearing user's voice, a voice model for the hearing user that can be used subsequently to tune automated software to transcribe the hearing user's voice may be stored along with a voice profile for the hearing user that can be used to distinguish the hearing user's voice from other hearing users. Thereafter, when the hearing user calls an assisted user's device again, the profile can be used to identify the hearing user and the voice model can be used to tune the software so that the automated software can immediately start generating highly accurate or at least relatively more accurate text corresponding to the hearing user's voice messages.

To the accomplishment of the foregoing and related ends, the disclosure, then, comprises the features hereinafter fully described. The following description and the annexed drawings set forth in detail certain illustrative aspects of the disclosure. However, these aspects are indicative of but a few of the various ways in which the principles of the invention can be employed. Other aspects, advantages and novel features of the disclosure will become apparent from the following detailed description of the invention when considered in conjunction with the drawings.

Figure 1:
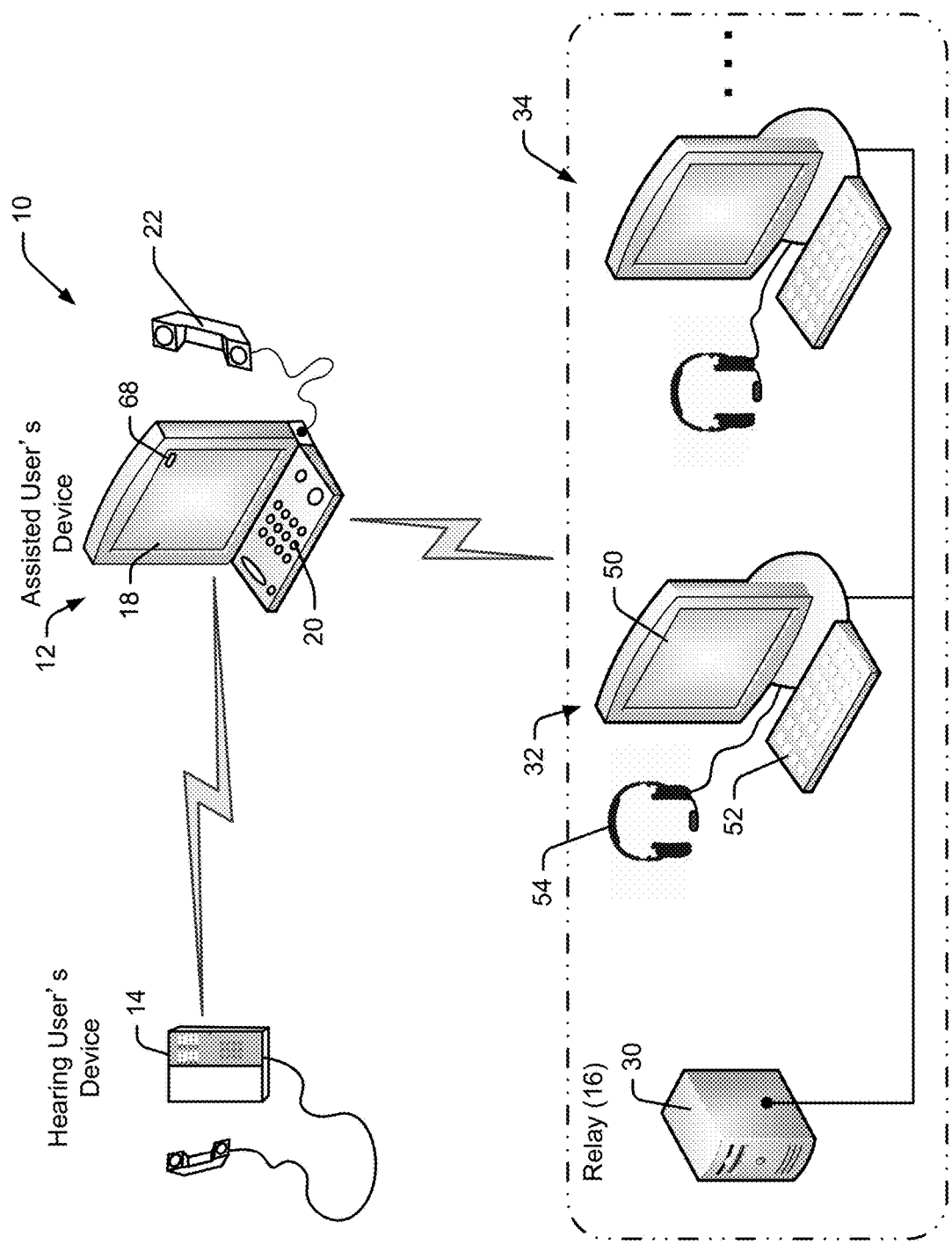
FIG. 1 is a schematic showing various components of a communication system including a relay that may be used to perform various processes and methods according to at least some aspects of the present invention.

While the disclosure is susceptible to various modifications and alternative forms, specific embodiments thereof have been shown by way of example in the drawings and are herein described in detail. It should be understood, however, that the description herein of specific embodiments is not intended to limit the disclosure to the particular forms disclosed, but on the contrary, the intention is to cover all modifications, equivalents, and alternatives falling within the spirit and scope of the disclosure as defined by the appended claims.

DETAILED DESCRIPTION OF THE DISCLOSURE

The various aspects of the subject disclosure are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views and, more specifically, referring to FIG. 1, the present disclosure will be described in the context of an exemplary communication system 10 including an assisted user's (AU's) communication device 12, a hearing user's (HU's) telephone or other type communication device 14, and a relay 16. The AU's device 12 is linked to the HU's device 14 via any network connection capable of facilitating a voice call between the AU and the HU. For instance, the link may be a conventional telephone line, a network connection such as an internet connection or other network connection, a wireless connection, etc. AU device 12 includes a keyboard 20, a display screen 18 and a handset 22. Keyboard 20 can be used to dial any telephone number to initiate a call and, in at least some cases, includes other keys or may be controlled to present virtual buttons via screen 18 for controlling various functions that will be described in greater detail below. Other identifiers such as IP addresses or the like may also be used in at least some cases to initiate a call. Screen 18 includes a flat panel display screen for displaying, among other things, text transcribed from a voice message or signal generated using HU's device 14, control icons or buttons, caption feedback signals, etc. Handset 22 includes a speaker for broadcasting a hearing user's voice messages to an assisted user and a microphone for receiving a voice message from an assisted user for delivery to the hearing user's device 14. Assisted user device 12 may also include a second loud speaker so that device 12 can operate as a speaker phone type device. Although not shown, device 12 further includes a processor and a memory for storing software run by the processor to perform various functions that are consistent with at least some aspects of the present disclosure. Device 12 is also linked or is linkable to relay 16 via any communication network including a phone network, a wireless network, the internet or some other similar network, etc.

Hearing user's device 14, in at least some embodiments, includes a communication device (e.g., a telephone) including a keyboard for dialing phone numbers and a handset including a speaker and a microphone for communication with other devices. In other embodiments device 14 may include a computer, a smart phone, a smart tablet, etc., that can facilitate audio communications with other devices. Devices 12 and 14 may use any of several different communication protocols including analog or digital protocols, a VOIP protocol or others.

Referring still to FIG. 1, relay 16 includes, among other things, a relay server 30 and a plurality of call assistant work stations 32, 34, etc. Each of the call assistant work stations 32, 34, etc., is similar and operates in a similar fashion and therefore only station 32 is described here in any detail. Station 32 includes a display screen 50, a keyboard 52 and a headphone/microphone headset 54. Screen 50 may be any type of electronic display screen for presenting information including text transcribed from a hearing user's voice signal or message. In most cases screen 50 will present a graphical user interface with on screen tools for editing text that appears on the screen. One text editing system is described in U.S. Pat. No. 7,164,753 which issued on Jan. 16, 2007 which is titled "Real Time Transcription Correction System" and which is incorporated herein in its entirety.

Keyboard 52 is a standard text entry QUERTY type keyboard and can be used to type text or to correct text presented on displays screen 50. Headset 54 includes a speaker in an ear piece and a microphone in a mouth piece and is worn by a call assistant. The headset enables a call assistant to listen to the voice of a hearing user and the microphone enables the call assistant to speak voice messages into the relay system such as, for instance, revoiced messages from a hearing user to be transcribed into text. For instance, typically during a call between a hearing user on device 14 and an assisted user on device 12, the hearing user's voice messages are presented to a call assistant via headset 54 and the call assistant revoices the messages into the relay system using headset 54. Software trained to the voice of the call assistant transcribes the assistant's voice messages into text which is presented on display screen 50. The call assistant then uses keyboard 52 and/or headset 54 to make corrections to the text on display 50. The corrected text is then transmitted to the assisted user's device 12 for display on screen 18. In the alternative, the text may be transmitted prior to correction to the assisted user's device 12 for display and corrections may be subsequently transmitted to correct the displayed text via in-line corrections where errors are replaced by corrected text.

Although not shown, call assistant work station 32 may also include a foot pedal or other device for controlling the speed with which voice messages are played via headset 54 so that the call assistant can slow or even stop play of the messages while the assistant either catches up on transcription or correction of text.

Figure 2:
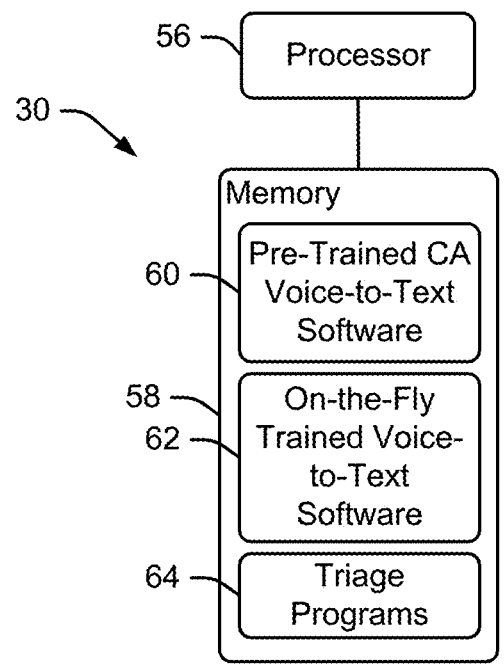
FIG. 2 is a schematic of the relay server shown in FIG. 1.

Referring still to FIG. 1 and also to FIG. 2, server 30 is a computer system that includes, among other components, at least a first processor 56 linked to a memory or database 58 where software run by server 56 to facilitate various functions that are consistent with at least some aspects of the present disclosure is stored. The software stored in memory 58 includes pre-trained call assistant voice-to-text transcription software 60 for each call assistant where call assistant specific software is trained to the voice of an associated call assistant thereby increasing the accuracy of transcription activities. For instance, Naturally Speaking continuous speech recognition software by Dragon, Inc. may be pre-trained to the voice of a specific call assistant and then used to transcribe voice messages voiced by the call assistant into text.

In addition to the call assistant trained software, a voice-to-text software program 62 that is not pre-trained to a CA's voice and instead that trains to any voice on the fly as voice messages are received is stored in memory 58. Again, Naturally Speaking software that can train on the fly may be used for this purpose. Hereinafter, the automatic voice recognition software or system that trains to the HU voices will be referred to generally as an AVR engine at times.

Moreover, software 64 that automatically performs one of several different types of triage processes to generate text from voice messages accurately, quickly and in a relatively cost effective manner is stored in memory 58. The triage programs are described in detail hereafter.

One issue with existing relay systems is that each call is relatively expensive to facilitate. To this end, in order to meet required accuracy standards for text caption calls, each call requires a dedicated call assistant. While automated voice-to-text systems that would not require a call assistant have been contemplated, none has been implemented because of accuracy and speed problems.

One aspect of the present disclosure is related to a system that is semi-automated wherein a call assistant is used when accuracy of an automated system is not at required levels and the assistant is cut out of a call automatically or manually when accuracy of the automated system meets or exceeds accuracy standards or at the preference of an AU. For instance, in at least some cases a call assistant will be assigned to every new call linked to a relay and the call assistant will transcribe voice-to-text as in an existing system. Here, however, the difference will be that, during the call, the voice of a hearing user will also be processed by server 30 to automatically transcribe the hearing user's voice messages to text (e.g., into "automated text"). Server 30 compares corrected text generated by the call assistant to the automated text to identify errors in the automated text. Server 30 uses identified errors to train the automated voice-to-text software to the voice of the hearing user. During the beginning of the call the software trains to the hearing user's voice and accuracy increases over time as the software trains. At some point the accuracy increases until required accuracy standards are met. Once accuracy standards are met, server 30 is programmed to automatically cut out the call assistant and start transmitting the automated text to the assisted user's device 12.

In at least some cases, when a call assistant is cut out of a call, the system may provide a "Help" button, an "Assist" button or "Assistance Request" type button (see 68 in FIG. 1) to an assisted user so that, if the assisted user recognizes that the automated text has too many errors for some reason, the assisted user can request a link to a call assistant to increase transcription accuracy (e.g., generate an assistance request). In some cases the help button may be a persistent mechanical button on the assisted user's device 12. In the alternative, the help button may be a virtual on screen icon (e.g., see 68 in FIG. 1) and screen 18 may be a touch sensitive screen so that contact with the virtual button can be sensed. Where the help button is virtual, the button may only be presented after the system switches from providing call assistant generated text to an assisted user's device to providing automated text to the assisted user's device to avoid confusion (e.g., avoid a case where an assisted user is already receiving call assistant generated text but thinks, because of a help button, that even better accuracy can be achieved in some fashion). Thus, while call assistant generated text is displayed on an assisted user's device 12, no "help" button is presented and after automated text is presented, the "help" button is presented. After the help button is selected and a call assistant is re-linked to the call, the help button is again removed from the assisted user's device display 18 to avoid confusion.

Figure 3:
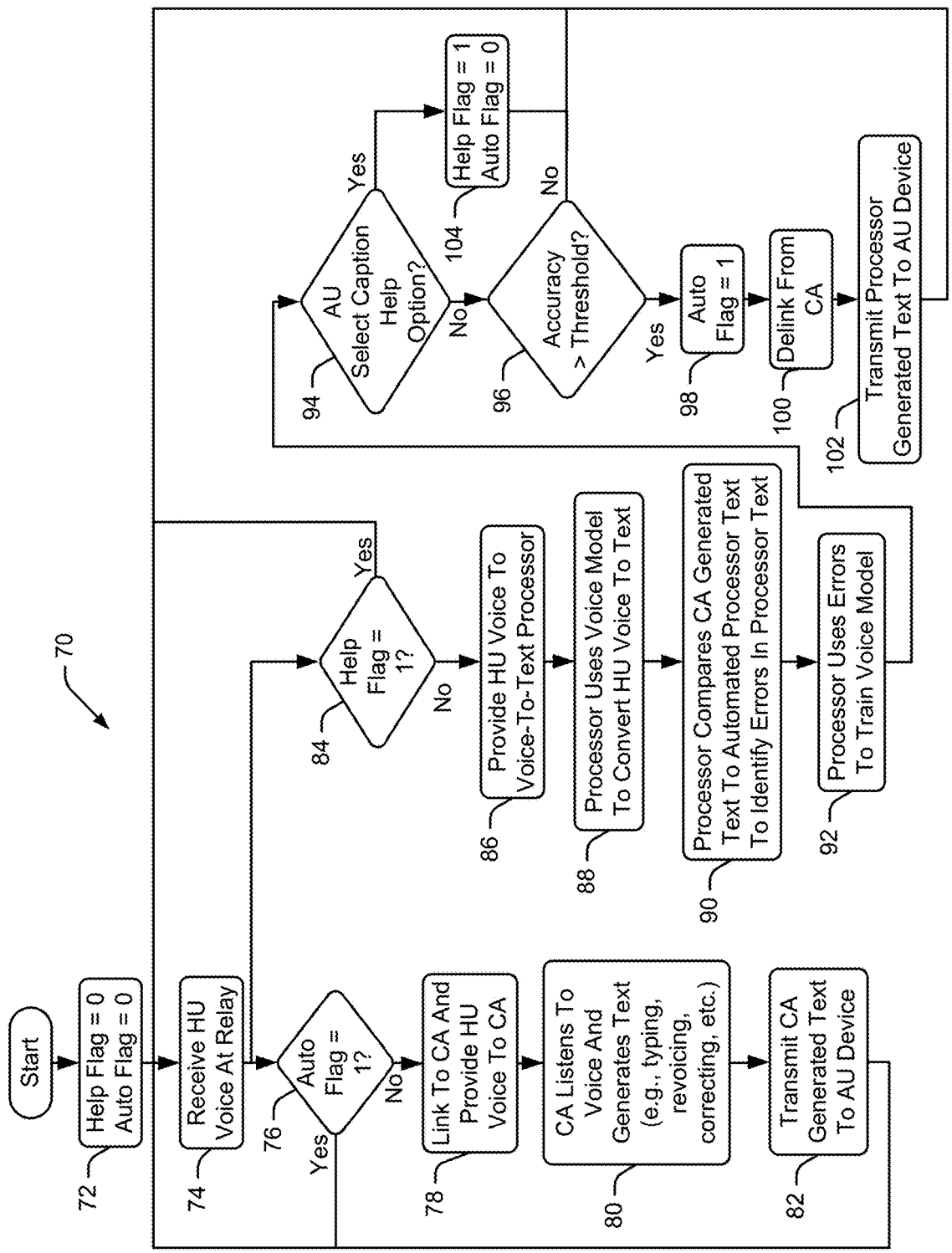
FIG. 3 is a flow chart showing a process whereby an automated voice-to-text engine is used to generate automated text in parallel with a call assistant generating text where the automated text is used instead of call assistant generated text to provide captioning an assisted user's device once an accuracy threshold has been exceeded.

Referring now to FIGS. 2 and 3, a method or process 70 is illustrated that may be performed by server 30 to cut out a call assistant when automated text reaches an accuracy level that meets a standard threshold level. Referring also to FIG. 1, at block 72, help and auto flags are each set to a zero value. The help flag indicates that an assisted user has selected a help or assist button via the assisted user's device 12 because of a perception that too many errors are occurring in transcribed text. The auto flag indicates that automated text accuracy has exceeded a standard threshold requirement. Zero values indicate that the help button has not been selected and that the standard requirement has yet to be met and one values indicate that the button has been selected and that the standard requirement has been met.

Referring still to FIGS. 1 and 3, at block 74, during a phone call between a hearing user using device 14 and an assisted user using device 12, the hearing user's voice messages are transmitted to server 30 at relay 16. Upon receiving the hearing user's voice messages, server 30 checks the auto and help flags at blocks 76 and 84, respectively. At least initially the auto flag will be set to zero at block 76 meaning that automated text has not reached the accuracy standard requirement and therefore control passes down to block 78 where the hearing user's voice messages are provided to a call assistant. At block 80, the call assistant listens to the hearing user's voice messages and generates text corresponding thereto by either typing the messages, revoicing the messages to voice-to-text transcription software trained to the call assistant's voice, or a combination of both. Text generated is presented on screen 50 and the call assistant makes corrections to the text using keyboard 52 and/or headset 54 at block 80. At block 82 the call assistant generated text is transmitted to assisted user device 12 to be displayed for the assisted user on screen 18.

Referring again to FIGS. 1 and 3, at block 84, at least initially the help flag will be set to zero indicating that the assisted user has not requested additional captioning assistance. In fact, at least initially the "help" button 68 may not be presented to an assisted user as call assistant generated text is initially presented. Where the help flag is zero at block 84, control passes to block 86 where the hearing user's voice messages are fed to voice-to-text software run by server 30 that has not been previously trained to any particular voice. At block 88 the software automatically converts the hearing user's voice-to-text generating automated text. At block 90, server 30 compares the call assistant generated text to the automated text to identify errors in the automated text. At block 92, server 30 uses the errors to train the voice-to-text software for the hearing user's voice. In this regard, for instance, where an error is identified, server 30 modifies the software so that the next time the utterance that resulted in the error occurs, the software will generate the word or words that the call assistant generated for the utterance. Other ways of altering or training the voice-to-text software are well known in the art and any way of training the software may be used at block 92.

After block 92 control passes to block 94 where server 30 monitors for a selection of the "help" button 68 by the assisted user. If the help button has not been selected, control passes to block 96 where server 30 compares the accuracy of the automated text to a threshold standard accuracy requirement. For instance, the standard requirement may require that accuracy be great than 96% measured over at least a most recent forty-five second period or a most recent 100 words uttered by a hearing user, whichever is longer. Where accuracy is below the threshold requirement, control passes back up to block 74 where the process described above continues. At block 96, once the accuracy is greater than the threshold requirement, control passes to block 98 where the auto flag is set to one indicating that the system should start using the automated text and delink the call assistant from the call to free up the assistant to handle a different call. A virtual "help" button may also be presented via the assisted user's display 18 at this time. Next, at block 100, the call assistant is delinked from the call and at block 102 the processor generated automated text is transmitted to the AU device to be presented on display screen 18.

Referring again to block 74, the hearing user's voice is continually received during a call and at block 76, once the auto flag has been set to one, the lower portion of the left hand loop including blocks 78, 80 and 82 is cut out of the process as control loops back up to block 74.

Referring again to block 94, if, during an automated portion of a call when automated text is being presented to the assisted user, the assisted user decides that there are too many errors in the transcription presented via display 18 and the assisted user selects the "help" button 68 (see again FIG. 1), control passes to block 104 where the help flag is set to one indicating that the assisted user has requested the assistance of a call assistant and the auto flag is reset to zero indicating that call assistant generated text will be used to drive the assisted user's display 18 instead of the automated text. Thereafter control passes back up to block 74. Again, at block 76, with the auto flag set to zero the next time through decision block 76, control passes back down to block 78 where the call is again linked to a call assistant for transcription as described above. In addition, the next time through block 84, because the help flag is set to one, control passes back up to block 74 and the automated text loop including blocks 86 through 104 is effectively cut out of the rest of the call.

In at least some embodiments, there will be a short delay (e.g., 5 to 10 seconds in most cases) between setting the flags at block 104 and stopping use of the automated text so that a new call assistant can be linked up to the call and start generating call assistant generated text prior to halting the automated text. In these cases, until the call assistant is linked and generating text for at least a few seconds (e.g., 3 seconds), the automated text will still be used to drive the assisted user's display 18. The delay may either be a pre-defined delay or may have a case specific duration that is determined by server 30 monitoring call assistant generated text and switching over to the call assistant generated text once the call assistant is up to speed.

In some embodiments, prior to delinking a call assistant from a call at block 100, server 30 may store a call assistant identifier along with a call identifier for the call. Thereafter, if an assisted user requests help at block 94, server 30 may be programmed to identify if the call assistant previously associated with the call is available (e.g. not handling another call) and, if so, may re-link to the call assistant at block 78. In this manner, if possible, a call assistant that has at least some context for the call can be linked up to restart transcription services.

In some embodiments it is contemplated that after an assisted user has selected a help button to receive call assistance, the call will be completed with a call assistant on the line. In other cases it is contemplated that server 30 may, when a call assistant is re-linked to a call, start a second triage process to attempt to delink the call assistant a second time if a threshold accuracy level is again achieved. For instance, in some cases, midstream during a call, a second hearing user may start communicating with the assisted user via the hearing user's device. For instance, a child may yield the hearing user's device 14 to a grandchild that has a different voice profile causing the assisted user to request help from a call assistant because of perceived text errors. Here, after the hand back to the call assistant, server 30 may start training on the grandchild's voice and may eventually achieve the threshold level required. Once the threshold again occurs, the call assistant may be delinked a second time so that automated text is again fed to the assisted user's device.

As another example text errors in automated text may be caused by temporary noise in one or more of the lines carrying the hearing user's voice messages to relay 16. Here, once the noise clears up, automated text may again be a suitable option. Thus, here, after an assisted user requests call assistant help, the triage process may again commence and if the threshold accuracy level is again exceeded, the call assistant may be delinked and the automated text may again be used to drive the assisted user's device 12. While the threshold accuracy level may be the same each time through the triage process, in at least some embodiments the accuracy level may be changed each time through the process. For instance, the first time through the triage process the accuracy threshold may be 96%. The second time through the triage process the accuracy threshold may be raised to 98%.

In at least some embodiments, when the automated text accuracy exceeds the standard accuracy threshold, there may be a short transition time during which a call assistant on a call observes automated text while listening to a hearing user's voice message to manually confirm that the handover from call assistant generated text to automated text is smooth. During this short transition time, for instance, the call assistant may watch the automated text on her workstation screen 50 and may correct any errors that occur during the transition. In at least some cases, if the call assistant perceives that the handoff does not work or the quality of the automated text is poor for some reason, the call assistant may opt to retake control of the transcription process.

Figure 4:
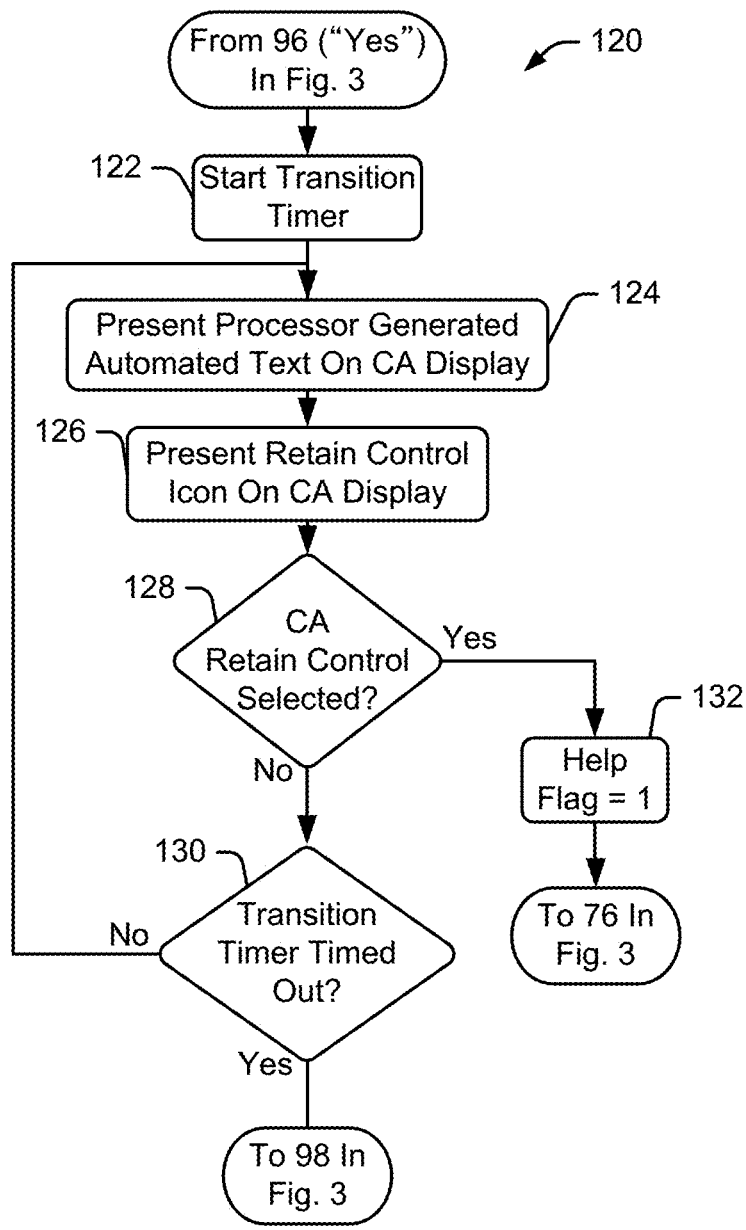
FIG. 4 is a sub-process that maybe substituted for a portion of the process shown in FIG. 3 whereby a control assistant can determine whether or not the automated text takes over the process after the accuracy threshold has been achieved.

One sub-process 120 that may be added to the process shown in FIG. 3 for managing a call assistant to automated text handoff is illustrated in FIG. 4. Referring also to FIGS. 1 and 2, at block 96 in FIG. 3, if the accuracy of the automated text exceeds the accuracy standard threshold level, control may pass to block 122 in FIG. 4. At block 122, a short duration transition timer (e.g. 10-15 seconds) is started. At block 124 automated text (e.g., text generated by feeding the hearing user's voice messages directly to voice-to-text software) is presented on the call assistant's display 50. At block 126 an on screen "Retain Control" icon or virtual button is provided to the call assistant via the assistant's display screen 50 which can be selected by the call assistant to forego the handoff to the automated voice-to-text software. At block 128, if the "Retain Control" icon is selected, control passes to block 132 where the help flag is set to one and then control passes back up to block 76 in FIG. 3 where the call assistant process for generating text continues as described above. At block 128, if the call assistant does not select the "Retain Control" icon, control passes to block 130 where the transition timer is checked. If the transition timer has not timed out control passes back up to block 124. Once the timer times out at block 130, control passes back to block 98 in FIG. 3 where the auto flag is set to one and the call assistant is delinked from the call.

In at least some embodiments it is contemplated that after voice-to-text software takes over the transcription task and the call assistant is delinked from a call, server 30 itself may be programmed to sense when transcription accuracy has degraded substantially and the server 30 may cause a re-link to a call assistant to increase accuracy of the text transcription. For instance, server 30 may assign a confidence factor to each word in the automated text based on how confident the server is that the word has been accurately transcribed. The confidence factors over a most recent number of words (e.g., 100) or a most recent period (e.g., 45 seconds) may be averaged and the average used to assess an overall confidence factor for transcription accuracy. Where the confidence factor is below a threshold level, server 30 may re-link to a call assistant to increase transcription accuracy. The automated process for re-linking to a call assistant may be used instead of or in addition to the process described above whereby an assisted user selects the "help" button to re-link to a call assistant.

In at least some cases when an assisted user selects a "help" button to re-link to a call assistant, partial call assistance may be provided instead of full call assistant service. For instance, instead of adding a call assistant that transcribes a hearing user's voice messages and then corrects errors, a call assistant may be linked only for correction purposes. The idea here is that while software trained to a hearing user's voice may generate some errors, the number of errors after training will still be relatively small in most cases even if objectionable to an assisted user. In at least some cases call assistants may be trained to have different skill sets where highly skilled and relatively more expensive to retain call assistants are trained to re-voice hearing user voice messages and correct the resulting text and less skilled call assistants are trained to simply make corrections to automated text. Here, initially all calls may be routed to highly skilled revoicing or "transcribing" call assistants and all re-linked calls may be routed to less skilled "corrector" call assistants.

Figure 5:
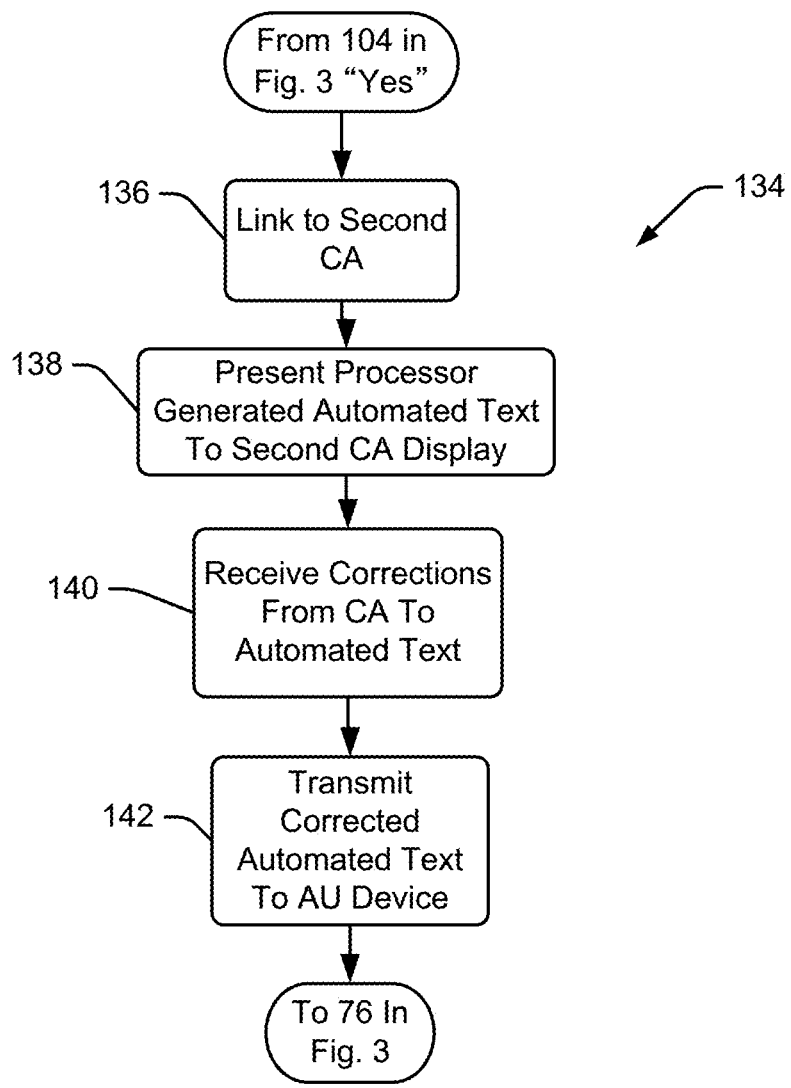
FIG. 5 is a sub-process that may be added to the process shown in FIG. 3 wherein, upon an assisted user's requesting help, a call is linked to a second call assistant for correcting the automated text.

A sub-process 134 that may be added to the process of FIG. 3 for routing re-linked calls to a corrector call assistant is shown in FIG. 5. Referring also to FIGS. 1 and 3, at decision block 94, if an assisted user selects the help button, control may pass to block 136 in FIG. 3 where the call is linked to a second corrector call assistant. At block 138 the automated text is presented to the second call assistant via the call assistant's display 50. At block 140 the second call assistant listens to the voice of the hearing user and observes the automated text and makes corrections to errors perceived in the text. At block 142, server 30 transmits the corrected automated text to the assisted user's device for display via screen 18. After block 142 control passes back up to block 76 in FIG. 2.

In some cases where a call assistant generates text that drives an assisted user's display screen 18 (see again FIG. 1), for one reason or another the call assistant's transcription to text may fall behind the hearing user's voice message stream by a substantial amount. For instance, where a hearing user is speaking quickly, is using odd vocabulary, and/or has an unusual accent that is hard to understand, call assistant transcription may fall behind a voice message stream by 20 seconds, 40 seconds or more.

In many cases when captioning falls behind, an assisted user can perceive that presented text has fallen far behind broadcast voice messages from a hearing user based on memory of recently broadcast voice message content and observed text. For instance, an assisted user may recognize that currently displayed text corresponds to a portion of the broadcast voice message that occurred thirty seconds ago. In other cases some captioning delay indicator may be presented via an assisted user's device display 18. For instance, see FIG. 17 where captioning delay is indicated in two different ways on a display screen 18. First, text 212 indicates an estimated delay in seconds (e.g., 24 second delay). Second, at the end of already transcribed text 214, blanks 216 for words already voiced but yet to be transcribed may be presented to give an assisted user a sense of how delayed the captioning process has become.

When an assisted user perceives that captioning is too far behind or when the user cannot understand a recently broadcast voice message, the assisted user may want the text captioning to skip ahead to the currently broadcast voice message. For instance, if an assisted user had difficulty hearing the most recent five seconds of a hearing user's voice message and continues to have difficulty hearing but generally understood the preceding 25 seconds, the assisted user may want the captioning process to be re-synced with the current hearing user's voice message so that the assisted user's understanding of current words is accurate.

Here, however, because the assisted user could not understand the most recent 5 seconds of broadcast voice message, a re-sync with the current voice message would leave the assisted user with at least some void in understanding the conversation (e.g., at least the most recent 5 seconds of misunderstood voice message would be lost). To deal with this issue, in at least some embodiments, it is contemplated that server 30 may run automated voice-to-text software on a hearing user's voice message simultaneously with a call assistant generating text from the voice message and, when an assisted user requests a "catch-up" or "re-sync" of the transcription process to the current voice message, server 30 may provide "fill in" automated text corresponding to the portion of the voice message between the most recent call assistant generated text and the instantaneous voice message which may be provided to the assisted user's device for display and also, optionally, to the call assistant's display screen to maintain context for the call assistant. In this case, while the fill in automated text may have some errors, the fill in text will be better than no text for the associated period and can be referred to by the assisted user to better understand the voice messages.

In cases where the fill in text is presented on the call assistant's display screen, the call assistant may correct any errors in the fill in text. This correction and any error correction by a call assistant for that matter may be made prior to transmitting text to the assisted user's device or subsequent thereto. Where corrected text is transmitted to an assisted user's device subsequent to transmission of the original error prone text, the assisted user's device corrects the errors by replacing the erroneous text with the corrected text.

Because it is often the case that assisted users will request a re-sync only when they have difficulty understanding words, server 30 may only present automated fill in text to an assisted user corresponding to a pre-defined duration period (e.g., 8 seconds) that precedes the time when the re-sync request occurs. For instance, consistent with the example above where call assistant captioning falls behind by thirty seconds, an assisted user may only request re-sync at the end of the most recent five seconds as inability to understand the voice message may only be an issue during those five seconds. By presenting the most recent eight seconds of automated text to the assisted user, the user will have the chance to read text corresponding to the misunderstood voice message without being inundated with a large segment of automated text to view. Where automated fill in text is provided to an assisted user for only a pre-defined duration period, the same text may be provided for correction to the call assistant.

Figure 7:
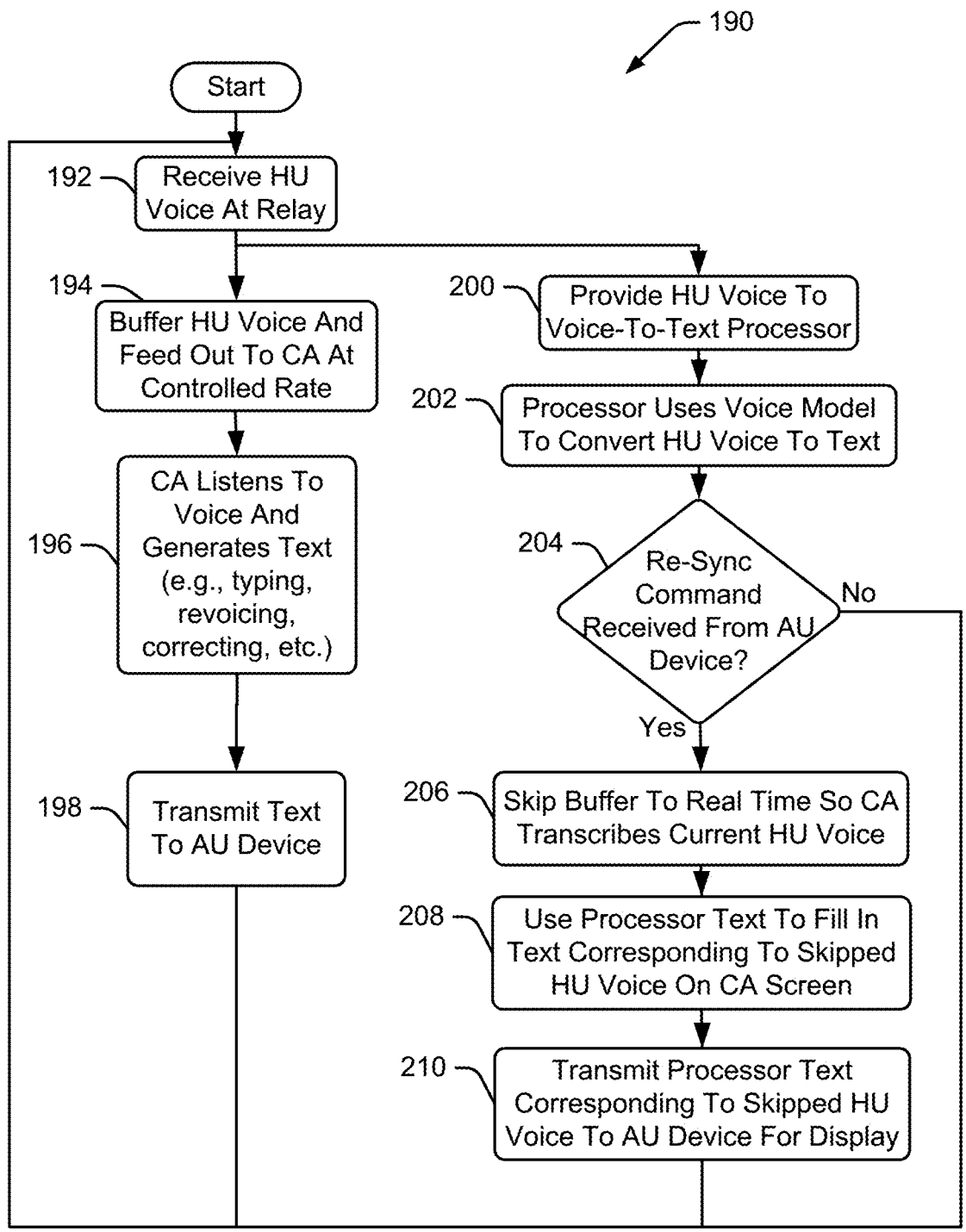
FIG. 7 is a process whereby automated text is automatically used to fill in captioning when transcription by a call assistant lags behind a hearing user's voice messages by a threshold duration.

Referring now to FIG. 7, a method 190 by which an assisted user requests a re-sync of the transcription process to current voice messages when call assistant generated text falls behind current voice messages is illustrated. Referring also to FIG. 1, at block 192 a hearing user's voice messages are received at relay 16. After block 192, control passes down to each of blocks 194 and 200 where two simultaneous sub-processes occur in parallel. At block 194, the hearing user's voice messages are stored in a rolling buffer. The rolling buffer may, for instance, have a two minute duration so that the most recent two minutes of a hearing user's voice messages are always stored. At block 196, a call assistant listens to the hearing user's voice message and transcribes text corresponding to the messages via re-voicing to software trained to the call assistant's voice, typing, etc. At block 198 the call assistant generated text is transmitted to assisted user's device 12 to be presented on display screen 18 after which control passes back up to block 192. Text correction may occur at block 196 or after block 198.

Referring again to FIG. 7, at process block 200, the hearing user's voice is fed directly to voice-to-text software run by server 30 which generates automated text at block 202. Although not shown in FIG. 7, after block 202, server 30 may compare the automated text to the call assistant generated text to identify errors and may use those errors to train the software to the hearing user's voice so that the automated text continues to get more accurate as a call proceeds.

Figure 17:
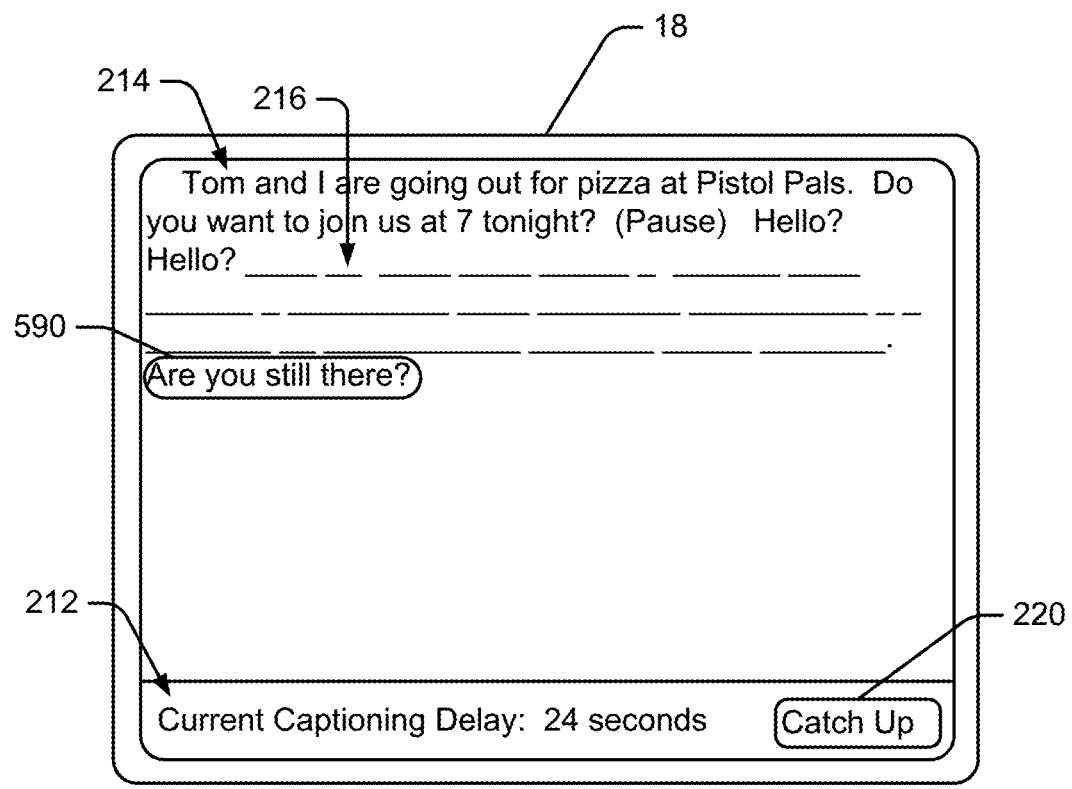
FIG. 17 is a schematic illustrating a screen shot that may be presented via an assisted user's device display screen.

Referring still to FIGS. 1 and 7, at decision block 204, controller 30 monitors for a catch up or re-sync command received via the assisted user's device 12 (e.g., via selection of an on-screen virtual "catch up" button 220, see again FIG. 17). Where no catch up or re-sync command has been received, control passes back up to block 192 where the process described above continues to cycle. At block 204, once a re-sync command has been received, control passes to block 206 where the buffered voice messages are skipped and a current voice message is presented to the ear of the call assistant to be transcribed. At block 208 the automated text corresponding to the skipped voice message segment is filled in to the text on the call assistant's screen for context and at block 210 the fill in text is transmitted to the assisted user's device for display.

Where automated text is filled in upon the occurrence of a catch up process, the fill in text may be visually distinguished on the assisted user's screen and/or on the call assistant's screen. For instance, fill in text may be highlighted, underlined, bolded, shown in a distinct font, etc. For example, see FIG. 18 that shows fill in text 222 that is underlined to visually distinguish. See also that the captioning delay 212 has been updated. In some cases, fill in text corresponding to voice messages that occur after or within some pre-defined period prior to a re-sync request may be distinguished in yet a third way to point out the text corresponding to the portion of a voice message that the assisted user most likely found interesting (e.g., the portion that prompted selection of the re-sync button). For instance, where 24 previous seconds of text are filled in when a re-sync request is initiated, all 24 seconds of fill in text may be underlined and the 8 seconds of text prior to the re-sync request may also be highlighted in yellow. See in FIG. 18 that some of the fill in text is shown in a phantom box 226 to indicate highlighting.

In at least some cases it is contemplated that server 30 may be programmed to automatically determine when call assistant generated text substantially lags a current voice message from a hearing user and server 30 may automatically skip ahead to re-sync a call assistant with a current message while providing automated fill in text corresponding to intervening voice messages. For instance, server 30 may recognize when call assistant generated text is more than thirty seconds behind a current voice message and may skip the voice messages ahead to the current message while filling in automated text to fill the gap. In at least some cases this automated skip ahead process may only occur after at least some (e.g., 2 minutes) training to a hearing user's voice so ensure that minimal errors are generated in the fill in text.

Figure 6:
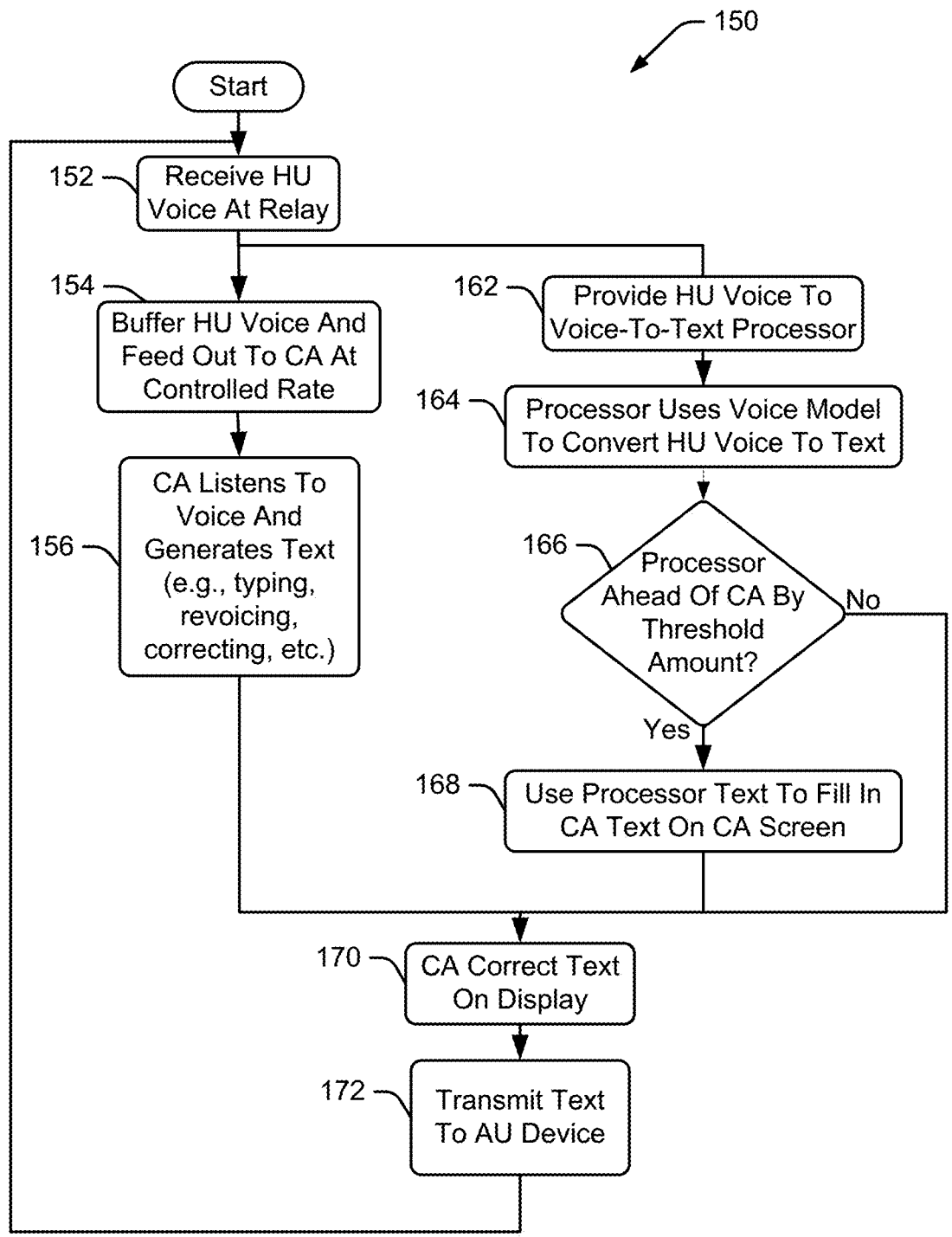
FIG. 6 is a process whereby an automated voice-to-text engine is used to fill in text for a hearing user's voice messages that are skipped over by a call assistant when an assisted user requests instantaneous captioning of a current message.

A method 150 for automatically skipping to a current voice message in a buffer when a call assistant falls to far behind is shown in FIG. 6. Referring also to FIG. 1, at block 152, a hearing user's voice messages are received at relay 16. After block 152, control passes down to each of blocks 154 and 162 where two simultaneous sub-processes occur in parallel. At block 154, the hearing user's voice messages are stored in a rolling buffer. At block 156, a call assistant listens to the hearing user's voice message and transcribes text corresponding to the messages via re-voicing to software trained to the call assistant's voice, typing, etc., after which control passes to block 170.

Referring still to FIG. 6, at process block 162, the hearing user's voice is fed directly to voice-to-text software run by server 30 which generates automated text at block 164. Although not shown in FIG. 6, after block 164, server 30 may compare the automated text to the call assistant generated text to identify errors and may use those errors to train the software to the hearing user's voice so that the automated text continues to get more accurate as a call proceeds.

Referring still to FIGS. 1 and 6, at decision block 166, controller 30 monitors how far call assistant text transcription is behind the current voice message and compares that value to a threshold value. If the delay is less than the threshold value, control passes down to block 170. If the delay exceeds the threshold value, control passes to block 168 where server 30 uses automated text from block 164 to fill in the call assistant generated text and skips the call assistant up to the current voice message. After block 168 control passes to block 170. At block 170, the text including the call assistant generated text and the fill in text is presented to the call assistant via display screen 50 and the call assistant makes any corrections to observed errors. At block 172, the text is transmitted to assisted user's device 12 and is displayed on screen 18. Again, uncorrected text may be transmitted to and displayed on device 12 and corrected text may be subsequently transmitted and used to correct errors in the prior text in line on device 12. After block 172 control passes back up to block 152 where the process described above continues to cycle. Automatically generated text to fill in when skipping forward may be visually distinguished (e.g., highlighted, underlined, etc.)

In at least some cases when automated fill in text is generated, that text may not be presented to the call assistant or the assisted user as a single block and instead may be doled out at a higher speed than the talking speed of the hearing user until the text catches up with a current time. To this end, where transcription is far behind a current point in a conversation, if automated catch up text were generated as an immediate single block, in at least some cases, the earliest text in the block could shoot off a call assistant's display screen or an assisted user's display screen so that the call assistant or the assisted user would be unable to view all of the automated catch up text. Instead of presenting the automated text as a complete block upon catchup, the automated catch up text may be presented at a rate that is faster (e.g., two to three times faster) than the hearing user's rate of speaking so that catch up is rapid without the oldest catch up text running off the call assistant's or assisted user's displays.

In other cases, when an assisted user requests fill in, the system may automatically fill in text and only present the most recent 10 seconds or so of the automatic fill in text to the CA for correction so that the assisted user has corrected text corresponding to a most recent period as quickly as possible. In many cases where the CA generated text is substantially delayed, much of the fill in text would run off a typical assisted user's device display screen when presented so making corrections to that text would make little sense as the assisted user that requests catch up text is typically most interested in text associated with the most recent HU voice signal.

Many assisted user's devices can be used as conventional telephones without captioning service or as assisted user devices where captioning is presented and voice messages are broadcast to an assisted user. The idea here is that one device can be used by hearing impaired persons and persons that have no hearing impairment and that the overall costs associated with providing captioning service can be minimized by only using captioning when necessary. In many cases even a hearing impaired person may not need captioning service all of the time. For instance, a hearing impaired person may be able to hear the voice of a person that speaks loudly fairly well but may not be able to hear the voice of another person that speaks more softly. In this case, captioning would be required when speaking to the person with the soft voice but may not be required when speaking to the person with the loud voice. As another instance, an impaired person may hear better when well rested but hear relatively more poorly when tired so captioning is required only when the person is tired. As still another instance, an impaired person may hear well when there is minimal noise on a line but may hear poorly if line noise exceeds some threshold. Again, the impaired person would only need captioning some of the time.

To minimize captioning service costs and still enable an impaired person to obtain captioning service whenever needed and even during an ongoing call, some systems start out all calls with a default setting where an assisted user's device 12 is used like a normal telephone without captioning. At any time during an ongoing call, an assisted user can select either a mechanical or virtual "Caption" icon or button (see again 68 in FIG. 1) to link the call to a relay, provide a hearing user's voice messages to the relay and commence captioning service. One problem with starting captioning only after an assisted user experiences problems hearing words is that at least some words (e.g., words that prompted the assisted user to select the caption button in the first place) typically go unrecognized and therefore the assisted user is left with a void in their understanding of a conversation.

One solution to the problem of lost meaning when words are not understood just prior to selection of a caption button is to store a rolling recordation of a hearing user's voice messages that can be transcribed subsequently when the caption button is selected to generate "fill in" text. For instance, the most recent 20 seconds of a hearing user's voice messages may be recorded and then transcribed only if the caption button is selected. The relay generates text for the recorded message either automatically via software or via revoicing or typing by a call assistant or via a combination of both. In addition, the call assistant or the automated voice recognition software starts transcribing current voice messages. The text from the recording and the real time messages is transmitted to and presented via assisted user's device 12 which should enable the assisted user to determine the meaning of the previously misunderstood words. In at least some embodiments the rolling recordation of hearing user's voice messages may be maintained by the assisted user's device 12 (see again FIG. 1) and that recordation may be sent to the relay for immediate transcription upon selection of the caption button.

Figure 8:
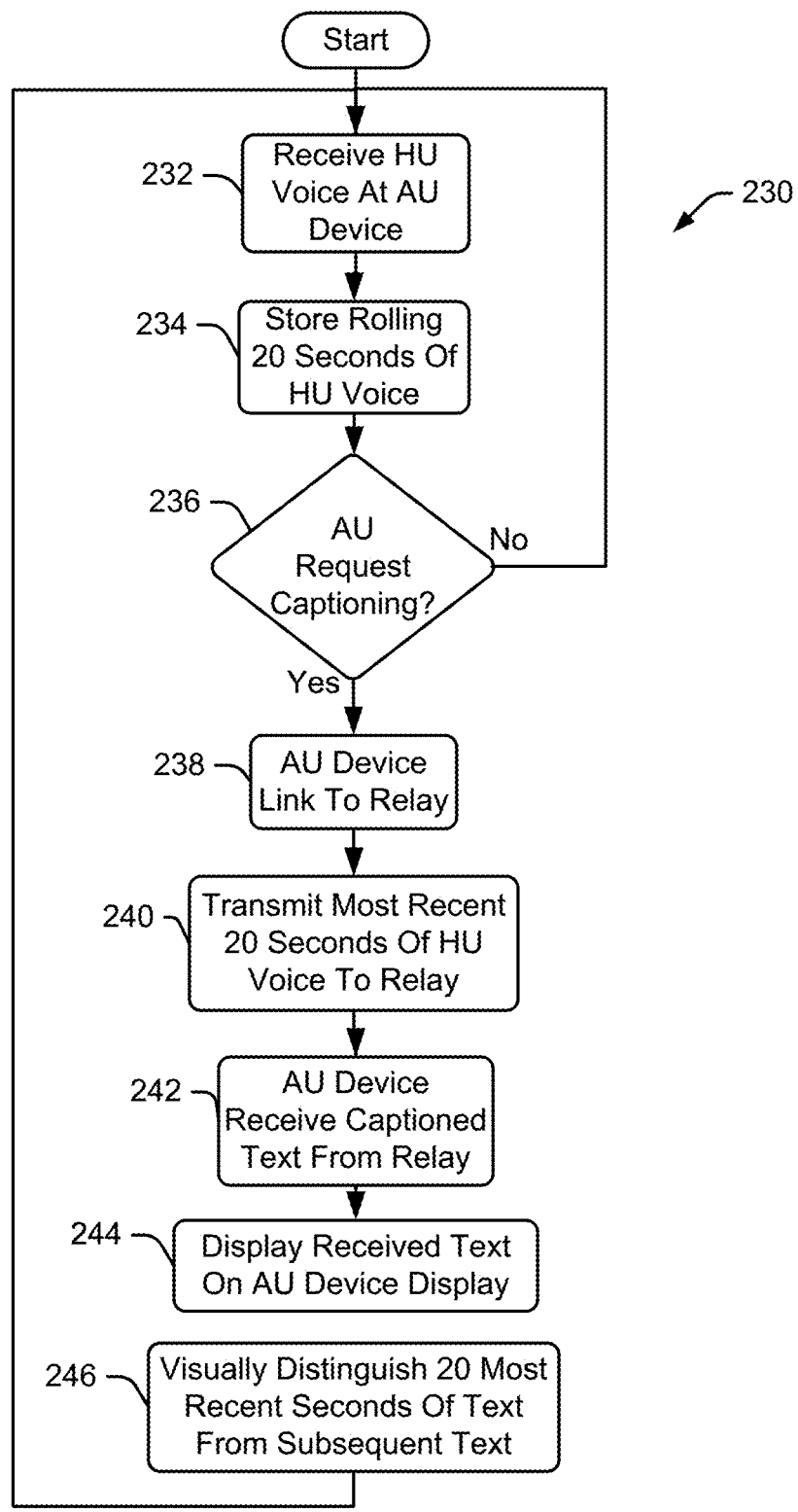
FIG. 8 is a flow chart illustrating a process whereby text is generated for a hearing user's voice messages that precede a request for captioning services.

Referring now to FIG. 8, a process 230 that may be performed by the system of FIG. 1 to provide captioning for voice messages that occur prior to a request for captioning service is illustrated. Referring also to FIG. 1, at block 232 a hearing user's voice messages are received during a call with an assisted user at the assisted user's device 12. At block 234 the assisted user's device 12 stores a most recent 20 seconds of the hearing user's voice messages on a rolling basis. The 20 seconds of voice messages are stored without captioning initially in at least some embodiments. At decision block 236, the assisted user's device monitors for selection of a captioning button (not shown). If the captioning button has not been selected, control passes back up to block 232 where blocks 232, 234 and 236 continue to cycle.

Once the caption button has been selected, control passes to block 238 where assisted user's device 12 establishes a communication link to relay 16. At block 240 assisted user's device 12 transmits the stored 20 seconds of the hearing user's voice messages along with current ongoing voice messages from the hearing user to relay 16. At this point a call assistant and/or software at the relay transcribes the voice-to-text, corrections are made (or not), and the text is transmitted back to device 12 to be displayed. At block 242 assisted user's device 12 receives the captioned text from the relay 16 and at block 244 the received text is displayed or presented on the assisted user's device display 18. At block 246, in at least some embodiments, text corresponding to the 20 seconds of hearing user voice messages prior to selection of the caption button may be visually distinguished (e.g., highlighted, bolded, underlined, etc.) from other text in some fashion. After block 246 control passes back up to block 232 where the process described above continues to cycle and captioning in substantially real time continues.

Figure 9:
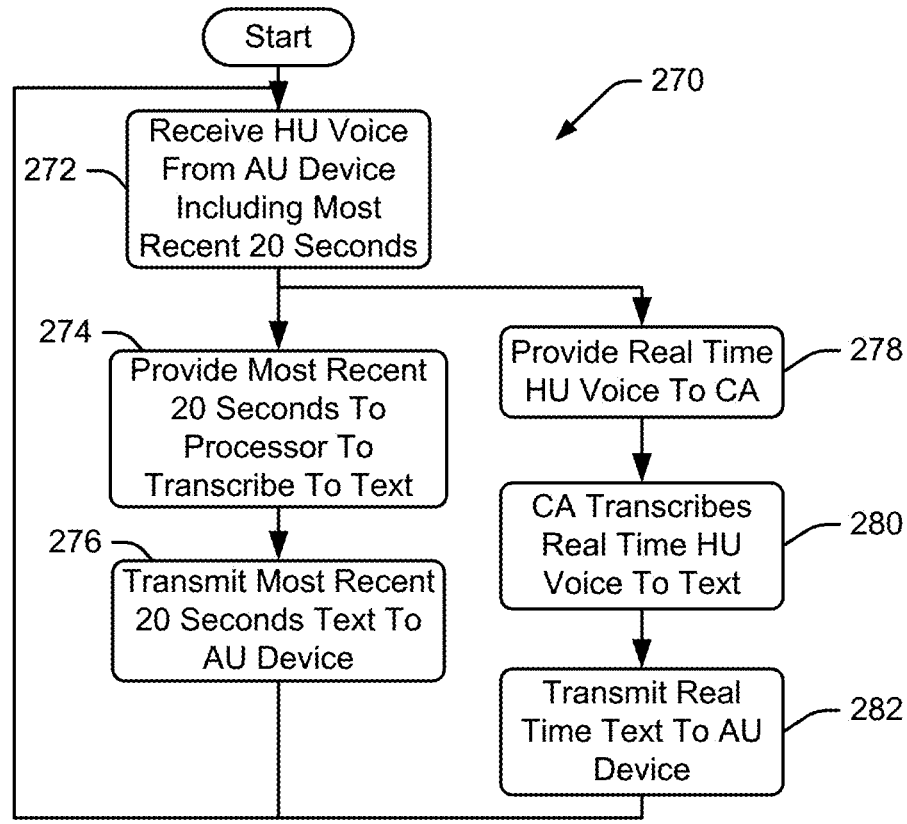
FIG. 9 is a flow chart illustrating a process whereby voice messages prior to a request for captioning service are automatically transcribed to text by an automated voice-to-text engine.

Referring to FIG. 9, a relay server process 270 whereby automated software transcribes voice messages that occur prior to selection of a caption button and a call assistant at least initially captions current voice messages is illustrated. At block 272, after an assisted user requests captioning service by selecting a caption button, server 30 receives a hearing user's voice messages including current ongoing messages as well as the most recent 20 seconds of voice messages that had been stored by assisted user's device 12 (see again FIG. 1). After block 27, control passes to each of blocks 274 and 278 where two simultaneous processes commence in parallel. At block 274 the stored 20 seconds of voice messages are provided to voice-to-text software run by server 30 to generate automated text and at block 276 the automated text is transmitted to the assisted user's device 12 for display. At block 278 the current or real time hearing user's voice messages are provided to a call assistant and at block 280 the call assistant transcribes the current voice messages to text. The call assistant generated text is transmitted to an assisted user's device at block 282 where the text is displayed along with the text transmitted at block 276. Thus, here, the assisted user receives text corresponding to misunderstood voice messages that occur just prior to the assisted user requesting captioning. One other advantage of this system is that when captioning starts, the call assistant is not starting captioning with an already existing backlog of words to transcribe and instead automated software is used to provide the prior text.

In addition to using a service provided by relay 16 to transcribe stored rolling text, other resources may be used to transcribe the stored rolling text. For instance, in at least some embodiments an assisted user's device may link via the Internet or the like to a third party provider that can receive voice messages and transcribe those messages, at least somewhat accurately, to text. In these cases it is contemplated that real time transcription where accuracy needs to meet a high accuracy standard would still be performed by a call assistant or software trained to a specific voice while less accuracy sensitive text may be generated by the third party provider, at least some of the time for free, and transmitted back to the assisted user's device for display.

In other cases, it is contemplated that the assisted user's device 12 itself may run voice-to-text software that could be used to at least somewhat accurately transcribe voice messages to text where the text generated by the assisted user's device would only be provided in cases where accuracy sensitivity is less than normal such as where rolling voice messages prior to selection of a caption icon to initiate captioning are to be transcribed.

Figure 10:
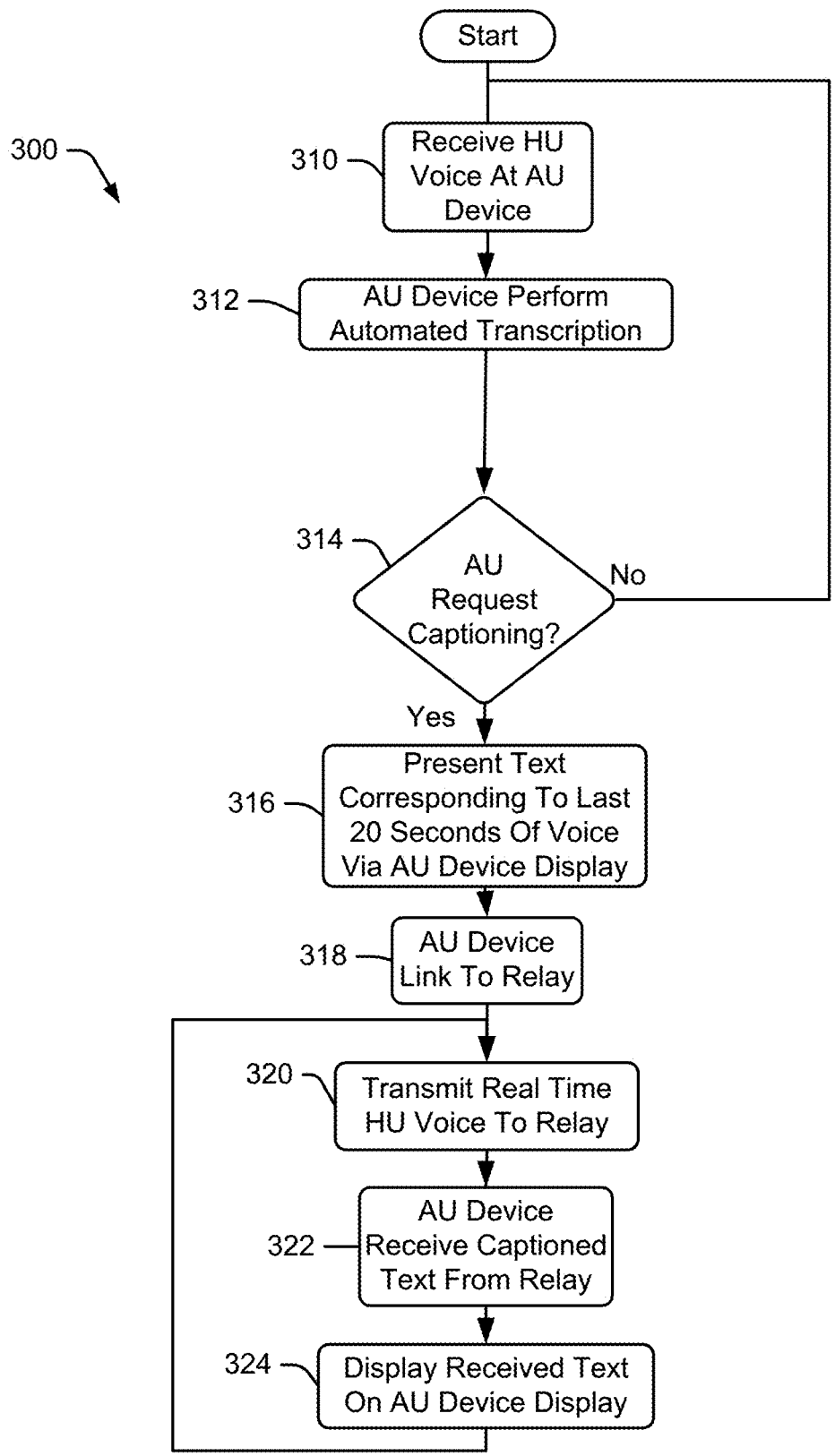
FIG. 10 is a flow chart illustrating a process whereby an assisted user's device processor performs transcription processes until a request for captioning is received at which point the assisted user's device presents texts related to hearing user voice messages prior to the request and ongoing voice messages are transcribed via a relay.

FIG. 10 shows another method 300 for providing text for voice messages that occurred prior to a caption request, albeit where an assisted user's device generates the pre-request text as opposed to a relay. Referring also to FIG. 1, at block 310 a hearing user's voice messages are received at an assisted user's device 12. At block 312, the assisted user's device 12 runs voice-to-text software that, in at least some embodiments, trains on the fly to the voice of a linked hearing user and generates caption text.

Here, on the fly training may include assigning a confidence factor to each automatically transcribed word and only using text that has a high confidence factor to train a voice model for the hearing user. For instance, only text having a confidence factor greater than 95% may be used for automatic training purposes. Here, confidence factors may be assigned based on many different factors or algorithms, many of which are well known in the automatic voice recognition art. In this embodiment, at least initially, the caption text generated by the assisted user's device 12 is not displayed to the assisted user. At block 314, until the assisted user requests captioning, control simply routes back up to block 310. Once captioning is requested by an assisted user, control passes to block 316 where the text corresponding to the last 20 seconds generated by the assisted user's device is presented on the assisted user's device display 18. Here, while there may be some errors in the displayed text, at least some text associated with the most recent voice message can be quickly presented and give the assisted user the opportunity to attempt to understand the voice messages associated therewith. At block 318 the assisted user's device links to a relay and at block 320 the hearing user's ongoing voice messages are transmitted to the relay. At block 322, after call assistant transcription at the relay, the assisted user's device receives the transcribed text from the relay and at block 324 the text is displayed. After block 324 control passes back up to block 320 where the sub-loop including blocks 320, 322 and 324 continues to cycle.

Thus, in the above example, instead of the assisted user's device storing the last 20 seconds of a hearing user's voice signal and transcribing that voice signal to text after the assisted user requests transcription, the assisted user's device constantly runs an ASR engine behind the scenes to generate automated engine text which is stored without initially being presented to the assisted user. Then, when the assisted user requests captioning or transcription, the most recently transcribed text can be presented via the assisted user's device display immediately or via rapid presentation (e.g., sequentially at a speed higher than the hearing user's speaking speed).

In at least some cases it is contemplated that voice-to-text software run outside control of the relay may be used to generate at least initial text for a hearing user's voice and that the initial text may be presented via an assisted user's device. Here, because known software still may generate more text transcription errors than allowed given standard accuracy requirements, a relay correction service may be provided. For instance, in addition to presenting text transcribed by the assisted user's device via a device display 18, the text transcribed by the assisted user's device may also be transmitted to a relay 16 for correction. In addition to transmitting the text to the relay, the hearing user's voice messages may also be transmitted to the relay so that a call assistant can compare the text automatically generated by the assisted user's device to the HU's voice messages. At the relay, the call assistant can listen to the voice of the hearing person and can observe associated text. Any errors in the text can be corrected and corrected text blocks can be transmitted back to the assisted user's device and used for in line correction on the assisted user's display screen.

One advantage to this type of system is that relatively less skilled call assistants may be retained at a lesser cost to perform the call assistant tasks. A related advantage is that the stress level on call assistants may be reduced appreciably by eliminating the need to both transcribe and correct at high speeds and therefore call assistant turnover at relays may be appreciably reduced which ultimately reduces costs associated with providing relay services.

A similar system may include an assisted user's device that links to some other third party provider transcription/caption server (e.g., in the "cloud") to obtain initial captioned text which is immediately displayed to an assisted user and which is also transmitted to the relay for call assistant correction. Here, again, the call assistant corrections may be used by the third party provider to train the software on the fly to the hearing user's voice. In this case, the assisted user's device may have three separate links, one to the hearing user, a second link to a third party provider server, and a third link to the relay. In other cases, the relay may create the link to the third party server for AVR services. Here, the relay would provide the HU's voice signal to the third party server, would receive text back from the server to transmit to the AU device and would receive corrections from the CA to transmit to each of the AU device and the server. The third party server would then use the corrections to train the voice model to the HU voice and would use the evolving model to continue AVR transcription.

Figure 11:
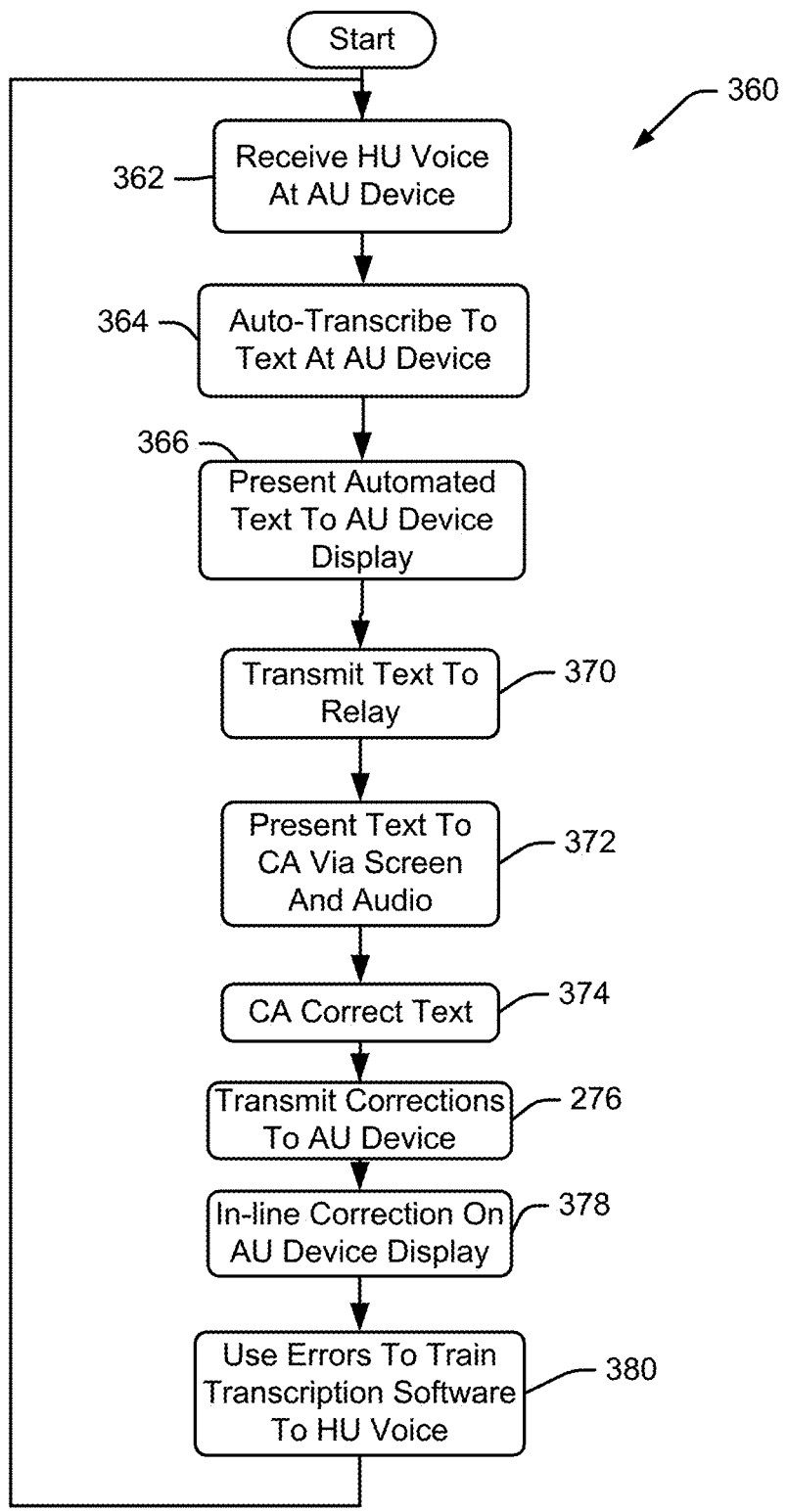
FIG. 11 is a flow chart illustrating a process whereby an assisted user's device processor generates automated text for a hear user's voice messages which is presented via a display to an assisted user and also transmits the text to a call assistant at a relay for correction purposes.

Referring to FIG. 11, a method 360 whereby an assisted user's device transcribes a hearing user's voice to text and where corrections are made to the text at a relay is illustrated. At block 362 a hearing user's voice messages are received at an assisted user's device 12 (see also again FIG. 1). At block 364 the assisted user's device runs voice-to-text software to generate text from the received voice messages and at block 366 the generated text is presented to the assisted user via display 18. At block 370 the transcribed text is transmitted to the relay 16 and at block 372 the text is presented to a call assistant via the call assistant's display 50. At block 374 the call assistant corrects the text and at block 376 corrected blocks of text are transmitted to the assisted user's device 12. At block 378 the assisted user's device 12 uses the corrected blocks to correct the text errors via in line correction. At block 380, the assisted user's device uses the errors, the corrected text and the voice messages to train the captioning software to the hearing user's voice.

In some cases instead of having a relay or an assisted user's device run automated voice-to-text transcription software, a hearing user's device may include a processor that runs transcription software to generate text corresponding to the hearing user's voice messages. To this end, device 14 may, instead of including a simple telephone, include a computer that can run various applications including a voice-to-text program or may link to some third party real time transcription software program (e.g., software run by a third party server in the "cloud") to obtain an initial text transcription substantially in real time. Here, as in the case where an assisted user's device runs the transcription software, the text will often have more errors than allowed by the standard accuracy requirements. Again, to correct the errors, the text and the hearing user's voice messages are transmitted to relay 16 where a call assistant listens to the voice messages, observes the text on screen 18 and makes corrections to eliminate transcription errors. The corrected blocks of text are transmitted to the assisted user's device for display. The corrected blocks may also be transmitted back to the hearing user's device for training the captioning software to the hearing user's voice. In these cases the text transcribed by the hearing user's device and the hearing user's voice messages may either be transmitted directly from the hearing user's device to the relay or may be transmitted to the assisted user's device 12 and then on to the relay. Where the hearing user's voice messages and text are transmitted directly to the relay 16, the voice messages and text may also be transmitted directly to the assisted user's device for immediate broadcast and display and the corrected text blocks may be subsequently used for in line correction.

In these cases the caption request option may be supported so that an assisted user can initiate captioning during an on-going call at any time by simply transmitting a signal to the hearing user's device instructing the hearing user's device to start the captioning process. Similarly, in these cases the help request option may be supported. Where the help option is facilitated, the automated text may be presented via the assisted user's device and, if the assisted user perceives that too many text errors are being generated, the help button may be selected to cause the hearing user's device or the assisted user's device to transmit the automated text to the relay for call assistant correction.

One advantage to having a hearing user's device manage or perform voice-to-text transcription is that the voice signal being transcribed can be a relatively high quality voice signal. To this end, a standard phone voice signal has a range of frequencies between 300 and about 3000 Hertz which is only a fraction of the frequency range used by most voice-to-text transcription programs and therefore, in many cases, automated transcription software does only a poor job of transcribing voice signals that have passed through a telephone connection. Where transcription can occur within a digital signal portion of an overall system, the frequency range of voice messages can be optimized for automated transcription. Thus, where a hearing user's computer that is all digital receives and transcribes voice messages, the frequency range of the messages is relatively large and accuracy can be increased appreciably. Similarly, where a hearing user's computer can send digital voice messages to a third party transcription server accuracy can be increased appreciably.

In at least some configurations it is contemplated that the link between an assisted user's device 12 and a hearing user's device 14 may be either a standard analog phone type connection or may be a digital connection depending on the capabilities of the hearing user's device that links to the assisted user's device. Thus, for instance, a first call may be analog and a second call may be digital. Because digital voice messages have a greater frequency range and therefore can be automatically transcribed more accurately than analog voice messages in many cases, it has been recognized that a system where automated voice-to-text program use is implemented on a case by case basis depending upon the type of voice message received (e.g., digital or analog) would be advantageous. For instance, in at least some embodiments, where a relay receives an analog voice message for transcription, the relay may automatically link to a call assistant for full call assistant transcription service where the call assistant transcribes and corrects text via revoicing and keyboard manipulation and where the relay receives a high definition digital voice message for transcription, the relay may run an automated voice-to-text transcription program to generate automated text. The automated text may either be immediately corrected by a call assistant or may only be corrected by an assistant after a help feature is selected by an assisted user as described above.

Figure 12:
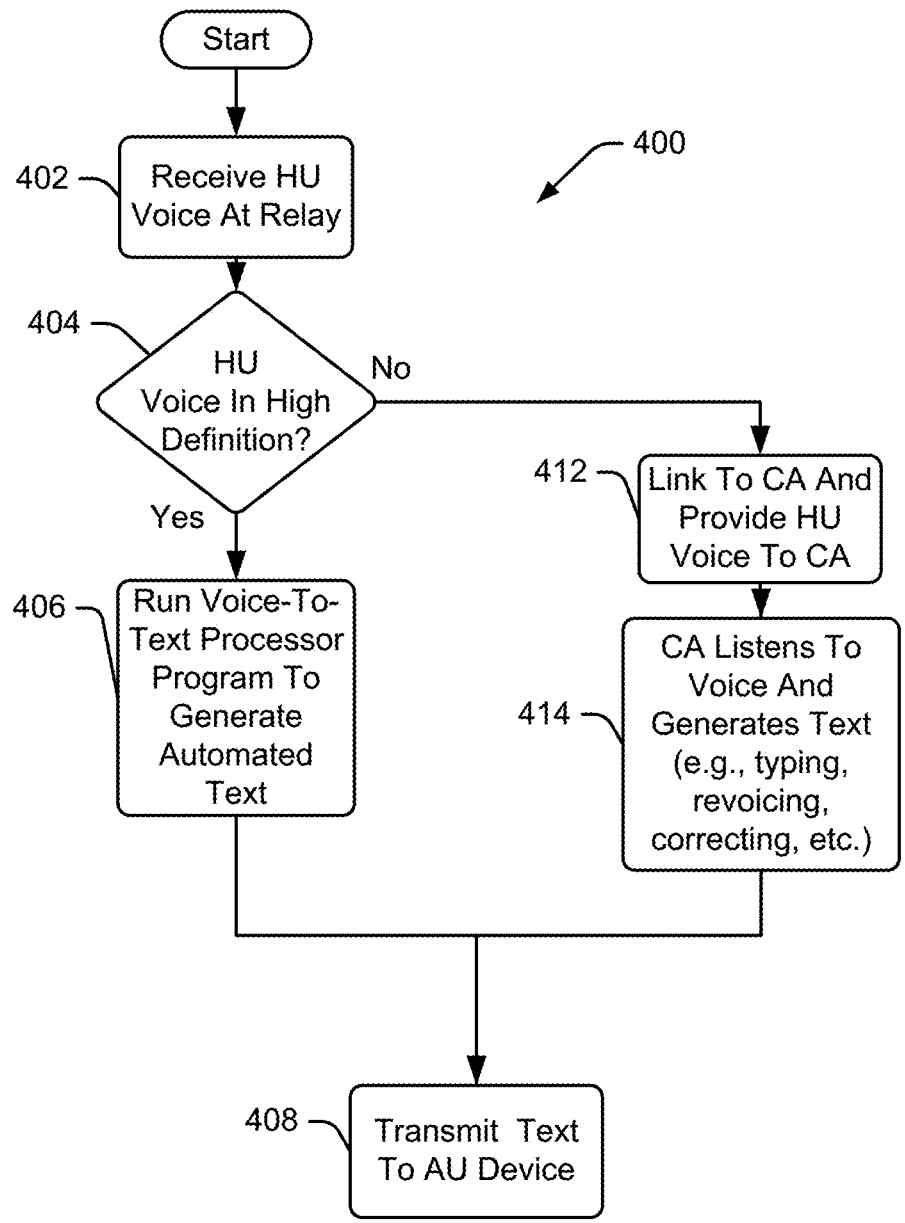
FIG. 12 is a flow chart illustrating a process whereby high definition digital voice messages and analog voice messages are handled differently at a relay.

Referring to FIG. 12, one process 400 for treating high definition digital messages differently than analog voice messages is illustrated. Referring also to FIG. 1, at block 402 a hearing user's voice messages are received at a relay 16. At decision block 404, relay server 30 determines if the received voice message is a high definition digital message or is an analog message. Where a high definition message has been received, control passes to block 406 where server 30 runs an automated voice-to-text program on the voice messages to generate automated text. At block 408 the automated text is transmitted to the assisted user's device 12 for display. Referring again to block 404, where the hearing user's voice messages are in analog, control passes to block 412 where a link to a call assistant is established so that the hearing user's voice messages are provided to a call assistant. At block 414 the call assistant listens to the voice messages and transcribes the messages into text. Error correction may also be performed at block 414. After block 414, control passes to block 408 where the call assistant generated text is transmitted to the assisted user's device 12. Again, in some cases, when automated text is presented to an assisted user, a help button may be presented that, when selected causes automated text to be presented to a call assistant for correction. In other cases automated text may be automatically presented to a call assistant for correction.

Another system is contemplated where all incoming calls to a relay are initially assigned to a call assistant for at least initial captioning where the option to switch to automated software generated text is only available when the call includes high definition audio and after accuracy standards have been exceeded. Here, all analog hearing user's voice messages would be captioned by a call assistant from start to finish and any high definition calls would cut out the call assistant when the standard is exceeded.

In at least some cases where an assisted user's device is capable of running automated voice-to-text transcription software, the assisted user's device 12 may be programmed to select either automated transcription when a high definition digital voice message is received or a relay with a call assistant when an analog voice message is received. Again, where device 12 runs an automated text program, call assistant correction may be automatic or may only start when a help button is selected.

Figure 13:
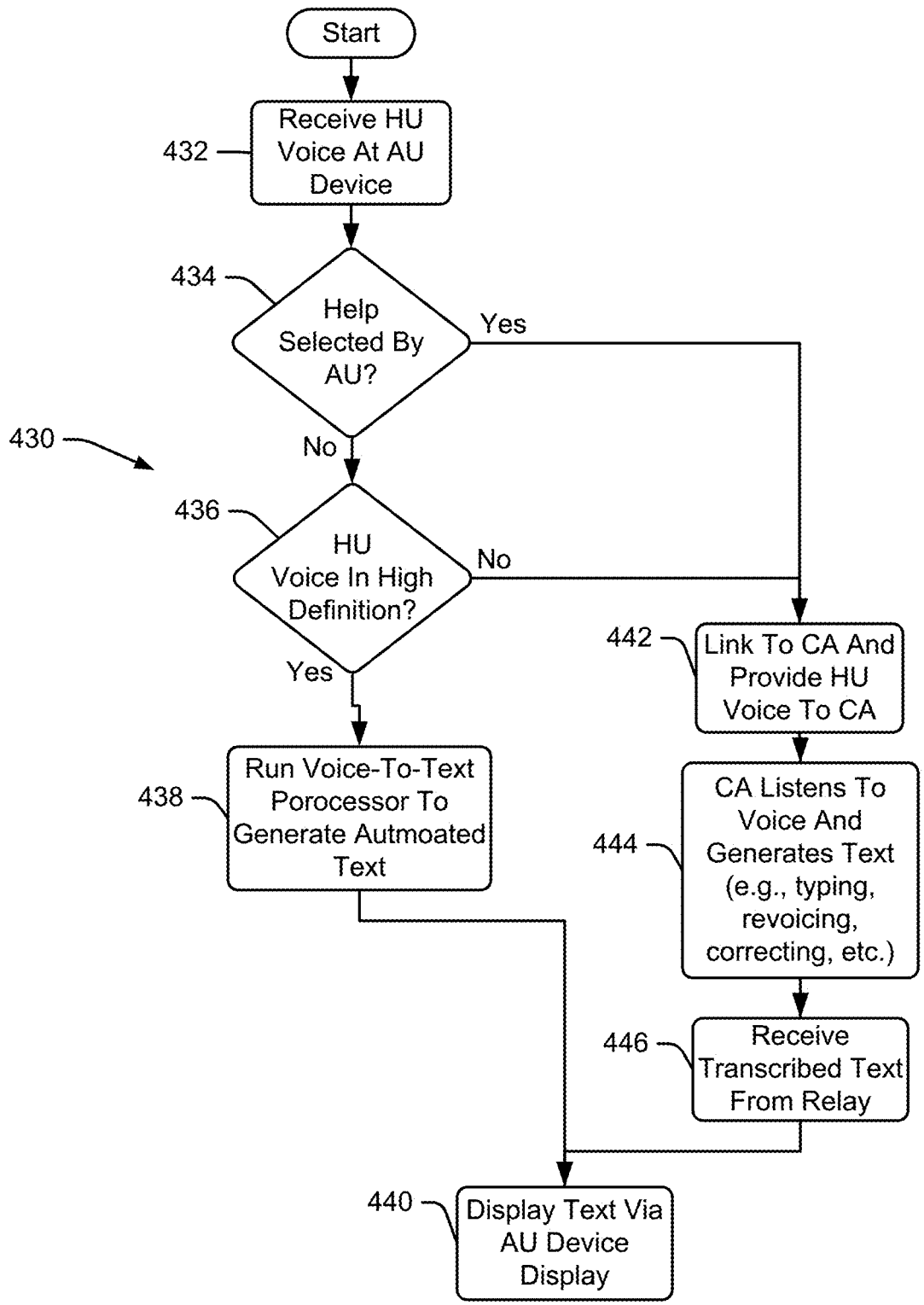
FIG. 13 is a process similar to FIG. 12, albeit where an assisted user also has the option to link to a call assistant for captioning service regardless of the type of voice message received.

FIG. 13 shows a process 430 whereby an assisted user's device 12 selects either automated voice-to-text software or a call assistant to transcribe based on the type (e.g., digital or analog) of voice messages received. At block 432 a hearing user's voice messages are received by an assisted user's device 12. At decision block 434, a processor in device 12 determines if the assisted user has selected a help button. Initially no help button is selected as no text has been presented so at least initially control passes to block 436. At decision block 436, the device processor determines if a hearing user's voice signal that is received is high definition digital or is analog. Where the received signal is high definition digital, control passes to block 438 where the assisted user's device processor runs automated voice-to-text software to generate automated text which is then displayed on the assisted user device display 18 at block 440. Referring still to FIG. 13, if the help button has been selected at block 434 or if the received voice messages are in analog, control passes to block 442 where a link to a call assistant at relay 16 is established and the hearing user's voice messages are transmitted to the relay. At block 444 the call assistant listens to the voice messages and generates text and at block 446 the text is transmitted to the assisted user's device 12 where the text is displayed at block 440.

In has been recognized that in many cases most calls facilitated using an assisted user's device will be with a small group of other hearing or non-hearing users. For instance, in many cases as much as 70 to 80 percent of all calls to an assisted user's device will be with one of five or fewer hearing user's devices (e.g., family, close friends, a primary care physician, etc.). For this reason it has been recognized that it would be useful to store voice-to-text models for at least routine callers that link to an assisted user's device so that the automated voice-to-text training process can either be eliminated or substantially expedited. For instance, when an assisted user initiates a captioning service, if a previously developed voice model for a hearing user can be identified quickly, that model can be used without a new training process and the switchover from a full service call assistant to automated captioning may be expedited (e.g., instead of taking a minute or more the switchover may be accomplished in 15 seconds or less, in the time required to recognize or distinguish the hearing user's voice from other voices).

Figure 14:
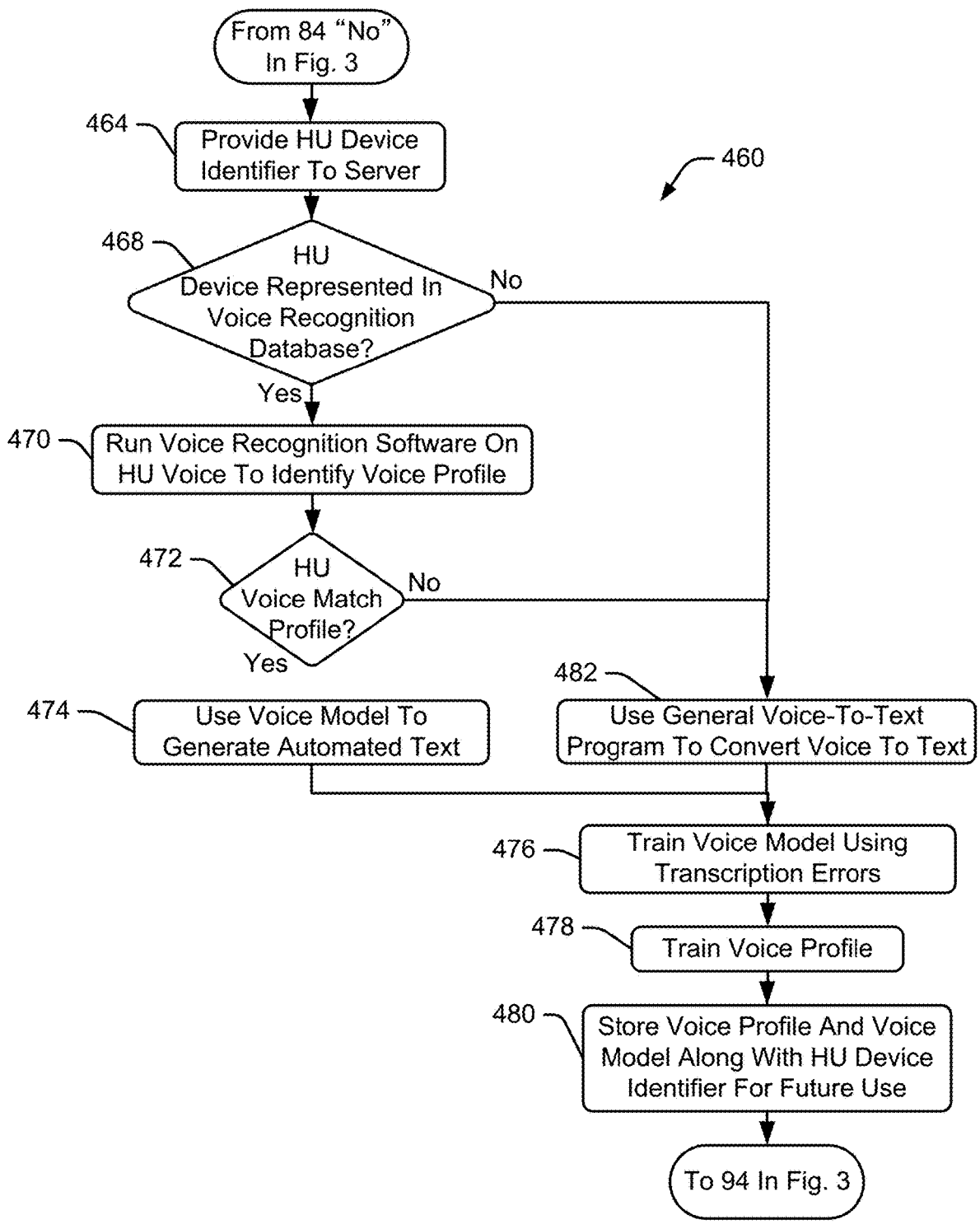
FIG. 14 is a flow chart that may be substituted for a portion of the process shown in FIG. 3 whereby voice models and voice profiles are generated for frequent hearing user's that communicate with an assisted user where the models and profiles can be subsequently used to increase accuracy of a transcription process.

FIG. 14 shows a sub-process 460 that may be substituted for a portion of the process shown in FIG. 3 wherein voice-to-text templates or models along with related voice recognition profiles for callers are stored and used to expedite the handoff to automated transcription. Prior to running sub-process 460, referring again to FIG. 1, server 30 is used to create a voice recognition database for storing hearing user device identifiers along with associated voice recognition profiles and associated voice-to-text models. A voice recognition profile is a data construct that can be used to distinguish one voice from others.

In the context of the FIG. 1 system, voice recognition profiles are useful because more than one person may use a hearing user's device to call an assisted user. For instance in an exemplary case, an assisted user's son or daughter-in-law or one of any of three grandchildren may use device 14 to call an assisted user and therefore, to access the correct voice-to-text model, server 30 needs to distinguish which caller's voice is being received. Thus, in many cases, the voice recognition database will include several voice recognition profiles for each hearing user device identifier (e.g., each hearing user phone number). A voice-to-text model includes parameters that are used to customize voice-to-text software for transcribing the voice of an associated hearing user to text.

The voice recognition database will include at least one voice model for each voice profile to be used by server 30 to automate transcription whenever a voice associated with the specific profile is identified. Data in the voice recognition database will be generated on the fly as an assisted user uses device 12. Thus, initially the voice recognition database will include a simple construct with no device identifiers, profiles or voice models.

Referring still to FIGS. 1 and 14 and now also to FIG. 3, at decision block 84 in FIG. 3, if the help flag is still zero (e.g., an assisted user has not requested call assistant help to correct automated text errors) control may pass to block 464 in FIG. 13 where the hearing user's device identifier (e.g., a phone number, an IP address, a serial number of a hearing user's device, etc.) is received by server 30. At block 468 server 30 determines if the hearing user's device identifier has already been added to the voice recognition database. If the hearing user's device identifier does not appear in the database (e.g., the first time the hearing user's device is used to connect to the assisted user's device) control passes to block 482 where server 30 uses a general voice-to-text program to convert the hearing user's voice messages to text after which control passes to block 476. At block 476 the server 30 trains a voice-to-text model using transcription errors. Again, the training will include comparing call assistant generated text to automated text to identify errors and using the errors to adjust model parameters so that the next time a word associated with an error is uttered by the hearing user, the software will identify the correct word. At block 478, server 30 trains a voice profile for the hearing user's voice so that the next time the hearing user calls, a voice profile will exist for the specific hearing user that can be used to identify the hearing user. At block 480 the server 30 stores the voice profile and voice model for the hearing user along with the hearing user device identifier for future use after which control passes back up to block 94 in FIG. 3.

Referring still to FIGS. 1 and 14, at block 468, if the hearing user's device is already represented in the voice recognition database, control passes to block 470 where server 30 runs voice recognition software on the hearing user's voice messages in an attempt to identify a voice profile associated with the specific hearing user. At decision block 472, if the hearing user's voice does not match one of the previously stored voice profiles associated with the device identifier, control passes to block 482 where the process described above continues. At block 472, if the hearing user's voice matches a previously stored profile, control passes to block 474 where the voice model associated with the matching profile is used to tune the voice-to-text software to be used to generate automated text.

Referring still to FIG. 14, at blocks 476 and 478, the voice model and voice profile for the hearing user are continually trained. Continual training enables the system to constantly adjust the model for changes in a hearing user's voice that may occur over time or when the hearing user experiences some physical condition (e.g., a cold, a raspy voice) that affects the sound of their voice. At block 480, the voice profile and voice model are stored with the HU device identifier for future use.

In at least some embodiments, server 30 may adaptively change the order of voice profiles applied to a hearing user's voice during the voice recognition process. For instance, while server 30 may store five different voice profiles for five different hearing users that routinely connect to an assisted user's device, a first of the profiles may be used 80 percent of the time. In this case, when captioning is commenced, server 30 may start by using the first profile to analyze a hearing user's voice at block 472 and may cycle through the profiles from the most matched to the least matched.

To avoid server 30 having to store a different voice profile and voice model for every hearing person that communicates with an assisted user via device 12, in at least some embodiments it is contemplated that server 30 may only store models and profiles for a limited number (e.g., 5) of frequent callers. To this end, in at least some cases server 30 will track calls and automatically identify the most frequent hearing user devices used to link to the assisted user's device 12 over some rolling period (e.g., 1 month) and may only store models and profiles for the most frequent callers. Here, a separate counter may be maintained for each hearing user device used to link to the assisted user's device over the rolling period and different models and profiles may be swapped in and out of the stored set based on frequency of calls.

In other embodiments server 30 may query an assisted user for some indication that a specific hearing user is or will be a frequent contact and may add that person to a list for which a model and a profile should be stored for a total of up to five persons.

While the system described above with respect to FIG. 14 assumes that the relay 16 stores and uses voice models and voice profiles that are trained to hearing user's voices for subsequent use, in at least some embodiments it is contemplated that an assisted user's device 12 processor may maintain and use or at least have access to and use the voice recognition database to generate automated text without linking to a relay. In this case, because the assisted user's device runs the software to generate the automated text, the software for generating text can be trained any time the user's device receives a hearing user's voice messages without linking to a relay. For example, during a call between a hearing user and an assisted user on devices 14 and 12, respectively, in FIG. 1, and prior to an assisted user requesting captioning service, the voice messages of even a new hearing user can be used by the assisted user's device to train a voice-to-text model and a voice profile for the user. In addition, prior to a caption request, as the model is trained and gets better and better, the model can be used to generate text that can be used as fill in text (e.g., text corresponding to voice messages that precede initiation of the captioning function) when captioning is selected.

Figure 15:
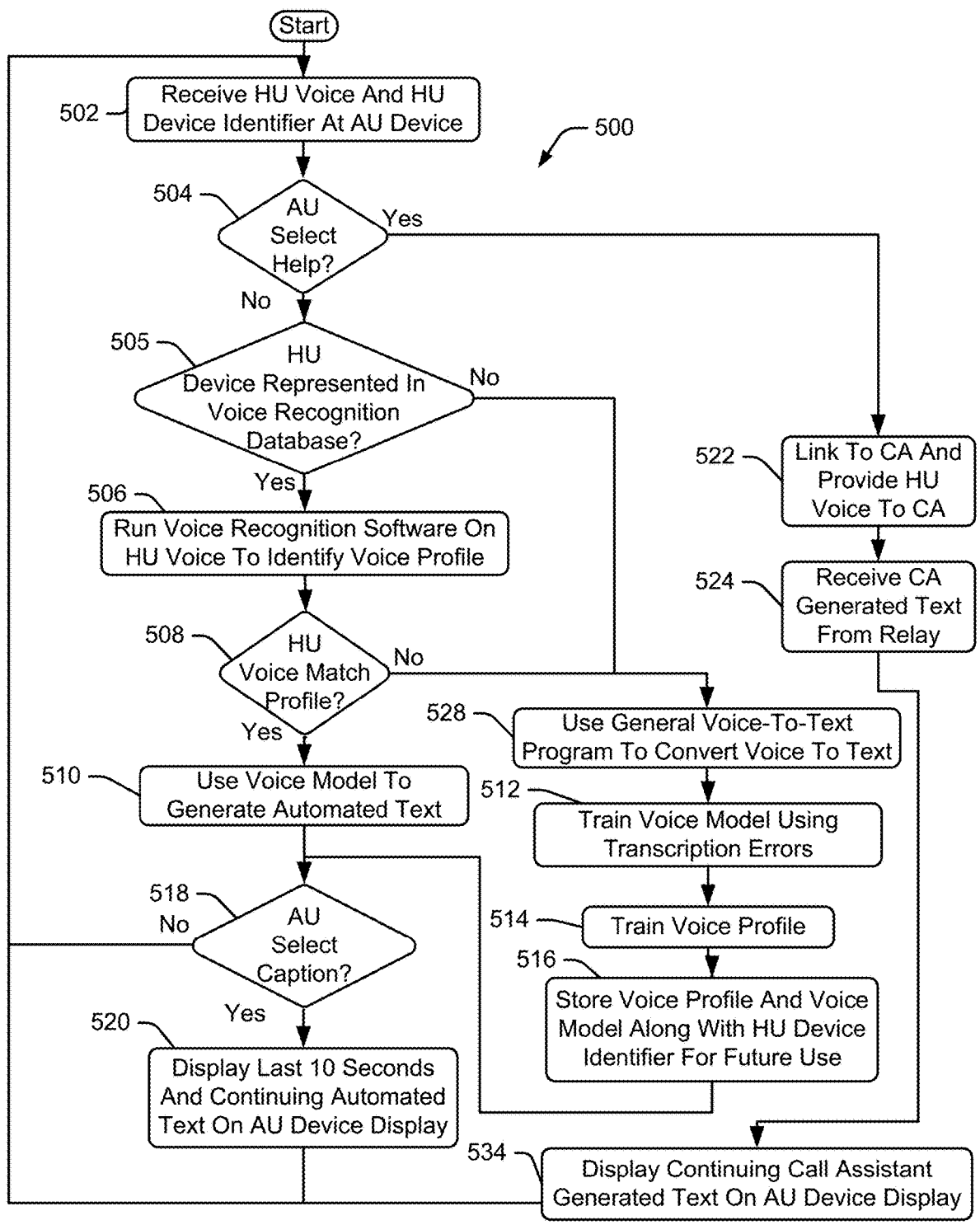
FIG. 15 is a flow chart illustrating a process similar to the sub-process shown in FIG. 14 where voice profiles and voice models are generated and stored for subsequent use during transcription.

FIG. 15 shows a process 500 that may be performed by an assisted user's device to train voice models and voice profiles and use those models and profiles to automate text transcription until a help button is selected. Referring also to FIG. 1, at block 502, an assisted user's device 12 processor receives a hearing user's voice messages as well as an identifier (e.g. a phone number) of the hearing user's device 14. At block 504 the processor determines if the assisted user has selected the help button (e.g., indicating that current captioning includes too many errors). If an assisted user selects the help button at block 504, control passes to block 522 where the assisted user's device is linked to a call assistant at relay 16 and the hearing user's voice is presented to the call assistant. At block 524 the assisted user's device receives text back from the relay and at block 534 the call assistant generated text is displayed on the assisted user's device display 18.

Where the help button has not been selected, control passes to block 505 where the processor uses the device identifier to determine if the hearing user's device is represented in the voice recognition database. Where the hearing user's device is not represented in the database control passes to block 528 where the processor uses a general voice-to-text program to convert the hearing user's voice messages to text after which control passes to block 512.

Referring again to FIGS. 1 and 15, at block 512 the processor adaptively trains the voice model using perceived errors in the automated text. To this end, one way to train the voice model is to generate text phonetically and thereafter perform a context analysis of each text word by looking at other words proximate the word to identify errors. Another example of using context to identify errors is to look at several generated text words as a phrase and compare the phrase to similar prior phrases that are consistent with how the specific hearing user strings words together and identify any discrepancies as possible errors. At block 514 a voice profile for the hearing user is generated from the hearing user's voice messages so that the hearing user's voice can be recognized in the future. At block 516 the voice model and voice profile for the hearing user are stored for future use during subsequent calls and then control passes to block 518 where the process described above continues. Thus, blocks 528, 512, 514 and 516 enable the assisted user's device to train voice models and voice profiles for hearing users that call in anew where a new voice model can be used during an ongoing call and during future calls to provide generally accurate transcription.

Referring still to FIGS. 1 and 15, if the hearing user's device is already represented in the voice recognition database at block 505, control passes to block 506 where the processor runs voice recognition software on the hearing user's voice messages in an attempt to identify one of the voice profiles associated with the device identifier. At block 508, where no voice profile is recognized, control passes to block 528.

At block 508, if the hearing user's voice matches one of the stored voice profiles, control passes to block 510 where the voice-to-text model associated with the matching profile is used to generate automated text from the hearing user's voice messages. Next, at block 518, the assisted user's device processor determine if the caption button on the assisted user's device has been selected. If captioning has not been selected control passes to block 502 where the process continues to cycle. Once captioning has been requested, control passes to block 520 where assisted user's device 12 displays the most recent 10 seconds of automated text and continuing automated text on display 18.

In at least some embodiments it is contemplated that different types of voice model training may be performed by different processors within the overall FIG. 1 system. For instance, while an assisted user's device is not linked to a relay, the assisted user's device cannot use any errors identified by a call assistance at the relay to train a voice model as no call assistant is generating errors. Nevertheless, the assisted user's device can use context and confidence factors to identify errors and train a model. Once an assisted user's device is linked to a relay where a call assistant corrects errors, the relay server can use the call assistant identified errors and corrections to train a voice model which can, once sufficiently accurate, be transmitted to the assisted user's device where the new model is substituted for the old content based model or where the two models are combined into a single robust model in some fashion. In other cases when an assisted user's device links to a relay for call assistant captioning, a context based voice model generated by the assisted user's device for the hearing user may be transmitted to the relay server and used as an initial model to be further trained using call assistant identified errors and corrections. In still other cases call assistant errors may be provided to the assisted user's device and used by that device to further train a context based voice model for the hearing user.

Figure 16:
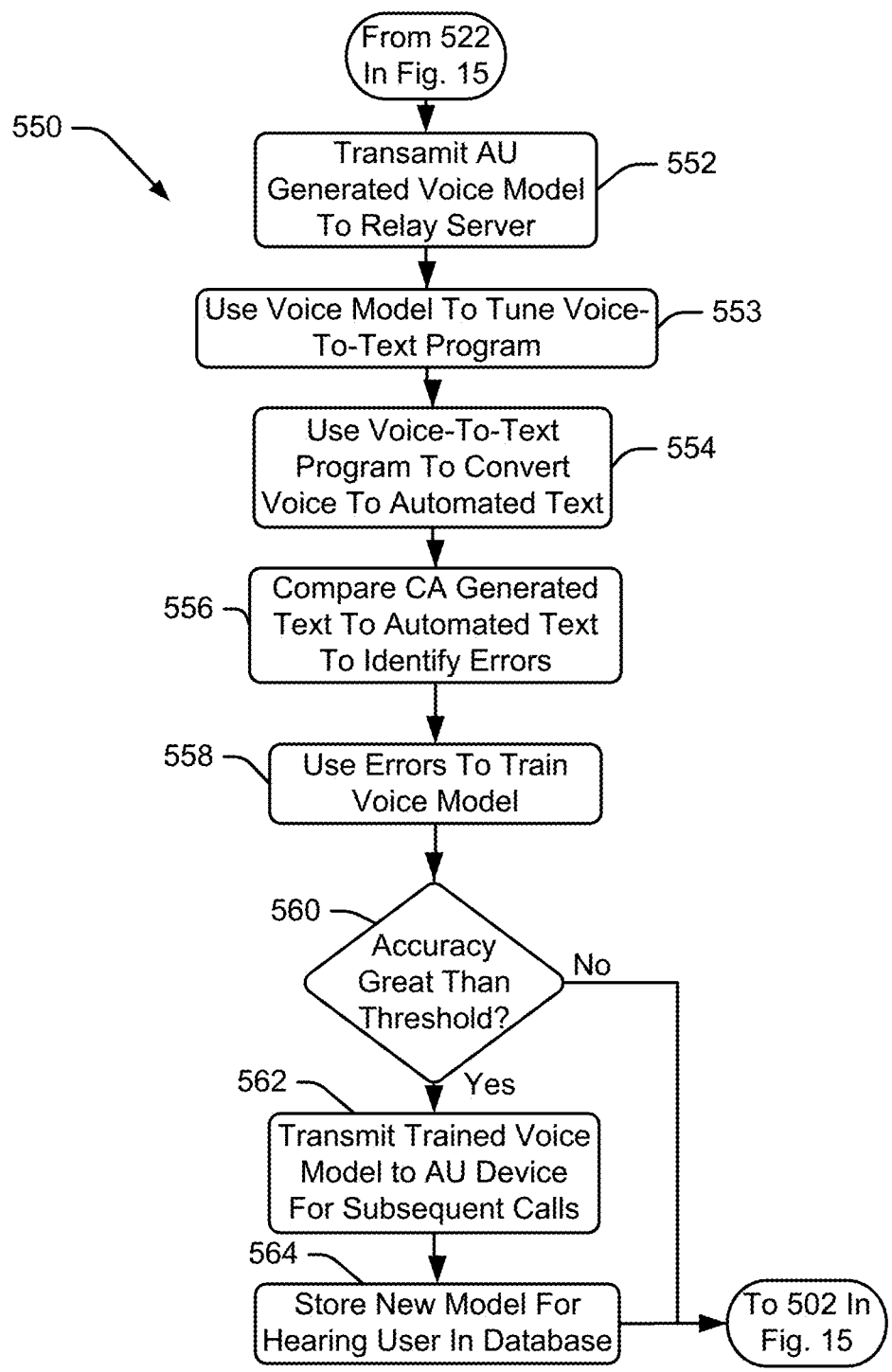
FIG. 16 is a flow chart illustrating a sub-process that may be added to the process shown in FIG. 15 where the resulting process calls for training of a voice model at each of an assisted user's device and a relay.

Referring now to FIG. 16, a sub-process 550 that may be added to the process shown in FIG. 15 whereby an assisted user's device trains a voice model for a hearing user using voice message content and a relay server further trains the voice model generated by the assisted user's device using call assistant identified errors is illustrated. Referring also to FIG. 15, sub-process 550 is intended to be performed in parallel with block 524 and 534 in FIG. 15. Thus, after block 522, in addition to block 524, control also passes to block 552 in FIG. 16. At block 552 the voice model for a hearing user that has been generated by an assisted user's device 12 is transmitted to relay 16 and at block 553 the voice model is used to modify a voice-to-text program at the relay. At block 554 the modified voice-to-text program is used to convert the hearing user's voice messages to automated text. At block 556 the call assistant generated text is compared to the automated text to identify errors. At block 558 the errors are used to further train the voice model. At block 560, if the voice model has an accuracy below the required standard, control passes back to block 502 in FIG. 15 where the process described above continues to cycle. At block 560, once the accuracy exceeds the standard requirement, control passes to block 562 wherein server 30 transmits the trained voice model to the assisted user's device for handling subsequent calls from the hearing user for which the model was trained. At block 564 the new model is stored in the database maintained by the assisted user's device.

Referring still to FIG. 16, in addition to transmitting the trained model to the assisted user's device at block 562, once the model is accurate enough to meet the standard requirements, server 30 may perform an automated process to cut out the call assistant and instead transmit automated text to the assisted user's device as described above in FIG. 1. In the alternative, once the model has been transmitted to the assisted user's device at block 562, the relay may be programmed to hand off control to the assisted user's device which would then use the newly trained and relatively more accurate model to perform automated transcription so that the relay could be disconnected.

Several different concepts and aspects of the present disclosure have been described above. It should be understood that many of the concepts and aspects may be combined in different ways to configure other triage systems that are more complex. For instance, one exemplary system may include an assisted user's device that attempts automated captioning with on the fly training first and, when automated captioning by the assisted user's device fails (e.g., a help icon is selected by an assisted user), the assisted user's device may link to a third party captioning system via the internet or the like where another more sophisticated voice-to-text captioning software is applied to generate automated text. Here, if the help button is selected a second time or a "call assistant" button is selected, the assisted user's device may link to a call assistant at the relay for call assistant captioning with simultaneous voice-to-text software transcription where errors in the automated text are used to train the software until a threshold accuracy requirement is met. Here, once the accuracy requirement is exceeded, the system may automatically cut out the call assistant and switch to the automated text from the relay until the help button is again selected. In each of the transcription hand offs, any learning or model training performed by one of the processors in the system may be provided to the next processor in the system to be used to expedite the training process.

In at least some embodiments an automated voice-to-text engine may be utilized in other ways to further enhance calls handled by a relay. For instance, in cases where transcription by a call assistant lags behind a hearing user's voice messages, automated transcription software may be programmed to transcribe text all the time and identify specific words in a hearing user's voice messages to be presented via an assisted user's display immediately when identified to help the assisted user determine when a hearing user is confused by a communication delay. For instance, assume that transcription by a call assistant lags a hearing user's most current voice message by 20 seconds and that an assisted user is relying on the call assistant generated text to communicate with the hearing user. In this case, because the call assistant generated text lag is substantial, the hearing user may be confused when the assisted user's response also lags a similar period and may generate a voice message questioning the status of the call. For instance, the hearing user may utter "Are you there?" or "Did you hear me?" or "Hello" or "What did you say?". These phrases and others like them querying call status are referred to herein as "line check words" (LCWs) as the hearing user is checking the status of the call on the line.

If the line check words are not presented until they occurred sequentially in the hearing user's voice messages, they would be delayed for 20 or more seconds in the above example. In at least some embodiments it is contemplated that the automated voice engine may search for line check words (e.g., 50 common line check phrases) in a hearing user's voice messages and present the line check words immediately via the assisted user's device during a call regardless of which words have been transcribed and presented to an assisted user. The assisted user, seeing line check words or a phrase can verbally respond that the captioning service is lagging but catching up so that the parties can avoid or at least minimize confusion.

When line check words are presented to an assisted user the words may be presented in-line within text being generated by a call assistant with intermediate blanks representing words yet to be transcribed by the call assistant. To this end, see again FIG. 17 that shows line check words "Are you still there?" in a highlighting box 590 at the end of intermediate blanks 216 representing words yet to be transcribed by the call assistant. Line check words will, in at least some embodiments, be highlighted on the display or otherwise visually distinguished. In other embodiments the line check words may be located at some prominent location on the assisted user's display screen (e.g., in a line check box or field at the top or bottom of the display screen).

One advantage of using an automated voice engine to only search for specific words and phrases is that the engine can be tuned for those words and will be relatively more accurate than a general purpose engine that transcribes all words uttered by a hearing user. In at least some embodiments the automated voice engine will be run by an assisted user's device processor while in other embodiments the automated voice engine may be run by the relay server with the line check words transmitted to the assisted user's device immediately upon generation and identification.

In still other cases where automated text is presented immediately upon generation to an assisted user, line check words may be presented in a visually distinguished fashion (e.g., highlighted, in different color, as a distinct font, as a uniquely sized font, etc.) so that an assisted user can distinguish those words from others and, where appropriate, provide a clarifying remark to a confused hearing user.

Figure 18:
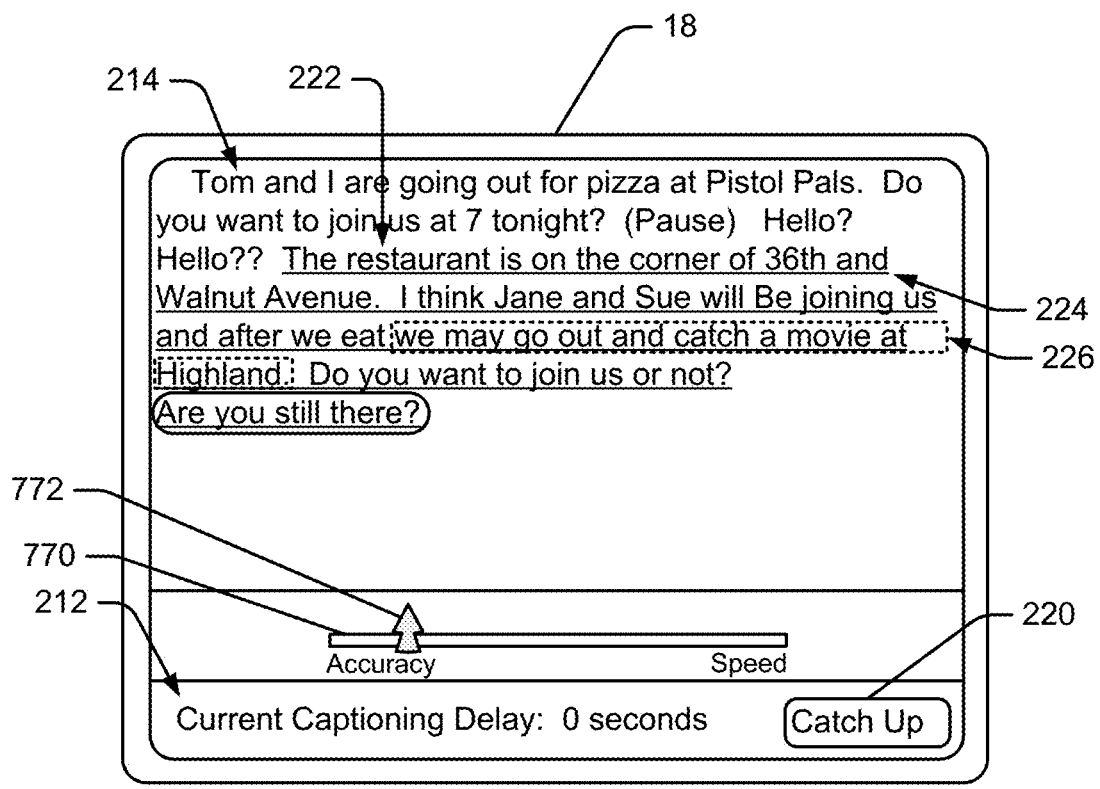
FIG. 18 is similar to FIG. 17, albeit showing a different screen shot.
Figure 19:
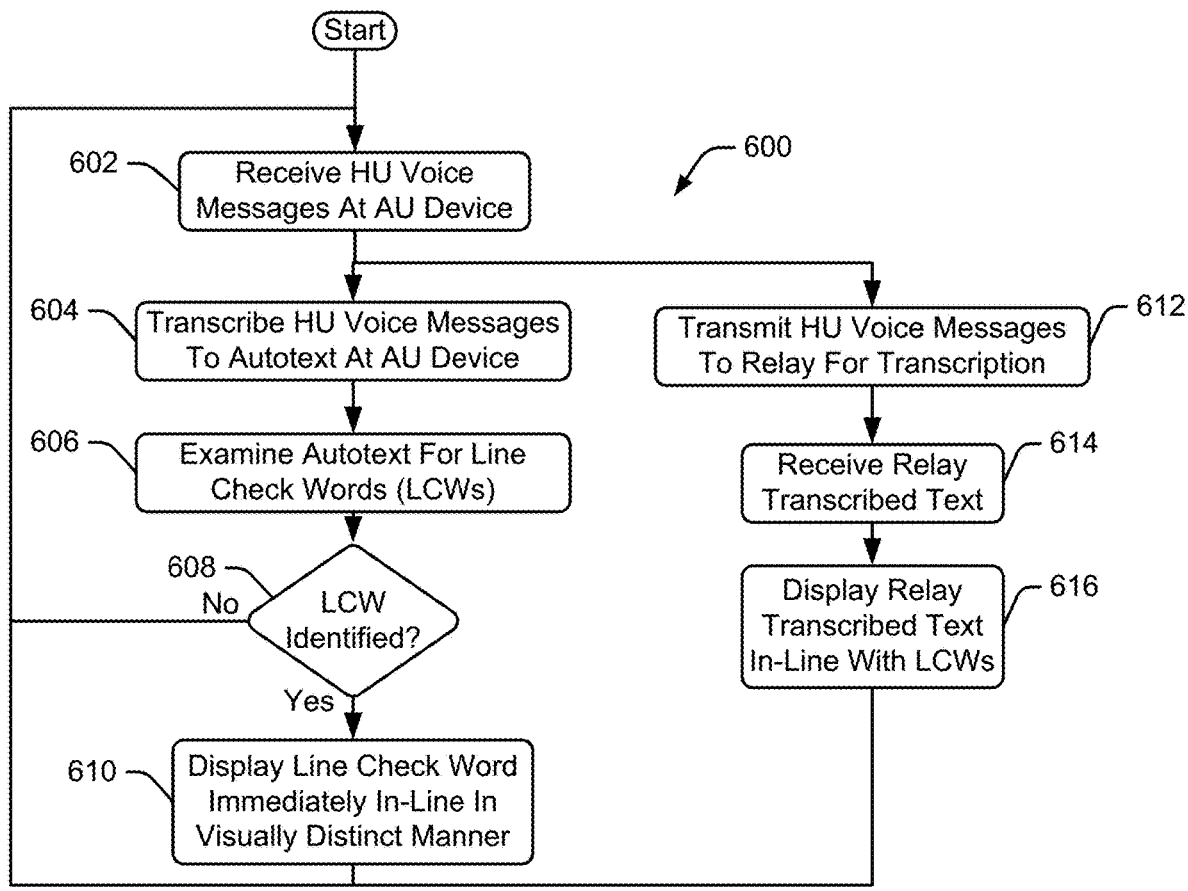
FIG. 19 is a process that may be performed by the system shown in FIG. 1 where automated text is generated for line check words and is presented to an assisted user immediately upon identification of the words.

Referring now to FIG. 19, a process 600 that may be performed by an assisted user's device 12 and a relay to transcribe hearing user's voice messages and provide line check words immediately to an assisted user when transcription by a call assistant lags in illustrated. At block 602 a hearing user's voice messages are received by an assisted user's device 12. After block 602 control continues along parallel sub-processes to blocks 604 and 612. At block 604 the assisted user's device processor uses an automated voice engine to transcribe the hearing user's voice messages to text. Here, it is assumed that the voice engine may generate several errors and therefore likely would be insufficient for the purposes of providing captioning to the assisted user. The engine, however, is optimized and trained to caption a set (e.g., 10 to 100) line check words and/or phrases which the engine can do extremely accurately. At block 606, the assisted user's device processor searches for line check words in the automated text. At block 608, if a line check word or phrase is not identified control passes back up to block 602 where the process continues to cycle. At block 608, if a line check word or phrase is identified, control passes to block 610 where the line check word/phrase is immediately presented (see phrase "Are you still there?" in FIG. 18) to the assisted user via display 18 either in-line or in a special location and, in at least some cases, in a visually distinct manner.

Referring still to FIG. 19, at block 612 the hearing user's voice messages are sent to a relay for transcription. At block 614, transcribed text is received at the assisted user's device back from the relay. At block 616 the text from the relay is used to fill in the intermediate blanks (see again FIG. 17 and also FIG. 18 where text has been filled in) on the assisted user's display.

In at least some embodiments it is contemplated that an automated voice-to-text engine may operate all the time and may check for and indicate any potential errors in call assistant generated text so that the call assistant can determine if the errors should be corrected. For instance, in at least some cases, the automated voice engine may highlight potential errors in call assistant generated text on the call assistant's display screen inviting the call assistant to correct the potential errors. In these cases the call assistant would have the final say regarding whether or not a potential error should be altered.

Figure 20:
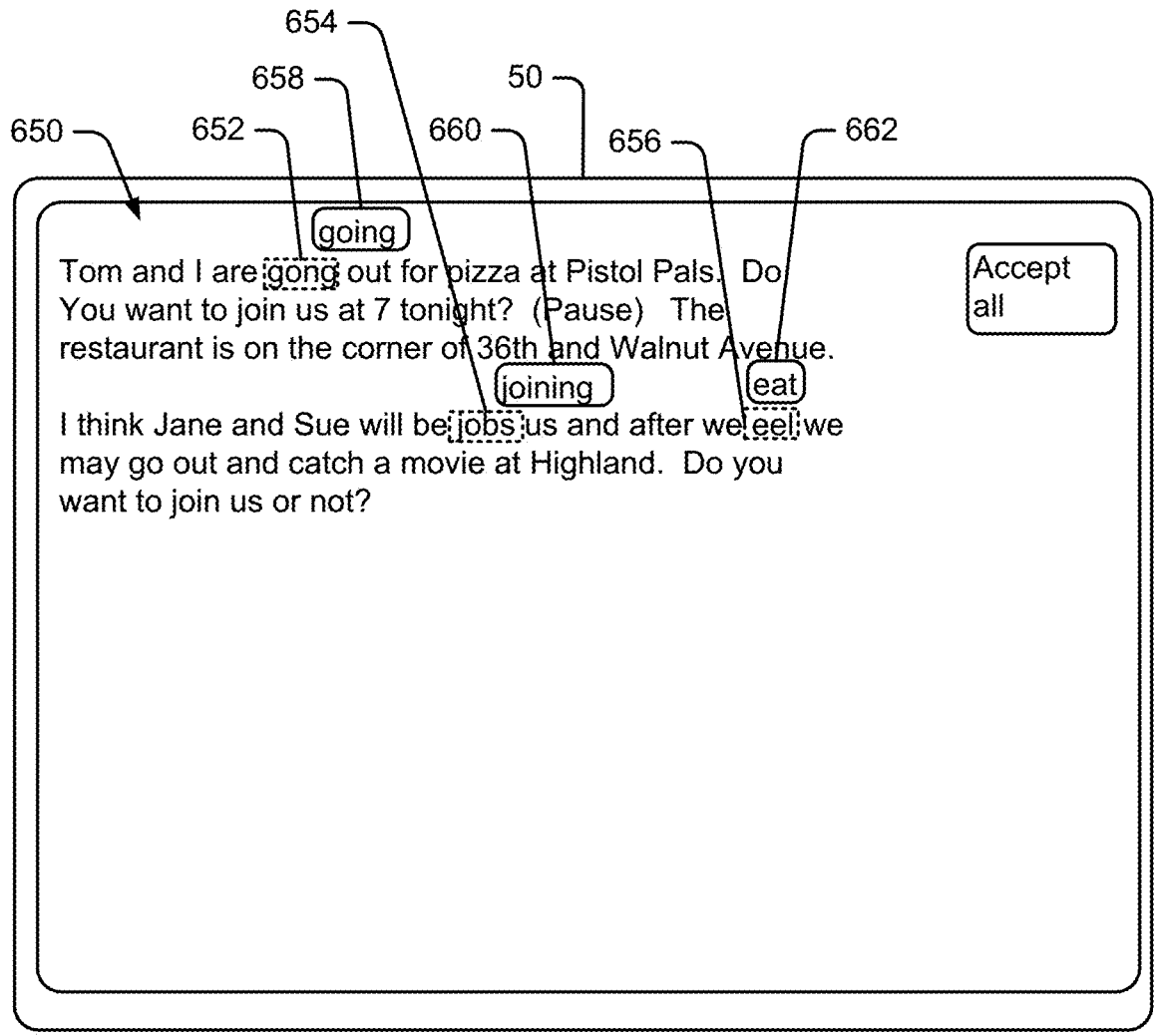
FIG. 20 is similar to FIG. 17, albeit showing a different screen shot.

Consistent with the above comments, see FIG. 20 that shows a screen shot of a call assistant's display screen where potential errors have been highlighted to distinguish the errors from other text. Exemplary call assistant generated text is shown at 650 with errors shown in phantom boxes 652, 654 and 656 that represent highlighting. In the illustrated example, exemplary words generated by an automated voice-to-text engine are also presented to the call assistant in hovering fields above the potentially erroneous text as shown at 658, 660 and 662. Here, a call assistant can simply touch a suggested correction in a hovering field to make a correction and replace the erroneous word with the automated text suggested in the hovering field. If a call assistant instead touches an error, the call assistant can manually change the word to another word. If a call assistant does not touch an error or an associated corrected word, the word remains as originally transcribed by the call assistant. An "Accept All" icon is presented at 669 that can be selected to accept all of the suggestions presented on a call assistant's display. All corrected words are transmitted to an assisted user's device to be displayed.

Figure 21:
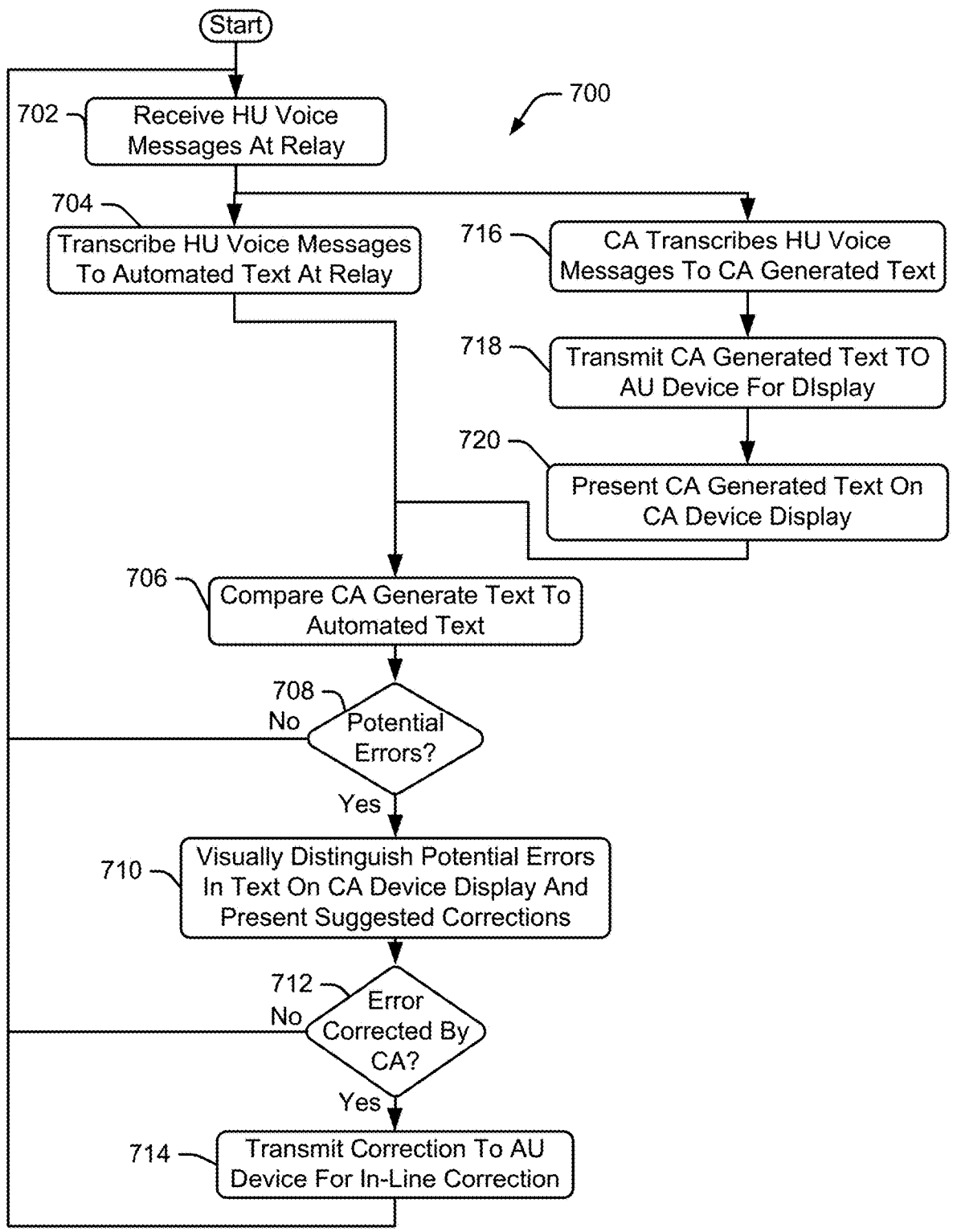
FIG. 21 is a flow chart illustrating a method whereby an automated voice-to-text engine is used to identify errors in call assistant generated text which can be highlighted and can be corrected by a call assistant.

Referring to FIG. 21, a method 700 by which a voice engine generates text to be compared to call assistant generated text and for providing a correction interface as in FIG. 20 for the call assistant is illustrated. At block 702 the hearing user's voice messages are provided to a relay. After block 702 control follows to two parallel paths to blocks 704 and 716. At block 704 the hearing user's voice messages are transcribed into text by an automated voice-to-text engine run by the relay server before control passes to block 706. At block 716 a call assistant transcribes the hearing user's voice messages to call assistant generated text. At block 718 the call assistant generated text is transmitted to the assisted user's device to be displayed. At block 720 the call assistant generated text is displayed on the call assistant's display screen 50 for correction after which control passes to block 706.

Referring still to FIG. 21, at block 706 the relay server compares the call assistant generated text to the automated text to identify any discrepancies. Where the automated text matches the call assistant generated text at block 708, control passes back up to block 702 where the process continues. Where the automated text does not match the call assistant generated text at block 708, control passes to block 710 where the server visually distinguishes the mismatched text on the call assistant's display screen 50 and also presents suggested correct text (e.g., the automated text). Next, at block 712 the server monitors for any error corrections by the call assistant and at block 714 if an error has been corrected, the corrected text is transmitted to the assisted user's device for in-line correction.

In at least some embodiments the relay server may be able to generate some type of probability or confidence factor related to how likely a discrepancy between automated and call assistant generated text is related to a call assistant error and may only indicate errors and present suggestions for probable errors or discrepancies likely to be related to errors. For instance, where an automated text segment is different than an associated call assistant generated text segment but the automated segment makes no sense contextually in a sentence, the server may not indicate the discrepancy or may not show the automated text segment as an option for correction. The same discrepancy may be shown as a potential error at a different time if the automated segment makes contextual sense.

In still other embodiments automated voice-to-text software that operates at the same time as a call assistant to generate text may be trained to recognize words often missed by a call assistant such as articles, for instance, and to ignore other words that call assistants more accurately transcribe.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Thus, the invention is to cover all modifications, equivalents, and alternatives falling within the spirit and scope of the invention as defined by the following appended claims. For example, while the methods above are described as being performed by specific system processors, in at least some cases various method steps may be performed by other system processors. For instance, where a hearing user's voice is recognized and then a voice model for the recognized hearing user is employed for voice-to-text transcription, the voice recognition process may be performed by an assisted user's device and the identified voice may be indicated to a relay 16 which then identifies a related voice model to be used. As another instance, a hearing user's device may identify a hearing user's voice and indicate the identity of the hearing user to the assisted user's device and/or the relay.

As another example, while the system is described above in the context of a two line captioning system where one line links an assisted user's device to a hearing user's device and a second line links the assisted user's device to a relay, the concepts and features described above may be used in any transcription system including a system where the hearing user's voice is transmitted directly to a relay and the relay then transmits transcribed text and the hearing user's voice to the assisted user's device.

As still one other example, while inputs to an assisted user's device may include mechanical or virtual on screen buttons/icons, in some embodiments other inputs arrangements may be supported. For instance, in some cases help or a captioning request may be indicated via a voice input (e.g., verbal a request for assistance or for captioning).

As another example, in at least some cases where a relay includes first and second differently trained call assistants where first call assistants are trained to be capable of transcribing and correcting text and second call assistants are only trained to be capable of correcting text, a call assistant may always be on a call but the automated voice-to-text software may aid in the transcription process whenever possible to minimize overall costs. For instance, when a call is initially linked to a relay so that a hearing user's voice is received at the relay, the hearing user's voice may be provided to a first call assistant fully trained to transcribe and correct text. Here, voice-to-text software may train to the hearing user's voice while the first call assistant transcribes the text and after the voice-to-text software accuracy exceeds a threshold, instead of completely cutting out the relay or call assistant, the automated text may be provided to a second call assistant that is only trained to correct errors. Here, after training the automated text should have minimal errors and therefore even a minimally trained call assistant should be able to make corrections to the errors in a timely fashion. In other cases, a first CA assigned to a call may only correct errors in automated voice-to-text transcription and a fully trained revoicing and correcting CA may only be assigned after a help or caption request is received.

In other systems an assisted user's device processor may run automated voice-to-text software to transcribe hearing user's voice messages and may also generate a confidence factor for each word in the automated text based on how confident the processor is that the word has been accurately transcribed. The confidence factors over a most recent number of words (e.g., 100) or a most recent period (e.g., 45 seconds) may be averaged and the average used to assess an overall confidence factor for transcription accuracy. Where the confidence factor is below a threshold level, the device processor may link to a relay for more accurate transcription either via more sophisticated automated voice-to-text software or via a call assistant. The automated process for linking to a relay may be used instead of or in addition to the process described above whereby an assisted user selects a "caption" button to link to a relay.

In addition to storing hearing user voice models, a system may also store other information that could be used when an assisted user is communicating with specific hearing user's to increase accuracy of automated voice-to-text software when used. For instance, a specific hearing user may routinely use complex words from a specific industry when conversing with an assisted user. The system software can recognize when a complex word is corrected by a call assistant or contextually by automated software and can store the word and the pronunciation of the word by the specific hearing user in a hearing user word list for subsequent use. Then, when the specific hearing user subsequently links to the assisted user's device to communicate with the assisted user, the stored word list for the hearing user may be accessed and used to automate transcription. The hearing user's word list may be stored at a relay, by an assisted user's device or even by a hearing user's device where the hearing user's device has data storing capability.

In other cases a word list specific to an assisted user's device (i.e., to an assisted user) that includes complex or common words routinely used to communicate with the assisted user may be generated, stored and updated by the system. This list may include words used on a regular basis by any hearing user that communicates with an assisted user. In at least some cases this list or the hearing user's word lists may be stored on an internet accessible database (e.g., in the "cloud") so that the assisted user has the ability to access the list(s) and edit words on the list via an internet portal or some other network interface.

Where an HU's complex or hard to spell word list and/or an AU's word list is available, when a CA is creating CA generated text (e.g., via revoicing, typing, etc.), an AVR engine may always operate to search the HU voice signal to recognize when a complex or difficult to spell word is annunciated and the complex or hard to spell words may be automatically presented to the CA via the CA display screen in line with the CA generated text to be considered by the CA. Here, while the CA would still be able to change the automatically generated complex word, it is expected that CA correction of those words would not occur often given the specialized word lists for the specific communicating parties.

In still other embodiments various aspects of a hearing user's voice messages may be used to select different voice-to-text software programs that are optimized for voices having different characteristic sets. For instance, there may be different voice-to-text programs optimized for male and female voices or for voices having different dialects. Here, system software may be able to distinguish one dialect from others and select an optimized voice engine/software program to increase transcription accuracy. Similarly, a system may be able to distinguish a high pitched voice from a low pitched voice and select a voice engine accordingly.

In some cases a voice engine may be selected for transcribing a hearing user's voice based on the region of a country in which a hearing user's device resides. For instance, where a hearing user's device is located in the southern part of the United States, an engine optimized for a southern dialect may be used while a device in New England may cause the system to select an engine optimized for another dialect. Different word lists may also be used based on region of a country in which a hearing user's device resides.

In at least some cases it is contemplated that an assisted user's device will provide a text or other indication to an assisted user to convey how text that appears on an AU device display 18 is being generated. For instance, when automated voice-to-text software (e.g., an automated voice recognition (AVR) system) is generating text, the phrase "Software Generated Text" may be persistently presented (see 729 in FIG. 22) at the top of a display 18 and when CA generated text is presented, the phrase "Call Assistant Generated Text" (not illustrated) may be presented. A phrase "Call Assistant Corrected Text" (not illustrated) may be presented when automated Text is corrected by a CA.

In some cases a set of virtual buttons (e.g., 68 in FIG. 1) or mechanical buttons may be provided via an AU device allowing an AU to select captioning preferences. For instance, captioning options may include "Automated/Software Generated Text", "CA Generated Text" (see virtual selection button 719 in FIG. 22) and "CA Corrected Text"

Figure 22:
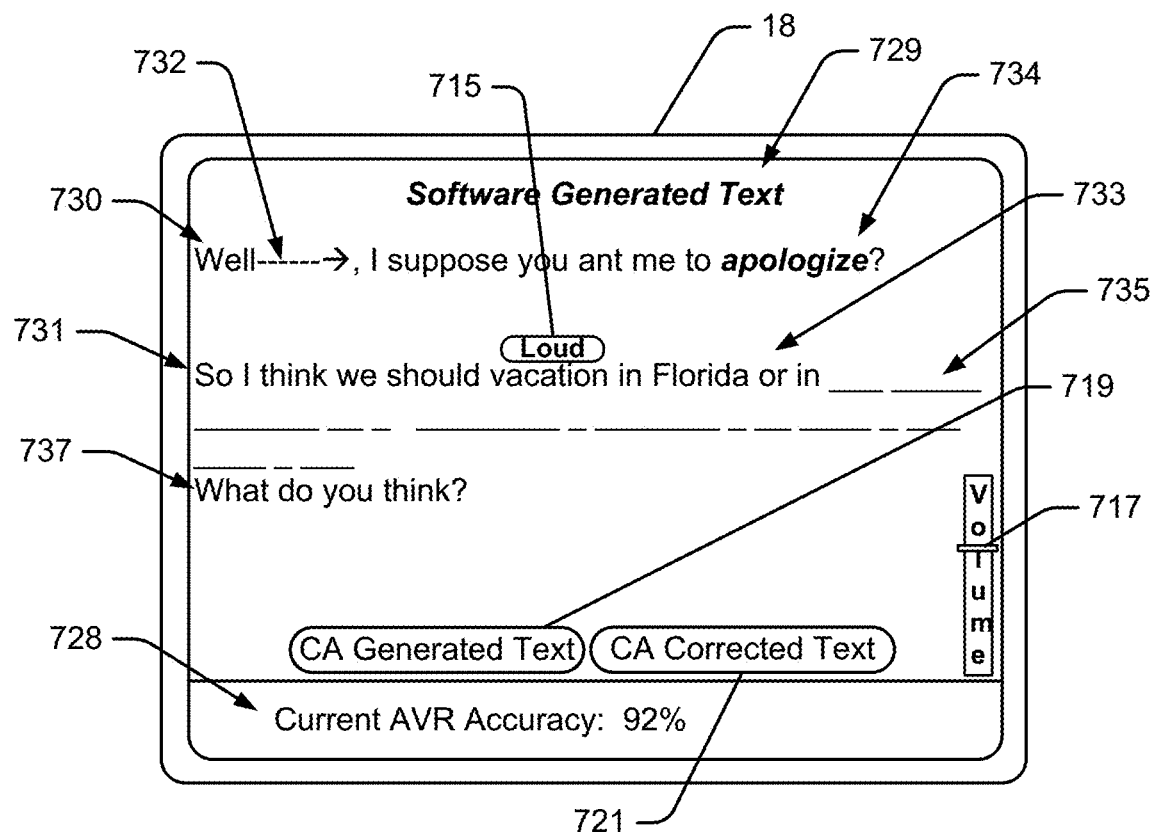
FIG. 22 is an exemplary AU device display screen shot that illustrates visually distinct text to indicate non-textual characteristics of an HU voice signal to an assisted user.

(see virtual selection button 721 in FIG. 22). This feature allows an AU to preemptively select a preference in specific cases or to select a preference dynamically during an ongoing call. For example, where an AU knows from past experience that calls with a specific HU result in excessive automated text errors, the AU could select "CA generated text" to cause CA support to persist during the duration of a call with the specific HU.

Figure 24:
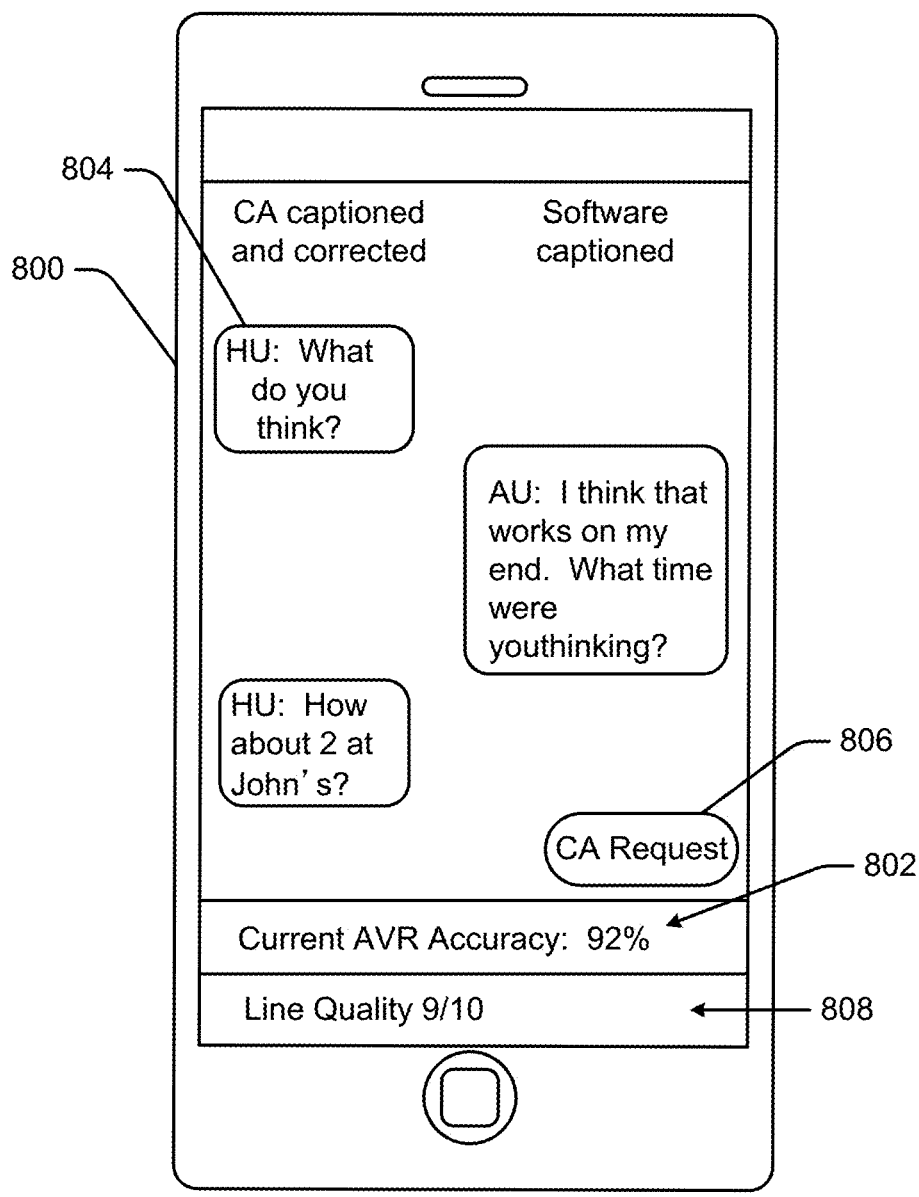
FIG. 24 shows an exemplary HU communication device with CA captioned HU text and AVR generated AU text presented as well as other communication information that is consistent with at least some aspects off the present disclosure.

In at least some embodiments, automated voice-to-text accuracy may be tracked by a system and indicated to any one or a subset of a CA, an AU, and an HU either during CA text generation or during automated text presentation. Here, the accuracy value may be over the duration of an ongoing call or over a short most recent rolling period or number of words (e.g., last 30 seconds, last 100 words, etc.), or for a most recent HU turn at talking. In some cases two averages, one over a full call period and the other over a most recent period, may be indicated. The accuracy values would be provided via the AU device display 18 (see 728 in FIG. 22) and/or the CA workstation display 50. Where an HU device has a display (e.g., a smart phone, a tablet, etc.), the accuracy value(s) may be presented via that display in at least some cases. To this end, see the smart phone type HU device 800 in FIG. 24 where an accuracy rate is displayed at 802 for a call with an AU. It is expected that seeing a low accuracy value would encourage an HU to try to annunciate words more accurately or slowly to improve the value.

Human communication has many different components and the meanings ascribed to text words are only one aspect of that communication. One other aspect of human non-text communication includes how words are annunciated which often belies a speakers emotions or other meaning. For instance, a simple change in volume while words are being spoken is often intended to convey a different level of importance. Similarly, the duration over which a word is expressed, the tone or pitch used when a phrase is annunciated, etc., can convey a different meaning. For instance, annunciating the word "Yes" quickly can connote a different meaning than annunciating the word "Yes" very slowly or such that the "s" sound carries on for a period of a few seconds. A simple text word representation is devoid of a lot of meaning in an originally spoken phrase in many cases.

In at least some embodiments of the present disclosure it is contemplated that volume changes, tone, length of annunciation, pitch, etc., of an HU's voice signal may be sensed by automated software and used to change the appearance of or otherwise visually distinguish transcribed text that is presented to an AU via a device display 18 so that the AU can more fully understand and participate in a richer communication session. To this end, see, for instance, the two textual effects 732 and 734 in AU device text 730 in FIG. 22 where an arrow effect 732 represents a long annunciation period while a bolded/italicized effect 734 represents an appreciable change in HU voice signal volume. Many other non-textual characteristics of an HU voice signal are contemplated and may be sensed and each may have a different appearance. For instance, pitch, speed of speaking, etc., may all be automatically determined and used to provide effect distinct visual cues along with the transcribed text.

The visual cues may be automatically provided with or used to distinguish text presented via an AU device display regardless of the source of the text. For example, in some cases automated text may be supplemented with visual cues to indicate other communication characteristics and in at least some cases even CA generated text may be supplemented with automatically generated visual cues indicating how an HU annunciates various words and phrases. Here, as voice characteristics are detected for an HU's utterances, software tracks the voice characteristics in time and associates those characteristics with specific text words or phrases generated by the CA. Then, the visual cues for each voice characteristic are used to visually distinguish the associated words when presented to the AU.

In at least some cases an AU may be able to adjust the degree to which text is enhanced via visual cues or even to select preferred visual cues for different voice characteristics. For instance, a specific AU may find fully enabled visual queuing to be distracting and instead may only want bold capital letter visual queuing when an HU's volume level exceeds some threshold value. AU device preferences may be set via a display 18 during some type device of commissioning process.

In some embodiments it is contemplated that the automated software that identifies voice characteristics will adjust or train to an HU's voice during the first few seconds of a call and will continue to train to that voice so that voice characteristic identification is normalized to the HU's specific voice signal to avoid excessive visual queuing. Here, it has been recognized that some people's voices will have persistent voice characteristics that would normally be detected as anomalies if compared to a voice standard (e.g., a typical male or female voice). For instance, a first HU may always speak loudly and therefore, if his voice signal was compared to an average HU volume level, the voice signal would exceed the average level most if not all the time. Here, to avoid always distinguishing the first HU's voice signal with visual queuing indicating a loud voice, the software would use the HU voice signal to determine that the first HU's voice signal is persistently loud and would normalize to the loud signal so that words uttered within a range of volumes near the persistent loud volume would not be distinguished as loud. Here, if the first HU's voice signal exceeds the range about his persistent volume level, the exceptionally loud signal may be recognized as a clear deviation from the persistent volume level for the normalized voice and therefore distinguished with a visual queue for the AU when associated text is presented. The voice characteristic recognizing software would automatically train to the persistent voice characteristics for each HU including for instance, pitch, tone, speed of annunciation, etc., so that persistent voice characteristics of specific HU voice signals are not visually distinguished as anomalies.

In at least some cases, as in the case of voice models developed and stored for specific HUs, it is contemplated that HU voice models may also be automatically developed and stored for specific HU's for specifying voice characteristics. For instance, in the above example where a first HU has a particularly loud persistent voice, the volume range about the first HU's persistent volume as well as other persistent characteristics may be determined once during an initial call with an AU and then stored along with a phone number or other HU identifying information in a system database. Here, the next time the first HU communicates with an AU via the system, the HU voice characteristic model would be automatically accessed and used to detect voice characteristic anomalies and to visually distinguish accordingly.

Referring again to FIG. 22, in addition to changing the appearance of transcribed text to indicate annunciation qualities or characteristics, other visual cues may be presented. For instance, if an HU persistently talks in a volume that is much higher than typical for the HU, a volume indicator 717 may be presented or visually altered in some fashion to indicate the persistent volume. As another example, a volume indicator 715 may be presented above or otherwise spatially proximate any word annunciated with an unusually high volume. In some cases the distinguishing visual queue for a specially annunciated word may only persist for a short duration (e.g., 3 seconds, until the end of a related sentence or phrase, for the next 5 words of an utterance, etc.) and then be eliminated. Here, the idea is that the visual queuing is supposed to mimic the effect of an annunciated word or phrase which does not persist long term (e.g., the loud effect of a high volume word only persists as the word is being annunciated).

The software used to generate the HU voice characteristic models and/or to detect voice anomalies to be visually distinguished may be run via any of an HU device processor, an AU device processor, a relay processor and a third party operated processor linkable via the internet or some other network. In at least some cases it will be optimal for an HU device to develop the HU model for an HU that is associated with the device and to store the model and apply the model to the HU's voice to detect anomalies to be visually distinguished for several reasons. In this regard, a particularly rich acoustic HU voice signal is available at the HU device so that anomalies can be better identified in many cases by the HU device as opposed to some processor downstream in the captioning process.

Referring again to FIG. 24, in at least some embodiments where an HU device 800 includes a display screen 801, an HU voice text transcription 804 may also be presented via the HU device. Here, an HU viewing the transcribed text could formulate an independent impression of transcription accuracy and whether or not a more robust transcription process (e.g., CA generation of text) is required or would be preferred. In at least some cases a virtual "CA request" button 806 or the like may be provided on the HU screen for selection so that the HU has the ability to initiate CA text transcription and or CA correction of text. Here, an HU device may also allow an HU to switch back to automated text if an accuracy value 802 exceeds some threshold level. Where HU voice characteristics are detected, those characteristics may be used to visually distinguish text at 804 in at least some embodiments.

Where an HU device is a smart phone, a tablet computing device or some other similar device capable of downloading software applications from an application store, it is contemplated that a captioning application may be obtained from an application store for communication with one or more AU devices 12. For instance, the son or daughter of an AU may download the captioning application to be used any time the device user communicates with the AU. Here, the captioning application may have any of the functionality described in this disclosure and may result in a much better overall system in various ways.

For instance, a captioning application on an HU device may run automated voice-to-text software on a digital HU voice signal as described above where that text is provided to the AU device 12 for display and, at times, to a relay for correction, voice model training, voice characteristic model training, etc. As another instance, an HU device may train a voice model for an HU any time an HU's voice signal is obtained regardless of whether or not the HU is participating in a call with an AU. For example, if a dictation application on an HU device which is completely separate from a captioning application is used to dictate a letter, the HU voice signal during dictation may be used to train a general HU voice model for the HU and, more specifically, a general model that can be used subsequently by the captioning system or application. Similarly, an HU voice signal captured during entry of a search phrase into a browser or an address into mapping software which is independent of the captioning application may be used to further train the general voice model for the HU. Here, the general voice model may be extremely accurate even before used in by AU captioning application. In addition, an accuracy value for an HU's voice model may be calculated prior to an initial AU communication so that, if the accuracy value exceeds a high or required accuracy standard, automated text transcription may be used for an HU-AU call without requiring CA assistance, at least initially.

For instance, prior to an initial AU call, an HU device processor training to an HU voice signal may assign confidence factors to text words automatically transcribed by an AVR engine from HU voice signals. As the software trains to the HU voice, the confidence factor values would continue to increase and eventually should exceed some threshold level at which initial captioning during an AU communication would meet accuracy requirements set by the captioning industry.

As another instance, an HU voice model stored by or accessible by the HU device can be used to automatically transcribe text for any AU device without requiring continual redevelopment of the HU voice model. Thus, one HU device may be used to communicate with two separate hearing impaired persons using two different AU devices without each sub-system redeveloping the HU voice model.

As yet another instance, an HU's smart phone or tablet device running a captioning application may link directly to each of a relay and an AU's device to provide one or more of the HU voice signal, automated text and/or an HU voice model or voice characteristic model to each. This may be accomplished through two separate phone lines or via two channels on a single cellular line or via any other combination of two communication links.

In some cases an HU voice model may be generated by a relay or an AU's device or some other entity (e.g., a third party AVR engine provider) over time and the HU voice model may then be stored on the HU device or rendered accessible via that device for subsequent transcription. In this case, one robust HU voice model may be developed for an HU by any system processor or server independent of the HU device and may then be used with any AU device and relay for captioning purposes.

In still other cases, at least one system processor may monitor and assess line and/or audio conditions associated with a call and may present some type of indication to each or a subset of an AU, an HU and a CA to help each or at least one of the parties involved in a call to assess communication quality. For instance, an HU device may be able to indicate to an AU and a CA if the HU device is being used as a speaker phone which could help explain an excessive error rate and help with a decision related to CA captioning involvement. As another instance, an HU's device may independently assess the level of non-HU voice signal noise being picked up by an HU device microphone and, if the determined noise level exceeds some threshold value either by itself or in relation to the signal strength of the HU voice signal, may perform some function. For example, one function may be to provide a signal to the HU indicating that the noise level is high. Another function may be to provide a noise level signal to the CA or the AU which could be indicated on one or both of the displays 50 and 18. Yet another function would be to offer one or more captioning options to any of the HU or AU or even to a text correcting CA when the noise level exceeds the threshold level. Here, the idea is that as the noise level increases, the likelihood of accurate AVR captioning will typically decrease and therefore more accurate and robust captioning options should be available.

As another instance, an HU device may transmit a known signal to an AU device which returns the known signal to the HU device and the HU device may compare the received signal to the known signal to determine line or communication link quality. Here, the HU may present a line quality value as shown at 808 in FIG. 24 for the HU to consider. Similarly, an AU device may present a line quality signal (not illustrated) to the AU to be considered.

In some cases system devices may monitor a plurality of different system operating characteristics such as line quality, speaker phone use, non-voice noise level, voice volume level, voice signal pace, etc., and may present one or more "coaching" indications to any one of or a subset of the HU, CA and AU for consideration. Here, the coaching indications should help the parties to a call understand if there is something they can do to increase the level of captioning accuracy. Here, in at least some cases only the most impactful coaching indications may be presented and different entities may receive different coaching indications. For instance, where noise at HU location exceeds a threshold level, a noise indicating signal may only be presented to the HU. Where the system also recognizes that line quality is only average, that indication may be presented to the AU and not to the HU while the HU's noise level remains high. If the HU moves to a quieter location, the noise level indication on the HU device may be replaced with a line quality indication. Thus, the coaching indications should help individual call entities recognize communication conditions that they can effect or that may be the cause of or may lead to poor captioning results for the AU.

In some cases coaching may include generating a haptic feedback or audible signal or both and a text message for an HU and/or an AU. To this end, while AU's routinely look at their devices to see captions during a caption assisted call, many HUs do not look at their devices during a call and simply rely on audio during communication. In the case of an AU, in some cases even when captioning is presented to an AU the AU may look away from their device display at times when their hearing is sufficient. By providing a haptic or audible or both additional signals, a user's attention can be drawn to their device displays where a warning or call state text message may present more information such as, for instance, an instruction to "Speak louder" or "Move to a less noisy space", for consideration.

In some embodiments an AU may be able to set a maximum text lag time such that automated text generated by an AVR engine is used to drive an AU device screen 18 when a CA generated text lag reaches the maximum value. For instance, an AU may not want text to lag behind a broadcast HU voice signal by more than 7 seconds and may be willing to accept a greater error rate to stay within the maximum lag time period. Here, CA captioning/correction may proceed until the maximum lag time occurs at which point automated text may be used to fill in the lag period up to a current HU voice signal on the AU device and the CA may be skipped ahead to the current HU signal automatically to continue the captioning process. Again, here, any automated fill in text or text not corrected by a CA may be visually distinguished on the AU device display as well as on the CA display for consideration.

It has been recognized that many AU's using text to understand a broadcast HU voice signal prefer that the text lag behind the voice signal at least some short amount of time. For instance, an AU talking to an HU may stair off into space while listening to the HU voice signal and, only when a word or phrase is not understood, may look to text on display 18 for clarification. Here, if text were to appear on a display 18 immediately upon audio broadcast to an AU, the text may be several words beyond the misunderstood word by the time the AU looks at the display so that the AU would be required to hunt for the word. For this reason, in at least some embodiments, a short minimum text delay may be implemented prior to presenting text on display 18. Thus, all text would be delayed at least 2 seconds in some cases and perhaps longer where a text generation lag time exceeds the minimum lag value. As with other operating parameters, in at least some cases an AU may be able to adjust the minimum voice-to-text lag time to meet a personal preference.

It has been recognized that in cases where transcription switches automatically from a CA to an AVR engine when text lag exceeds some maximum lag time, it will be useful to dynamically change the threshold period as a function of how a communication between an HU and an AU is progressing. For instance, periods of silence in an HU voice signal may be used to automatically adjust the maximum lag period. For example, in some cases if silence is detected in an HU voice signal for more than three seconds, the threshold period to change from CA text to automatic text generation may be shortened to reflect the fact that when the HU starts speaking again, the CA should be closer to a caught up state. Then, as the HU speaks continuously for a period, the threshold period may again be extended. The threshold period prior to automatic transition to the AVR engine to reduce or eliminate text lag may be dynamically changed based on other operating parameters. For instance, rate of error correction by a CA, confidence factor average in AVR text, line quality, noise accompanying the HU voice signal, or any combination of these and other factors may be used to change the threshold period.

One aspect described above relates to an AVR engine recognizing specific or important phrases like questions (e.g., see phrase "Are you still there?") in FIG. 18 prior to CA text generation and presenting those phrases immediately to an AU upon detection. Other important phrases may include phrases, words or sound anomalies that typically signify "turn markers" (e.g., words or sounds often associated with a change in speaker from AU to HU or vice versa). For instance, if an HU utters the phrase "What do you think?" followed by silence, the combination including the silent period may be recognized as a turn marker and the phrase may be presented immediately with space markers (e.g., underlined spaces) between CA text and the phrase to be filled in by the CA text transcription once the CA catches up to the turn marker phrase.

To this end, see the text at 731 in FIG. 22 where CA generated text is shown at 733 with a lag time indicated by underlined spaces at 735 and an AVR recognized turn marker phrase presented at 737. In this type of system, in some cases the AVR engine will be programmed with a small set (e.g., 100-300) of common turn marker phrases that are specifically sought in an HU voice signal and that are immediately presented to the AU when detected. In some cases, non-text voice characteristics like the change in sound that occurs at the end of a question which is often the signal for a turn marker may be sought in an HU voice signal and any AVR generated text within some prior period (e.g., 5 seconds, the previous 8 words, etc.) may be automatically presented to an AU.

It has been recognized that some types of calls can almost always be accurately handled by an AVR engine. For instance, auto-attendant type calls can typically be transcribed accurately via an AVR. For this reason, in at least some embodiments, it is envisioned that a system processor at the AU device or at the relay may be able to determine a call type (e.g., auto-attendant or not, or some other call type routinely accurately handled by an AVR engine) and automatically route calls within the overall system to the best and most efficient/effective option for text generation. Thus, for example, in a case where an AU device manages access to an AVR operated by a third party and accessible via an internet link, when an AU places a call that is received by an auto-attendant system, the AU device may automatically recognize the answering system as an auto-attendant type and instead of transmitting the auto-attendant voice signal to a relay for CA transcription, may transmit the auto-attendant voice signal to the third party AVR engine for text generation.

In this example, if the call type changes mid-stream during its duration, the AU device may also transmit the received voice signal to a CA for captioning if appropriate. For instance, if an interactive voice recognition auto-attendant system eventually routes the AU's call to a live person (e.g., a service representative for a company), once the live person answers the call, the AU device processor may recognize the person's voice as a non-auto-attendant signal and route that signal to a CA for captioning as well as to the AVR for voice model training. In these cases, the AVR engine may be specially tuned to transcribe auto-attendant voice signals to text and, when a live HU gets on the line, would immediately start training a voice model for that HU's voice signal.

In cases or at times when HU voice signals are transcribed automatically to text via an AVR engine when a CA is only correcting AVR generated text, the relay may include a synchronizing function or capability so that, as a CA listens to an HU's voice signal during an error correction process, the associated text from the AVR is presented generally synchronously to the CA with the HU voice signal. For instance, in some cases an AVR transcribed word may be visually presented via a CA display 50 at substantially the same instant at which the word is broadcast to the CA to hear. As another instance, the AVR transcribed word may be presented one, two, or more seconds prior to broadcast of that word to the CA.

Figure 23:
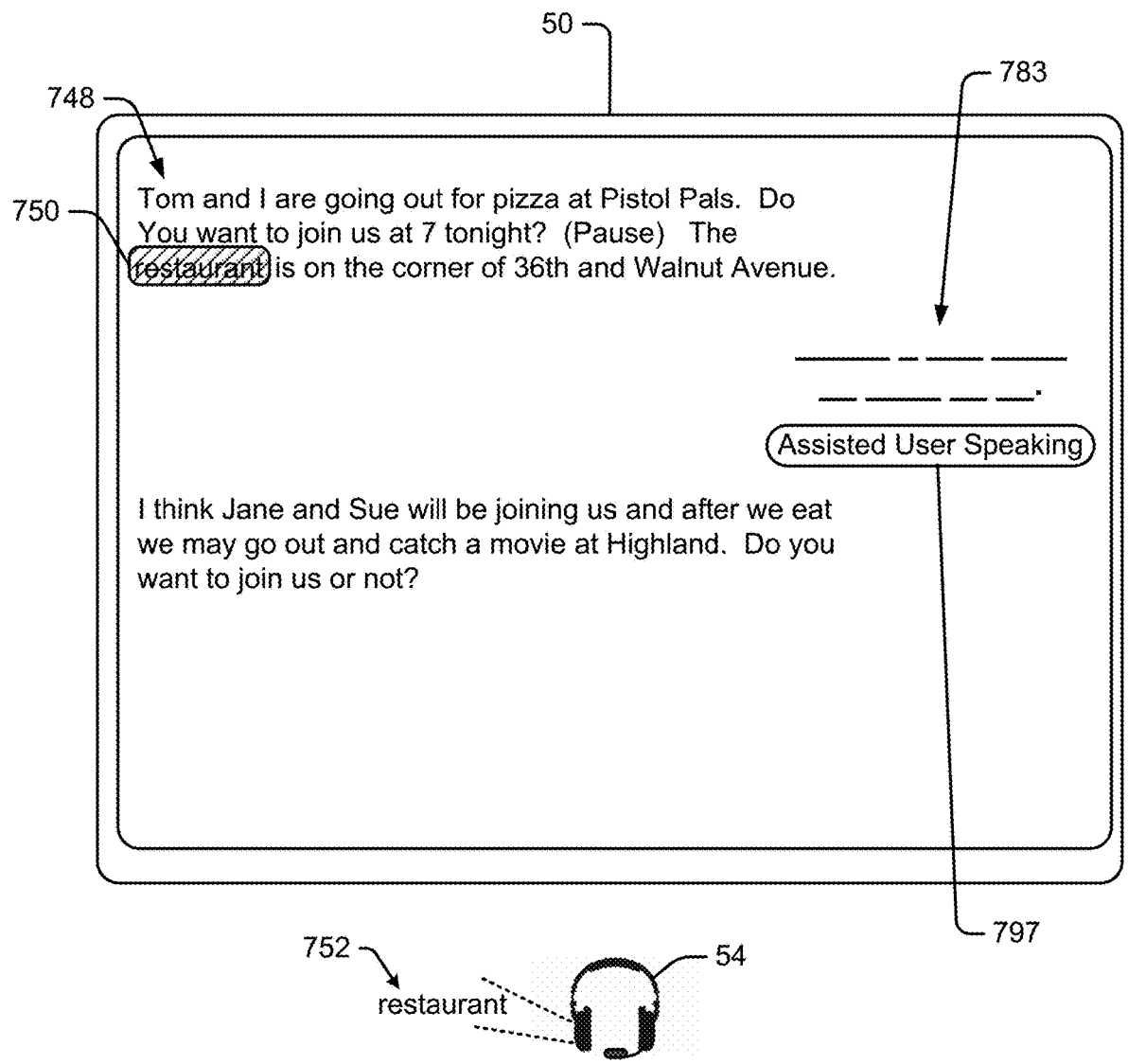
FIG. 23 is an exemplary CA workstation display screen shot that shows how automated AVR text associated with an instantaneously broadcast word may be visually distinguished for an error correcting CA.

In still other cases, the AVR generated text may be presented for correction via a CA display 50 immediately upon generation and, as the CA controls broadcast speed of the HU voice signal for correction purposes, the word or phrase instantaneously audibly broadcast may be highlighted or visually distinguished in some fashion. To this end, see FIG. 23 where automated AVR generated text is shown at 748 where a word instantaneously audibly broadcast to a CA (see 752) is simultaneously highlighted at 750. Here, as the words are broadcast via CA headset 54, the text representations of the words are highlighted or otherwise visually distinguished to help the error correcting CA follow along.

Figure 25:
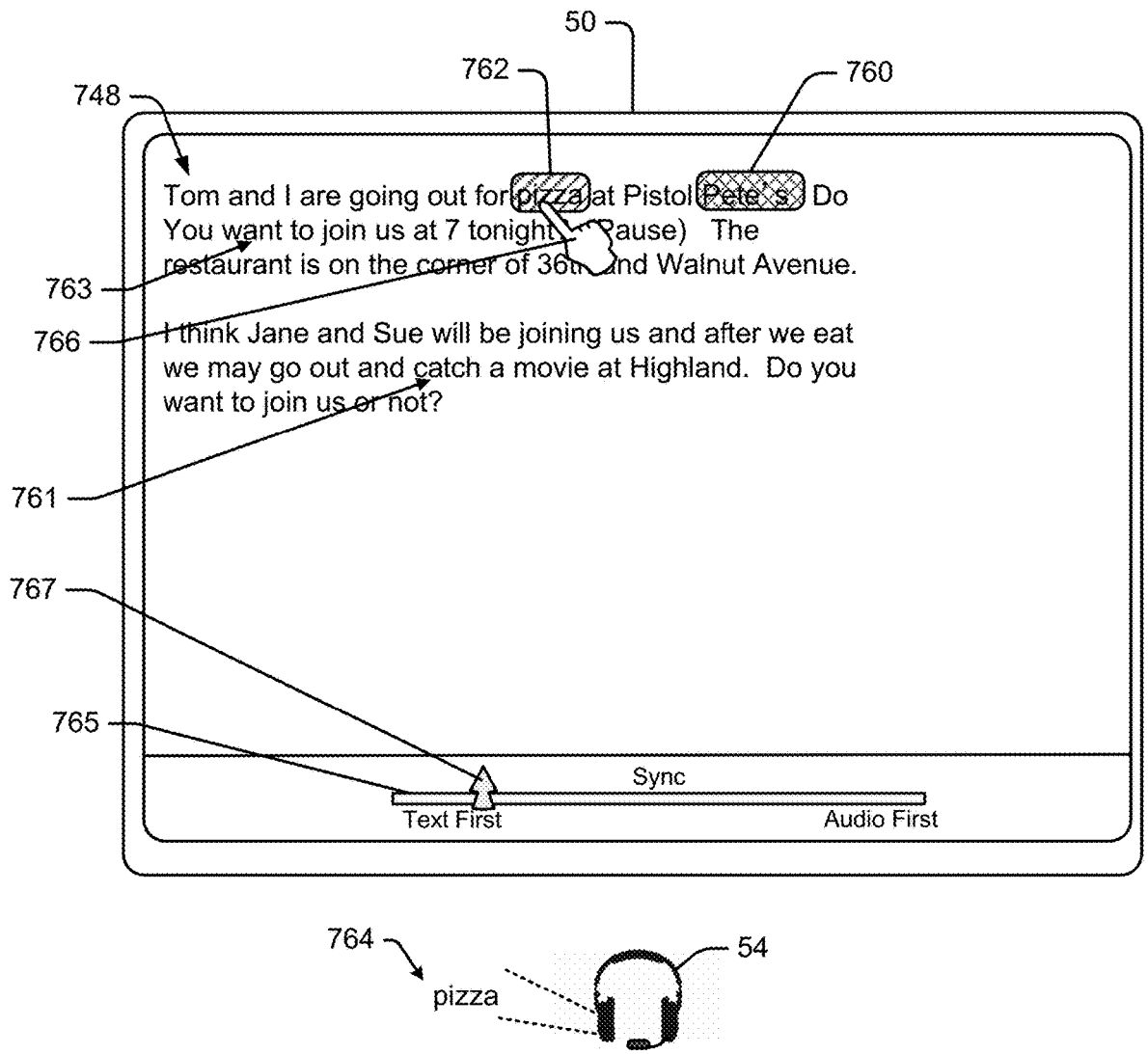
FIG. 25 is an exemplary CA workstation display screen shot similar to FIG. 23, albeit where a CA has corrected an error and an HU voice signal playback has been skipped backward as a function of where the correction occurred.

In at least some cases an error correcting CA will be able to skip back and forth within the HU voice signal to control broadcast of the HU voice signal to the CA. For instance, as described above, a CA may have a foot pedal useable to skip back in a buffered HU voice recording 5, 10, etc., seconds to replay an HU voice signal recording. Here, when the recording skips back, the highlighted text in representation 748 would likewise skip back to be synchronized with the broadcast words. To this end, see FIG. 25 where, in at least some cases, a foot pedal activation may cause the recording to skip back to the word "pizza" which is then broadcast as at 764 and highlighted in text 748 as shown at 762. In other cases, the CA may simply single tap or otherwise select any word presented on display 50 to skip the voice signal play back and highlighted text to that word. For instance, in FIG. 25 icon 766 represents a single tap which causes the word "pizza" to be highlighted and substantially simultaneously broadcast. Other word selecting gestures (e.g., a mouse control click, etc.) are contemplated.

In some embodiments when a CA selects a text word to correct, the voice signal replay may automatically skip to some word in the voice buffer relative to the selected word and may halt voice signal replay automatically until the correction has been completed. For instance, a double tap on the word "pals' in FIG. 23 may cause that word to be highlighted for correction and may automatically cause the point in the HU voice replay to move backward to a location a few words prior to the selected word "pals." To this end, see in FIG. 25 that the word "Pete's" that is still highlighted as being corrected (e.g., the CA has not confirmed a complete correction) has been typed in to replace the word "Pals" and the word "pizza" that precedes the word "Pete's" has been highlighted to indicate where the HU voice signal broadcast will again commence after the correction at 760 has been completed. While backward replay skipping has been described, forward skipping is also contemplated.

In some cases, when a CA selects a word in presented text for correction or at least to be considered for correction, the system may skip to a location a few words prior to the selected word and may represent the HU voice signal stating at that point and ending a few words after that point to give a CA context in which to hear the word to be corrected. Thereafter, the system may automatically move back to a subsequent point in the HU voice signal at which the CA was when the word to be corrected was selected. For instance, again, in FIG. 25, assume that the HU voice broadcast to a CA is at the word "catch" 761 when the CA selects the word "Pete's 760 for correction. In this case, the CA's interface may skip back in the HU voice signal to the word pizza at 762 and re-broadcast the phrase parts from the word "pizza" to the word "want" 763 to provide immediate context to the CA. After broadcasting the word "want", the interface would skip back to the word "catch" 761 and continue broadcasting the HU voice signal from that point on.

In at least some embodiments where an AVR engine generates automatic text and a CA is simply correcting that text prior to transmission to an AU, the AVR engine may assign a confidence factor to each word generated that indicates how likely it is that the word is accurate. Here, in at least some cases, the relay server may highlight any text on the correcting CA's display screen that has a confidence factor lower than some threshold level to call that text to the attention of the CA for special consideration. To this end, see again FIG. 23 where various words (e.g., 777, 779, 781) are specially highlighted in the automatically generated AVR text to indicate a low confidence factor.

While AU voice signals are not presented to a CA in most cases for privacy reasons, it is believed that in at least some cases a CA may prefer to have some type of indication when an AU is speaking to help the CA understand how a communication is progressing. To this end, in at least some embodiments an AU device may sense an AU voice signal and at least generate some information about when the AU is speaking. The speaking information, without word content, may then be transmitted in real time to the CA at the relay and used to present an indication that the AU is speaking on the CA screen. For instance, see again FIG. 23 where lines 783 are presented on display 50 to indicate that an AU is speaking. As shown, lines 783 are presented on a right side of the display screen to distinguish the AU's speaking activity from the text and other visual representations associated with the HU's voice signal. As another instance, when the AU speaks, a text notice 797 or some graphical indicator (e.g., a talking head) may be presented on the CA display 50 to indicate current speaking by an AU. While not shown it is contemplated that some type of non-content AU speaking indication like 783 may also be presented to an AU via the AU's device to help the AU understand how the communication is progressing.

It has been recognized that some third party AVR systems available via the internet or the like tend to be extremely accurate for short voice signal durations (e.g., 15-30 seconds) after which accuracy becomes less reliable. To deal with AVR accuracy degradation during an ongoing call, in at least some cases where a third party AVR system is employed to generate automated text, the system processor (e.g., at the relay, in the AU device or in the HU device) may be programmed to generate a series of automatic text transcription requests where each request only transmits a short sub-set of a complete HU voice signal. For instance, a first AVR request may be limited to a first 15 seconds of HU voice signal, a second AVR request may be limited to a next 15 seconds of HU voice signal, a third AVR request may be limited to a third 15 seconds of HU voice signal, and so on. Here, each request would present the associated HU signal to the AVR system immediately and continuously as the HU voice signal is received and transcribed text would be received back from the AVR system during the 15 second period. As the text is received back from the AVR system, the text would be cobbled together to provide a complete and relatively accurate transcript of the HU voice signal.

While the HU voice signal may be divided into consecutive periods in some cases, in other cases it is contemplated that the HU voice signal slices or sub-periods sent to the AVR system may overlap at least somewhat to ensure all words uttered by an HU are transcribed and to avoid a case where words in the HU voice signal are split among periods. For instance, voice signal periods may be 30 seconds long and each may overlap a preceding period by 10 seconds and a following period by 10 seconds to avoid split words. In addition to avoiding a split word problem, overlapping HU voice signal periods presented to an AVR system allows the system to use context represented by surrounding words to better (e.g., contextually) covert HU voiced words to text. Thus, a word at the end of a first 20 second voice signal period will be near the front end of the overlapping portion of a next voice signal period and therefore, typically, will have contextual words prior to and following the word in the next voice signal period so that a more accurate contextually considered text representation can be generated.

In some cases, a system processor may employ two, three or more independent or differently tuned AVR systems to automatically generate automated text and the processor may then compare the text results and formulate a single best transcript representation in some fashion. For instance, once text is generated by each engine, the processor may poll for most common words or phrases and then select most common as text to provide to an AU, to a CA, to a voice modeling engine, etc.

In most cases automated text (e.g., AVR generated text) will be generated much faster than CA generated text or at least consistently much faster. It has been recognized that in at least some cases an assisted user will prefer even uncorrected automated text to CA corrected text where the automated text is presented more rapidly generated and therefore more in sync with an audio broadcast HU voice signal. For this reason, in at least some cases, a different and more complex voice-to-text triage process may be implemented. For instance, when an AU-HU call commences and the AU requires text initially, automated AVR generated text may initially be provided to the AU. If a good HU voice model exists for the HU, the automated text may be provided without CA correction at least initially. If the AU, a system processor, or an HU determines that the automated text includes too many errors or if some other operating characteristic (e.g., line noise) that may affect text transcription accuracy is sensed, a next level of the triage process may link an error correcting CA to the call and the AVR text may be presented in essentially real time to the CA via display 50 simultaneously with presentation to the AU via display 18.

Here, as the CA corrects the automated text, corrections are automatically sent to the AU device and are indicated via display 18. Here, the corrections may be in-line (e.g., erroneous text replaced), above error, shown after errors, may be visually distinguished via highlighting or the like, etc. Here, if too many errors continue to persist from the AU's perspective, the AU may select an AU device button (e.g., see 68 again in FIG. 1) to request full CA transcription. Similarly, if an error correcting CA perceives that the AVR engine is generating too many errors, the error correcting CA may perform some action to initiate full CA transcription and correction. Similarly, a relay processor or even an AU device processor may detect that an error correcting CA is having to correct too many errors in the AVR generated text and may automatically initiate full CA transcription and correction.

In any case where a CA takes over for an AVR engine to generate text, the AVR engine may still operate on the HU voice signal to generate text and use that text and CA generated text, including corrections, to refine a voice model for the HU. At some point, once the voice model accuracy as tested against the CA generated text reaches some threshold level (e.g., 95% accuracy), the system may again automatically or at the command of the transcribing CA or the AU, revert back to the CA corrected AVR text and may cut out the transcribing CA to reduce costs. Here, if the AVR engine eventually reaches a second higher accuracy threshold (e.g., 98% accuracy), the system may again automatically or at the command of an error correcting CA or an AU, revert back to the uncorrected AVR text to further reduce costs.

In at least some cases it is contemplated that an AU device may allow an AU to set a personal preference between text transcription accuracy and text speed. For instance, a first AU may have fairly good hearing and therefore may only rely on a text transcript periodically to identify a word uttered by an HU while a second AU has extremely bad hearing and effectively reads every word presented on an AU device display. Here, the first AU may prefer text speed at the expense of some accuracy while the second AU may require accuracy even when speed of text presentation or correction is reduced. An exemplary AU device tool is shown as an accuracy/speed scale 770 in FIG. 18 where an accuracy/speed selection arrow 772 indicates a current selected operating characteristic. Here, moving arrow 772 to the left, operating parameters like correction time, AVR operation etc., are adjusted to increase accuracy at the expense of speed and moving arrow 772 right on scale 770 increases speed of text generation at the expense of accuracy.

In at least some embodiments when text is presented to an error correcting CA via a CA display 50, the text may be presented at least slightly prior to broadcast of (e.g., ¼ to 2 seconds) an associated HU voice signal. In this regard, it has been recognized that many CAs prefer to see text prior to hearing a related audio signal and link the two optimally in their minds when text precedes audio. In other cases specific CAs may prefer simultaneous text and audio and still others may prefer audio before text. In at least some cases it is contemplated that a CA workstation may allow a CA to set text-audio sync preferences. To this end, see exemplary text-audio sync scale 765 in FIG. 25 that includes a sync selection arrow 767 that can be moved along the scale to change text-audio order as well as delay or lag between the two.

In at least some embodiments an on-screen tool akin to scale 765 and arrow 767 may be provided on an AU device display 18 to adjust HU voice signal broadcast and text presentation timing to meet an AU's preferences.

It has been recognized that some AU's can hear voice signals with a specific characteristic set better than other voice signals. For instance, one AU may be able to hear low pitch traditionally male voices better than high pitch traditionally female voice signals. In some embodiments an AU may perform a commissioning procedure whereby the AU tests capability to accurately hear voice signals having different characteristics and results of those capabilities may be stored in a system database. The hearing capability results may then be used to adjust or modify the way text captioning is accomplished. For instance, in the above case where an AU hears low pitch voices well but not high pitch voices, if a low pitch HU voice is detected when a call commences, the system may use the AVR function more rapidly than in the case of a high pitched voice signal. Voice characteristics other than pitch may be used to adjust text transcription and AVR transition protocols in similar ways.

In at least some cases where an HU device like a smart phone, tablet, computing device, laptop, smart watch, etc., has the ability to store data or to access data via the internet, a WIFI system or otherwise that is stored on a local or remote (e.g., cloud) server, it is contemplated that every HU device or at least a subset used by specific HUs may store an HU voice model for an associated HU to be used by a captioning application or by any software application run by the HU device. Here, the HU model may be trained by one or more applications run on the HU device or by some other application like an AVR system associated with one of the captioning systems described herein that is run by an AU device, the relay server, or some third party server or processor. Here, for example, in one instance, an HU's voice model stored on an HU device may be used to drive a voice-to-text search engine input tool to provide text for an internet search independent of the captioning system. The multi-use and perhaps multi-application trained HU voice model may also be used by a captioning AVR system during an AU-HU call. Here, the voice model may be used by an AVR application run on the HU device, run on the AU device, run by the relay server or run by a third party server.

In cases where an HU voice model is accessible to an AVR engine independent of an HU device, when an AU device is used to place a call to an HU device, an HU model associated with the number called may be automatically prepared for generating captions even prior to connection to the HU device. Where a phone or other identifying number associated with an HU device can be identified prior to an AU answering a call from the HU device, again, an HU voice model associated with the HU device may be accessed and readied by the captioning system for use prior to the answering action to expedite AVR text generation. Most people use one or a small number of phrases when answering an incoming phone call. Where an HU voice model is loaded prior to an HU answering a call, the AVR engine can be poised to detect one of the small number of greeting phrases routinely used to answer calls and to compare the HU's voice signal to the model to confirm that the voice model is for the specific HU that answers the call. If the HU's salutation upon answering the call does not match the voice model, the system may automatically link to a CA to start a CA controlled captioning process.

While a captioning system must provide accurate text corresponding to an HU voice signal for an AU to view when needed, typical relay systems for deaf and hard of hearing person would not provide a transcription of an AU's voice signal. Here, generally, the thinking has been that an AU knows what she says in a voice signal and an HU hears that signal and therefore text versions of the AU's voice was not necessary. This, coupled with the fact that AU captioning would have substantially increased the transcription burden on CAs (e.g., would have required CA revoicing or typing and correction of more voice signal (e.g., the AU voice signal)) meant that AU voice signal transcription simply was not supported. Another reason AU voice transcription was not supported was that at least some AUs, for privacy reasons, do not want both sides of conversations with HUs being listened to by CAs.

In at least some embodiments, it is contemplated that the AU side of a conversation with an HU may be transcribed to text automatically via an AVR engine and presented to the AU via a device display 18 while the HU side of the conversation is transcribed to text in the most optimal way given transcription triage rules or algorithms as described above. Here, the AU voice captions and AU voice signal would never be presented to a CA. Here, while AU voice signal text may not be necessary in some cases, in others it is contemplated that many AUs may prefer that text of their voice signals be presented to be referred back to or simply as an indication of how the conversation is progressing. Seeing both sides of a conversation helps a viewer follow the progress more naturally. Here, while the AVR generated AU text may not always be extremely accurate, accuracy in the AU text is less important because, again, the AU knows what she said.

Where an AVR engine automatically generates AU text, the AVR engine may be run by any of the system processors or devices described herein. In particularly advantageous systems the AVR engine will be run by the AU device 12 where the software that transcribes the AU voice to text is trained to the voice of the AU and therefore is extremely accurate because of the personalized training.

Figure 26:
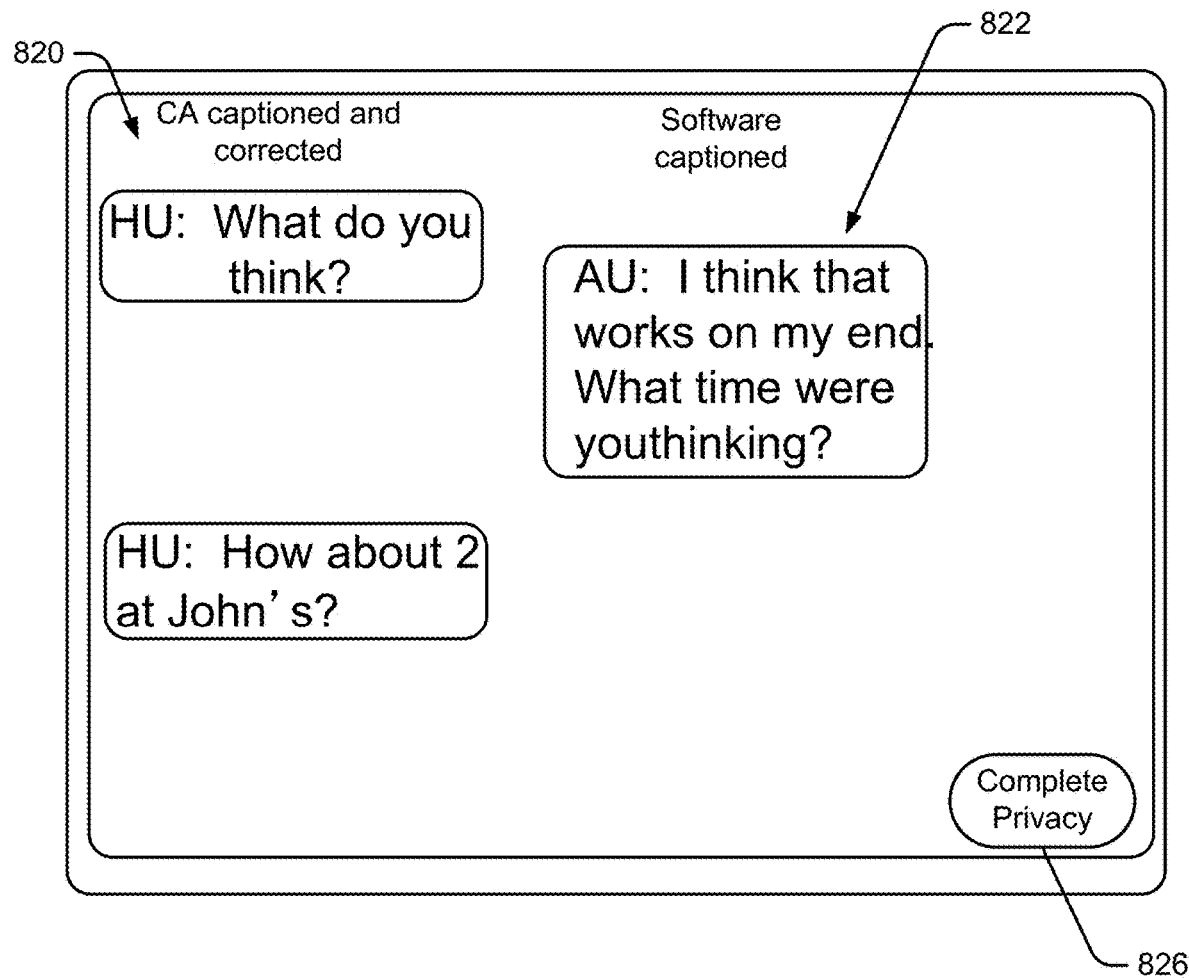
FIG. 26 is a screen shot of an exemplary AU device display that presents CA captioned HU text as well as AVR engine generated AU text.

Thus, referring again to FIG. 1, for instance, in at least some embodiments, when an AU-HU call commences, the AU voice signal may be transcribed to text by AU device 12 and presented as shown at 822 in FIG. 26 without providing the AU voice signal to relay 16. The HU voice signal, in addition to being audibly broadcast via AU device 12, may be transmitted in some fashion to relay 16 for conversion to text when some type of CA assistance is required. Accurate HU text is presented on display 18 at 820. Thus, the AU gets to see both AU text, albeit with some errors, and highly accurate HU text. Referring again to FIG. 24, in at least some cases, AU and HU text may also be presented to an HU via an HU device (e.g., a smart phone) in a fashion similar to that shown in FIG. 26.

Referring still to FIG. 26, where both HU and AU text are generated and presented to an AU, the HU and AU text may be presented in staggered columns as shown along with an indication of how each text representation was generated (e.g., see titles at top of each column in FIG. 26).

In at least some cases it is contemplated that an AU may, at times, not even want the HU side of a conversation to be heard by a CA for privacy reasons. Here, in at least some cases, it is contemplated that an AU device may provide a button or other type of selectable activator to indicate that total privacy is required and then to re-establish relay or CA captioning and/or correction again once privacy is no longer required. To this end, see the "Complete Privacy" button or virtual icon 826 shown on the AU device display 18 in FIG. 26. Here, it is contemplated that, while an AU-HU conversation is progressing and a CA generates/corrects text 820 for an HU's voice signal and an AVR generates AU text 822, if the AU wants complete privacy but still wants HU text, the AU would select icon 826. Once icon 826 is selected, the HU voice signal would no longer be broadcast to the CA and instead an AVR engine would transcribe the AU voice signal to automated text to be presented via display 18. Icon 826 in FIG. 26 would be changed to "CA Caption" or something to that effect to allow the AU to again start full CA assistance when privacy is less of a concern.

In addition to a voice-to-text lag exceeding a maximum lag time, there may be other triggers for using AVR engine generated text to catch an AU up to an HU voice signal. For instance, in at least some cases an AU device may monitor for an utterance from an AU using the device and may automatically fill in AVR engine generated text corresponding to an HU voice signal when any AU utterance is identified. Here, for example, where CA transcription is 30 seconds behind an HU voice signal, if an AU speaks, it may be assumed that the AU has been listening to the HU voice signal and is responding to the broadcast HU voice signal in real time. Because the AU responds to the up to date HU voice signal, there is no need for an accurate text transcription for prior HU voice phrases and therefore automated text may be used to automatically catch up. In this case, the CA's transcription task would simply be moved up in time to a current real time HU voice signal automatically and the CA would not have to consider the intervening 30 seconds of HU voice for transcription or even correction.

As another example, when an AU device or other system device recognizes a turn marker in an HU voice signal, all AVR generated text that is associated with a lag time may be filled in immediately and automatically.

As still one other instance, an AU device or other device may monitor AU utterances for some specific word or phrase intended to trigger an update of text associated with a lag time. For instance, the AU may monitor for the word "Update" and, when identified, may fill in the lag time with automated text. Here, in at least some cases, the AU may be programmed to cancel the catch-up word "Update" from the AU voice signal sent to the HU device. Thus, here, the AU utterance "Update" would have the effect of causing AVR text to fill in a lag time without being transmitted to the HU device. Other commands may be recognized and automatically removed from the AU voice signal.

Thus, it should be appreciated that various embodiments of a semi-automated automatic voice recognition or text transcription system to aid hearing impaired persons when communicating with HUs have been described. In each system there are at least three entities and at least three devices and in some cases there may be a fourth entity and an associated fourth device. In each system there is at least one HU and associated device, one AU and associated device and one relay and associated device or sub-system while in some cases there may also be a third party provider (e.g., a fourth party) of AVR services operating one or more servers that run AVR software. The HU device, at a minimum, enables an HU to annunciate words that are transmitted to an AU device and receives an AU voice signal and broadcasts that signal audibly for the HU to hear.

The AU device, at a minimum, enables an AU to annunciate words that are transmitted to an HU device, receives an HU voice signal and broadcasts that signal audibly for the AU to attempt to hear, receives or generates transcribed text corresponding to an HU voice signal and displays the transcribed text to an AU on a display to view.

The relay, at a minimum, at times, receives the AU voice signal and generates at least corrected text that may be transmitted to another system device.

In some cases where there is no fourth party AVR system, any of the other functions/processes described above may be performed by any of the HU device, AU device and relay server. For instance, the HU device in some cases may store an HU voice model and/or voice characteristics model, an AVR application and a software program for managing which text, AVR or CA generated, is used to drive an AU device. Here, the HU may link directly with each of the AU device and relay, and may operate as an intermediary therebetween.

As another instance, HU models, AVR software and caption control applications may be stored and used by the AU device processor or, alternatively, by the relay server. In still other instances different system components or devices may perform different aspects of a functioning system. For instance, an HU device may store an HU voice model which may be provided to an AU device automatically at the beginning of a call and the AU device may transmit the HU voice model along with a received HU voice signal to a relay that uses the model to tune an AVR engine to generate automated text as well as provides the HU voice signal to a first CA for revoicing to generate CA text and a second CA for correcting the CA text. Here, the relay may transmit and transcribe text (e.g., automated and CA generated) to the AU device and the AU device may then select one of the received texts to present via the AU device screen. Here CA captioning and correction and transmission of CA text to the AU device may be halted in total or in part at any time by the relay or, in some cases, by the AU device, based on various parameters or commands received from any parties (e.g., AU, HU, CA) linked to the communication.

In cases where a fourth party to the system operates an AVR engine in the cloud or otherwise, at a minimum, the AVR engine receives an HU voice signal at least some of the time and generates automated text which may or may not be used at times to drive an AU device display.

Figure 27:
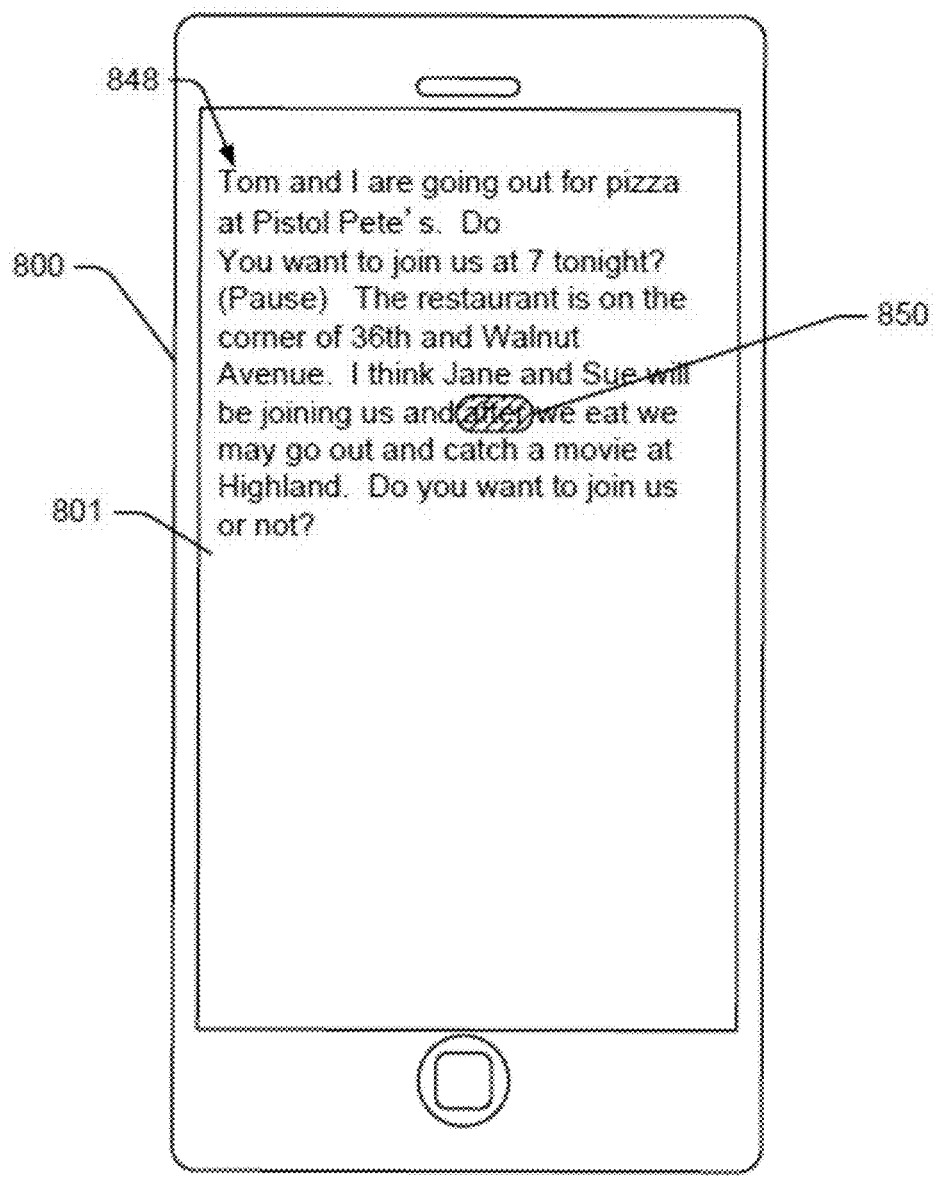
FIG. 27 is an illustration of an exemplary HU device that shows text corresponding to the HU's voice signal as well as an indication of which word in the text has been most recently presented to an AU.

In some cases it is contemplated that AVR engine text (e.g., automated text) may be presented to an HU while CA generated text is presented to an AU and a most recent word presented to an AU may be indicated in the text on the HU device so that the HU has a good sense of how far behind an AU is in following the HU's voice signal. To this end, see FIG. 27 that shows an exemplary HU smart phone device 800 including a display 801 where text corresponding to an HU voice signal is presented for the HU to view at 848. The text 848 includes text already presented to an AU prior to and including the word "after" that is shown highlighted 850 as well as AVR engine generated text subsequent to the highlight 850 that, in at least the illustrated embodiment, may not have been presented to the AU at the illustrated time. Here, an HU viewing display 801 can see where the AU is in receiving text corresponding to the HU voice signal. The HU may use the information presented as a coaching tool to help the HU regulate the speed at which the HU converses.

To be clear, where an HU device is a smart phone or some other type of device that can run an application program to participate in a captioning service, many different linking arrangements between the AU, HU and a relay are contemplated. For instance, in some cases the AU and HU may be directly linked and there may be a second link or line from the AU to the relay for voice and data transmission when necessary between those two entities. As another instance, when an HU and AU are linked directly and relay services are required after the initial link, the AU device may cause the HU device to link directly to the relay and the relay may then link to the AU device so that the relay is located between the AU and HU devices and all communications pass through the relay. In still another instance, an HU device may link to the relay and the relay to the AU device and the AU device to the HU device so that any communications, voice or data, between two of the three entities is direct without having to pass through the other entity (e.g., HU and AU voice signals would be directly between HU and AU devices, HU voice signal would be direct from the HU device to the relay and transcribed text associated with the HU voice would be directly passed from the relay to the AU device to be displayed to the AU. Here, any text generated at the relay to be presented via the HU device would be transmitted directly from the relay to the HU device and any text generated by either one of the AU or HU devices (e.g., via an ARV engine) would be directly transmitted to the receiving device. Thus, an HU device or captioning application run thereby may maintain a direct dial number or address for the relay and be able to link up to the relay automatically when CA or other relay services are required.

Figure 28:
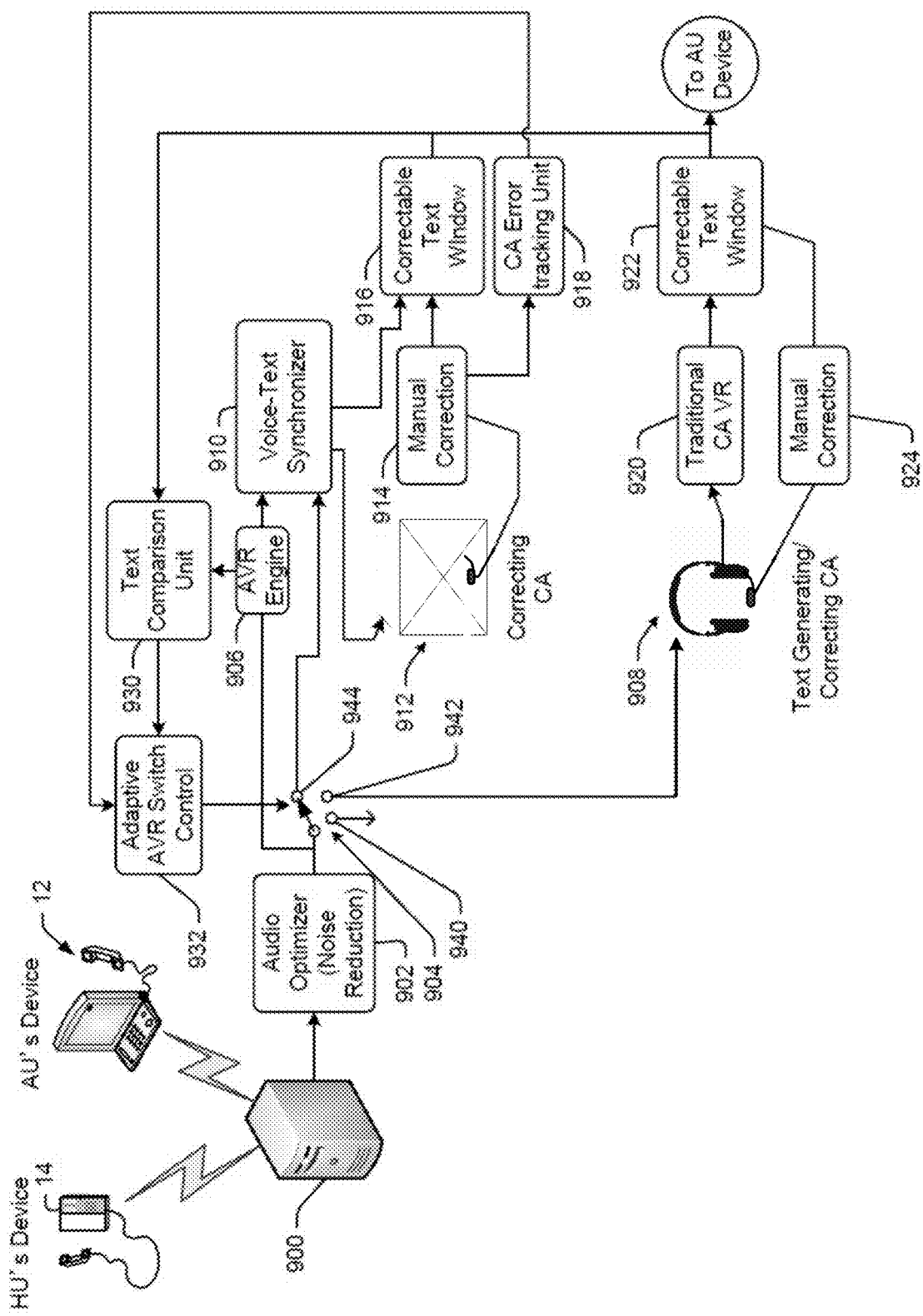
FIG. 28 is a schematic diagram showing a relay captioning system that is consistent with at least some aspects of the present disclosure.

Referring now to FIG. 28, a schematic is shown of an exemplary semi-automated captioning system that is consistent with at least some aspects of the present disclosure. The system enables an HU using device 14 to communicate with an AU using AU device 12 where the AU receives text and HU voice signals via the AU device 12. Each of the HU and the AU link into a gateway server or other computing device 900 that is linked via a network of some type to a relay. HU voice signals are fed through a noise reducing audio optimizer to a 3 pole or path AVR switch device 904 that is controlled by an adaptive AVR switch controller 932 to select one of first, second and third text generating processes associated with switch output leads 940, 942 and 944, respectively. The first text generating process is an automated AVR text process wherein an AVR engine generates text without any input (e.g., data entry, correction, etc.) from any CA. The second text generating process is a process wherein a CA 908 revoices an HU voice or types to generate text corresponding to an HU voice signal and then corrects that text. The third text generating process is one wherein the AVR engine generates automated text and a correcting CA 912 makes corrections to the automated text. In the second process, the AVR engine operates in parallel with the CA to generate automated text in parallel to the CA generated and corrected text.

Referring still to FIG. 28, with switch 904 connected to output lead 940, the HU voice signal is only presented to AVR engine 906 which generates automated text corresponding to the HU voice which is then provided to a voice to text synchronizer 910. Here, synchronizer 908 simply passes the raw AVR text on through a correctable text window 916 to the AU device 12.

Referring again to FIG. 28, with switch 904 connected to output lead 942, the HU voice signal, in addition to being linked to the AVR engine, is presented to CA 908 for generating and correcting text via traditional CA voice recognition 920 and manual correction tools 924 via correction window 922. Here, corrected text is provided to the AU device 12 and is also provided to a text comparison unit or module 930. Raw text from the AVR engine 906 is presented to comparison unit 930. Comparison unit 930 compares the two text streams received and calculates an AVR error rate which is output to switch control 932. Here, where the AVR error rate is low (e.g., below some threshold), control 932 may be controlled to cut the text generating CA 908 out of the captioning process.

Referring still to FIG. 28, with switch 904 connected to output lead 944, the HU voice signal, in addition to being linked to the AVR engine, is fed through synchronizer 910 which delays the HU voice signal so that the HU voice signal lags the raw AVR text by a short period (e.g., 2 seconds). The delayed HU voice signal is provided to a CA 912 charged with correcting AVR text generated by engine 906. The CA 912 uses a keyboard or the like 914 to correct any perceived errors in the raw AVR text presented in window 916. The corrected text is provided to the AU device 12 and is also provided to the text comparison unit 930 for comparison to the raw AVR text. Again, comparison unit 930 generates an AVR error rate which is used by control 932 to operate switch device 904. The manual corrections by CA 912 are provided to a CA error tracking unit 918 which counts the number of errors corrected by the CA and compares that number to the total number of words generated by the AVR engine 906 to calculate a CA correction rate for the AVR generated raw text. The correction rate is provided to control 932 which uses that rate to control switch device 904.

Thus, in operation, when an HU-AU call first requires captioning, in at least some cases switch device 904 will be linked to output lead 942 so that full CA transcription and correction occurs in parallel with the AVR engine generating raw AVR text for the HU voice signal. Here, as described above, the AVR engine may be programmed to compare the raw AVR text and the CA generated text and to train to the HU's voice signal so that, over a relatively short period, the error rate generated by comparison unit 930 drops. Eventually, once the error rate drops below some rate threshold, control 932 controls device 940 to link to output lead 944 so that CA 908 is taken out of the captioning path and CA 912 is added. CA 912 receives the raw AVR text and corrects that text which is sent on to the AU device 12. As the CA corrects text, the AVR engine continues to train to the HU voice using the corrected errors. Eventually, the AVR accuracy should improve to the point where the correction rate calculated by tracking unit 918 is below some threshold. Once the correction rate is below the threshold, control 932 may control switch 904 to link to output link 940 to take the CA 912 out of the captioning loop which causes the relatively accurate raw AVR text to be fed through to the AU device 12. As described above in at least some cases the AU and perhaps a CA or the HU may be able to manually switch between captioning processes to meet preferences or to address perceived captioning problems.

As described above, it has been recognized that at least some AVR engines are more accurate and more resilient during the first 30+/−seconds of performing voice to text transcription. If an HU takes a speaking turn that is longer than 30 seconds the engine has a tendency to freeze or lag. To deal with this issue, in at least some embodiments, all of an HU's speech or voice signal may be fed into an audio buffer and a system processor may examine the HU voice signal to identify any silent periods that exceed some threshold duration (e.g., 2 seconds). Here, a silent period would be detected whenever the HU voice signal audio is out of a range associated with a typical human voice. When a silent period is identified, in at least some cases the AVR engine is restarted and a new AVR session is created. Here, because the process uses an audio buffer, no portion of the HU's speech or voice signal is lost and the system can simply restart the AVR engine after the identified silent period and continue the captioning process after removing the silent period.

Because the AVR engine is restarted whenever a silent period of at least a threshold duration occurs, the system can be designed to have several advantageous features. First, the system can implement a dynamic and configurable range of silence or gap threshold. For instance, in some cases, the system processor monitoring for a silent period of a certain threshold duration can initially seek a period that exceeds some optimal relatively long length and can reduce the length of the threshold duration as the AVR captioning process nears a maximum period prior to restarting the engine. Thus, for instance, where a maximum AVR engine captioning period is 30 seconds, initially the silent period threshold duration may be 3 seconds. However, after an initial 20 seconds of captioning by an engine, the duration may be reduced to 1.5 seconds. Similarly, after 25 seconds of engine captioning, the threshold duration may be reduced further to one half a second.

As another instance, because the system uses an audio buffer in this case, the system can "manufacture" a gap or silent period in which to restart an AVR engine, holding an HU's voice signal in the audio buffer until the AVR engine starts captioning anew. While the manufactured silent period is not as desirable as identifying a natural gap or silent period as described above, the manufactured gap is a viable option if necessary so that the AVR engine can be restarted without loss of HU voice signal.

In some cases it is contemplated that a hybrid silent period approach may be implemented. Here, for instance, a system processor may monitor for a silent period that exceeds 3 seconds in which to restart an AVR engine. If the processor does not identify a suitable 3-plus second period for restarting the engine within 25 seconds, the processor may wait until the end of any word and manufacture a 3 second period in which to restart the engine.

Where a silent period longer than the threshold duration occurs and the AVR engine is restarted, if the engine is ready for captioning prior to the end of the threshold duration, the processor can take out the end of the silent period and begin feeding the HU voice signal to the AVR engine prior to the end of the threshold period. In this way, the processor can effectively eliminate most of the silent period so that captioning proceeds quickly.

Restarting an AVR engine at various points within an HU voice signal has the additional benefit of making all hypothesis words (e.g., initially identified words prior to contextual correction based on subsequent words) firm. Doing so allows a CA correcting the text to make corrections or any other manipulations deemed appropriate for an AU immediately without having to wait for automated contextual corrections.

In still other cases other hybrid systems are contemplated where a processor examines an HU voice signal for suitably long silent periods in which to restart an AVR engine and, where no such period occurs by a certain point in a captioning process, the processor commences another AVR engine captioning process which overlaps the first process so that no HU voice signal is lost. Here, the processor would work out which captioned words are ultimately used as final AVR output during the overlapping periods to avoid duplicative or repeated text.

One other feature that may be implemented in some embodiments of this disclosure is referred to as a Return On Audio detector (ROA-Detector) feature. In this regard, a system processor receiving an HU voice signal ascertains whether or not the signal includes audio in a range that is typical for human speech during an HU turn and generates a duration of speech value equal to the number of seconds of speech received. Thus, for instance, in a ten second period corresponding to an HU voice signal turn, there may be 3 seconds of silence during which audio is not in the range of typical human speech and therefore the duration of speech value would be 7 seconds. In addition, the processor detects the quantity of captions being generated by an AVR engine. The processor automatically compares the quantity of captions from the AVR with the duration of speech value to ascertain if there is a problem with the AVR engine. Thus, for instance, if the quantity of AVR generated captions is substantially less than would be expected given the duration of speech value, a potential AVR problem may be identified. Where an AVR problem is likely, the likely problem may be used by the processor to trigger a restart of the AVR engine to generate a better result. As an alternative, where an AVR problem is likely, the problem may trigger initiation of a whole new AVR session. As still one other alternative, a likely AVR problem may trigger a process to bring a CA on line immediately or more quickly than would otherwise be the case.

In still other cases, when an AVR error is detected as indicated above, the ROA detector may retrieve the audio (i.e., the HU voice signal) that was originally sent to the AVR from a rolling buffer and replay/resend the audio to the AVR engine. This replayed audio would be sent through a separate session simultaneously with any new sessions that are sending ongoing audio to the AVR. Here, the captions corresponding to the replayed audio would be sent to the AU device and inserted into a correct sequential slot in the captions presented to the AU. In addition, here, the ROA detector would monitor the text that comes back from the AVR and compare that text to the text retrieved during the prior session, modifying the captions to remove redundancies. Another option would be for the ROA to simply deliver a message to the AU device indicating that there was an error and that a segment of audio was not properly captioned. Here, the AU device would present the likely erroneous captions in some way that indicates a likely error (e.g., perhaps visually distinguished by a yellow highlight or the like).

In some cases it is contemplated that a phone user may want to have just in time (JIT) captions on their phone or other communication device (e.g., a tablet) during a call with an HU for some reason. For instance, when a smart phone user wants to remove a smart phone from her ear for a short period the user may want to have text corresponding to an HU's voice presented during that period. Here, it is contemplated that a virtual "Text" or "Caption" button may be presented on the smart phone display screen or a mechanical button may be presented on the device which, when selected causes an AVR to generate text for a preset period of time (e.g. 10 seconds) or until turned off by the device user. Here, the AVR may be on the smart phone device itself, may be at a relay or at some other deice (e.g., the HU's device).

While HU voice profiles may be developed and stored for any HU calling an AU, in some embodiments profiles may only be stored for a small set of HUs, such as, for instance, a set of favorites or contacts of an AU. For instance, where an AU has a list of ten favorites, HU voice profiles may be developed, maintained, and morphed over time for each of those favorites. Here, again, the profiles may be stored at different locations and by different devices including the AU device, a relay, via a third party service provider, or even an HU device where the HU earmarks certain AUs as having the HU as a favorite or a contact.

In some cases it may be difficult technologically for a CA to correct AVR captions. Here, instead of a CA correcting captions, another option would simply be for a CA to mark errors in AVR text as wrong and move along. Here, the error could be indicated to an AU via the display on an AU's device. In addition, the error could be used to train an HU voice profile and/or captioning model as described above. As another alternative, where a CA marks a word wrong, a correction engine may generate and present a list of alternative words for the CA to choose from. Here, using an on screen tool, the CA may select a correct word option causing the correction to be presented to an AU as well as causing the AVR to train to the corrected word.

In at least some cases it is contemplated that it may be useful to run periodic tests on CA generated text captions to track CA accuracy or reliability over time. For instance, in some cases CA reliability testing can be used to determine when a particular CA could use additional or specialized training. In other cases, CA reliability testing may be useful for determining when to cut a CA out of a call to be replaced by automatic speech recognition (ASR) generated text. In this regard, for instance, if a CA is less reliable than an ASR application for at least some threshold period of time, a system processor may automatically cut the CA out even if ASR quality remains below some threshold target quality level if the ASR quality is persistently above the quality of CA generated text. As another instance, where CA quality is low, text from the CA may be fed to a second CA for either a first or second round of corrections prior to transmission to an AU device for display or, a second relatively more skilled CA trained in handling difficult HU voice signals may be swapped into the transcription process in order to increase the quality level of the transcribed text. As still one other instance, CA reliability testing may be useful to a governing agency interested in tracking CA accuracy for some reason.

In at least some cases it has been recognized that in addition to assessing CA captioning quality, it will be useful to assess how accurately an automated speech recognition system can caption the same HU voice signal regardless of whether or not the quality values are used to switch the method of captioning. For instance, in at least some cases line noise or other signal parameters may affect the quality of HU voice signal received at a relay and therefore, a low CA captioning quality may be at least in part attributed to line noise and other signal processing issues. In this case, an ASR quality value for ASR generated text corresponding to the HU voice signal may be used as an indication of other parameters that affect CA captioning quality and therefore in part as a reason or justification for a low CA quality value. For instance, where an ASR quality value is 75% out of 100% and a CA quality value is 87% out of 100%, the low ASR quality value may be used to show that, in fact, given the relatively higher CA quality value, that the CA value is quite good despite being below a minimum target threshold. Line noise and other parameters may be measured in more direct ways via line sensors at a relay or elsewhere in the system and parameter values indicative of line noise and other characteristics may be stored along with CA quality values to consideration when assessing CA quality.

Several ways to test CA accuracy and generate accuracy statistics are contemplated by the present disclosure. One system for testing and tracking accuracy may include a system where actual or simulated HU-AU calls are recorded for subsequent testing purposes and where HU turns (e.g., voice signal periods) in each call are transcribed and corrected by a CA to generate a true and highly accurate (e.g., approximately 100% accurate) transcription of the HU turns that is referred to hereinafter as the "truth".

During testing, without a CA knowing, the recording is played for the CA who perceives the recording to be a typical HU-AU call. In many cases, a large number of recorded calls may be generated and stored for use by the testing system so that a CA never listens to the same test recording more than once. In some cases a system processor may track CAs and which test recordings the CA has been exposed to previously and may ensure that a CA only listens to any test recording once.

As a CA listens to a test recording, the CA transcribes the HU voice signal to text and, in at least some cases, makes corrections to the text. Because the CA generated text corresponds to a recorded voice signal and not a real time signal, the text is not forwarded to an AU device for display. The CA is unaware that the text is not forwarded to the AU device as this exercise is a test. The CA generated text is compared to the truth and a quality value is generated for the CA generated text (hereinafter a "CA quality value"). For instance, the CA quality value may be a percent accuracy representing the percent of HU voice signal words accurately transcribed to text. The CA quality value is then stored in a data base for subsequent access.

In addition to generating a CA quality value that represents how accurately a CA transcribes voice to text, in at least some cases the system will be programmed to track and record transcription latency that can be used as a second type of quality factor referred to hereinafter as the "CA latency value". Here, the system may track instantaneous latency and use the instantaneous values to generate average and other statistical latency values. For instance, an average latency over an entire call may be calculated, an average latency over a most recent one minute period may be calculated, a maximum latency during a call, a minimum latency during a call, a latency average taking out the most latent 20% and least latent 20% of a call may be calculated and stored, etc. In some cases where both a CA quality value and CA latency values are generated, the system may combine the quality and latency values according to some algorithm to generate an overall CA service value that reflects the combination of accuracy and latency.

CA latency may also be calculated in other ways. For instance, in at least some cases a relay server may be programmed to count the number of words during a period that are received from an ASR service provider (see 1006 in FIG. 30) and to assume that the returned number of words represents the actual words per minute (WPM) spoken by an HU. Here, periods of HU silence may be removed from the period so that the word count more accurately reflects WPM of the speaking HU. Then, the number of words generated by a CA for the same period may be counted and used along with the period duration minus silent periods to determine a CA WPM count. The server may then compare the speaker WPM to the CA WPM count to assess CA delay or latency.

In at least some cases the recorded call may also be provided to an ASR to generate automatic text. The ASR generated text may also be compared to the truth and an "ASR quality value" may be generated. The ASR quality value may be stored in a database for subsequent use or may be compared to the CA quality value to assess which quality value is higher or for some other purpose. Here, also, an ASR latency value or ASR latency values (e.g., max, min, average over a call, average over a most recent period, etc.) may be generated as well as an overall ASR service value. Again, the ASR and CA values may be used by a system processor to determine when the ASR generated text should be swapped in for the CA generated text and vice versa.

Figure 29:
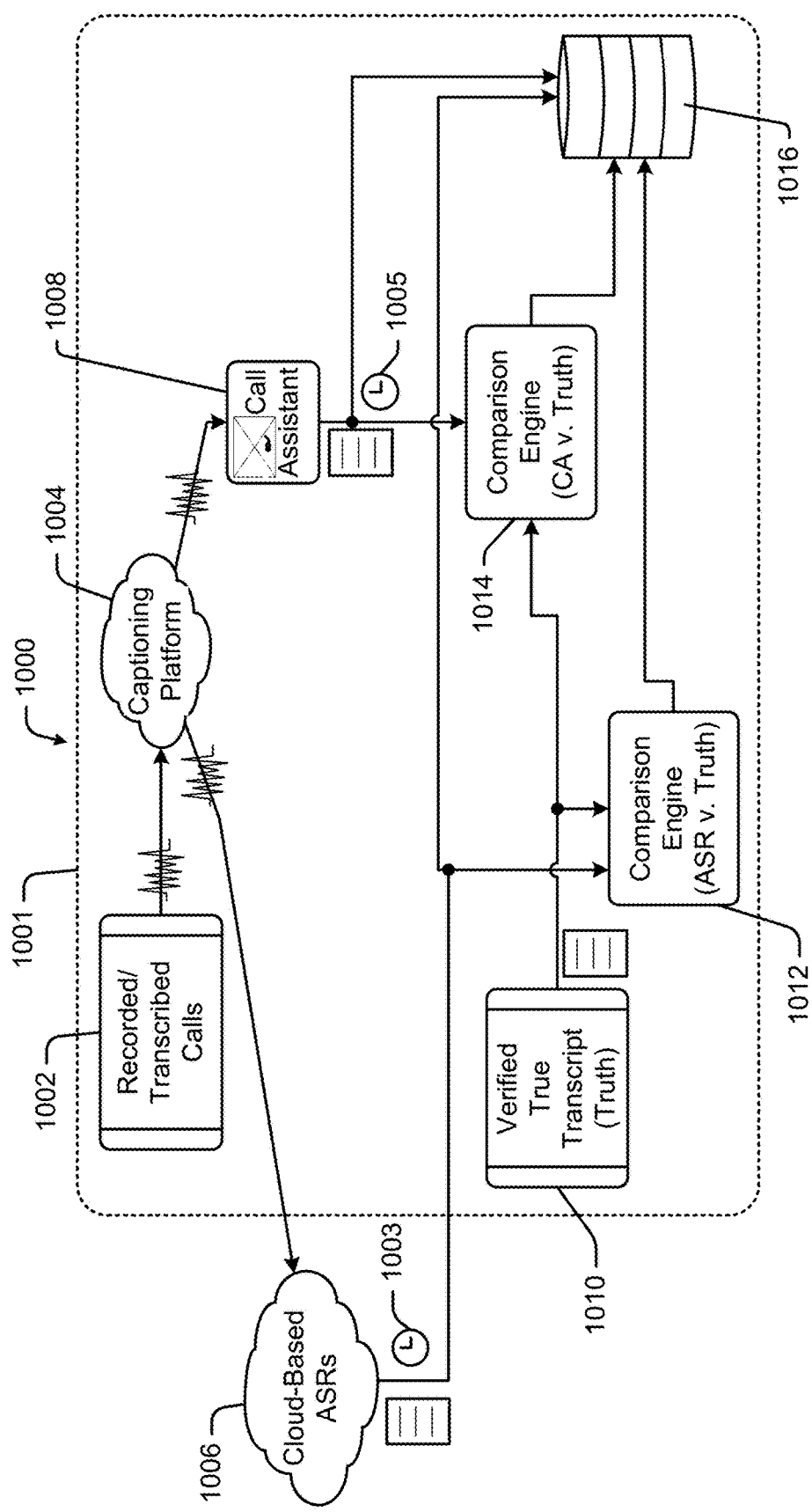
FIG. 29 is a schematic diagram of a relay system that includes a text transcription quality assessment function that is consistent with at least some aspects of the present disclosure.

Referring now to FIG. 29, an exemplary system 1000 for testing and tracking CA and AVR quality and latency values using recorded HU-AU calls is illustrated. System 1000 includes relay components represented by the phantom box at 1001 and a cloud based ASR system 1006 (e.g., a server that is linked to via the internet or some other type of computing network). Two sources of pre-generated information are maintained at the relay including a set of recorded calls at 1002 and a set of verified true transcripts at 1010, one truth or true transcript for each recorded call in the set 1002. Again, the recorded calls may include actual HU-AU calls or may include mock calls that occur between two knowing parties that simulate an actual call.

During testing, a connection is linked from a system server that stores the calls 1002 to a captioning platform as shown at 1004 and one of the recorded calls, hereinafter referred to as a test recording, is transmitted to the captioning platform 1004. The captioning platform 1004 sends the received test recording to two targets including a CA at 1008 and the ASR server 1006 (e.g., Google Voice, IBM's Watson, etc.). The ASR generates an automated text transcript that is forwarded on to a first comparison engine at 1012. Similarly, the CA generates CA generated text which is forwarded on to a second comparison engine 1014. The verified truth text transcript at 1010 is provided to each of the first and second comparison engines 1012 and 1014. The first engine 1012 compares the ASR text to the truth and generates an ASR quality value and the second engine 1014 compares the CA generated text to truth and generates a CA quality value, each of which are provided to a system database 1016 for storage until subsequently required.

In addition, in some cases, some component within the system 1000 generates latency values for each of the ASR text and the CA generated text by comparing when the times at which words are uttered in the HU voice signal to the times at which the text corresponding thereto is generated. The latency values are represented by clock symbols 1003 and 1005 in FIG. 29. The latency values are stored in the database 1016 along with the associated ASR and CA quality values generated by the comparison engines 1012 and 1014.

Another way to test CA quality contemplated by the present disclosure is to use real time HU-AU calls to generate quality and latency values. In these cases, a first CA may be assigned to an ongoing HU-AU call and may operate in a conventional fashion to generate transcribed text that corresponds to an HU voice signal where the transcribed text is transmitted back to the AU device for display substantially simultaneously as the HU voice is broadcast to the AU. Here, the first CA may perform any process to convert the HU voice to text such as, for instance, revoicing the HU voice signal to a processor that runs voice to text software trained to the voice of the HU to generate text and then correcting the text on a display screen prior to sending the text to the AU device for display. In addition, the CA generated text is also provided to a second CA along with the HU voice signal and the second CA listens to the HU voice signal and views the text generated by the first CA and makes corrections to the first CA generated text. Having been corrected a second time, the text generated by the second CA is a substantially error free transcription of the HU voice signal referred to hereinafter as the "truth". The truth and the first CA generated text are provided to a comparison engine which then generates a "CA quality value" similar to the CA quality value described above with respect to FIG. 29 which is stored for subsequent access in a database.

In addition, as is the case in FIG. 29, in the case of transcribing an ongoing HU-AU call, the HU voice signal may also be provided to a cloud based ASR server or service to generate automated speech recognition text during an ongoing call that can be compared to the truth (e.g., the second CA generated text) to generate an ASR quality value. Here, while conventional ASRs are fast, there will again be some latency in text generation and the system will be able to generate an ASR latency value.

Figure 30:
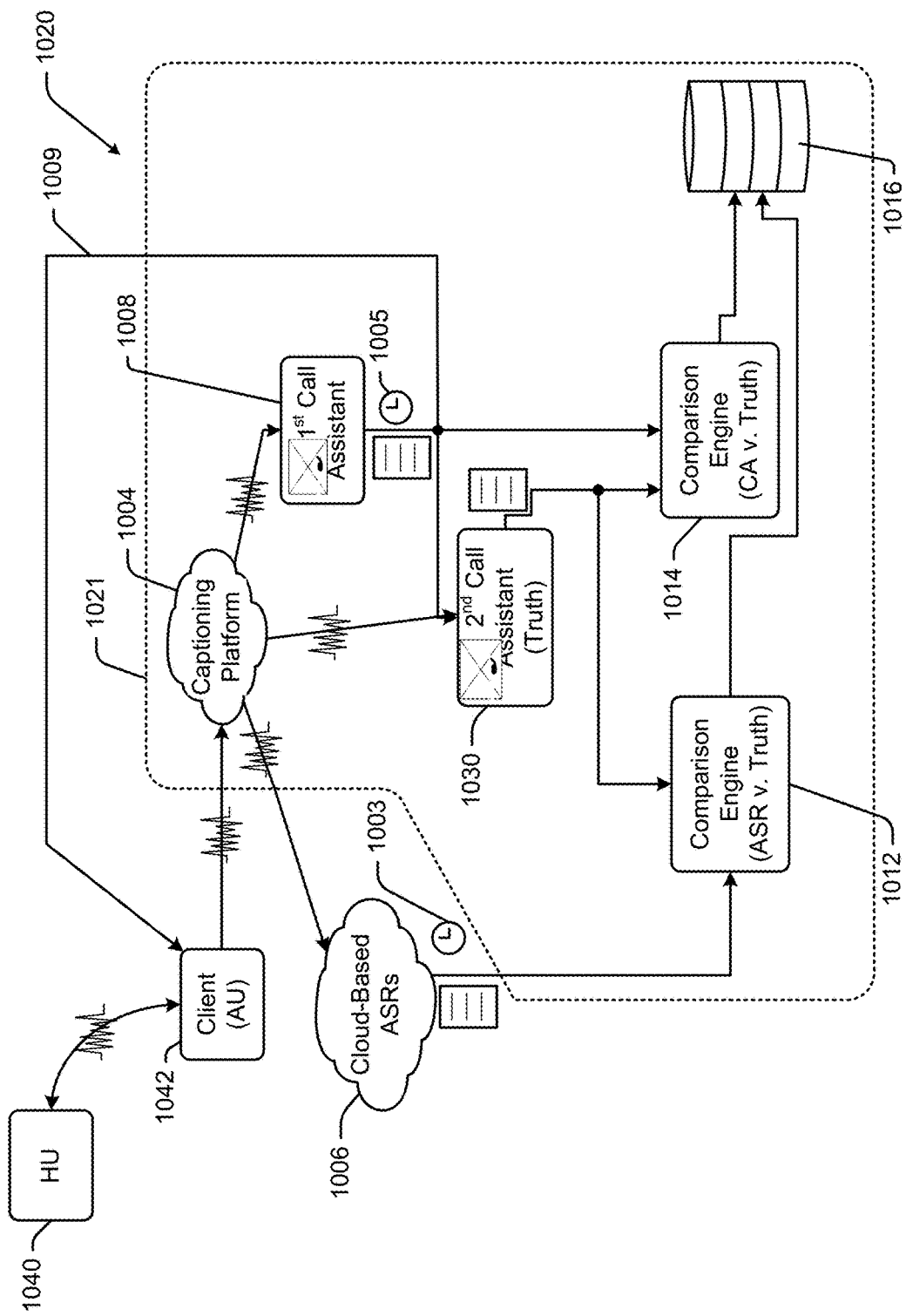
FIG. 30 is similar to FIG. 29, albeit showing a different relay system that includes a different quality assessment function.

Referring now to FIG. 30, an exemplary system 1020 for testing and tracking CA and AVR quality and latency values using ongoing HU-AU calls is illustrated. Components in the FIG. 30 system 1020 that are similar to the components described above with respect to FIG. 29 are labeled with the same numbers and operate in a similar fashion unless indicated otherwise hereafter. In addition to an HU communication device 1040 and an AU communication device 1042 (e.g., a caption type telephone device), system 1020 includes relay components represented by the phantom box at 1021 and a cloud based ASR system 1006 akin to the cloud based system described above with respect to FIG. 29. Here there is no pre-generated and recorded call or pre-generated truth text as testing is done using an ongoing dynamic call. Instead, a second CA at 1030 corrects text generated by a first CA at 1008 to create a truth (e.g., essentially 100% accurate text). The truth is compared to ASR generated text and the first CA generated text to create quality values to be stored in database 1016.

Referring still to FIG. 30, during testing, as in a conventional relay assisted captioning system, the AU device 1042 transmits an HU voice signal to the captioning platform at 1004. The captioning platform 1004 sends the received HU voice signal to two targets including a first CA at 1008 and the ASR server 1006 (e.g., Google Voice, IBM's Watson, etc.). The ASR generates an automated text transcript that is forwarded on to a first comparison engine at 1012. Similarly, the first CA generates CA generated text which is transmitted to at least three different targets. First, the first CA generated text which may include text corrected by the first CA is transmitted to the AU device 1042 for display to the AU during the call. Second, the first CA generated text is transmitted to the second comparison engine 1014. Third, the first CA generated text is transmitted to a second CA at 1030. The second CA at 1030 views the CA generated text on a display screen and also listens to the HU voice signal and makes corrections to the first CA generated text where the second CA generated text operates as a truth text or truth. The truth is transmitted to the second comparison engine at 1014 to be compared to the first CA generated text so that a CA quality value can be generated. The CA quality value is stored in database 1016 along with one or more CA latency values.

Referring again to FIG. 30, the truth is also transmitted from the second call assistant at 1030 to the first comparison engine at 1012 to be compared to the ASR generated text so that an ASR quality value is generated which is also stored along with at least one ASR latency value in the database 1016.

Figure 31:
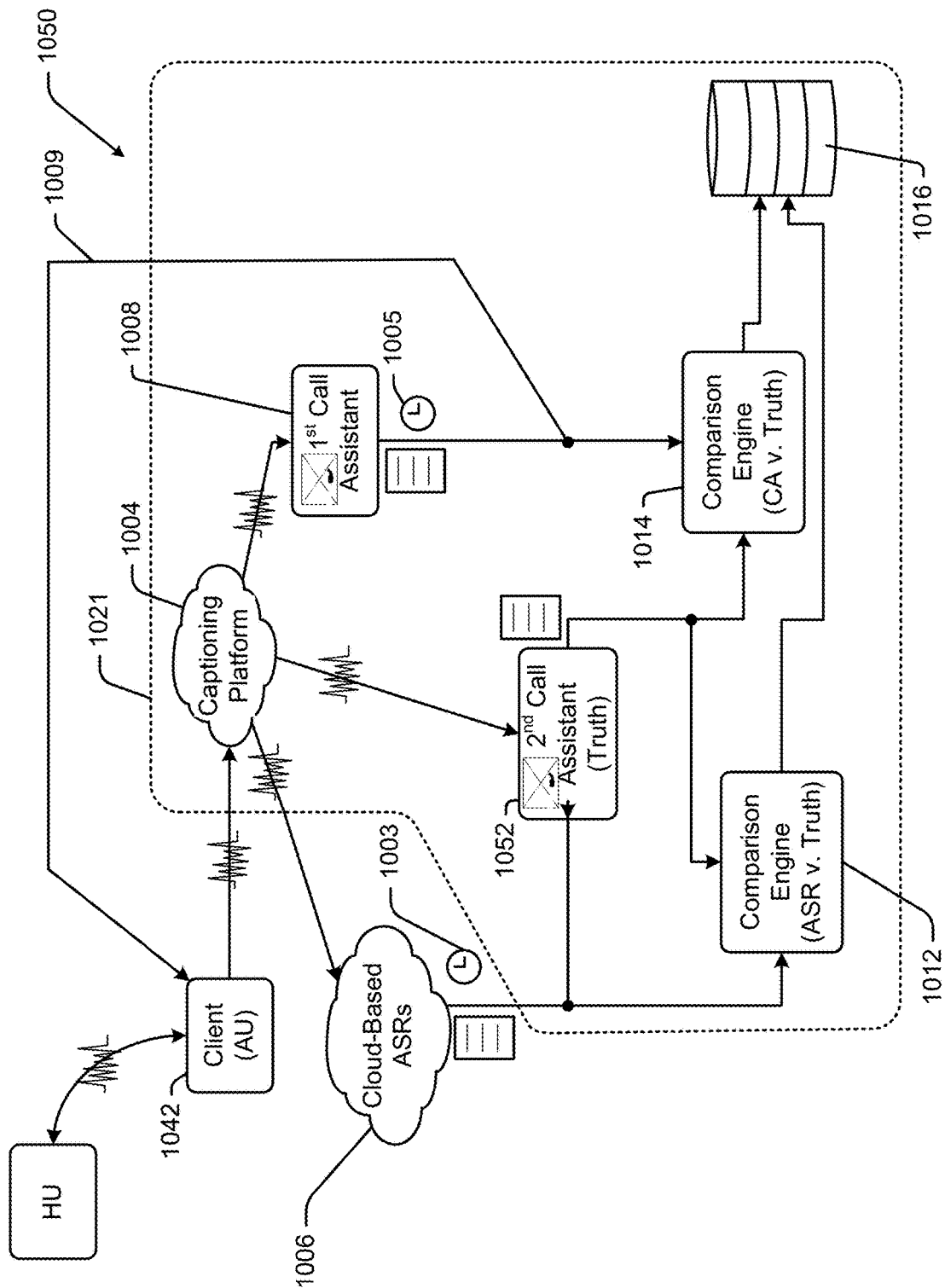
FIG. 31 is similar to FIG. 29, albeit showing a third relay system that includes a third quality assessment function.

Referring to FIG. 31, another embodiment of a testing relay system is shown at 1050 which is similar to the system 1020 of FIG. 30, albeit where the ASR service 1006 provides an initial text transcription to the second CA at 1052 instead of the CA receiving the initial text from the first call assistant. Here, the second CA generated the truth text which is again provided to the two comparison engines at 1012 and 1014 so that ASR and CA quality factors can be generated to be stored in database 1016.

The ASR text generation and quality testing processes are described above as occurring essentially in real time as a first CA generates text for a recorded or ongoing call. Here, real time quality and latency testing may be important where a dynamic triage transcription process is occurring where, for instance, ASR generated text may be swapped in for a cut out CA when ASR generated text achieves some quality threshold or a CA may be swapped in for ASR generated text if the ASR quality value drops below some threshold level. In other cases, however, quality testing may not need to be real time and instead, may be able to be done off line for some purposes. For instance, where quality testing is only used to provide metrics to a government agency, the testing may be done off line.

In this regard, referring again to FIG. 29, in at least some cases where testing cannot be done on the fly as a CA at 1008 generates text, the CA text and the recorded HU voice signal associated therewith may be stored in database 1016 for subsequent access for generating the ASR text at 1006 as well as for comparing the CA generated text and the ASR generated text to the verified truth text from 1010. Similarly, referring again to FIG. 30, where real time quality and latency values are not required, at least the HU portion of a call may be stored in database 1016 for subsequent off line processing by ASR service 1006 and the second CA at 1030 and then for comparisons to the truth at engines 1012 an 1014.

One advantage of generating quality and latency values in real time using real HU-AU calls is that there is no need to store calls for subsequent processing. Currently there are regulations in at least some jurisdictions that prohibit storing calls for privacy reasons and therefore off line quality testing cannot be done in these cases.

In at least some embodiments it is contemplated that quality and latency testing may only be performed sporadically and generally randomly so that generated values are sort of an average representation of the overall captioning service. In other cases, while quality and latency testing may be periodic in general, it is contemplated that tell tail signs of poor quality during transcription may be used to trigger additional quality and latency testing. For instance, in at least some cases where an AU is receiving ASR generated text and the AU selects an option to link to a CA for correction, the AU request may be used as a trigger to start the quality testing process on text received from that point on (e.g., quality testing will commence and continue for HU voice received as time progresses forward). Similarly, when an AU requests full CA captioning (e.g., revoicing and text correction), quality testing may be performed from that point forward on the CA generated text.

In other cases, it is contemplated that an HU-AU call may be stored during the duration of the call and that, at least initially, no quality testing may occur. Then, if an AU requests CA assistance, in addition to patching a CA into the call to generate higher quality transcription, the system may automatically patch in a second CA that generates truth text as in FIG. 30 for the remainder of the call. In addition or instead, when the AU requests CA assistance, the system may, in addition to patching a CA in to generate better quality text, also cause the recorded HU voice prior to the request to be used by a second CA to generate truth text for comparison to the ASR generated text so that an ASR quality value for the text that caused the AU to request assistance can be generated. Here, the pre-CA assistance ASR quality value may be generated for the entire duration of the call prior to the request or just for a most recent sub-period (e.g., for the prior minute or 30 seconds). Here, in at least some cases, it is contemplated that the system may automatically erase any recorded portion of an HU-AU call immediately after any quality values associated therewith have been calculated. In cases where quality values are only calculated for a most recent period of HU voice signal, recordings prior thereto may be erased on a rolling basis.

As another instance, in at least some cases it is contemplated that sensors at a relay may sense line noise or other signal parameters and, whenever the line noise or other parameters meet some threshold level, the system may automatically start quality testing which may persist until the parameters no longer meet the threshold level. Here, there may be hysteresis built into the system so that once a threshold is met, at least some duration of HU voice signal below the threshold is required to halt the testing activities. The parameter value or condition or circumstance that triggered the quality testing would, in this case, be stored along with the quality value and latency information to add context to why the system started quality testing in the specific instance.

As one other example, in a case where an AU signals dissatisfaction with a captioning service at the end of a call, quality testing may be performed on at least a portion of the call. To this end, in at least some cases as an HU-AU call progresses, the call may be recorded regardless of whether or not ASR or CA generated text is presented to an AU. Then, at the end of a call, a query may be presented to the AU requesting that the AU rate the AU's satisfaction with the call and captioning on some scale (e.g., a 1 through 10 quality scale with 10 being high). Here, if a satisfaction rating were low (e.g., less than 7) for some reason, the system may automatically use the recorded HU voice or at least a portion thereof to generate a CA quality value in one of the ways described above. For instance, the system may provide the text generated by a first CA or by the ASR and the recorded HU voice signal to a second CA for generating truth and a quality value may be generated using the truth text for storage in the database.

In still other cases where an AU expresses a low satisfaction rating for a captioning service, prior to using a recorded HU voice signal to generate a quality value, the system server may request authorization to use the signal to generate a captioning quality value. For instance, after an AU indicates a 7 or lower on a satisfaction scale, the system may query the AU for authorization to check captioning quality by providing a query on the AU's device display and "Yes" and "No" options. Here, if the yes option is selected, the system would generate the captioning quality value for the call and memorialize that value in the system database 1016.

As another instance, because it is the HU's voice signal that is recorded (e.g., in some cases the AU voice signal may not be recorded) and used to generate the captioning quality value, authorization to use the recording to generate the quality value may be sought from an HU if the HU is using a device that can receive and issue an authorization request at the end of a call. For instance, in the case of a call where an HU uses a standard telephone, if an AU indicates a low satisfaction rating at the end of a call, the system may transmit an audio recording to the HU requesting authorization to use the HU voice signal to generate the quality value along with instructions to select "1" for yes and "2" for no. In other cases where an HU's device is a smart phone or other computing type device, the request may include text transmitted to the HU device and selectable "Yes" and "No" buttons for authorizing or not.

While an HU-AU call recording may be at least temporarily stored at a relay, in other cases it is contemplated that call recordings may be stored at an AU device or even at an HU device until needed to generate quality values. In this way, an HU or AU may exercise more control or at least perceive to exercise more control over call content. Here, for instance, while a call may be recorded, the recording device may not release recordings unless authorization to do so is received from a device operator (e.g., an HU or an AU). Thus, for instance, if the HU voice signal for a call is stored on an HU device during the call and, at the end of a call an AU expresses low satisfaction with the captioning service in response to a satisfaction query, the system may query the HU to authorize use of the HU voice to generate captioning quality values. In this case, if the HU authorizes use of the HU voice signal, the recorded HU voice signal would be transmitted to the relay to be used to generate captioning quality values as described above. Thus, the HU or AU device may serve as a sort of software vault for HU voice signal recordings that are only released to the relay after proper authorization is received from the HU or the AU, depending on system requirements.

As generally known in the industry, voice to text software accuracy is higher for software that is trained to the voice of a speaking person. Also known is that software can train to specific voices over short durations. Nevertheless, in most cases it is advantageous if software starts with a voice model trained to a particular voice so that caption accuracy can start immediately upon transcription. Thus, for instance, in FIG. 30, when a specific HU calls an AU to converse, it would be advantageous if the ASR service at 1006 had access to a voice model for the specific HU. One way to do this would be to have the ASR service 1006 store voice models for at least HUs that routinely call an AU (e.g., a top ten HU list for each AU) and, when an HU voice signal is received at the ASR service, the service would identify the HU voice signal either using recognition software that can distinguish once voice from others or via some type of an identifier like the phone number of the HU device used to call the AU. Once the HU voice is identified, the ASR service accesses an HU voice model associated with the HU voice and uses that model to perform automated captioning.

One problem with systems that require an ASR service to store HU voice models is that HUs may prefer to not have their voice models stored by third party ASR service providers or at least to not have the models stored and associated with specific HUs. Another problem may be that regulatory agencies may not allow a third party ASR service provider to maintain HU voice models or at least models that are associated with specific HUs. One solution is that no information useable to associate an HU with a voice model may be stored by an ASR service provider. Here, instead of using an HU identifier like a phone number or other network address associated with an HU's device to identify an HU, an ASR server may be programmed to identify an HU's voice signal from analysis of the voice signal itself in an anonymous way.

Another solution may be for an AU device to store HU voice models for frequent callers where each model is associated with an HU identifier like a phone number or network address associated with a specific HU device. Here, when a call is received at an AU device, the AU device processor may use the number or address associated with the HU device to identify which voice model to associate with the HU device. Then, the AU device may forward the HU voice model to the ASR service provider 1006 to be used temporarily during the call to generate ASR text. Similarly, instead of forwarding an HU voice model to the ASR service provider, the AU device may simply forward an intermediate identification number or other identifier associated with the HU device to the ASR provider and the provider may associate the number with a specific HU voice model stored by the provider to access an appropriate HU voice model to use for text transcription. Here, for instance, where an AU supports ten different HU voice models for 10 most recent HU callers, the models may be associated with number 1 through 10 and the AU may simply forward on one of the intermediate identifiers (e.g., "7") to the ASR provider 1006 to indicate which one of ten voice models maintained by the ASR provider for the AU to use with the HU voice transmitted.

In still other cases an HU may maintain one or more HU voice models that can be forwarded on to an ASR provider either through the relay or directly to generate text.

In at least some cases other more complex quality analysis and statistics are contemplated that may be useful in determining better ways to train CAs as well as in assessing CA quality values. For instance, it has been recognized that voice to text errors can generally be split into two different categories referred to herein as "visible" and "invisible" errors. Visible errors are errors that result in text that, upon reading, is clearly erroneous while invisible errors are errors that result in text that, despite the error that occurred, makes sense in context. For instance, where an HU voices the phrase "We are meeting at Joe's restaurant at 9 PM", in a text transcription "We are meeting at Joe's rodent for pizza at 9 PM", the word "rodent" is a "visible" error in the sense that an AU reading the phrase would quickly understand that the word "rodent" makes no sense in context. On the other hand, if the HU's phrase were transcribed as "We are meeting at Joe's room for pizza at 9 PM", the erroneous word "room" is not contextually wrong and therefore cannot be easily discerned as an error. Where the word room is replaced by restaurant, an AU could easily get a wrong impression and for that reason invisible errors are generally considered worse than visible errors.

In at least some cases it is contemplate that some mechanism for distinguishing visible and invisible text transcription errors may be included in a relay quality testing system. For instance, where 10 errors are made during some sub-period of an HU-AU call, three of the errors may be identified as invisible while 7 are visible. Here, because invisible errors typically have a worse effect on communication effectiveness, statistics that capture relative numbers of invisible to all errors should be useful in assessing CA or ASR quality.

In at least some systems it is contemplated that a relay server may be programmed to automatically identify at least visible errors so that statistics related thereto can be captured. For instance, the server may be able to contextually examine text and identify words of phrases that simply make no sense and may identify each of those nonsensical errors as a visible error. Here, because invisible errors make contextual sense, there is no easy algorithm by which a processor or server can identify invisible errors. For this reason in at least some cases a correcting CA (See 1053 in FIG. 31) may be required to identify invisible errors or, in the alternative, the system may be programmed to automatically use CA corrections to identify invisible errors. In this regard, any time a CA changes a word in a text phrase that initially made sense within the phrase to another word that contextually makes sense in the phrase, the system may recognize that type of correction to have been associated with an invisible error.

In at least some cases it is contemplated that the decision to switch captioning methods may be tied at least in part to the types of errors that are identified during a call. For instance, assume that a CA is currently generating text corresponding to an HU voice signal and that an ASR is currently training to the HU voice signal but is not currently at a high enough quality threshold to cut out the CA transcription process. Here, there may be one threshold for the CA quality value generally and another for the CA invisible error rate where, if either of the two thresholds are met, the system automatically cuts the CA out. For example, the threshold CA quality value may require 95% accuracy and the CA invisible error rate may be 20% coupled with a 90% overall accuracy requirement. Thus, here, if the invisible error rate amounts to 20% or less of all errors and the overall CA text accuracy is above 90% (e.g., the invisible error rate is less than 2% of all words uttered by the HU), the CA may be cut out of the call and ASR text relied upon for captioning. Other error types are contemplated and a system for distinguishing each of several errors types from one another for statistical reporting and for driving the captioning triage process are contemplated.

In at least some cases when to transition from CA generated text to ASR generated text may be a function of not just a straight up comparison of ASR and CA quality values and instead may be related to both quality and relative latency associated with different transcription methods. In addition, when to transition in some cases may be related to a combination of quality values, error types and relative latency as well as to user preferences.

Other triage processes for identifying which HU voice to text method should be used are contemplated. For instance, in at least some embodiments when an ASR service or ASR software at a relay is being used to generate and transmit text to an AU device for display, if an ASR quality value drops below some threshold level, a CA may be patched in to the call in an attempt to increase quality of the transcribed text. Here, the CA may either be a full revoicing and correcting CA, just a correcting CA that starts with the ASR generated text and makes corrections or a first CA that revoices and a second CA that makes corrections. In a case where a correcting CA is brought into a call, in at least some cases the ASR generated text may be provided to the AU device for display at the same time that the ASR generated text is sent to the CA for correction. In that case, corrected text may be transmitted to the AU device for in line correction once generated by the CA. In addition, the system may track quality of the CA corrected text and store a CA quality value in a system database.

In other cases when a CA is brought into a call, text may not be transmitted to the AU device until the CA has corrected that text and then the corrected text may be transmitted.

In some cases, when a CA is linked to a call because the ASR generated text was not of a sufficiently high quality, the CA may simply start correcting text related to HU voice signal received after the CA is linked to the call. In other cases the CA may be presented with text associated with HU voice signal that was transcribed prior to the CA being linked to the call for the CA to make corrections to that text and then the CA may continue to make corrections to the text as subsequent HU voice signal is received.

Thus, as described above, in at least some embodiments an HU's communication device will include a display screen and a processor that drives the display screen to present a quality indication of the captions being presented to an AU. Here, the quality characteristic may include some accuracy percentage, the actual text being presented to the AU, or some other suitable indication of caption accuracy or an accuracy estimation. In addition, the HU device may present one or more options for upgrading the captioning quality such as, for instance, requesting CA correction of automated text captioning, requesting CA transcription and correction, etc.

Additional Specification

In at least some embodiments described above various HU voice delay concepts have been described where an HU's voice signal broadcast is delayed in order to bring the voice signal broadcast more temporally in line with associated captioned text. Thus, for instance, in a system that requires at least three seconds (and at times more time) to transcribe an HU's voice signal to text for presentation, a system processor may be programmed to introduce a three second delay in HU voice broadcast to an AU to bring the HU voice signal broadcast more into simultaneous alignment with associated text generated by the system. As another instance in a system where an AVR requires at least two seconds to transcribe an HU's voice signal to text for presentation to a correcting CA, the system processor may be programmed to introduce a two second delay in the HU voice that is broadcast to an AU to bring the HU voice signal broadcast for into temporal alignment with the ASR generated text.

In the above examples, the three and two second delays are simply based on the average minimum voice-to-text delays that occur with a specific voice to text system and therefore, at most times, will only imprecisely align an HU voice signal with corresponding text. For instance, in a case where HU voice broadcast is delayed three seconds, if text transcription is delayed ten seconds, the three second delay would be insufficient to align the broadcast voice signal and text presentation. As another instance, where the HU voice is delayed three seconds, if a text transcription is generated in one second, the three second delay would cause the HU voice to be broadcast two seconds after presentation of the associated text. In other words, in this example, the three second HU voice delay would be too much delay at times and too little at other times and misalignment could cause assisted user confusion.

In at least some embodiments it is contemplated that a transcription system may assign time stamps to various utterances in an HU's voice signal and those time stamps may also be assigned to text that is then generated from the utterances so that the HU voice and text can be precisely synchronized per user preferences (e.g., precisely aligned in time or, if preferred by an AU, with an HU's voice preceding or delayed with respect to text by the same persistent period) when broadcast and presented to the AU, respectively. While alignment per an AU's preferences may cause an HU voice to be broadcast prior to or after presentation of associated text, hereinafter, unless indicated otherwise, it will be assumed that an AU's preference is that the HU voice and related text be broadcast and presented simultaneously at substantially the same time. It should be recognized that in any embodiment described hereafter where the description refers to aligned or simultaneous voice and text, the same teachings will be applicable to cases where voice and text are purposefully misaligned by a persistent period (e.g., always misaligned by 3 seconds per user preference).

Various systems are contemplated for assigning time stamps to HU voice signals and associated text words and/or phrases. In a first relatively simple case, an AU device that receives an HU voice signal may assign periodic time stamps to sequentially received voice signal segments and store the HU voice signal segments along with associated time stamps. The AU device may also transmit at least an initial time stamp (e.g. corresponding to the beginning of the HU voice signal or the beginning of a first HU voice signal segment during a call) along with the HU voice signal to a relay when captioning is to commence.

In at least some embodiments the relay stores the initial time stamp in association with the beginning instant of the received HU voice signal and continues to store the HU voice signal as it is received. In addition, the relay operates its own timer to generate time stamps for on-going segments of the HU voice signal as the voice signal is received and the relay generated time stamps are stored along with associated HU voice signal segments (e.g., one time stamp for each segment that corresponds to the beginning of the segment). In a case where a relay operates an ASR engine or taps into a fourth party ASR service (e.g., Google Voice, IBM's Watson, etc.) where a CA checks and corrects ASR generated text, the ASR engine generates automated text for HU voice segments in real time as the HU voice signal is received.

A CA computer at the relay simultaneously broadcasts the HU voice segments and presents the ASR generated text to a CA at the relay for correction. Here, the ASR engine speed will fluctuate somewhat based on several factors that are known in the speech recognition art so that it can be assumed that the ASR engine will translate a typical HU voice signal segment to text within anywhere between a fraction of a second (e.g., one tenth of a second) to 10 seconds. Thus, where the CA computer is configured to simultaneously broadcast HU voice and present ASR generated text for CA consideration, the relay is programmed to delay the HU voice signal broadcast dynamically for a period within the range of a fraction of a second up to the maximum number of seconds required for the ASR engine to transcribe a voice segment to text. Again, here, a CA may have control over the timing between text presentation and HU voice broadcast and may prefer one or the other of the text and voice to precede the other (e.g., HU voice to proceed corresponding text by two seconds or vice versa). In these cases, the preferred delay between voice and text can be persistent and unchanging which results in less CA confusion.

After a CA corrects text errors in the ASR engine generated text, in at least some cases the relay transmits the time stamped text back to the AU caption device for display to the AU. Upon receiving the time stamped text from the relay, the AU device accesses the time stamped HU voice signal stored thereat and associates the text and HU voice signal segments based on similar (e.g., closest in time) or identical time stamps and stores the associated text and HU voice signal until presented and broadcasted to the AU. The AU device then simultaneously (or delayed per user preference) broadcasts the HU voice signal segments and presents the corresponding text to the AU via the AU caption device in at least some embodiments.

Figure 32:
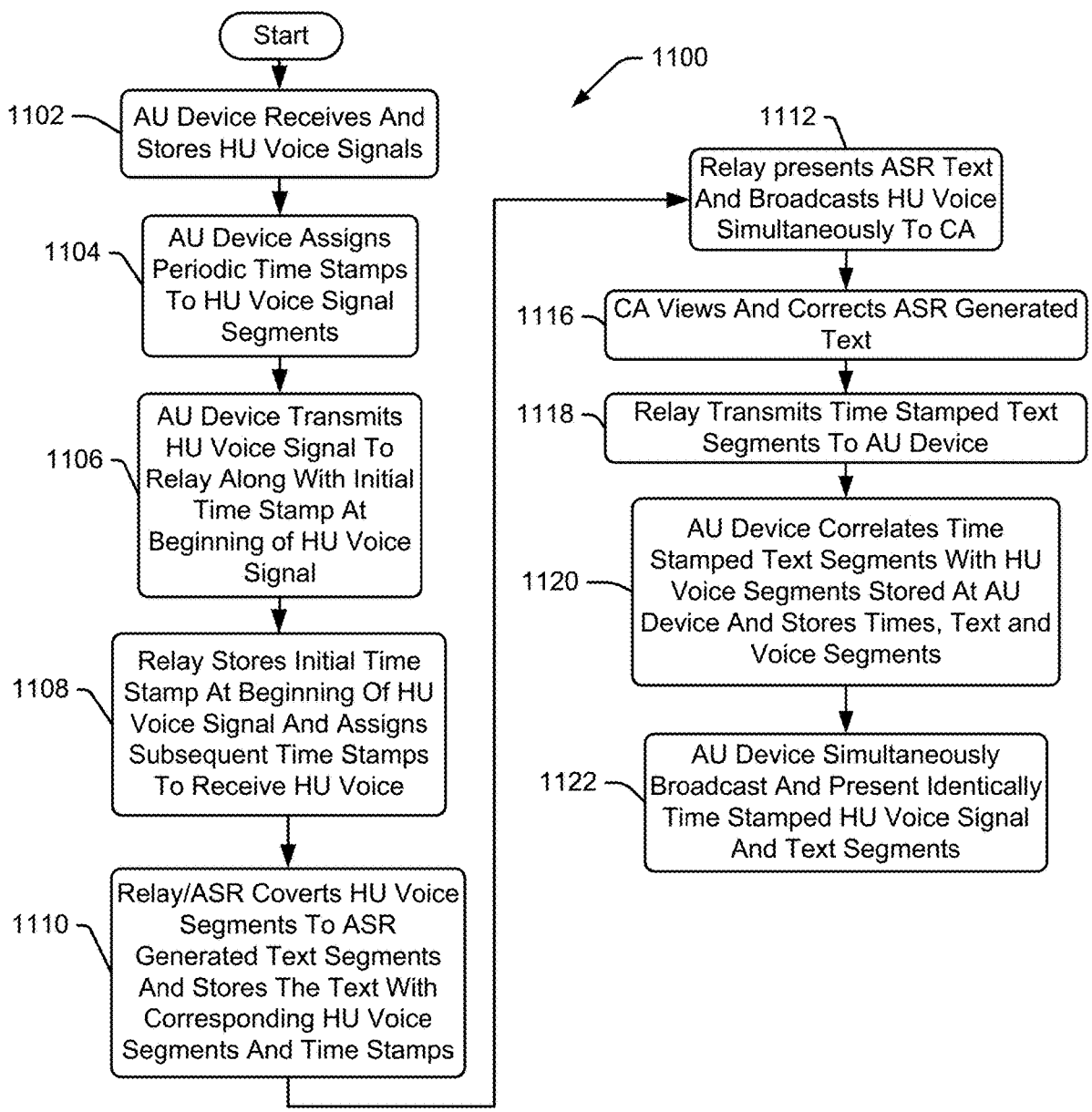
FIG. 32 is a flow chart illustrating a method whereby time stamps are assigned to HU voice segments which are then used to substantially synchronize text and voice presentation.
Figure 33:
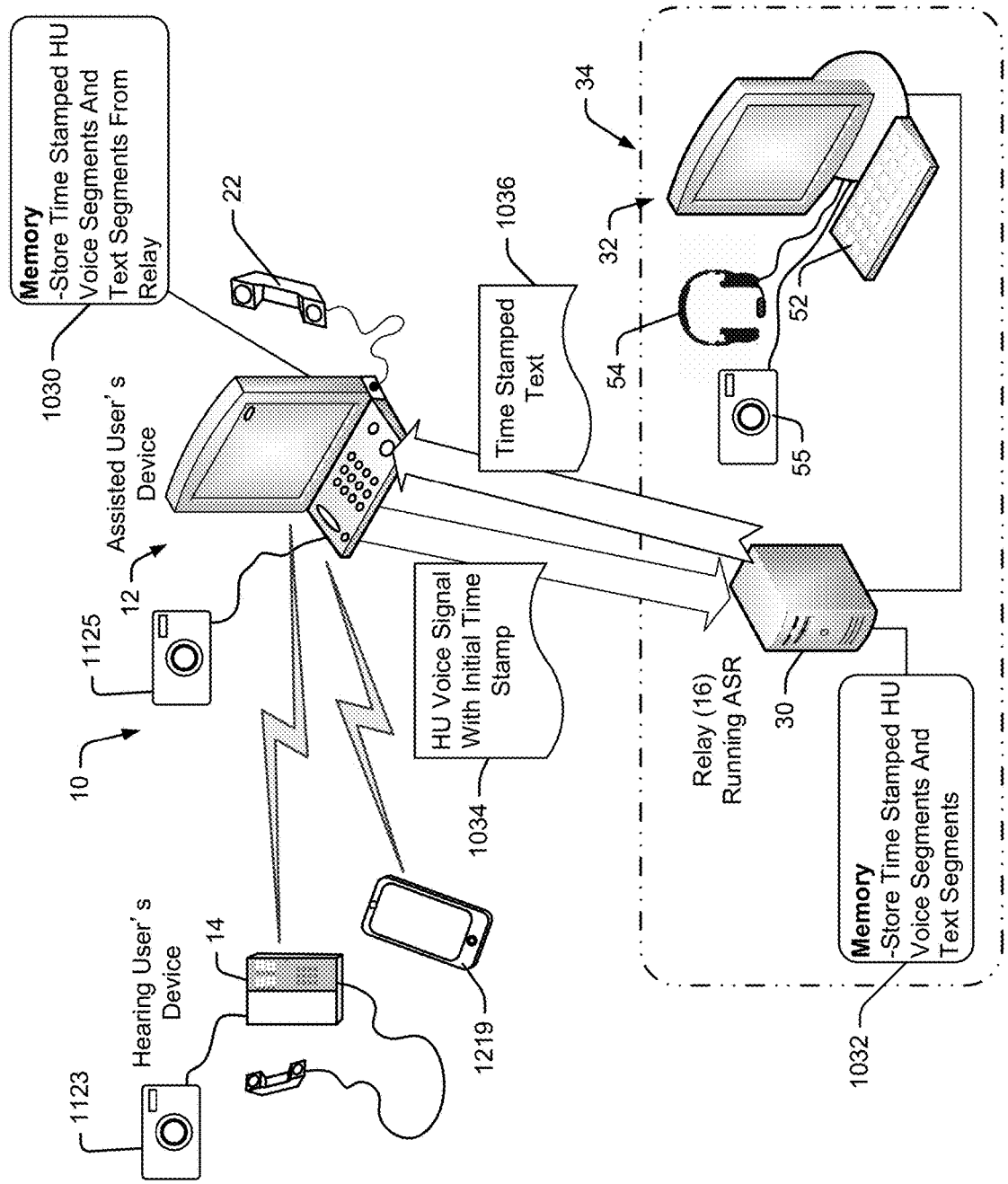
FIG. 33 is a schematic illustrating a caption relay system that may implement the method illustrated in FIG. 32 as well as other methods described herein.

A flow chart that is consistent with this simple first case of time stamping text segments is shown in FIG. 32 and will be described next. Referring also to FIG. 33, a system similar to the system described above with respect to FIG. 1 is illustrated where similar elements are labelled with the same numbers used in FIG. 1 and, unless indicated otherwise, operates in a similar fashion. The primary differences between the FIG. 1 system and the system described in FIG. 33 is that each of the AU caption device 12 and the relay 16 includes a memory device that stores, among other things, time stamped voice message segments corresponding to a received HU voice signal and that time stamps are transmitted between AU device 12 and relay server 30 (see 1034 and 1036).

Referring to FIGS. 32 and 33, during a call between an HU using an HU device 14 and an AU using AU device 12, at some point, captioning is required by the AU (e.g., either immediately when the call commences or upon selection of a caption option by the AU) at which point AU device 12 performs several functions. First, after captioning is to commence, at block 1102, the HU voice signal is received by the AU device 12. At block 1104, AU device 12 commences assignment and continues to assign periodic time stamps to the HU voice signal segments received at the AU device. The time stamps include an initial time stamp t0 corresponding to the instant in time when captioning is to commence or some specific instant in time thereafter as well as following time stamps. In addition, at block 1104, AU device 12 commences storing the received HU voice signal along with the assigned time stamps that divide up the HU voice signal into segments in AU device memory 1030.

Referring still to FIGS. 32 and 33, at block 1106, AU device 12 transmits the HU voice signal segments to relay 16 along with the initial time stamp t0 corresponding to the instant captioning was initiated where the initial time stamp is associated with the start of the first HU voice segment transmitted to the relay (see 1034 in FIG. 33). At block 1108, relay 16 stores the initial time stamp t0 along with the first HU voice signal segment in memory 1032, runs its own timer to assign subsequent time stamps to the HU voice signal received and stores the HU voice signal segments and relay generated time stamps in memory 1032. Here, because both the AU device and the relay assign the initial time stamp t0 to the same point within the HU voice signal and each assigns other stamps based on the initial time stamp, all of the AU device and relay time stamps should be aligned assuming that each assigns time stamps at the same periodic intervals (e.g., every second).

In other cases, each of the AU device and relay may assign second and subsequent time stamps having the form (t0+Δt) where Δt is a period of time relative to the initial time stamp t0. Thus, for instance, a second time stamp may be (t0+1 sec), a third time stamp may be (t0+4 sec), etc. In this case, the AU device and relay may assign time stamps that have a different periods where the system simply aligns stamps text and voice when required based on closest stamps in time.

Continuing, at block 1110, relay 16 runs an ASR engine to generate ASR engine text for each of the stored HU voice signal segments and stores the ASR engine text with the corresponding time stamped HU voice signal segments. At block 1112, relay 16 presents the ASR engine text to a CA for consideration and correction. Here, the ASR engine text is presented via a CA computer display screen 32 while the HU voice segments are simultaneously (e.g., as text is scrolled onto display 32) broadcast to the CA via headset 54. The CA uses display 32 and/or other interface devices to make corrections (see block 1116) to the ASR engine text. Corrections to the text are stored in memory 1032 and the resulting text is transmitted at block 1118 to AU device 12 along with a separate time stamp for each of the text segments (see 1036 in FIG. 33).

Referring yet again to FIGS. 32 and 33, upon receiving the time stamped text, AU device 12 correlates the time stamped text with the HU voice signal segments and associated time stamps in memory 1130 and stores the text with the associated voice segments and related time stamps at block 1120. At block 1122, in some embodiments, AU device 12 simultaneously broadcasts and presents the correlated HU voice signal segments and text segments to the AU via an AU device speaker and the AU device display screen, respectively.

Referring still to FIG. 32, it should be appreciated that the time stamps applied to HU voice signal segments and corresponding text segments enable the system to align voice and text when presented to each of a CA and an AU. In other embodiments it is contemplated that the system may only use time stamps to align voice and text for one or the other of a CA and an AU. Thus, for instance, in FIG. 32, the simultaneous broadcast step at 1112 may be replaced by voice broadcast and text presentation immediately when available and synchronous presentation and broadcast may only be available to the AU at step 1122. In a different system synchronous voice and text may be provided to the CA at step 1112 while HU voice signal and caption text are independently presented to the AU immediately upon reception at steps 1102 and 1122, respectively.

In the FIG. 32 process, the AU only transmits an initial HU voice signal time stamp to the relay corresponding to the instant when captioning commences. In other cases it is contemplated that AU device 12 may transmit more than one time stamp corresponding to specific points in time to relay 16 that can be used to correct any voice and text segment misalignment that may occur during system processes. Thus, for instance, instead of sending just the initial time stamp, AU device 12 may transmit time stamps along with specific HU voice segments every 5 seconds or every 10 seconds or every 30 seconds, etc., while a call persists, and the relay may simply store each newly received time stamp along with an instant in the stream of HU voice signal received.

In still other cases AU device 12 may transmit enough AU device generated time stamps to relay 16 that the relay does not have to run its own timer to independently generate time stamps for voice and text segments. Here, AU device 12 would still store the time stamped HU voice signal segments as they are received and stamped and would correlate time stamped text received back from the relay 16 in the same fashion so that HU voice segments and associated text can be simultaneously presented to the AU.

Figure 34:
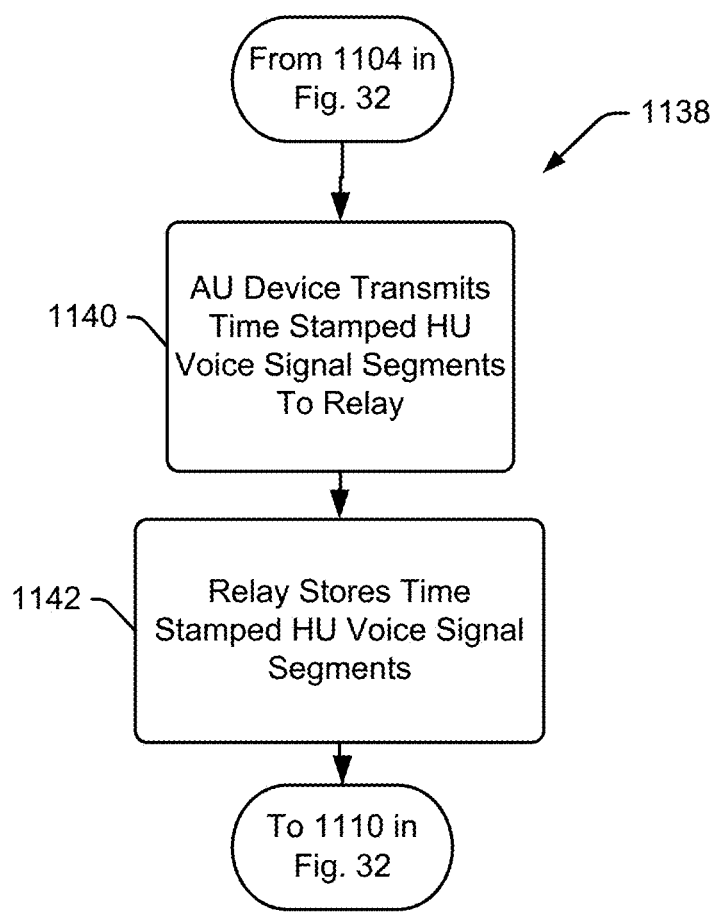
FIG. 34 is a sub process that may be substituted for a portion of the FIG. 32 process where an Au device assigns a sequence of time stamps to a sequence of text segments.

A sub-process 1138 that may be substituted for a portion of the process described above with respect to FIG. 32 is shown in FIG. 34, albeit where all AU device time stamps are transmitted to and used by a relay so that the relay does not have to independently generate time stamps for HU voice and text segments. In the modified process, referring also and again to FIG. 32, after AU device 12 assigns periodic time stamps to HU voice signal segments at block 1104, control passes to block 1140 in FIG. 34 where AU device 12 transmits the time stamped HU voice signal segments to relay 16. At block 1142, relay 16 stores the time stamped HU voice signal segments after which control passes back to block 1110 in FIG. 32 where the relay employs an ASR engine to convert the HU voice signal segments to text segments that are stored with the corresponding voice segments and time stamps. The process described above with respect to FIG. 32 continues as described above so that the CA and/or the AU are presented with simultaneous HU voice and text segments.

In other cases it is contemplated that an AU device 12 may not assign any time stamps to the HU voice signal and, instead, the relay or a fourth party ASR service provider may assign all time stamps to voice and text signals to generate the correlated voice and text segments. In this case, after text segments have been generated for each HU voice segment, the relay may transmit both the HU voice signal and the corresponding text back to AU device 12 for presentation.

A process 1146 that is similar to the FIG. 32 process described above is shown in FIG. 35, albeit where the relay generates and assigns all time stamps to the HU voice signals and transmits the correlated time stamps, voice signals and text to the AU device for simultaneous presentation. In the modified process 1146, process steps 1150 through 1154 in FIG. 35 replace process steps 1102 through 1108 in FIG. 32 and process steps 1158 through 1162 in FIG. 35 replace process steps 1118 through 1122 in FIG. 32 while similarly numbered steps 1110 through 1116 are substantially identical between the two processes.

Figure 35:
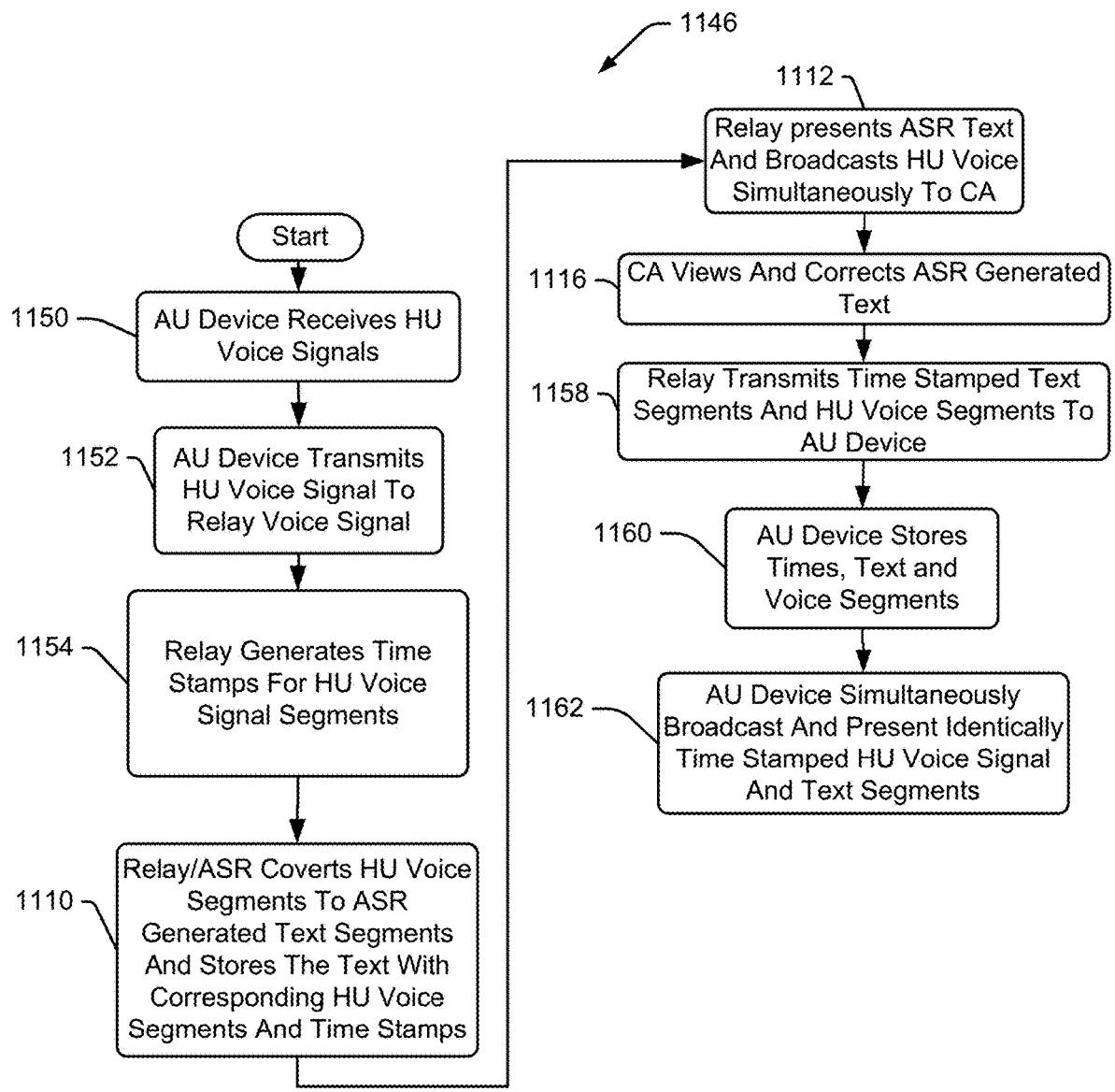
FIG. 35 is another flow chart illustrating another method for assigning and using time stamps to synchronize text and HU voice broadcast.

Process 1146 starts at block 1150 in FIG. 35 where AU device 12 receives an HU voice signal from an HU device where the HU voice signal is to be captioned. Without assigning any time stamps to the HU voice signal, AU device 12 links to a relay 16 and transmits the HU voice signal to relay 16 at block 1152. At block 1154, relay 16 uses a timer or clock to generate time stamps for HU voice signal segments after which control passes to block 1110 where relay 16 uses an ASR engine to convert the HU voice signal to text which is stored along with the corresponding HU voice signal segments and related time stamps. At block 1112, relay 16 simultaneously presents ASR text and broadcasts HU voice segments to a CA for correction and the CA views the text and makes corrections at block 1116. After block 1116, relay 16 transmits the time stamped text and HU voice segments to AU device 12 and that information is stored by the AU device as indicated at block 1160. At block 1162, AU device 12 simultaneously broadcasts and presents corresponding HU voice and text segments via the AU device display.

In cases where HU voice signal broadcast is delayed so that the broadcast is aligned with presentation of corresponding transcribed text, delay insertion points will be important in at least some cases or at some times. For instance, an HU may speak for 20 consecutive seconds where the system assigns a time stamp every 2 seconds. In this case, one solution for aligning voice with text would be to wait until the entire 20 second spoken message is transcribed and then broadcast the entire 20 second voice message and present the transcribed text simultaneously. This, however, is a poor solution as it would slow down HU-AU communication appreciably.

Another solution would be to divide up the 20 second voice message into 5 second periods with silent delays therebetween so that the transcription process can routinely catch up. For instance, here, during a first five second period plus a short transcription catch up period (e.g., 2 seconds), the first five seconds of the 20 second HU voice massage is transcribed. At the end of the first 7 seconds of HU voice signal, the first five seconds of HU voice signal is broadcast and the corresponding text presented to the AU while the next 5 seconds of HU voice signal is transcribed. Transcription of the second 5 seconds of HU voice signal may take another 7 seconds which would meant that a 2 second delay or silent period would be inserted after the first five seconds of HU voice signal is broadcast to the AU. This process of inserting periodic delays into HU voice broadcast and text presentation while transcription catches up continues. Here, while it is possible that the delays at the five second times would be at ideal times between consecutive natural phrases, more often than not, the 5 second point delays would imperfectly divide natural language phrases making it more, not less difficult, to understand the overall HU voice message.

A better solution is to insert delays between natural language phrases when possible. For instance, in the case of the 20 second HU voice signal example above, a first delay may be inserted after a first 3 second natural language phrase, a second delay may be inserted after a second 4 second natural language phrase, a third delay may be inserted after a third 5 second natural language phrase, a fourth delay may be inserted after a fourth 2 second natural language phrase and a fifth delay may be inserted after a fifth 2 second natural language phrase, so that none of the natural language phrases during the voice message are broken up by intervening delays.

Software for identifying natural language phrases or natural breaks in an HU's voice signal may use actual delays between consecutive spoken phrases as one proxy for where to insert a transcription catch up delay. In some cases software may be able to perform word, sentence and/or topic segmentation in order to identify natural language phrases. Other software techniques for dividing voice signals into natural language phrases are contemplated and should be used as appropriate.

Figure 36:
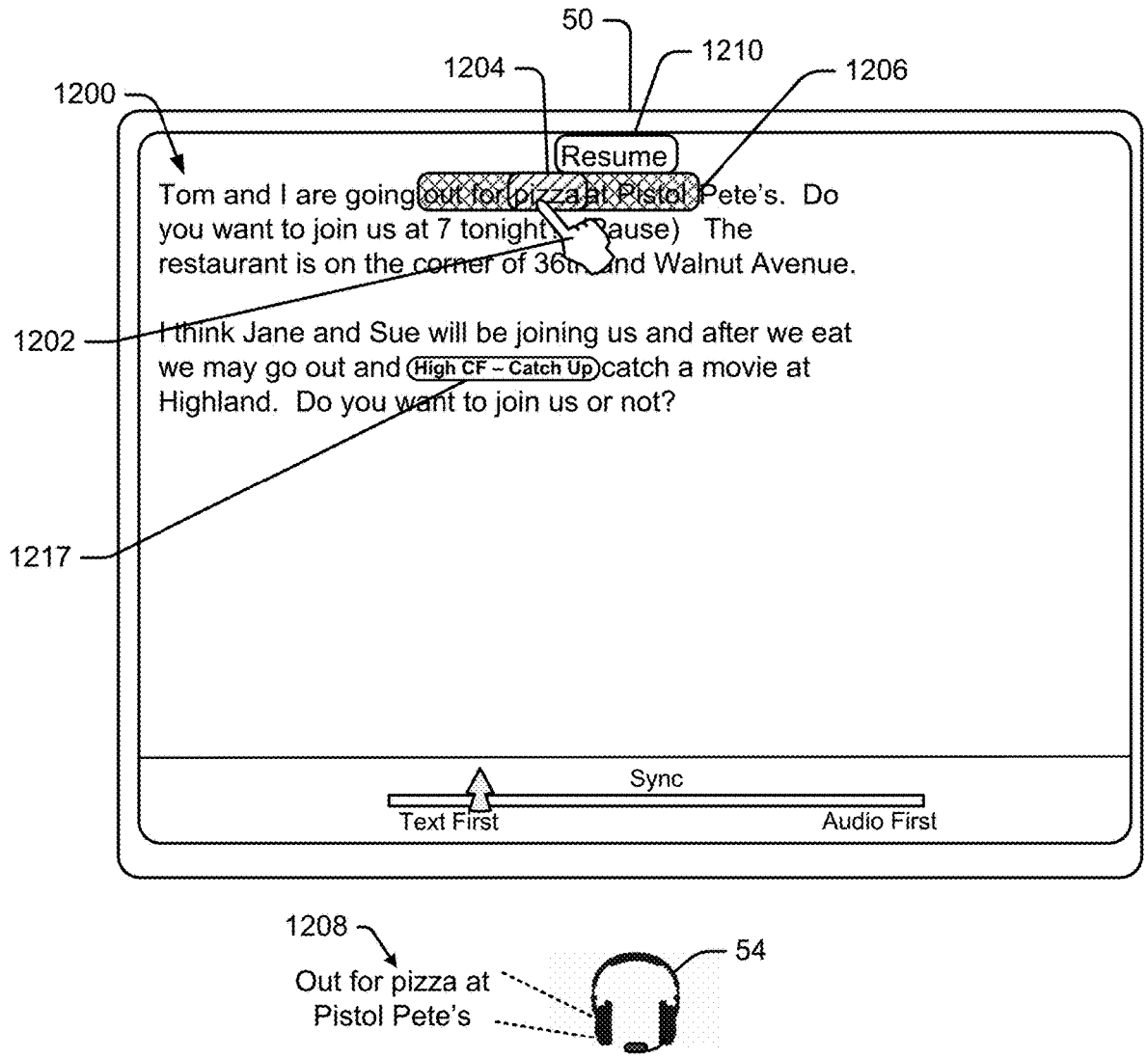
FIG. 36 is a screen shot illustrating a CA interface where a prior word is selected to be rebroadcast.

Thus, while some systems may assign perfectly periodic time stamps to HU voice signals to divide the signals into segments, in other cases time stamps will be assigned at irregular time intervals that make more sense given the phrases that an HU speaks, how an HU speaks, etc.

Where time stamps are assigned to HU voice and text segments, voice segments can be more accurately selected for replay via selection of associated text. For instance, see FIG. 36 that shows a CA display screen 50 with transcribed text represented at 1200. Here, as text is generated by a relay ASR engine and presented to a CA, consistent with at least some of the systems described above, the CA may select a word or phrase in presented text via touch (represented by hand icon 1202) to replay the HU voice signal associated therewith. When a word is selected in the presented text several things will happen in at least some contemplated embodiments. First, a current voice broadcast to the CA is halted. Second, the selected word is highlighted (see 1204) or otherwise visually distinguished. Third, when the word is highlighted, the CA computer accesses the HU voice segment associated with the highlighted word and re-broadcasts the voice segment for the CA to re-listen to the selected word. Where time stamps are assigned with short intervening periods, the time stamps should enable relatively precise replay of selected words from the text. In at least some cases, the highlight will remain and the CA may change the highlighted word or phrase via standard text editing tools.

In some cases a "Resume" or other icon 1210 may be presented proximate the selected word that can be selected via touch to continue the HU voice broadcast and text presentation at the location where the system left off when the CA selected the word for re-broadcast. In other cases, a short time (e.g., ¼th second to 3 seconds) after rebroadcasting a selected word or phrase, the system may automatically revert back to the voice and text broadcast at the location where the system left off when the CA selected the word for re-broadcast.

While not shown, in some cases when a text word is selected, the system will also identify other possible words that may correspond to the voice segment associated with the selected word (e.g., second and third best options for transcription of the HU voice segment associated with the selected word) and those options may be automatically presented for touch selection and replacement via a list of touch selectable icons, one for each option, similar to Resume icon 1210. Here, the options may be presented in a list where the first list entry is the most likely substitute text option, the second entry is the second most likely substitute text option, and so on.

Referring again to FIG. 36, in other cases when a text word is selected on a CA display screen 50, a relay server or the CA's computer may select an HU voice segment that includes the selected word and also other words in an HU voice segment or phrase that includes the selected word for re-broadcast to the CA so that the CA has some audible context in which to consider the selected word. Here, when the phrase length segment is re-broadcast, the full text phrase associated therewith may be highlighted as shown at 1206 in FIG. 36. In some cases, the selected word may be highlighted or otherwise visually distinguished in one way and the phrase length segment that includes the selected word may be highlighted or otherwise visually distinguished in a second way that is discernably different to the CA so that the CA is not confused as to what was selected (e.g., see different highlighting at 1204 and 1206 in FIG. 36).

In some cases a single touch on a word may cause the CA computer to re-broadcast the single selected word while highlighting the selected word and the associated longer phrase that includes the selected word differently while a double tap on a word may cause the phrase that includes the selected word to be re-broadcast to provide audio context. Where the system divides up an HU voice signal by natural phrases, broadcasting a full phrase that includes a selected word should be particularly useful as the natural language phrase should be associated with a more meaningful context than an arbitrary group of words surrounding the selected word.

Upon selection of Resume icon 1210, the highlighting is removed from the selected word and the CA computer restarts simultaneously broadcasting the HU voice signal and presenting associated transcribed text at the point where the computer left off when the re-broadcast word was selected. In some cases, the CA computer may back up a few seconds from the point where the computer left off to restart the broadcast to re-contextualize the voice and text presented to the CA as the CA again begins correcting text errors.

In other cases, instead of requiring a user to select a "Resume" option, the system may, after a short period (e.g., one second after the selected word or associated phrase is re-broadcast), simply revert back to broadcasting the HU voice signal and presenting associated transcribed text at the point where the computer left off when the re-broadcast word was selected. Here, a beep or other audibly distinguishable signal may be generated upon word selection and at the end of a re-broadcast to audibly distinguish the re-broadcast from broadcast HU voice. In other cases any re-broadcast voice signal may be audibly modified in some fashion (e.g., higher pitch or tone, greater volume, etc.) to audibly distinguish the re-broadcast from other HU voice signal broadcast.

Figure 37:
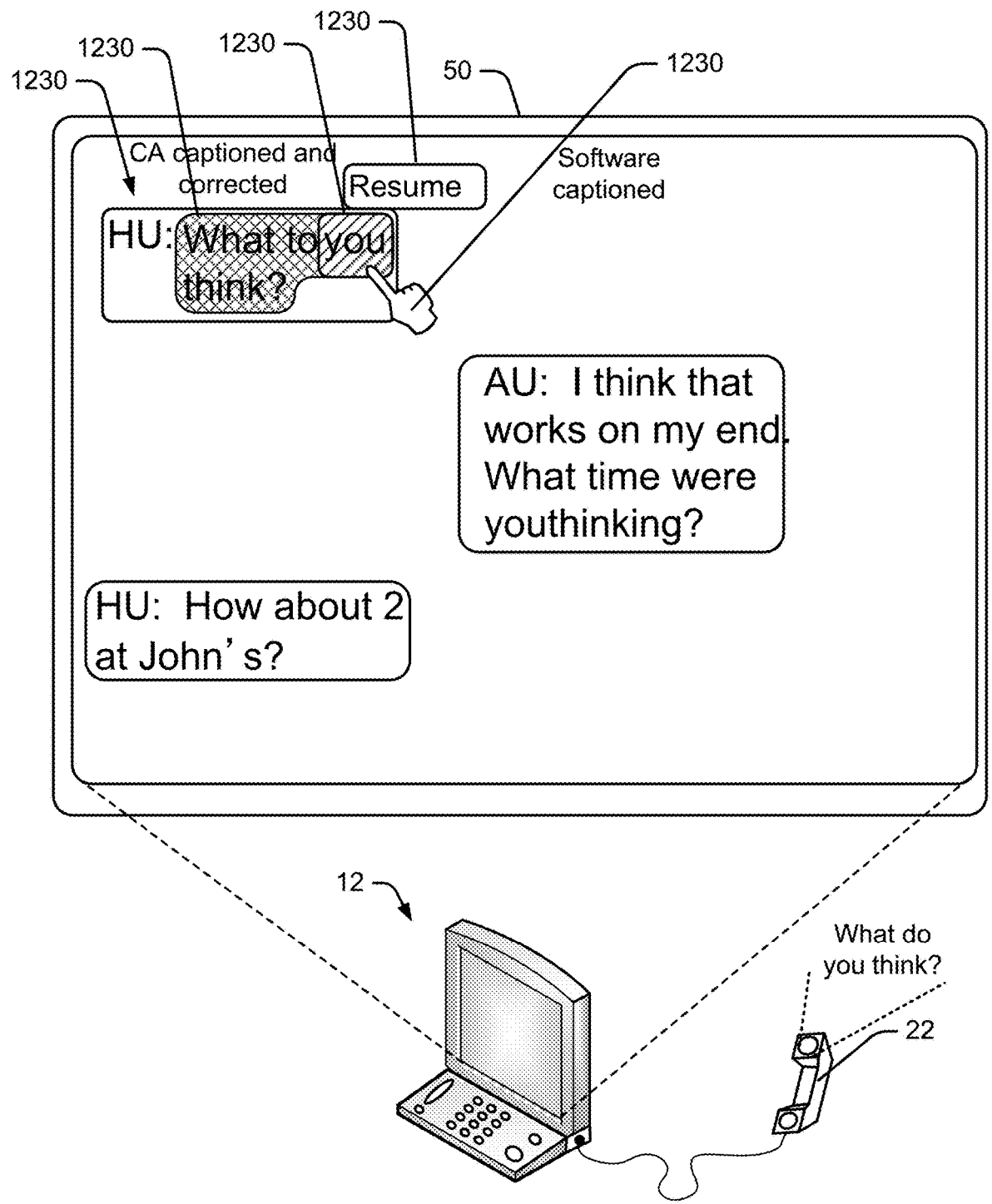
FIG. 37 is a screen shot similar to FIG. 36, albeit of an Au device display showing an AU selecting a prior broadcast phrase for rebroadcast.

Referring now to FIG. 37, a screen shot akin to the screen shot shown in FIG. 26 is illustrated at 50 that may be presented to an AU via an AU device display, albeit where an AU has selected a word from within transcribed text for re-broadcast. In at least some embodiments, similar to the CA system described above, when an AU selects a word from presented text, the instantaneous HU voice broadcast and text presentation is halted, the selected word is highlighted or otherwise visually distinguished as shown at 1230 and the phrase including the selected word may also be differently visually distinguished. Beeps or other audible signals may be generated immediately prior to and after re-broadcast of a voice signal segment. When a word is selected, the AU device speaker (e.g., the speaker in associated handset 22) re-broadcasts the HU voice signal that is associated through the assigned time stamp to the selected word. In other cases the AU device will re-broadcast the entire phrase or sub-phrase that includes the selected word to give audio context to the selected word.

While the time stamping concept is described above with respect to a system where an ASR initially transcribes an HU voice signal to text and a CA corrects the ASR generated text, the time stamping concept is also advantageously applicable to cases where a CA transcribes an HU voice signal to text and then corrects the transcribed text or where a second CA corrects text transcribed by a first CA. To this end, in at least some cases it is contemplated that an ASR may operate in the background of a CA transcription system to generate and time stamp ASR text (e.g., text generated by an ASR engine) in parallel with the CA generated text. A processor may be programmed to compare the ASR text and CA generated text to identify at least some matching words or phrases and to assign the time stamps associated with the matching ASR generated words or phrases to the matching CA generated text.

It is recognized that the CA text will likely be more accurate than the ASR text most of the time and therefore that there will be differences between the two text strings. However, some if not most of the time the ASR and CA generated texts will match so that many of the time stamps associated with the ASR text can be directly applied to the CA generated text to align the HU voice signal segments with the CA generated text. In some cases it is contemplated that confidence factors may be generated for likely associated ASR and CA generated text and time stamps may only be assigned to CA generated text when a confidence factor is greater than some threshold confidence factor value (e.g., 88/100). In most cases it is expected that confidence factors that exceed the threshold value will occur routinely and with short intervening durations so that a suitable number of reliable time stamps can be generated.

Once time stamps are associated with CA generated text, the stamps may be used to precisely align HU voice signal broadcast and text presentation to an AU or a CA (e.g., in the case of a second "correcting CA") as described above as well as to support re-broadcast of HU voice signal segments corresponding to selected text by a CA and/or an AU.

Figure 38:
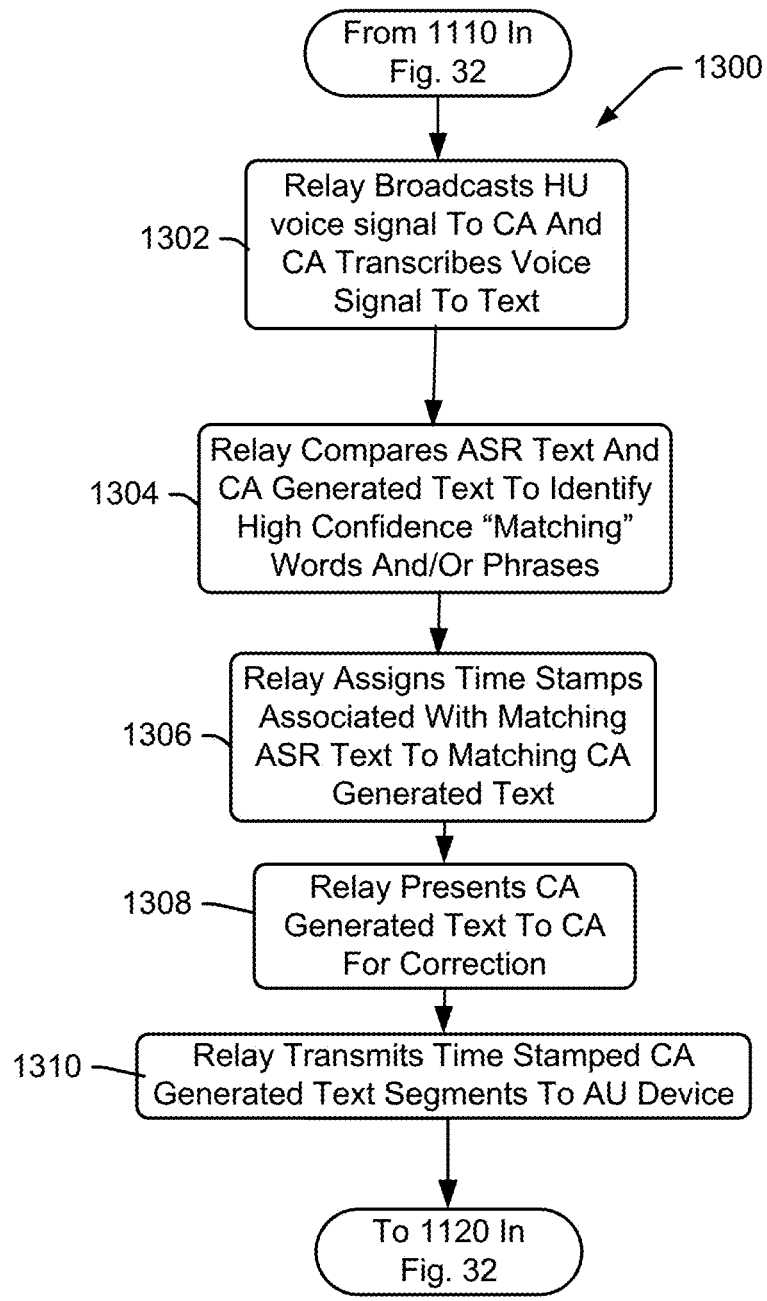
FIG. 38 is another sub process that may be substituted for a portion of the FIG. 32 method.

A sub-process 1300 that may be substituted for a portion of the FIG. 32 process is shown in FIG. 38, albeit where ASR generated time stamps are applied to CA generated text. Referring also to FIG. 32, steps 1302 through 1310 shown in FIG. 38 are swapped into the FIG. 32 process for steps 1112 through 1118. Referring also to FIG. 32, after an ASR engine generates and stores time stamped text segments for a received HU voice signal segment, control passes to block 1302 in FIG. 38 where the relay broadcasts the HU voice signal to a CA and the CA revoices the HU voice signal to transcription software trained to the CA's voice and the software yields CA generated text.

At block 1304, a relay server or processor compares the ASR text to the CA generated text to identify high confidence "matching" words and/or phrases. Here, the phrase high confidence means that there is a high likelihood (e.g., 95% likely) that an ASR text word or phrase and a CA generated text word or phrase both correspond to the exact same HU voice signal segment. Characteristics analyzed by the comparing processor include multiple word identical or nearly identical strings in compared text, temporally when text appears in each text string relative to other assigned time stamps, easily transcribed words where both an ASR and a CA are highly likely to accurately transcribe words, etc. In some cases time stamps associated with the ASR text are only assigned to the CA generated text when the confidence factor related to the comparison is above some threshold level (e.g., 88/100). Time stamps are assigned at block 1306 in FIG. 38.

At block 1308, the relay presents the CA generated text to the CA for correction and at block 1310 the relay transmits the time stamped CA generated text segments to the AU device. After block 1310 control passes back to block 1120 in FIG. 32 where the AU device correlates time stamped CA generated text with HU voice signal segments previously stored in the AU device memory and stores the times, text and associated voice segments. At block 1122, the AU device simultaneously broadcasts and presents identically time stamped HU voice and CA generated text to an AU. Again, in some cases, the AU device may have already broadcast the HU voice signal to the AU prior to block 1122. In this case, upon receiving the text, the text may be immediately presented via the AU device display to the AU for consideration. Here, the time stamped HU voice signal and associated text would only be used by the AU device to support synchronized HU voice and text re-play or representation.

In some cases the time stamps assigned to a series of text and voice segments may simply represent relative time stamps as opposed to actual time stamps. For instance, instead of labelling three consecutive HU voice segments with actual times 3:55:45 AM; 3:55:48 AM; 3:55:51 AM . . . , the three segments may be labelled t0, t1, t2, etc., where the labels are repeated after they reach some maximum number (e.g., t20). In this case, for instance, during a 20 second HU voice signal, the 20 second signal may have five consecutive labels t0, t1, t2, t3 and t4 assigned, one every four seconds, to divide the signal into five consecutive segments. The relative time labels can be assigned to HU voice signal segments and also associated with specific transcribed text segments.

In at least some cases it is contemplated that the rate of time stamp assignment to an HU voice signal may be dynamic. For instance, if an HU is routinely silent for long periods between intermittent statements, time stamps may only be assigned during periods while the HU is speaking. As another instance, if an HU speaks slowly at times and more rapidly at other times, the number of time stamps assigned to the user's voice signal may increase (e.g., when speech is rapid) and decrease (e.g., when speech is relatively slow) with the rate of user speech. Other factors may affect the rate of time stamps applied to an HU voice signal.

While the systems describe above are described as ones where time stamps are assigned to an HU voice signal by either or both of an assisted user's device and a relay, in other cases it is contemplated that other system devices or processors may assign time stamps to the HU voice signal including a fourth party ASR engine provider (e.g., IBM's Watson, Google Voice, etc.). In still other cases where the HU device is a computer (e.g., a smart phone, a tablet type computing device, a laptop computer), the HU device may assign time stamps to the HU voice signal and transmit to other system devices that need time stamps. All combinations of system devices assigning new or redundant time stamps to HU voice signals are contemplated.

In any case where time stamps are assigned to voice signals and text segments, words, phrases, etc., the engine(s) assigning the time stamps may generate stamps indicating any of (1) when a word or phrase is voiced in an HU voice signal audio stream (e.g., 16:22 to 16:22:5 corresponds to the word "Now") and (2) the time at which text is generated by the ASR for a specific word (e.g., "Now" generated at 16:25). Where a CA generates text or corrects text, a processor related to the relay may also generate time stamps indicating when a CA generated word is generated as well as when a correction is generated.

In at least some embodiments it is contemplated that any time a CA falls behind when transcribing an HU voice signal or when correcting an ASR engine generated text stream, the speed of the HU voice signal broadcast may be automatically increased or sped up as one way to help the CA catch up to a current point in an HU-AU call. For instance, in a simple case, any time a CA caption delay (e.g., the delay between an HU voice utterance and CA generation of text or correction of text associated with the utterance) exceeds some threshold (e.g., 12 seconds), the CA interface may automatically double the rate of HU signal broadcast to the CA until the CA catches up with the call.

In at least some cases the rate of broadcast may be dynamic between a nominal value representing the natural speaking speed of the HU and a maximum rate (e.g., increase the natural HU voice speed three times), and the instantaneous rate may be a function of the degree of captioning delay. Thus, for instance, where the captioning delay is only 4 or less seconds, the broadcast rate may be 1 representing the natural speaking speed of the HU, if the delay is between 4 and 8 seconds the rebroadcast rate may be 2 (e.g., twice the natural speaking speed), and if the delay is greater than 8 seconds, the broadcast rate may be 3 (e.g., three times the natural speaking speed).

In other cases the dynamic rate may be a function of other factors such as but not limited to the rate at which an HU utters words, perceived clarity in the connection between the HU and AU devices or between the AU device and the relay or between any two components within the system, the number of corrections required by a CA during some sub-call period (e.g., the most recent 30 seconds), statistics related to how accurately a CA can generate text or make text corrections at different speaking rates, some type of set AU preference, some type of HU preference, etc.

In some cases the rate of HU voice broadcast may be based on ASR confidence factors. For instance, where an ASR assigns a high confidence factor to a 15 second portion of HU voice signal and a low confidence factor to the next 10 seconds of the HU voice signal, the HU voice broadcast rate may be set to twice the rate of HU speaking speed during the first 15 second period and then be slowed down to the actual HU speaking speed during the next 10 second period.

In some cases the HU broadcast rate may be at least in part based on characteristics of an HU's utterances. For instance, where an HU's volume on a specific word is substantially increased or decreased, the word (or phrase including the word) may always be presented at the HU speaking speed (e.g., at the rate uttered by the HU). In other cases, where the volume of one word within a phrase is stressed, the entire phrase may be broadcast at speaking speed so that the full effect of the stressed word can be appreciated. As another instance, where an HU draws out pronunciation of a word such as "Well . . . " for 3 seconds, the word (or phrase including the word) may be presented at the spoken rate.

In some cases the HU voice broadcast rate may be at least in part based on words spoken by an HU or on content expressed in an HU's spoken words. For instance, simple words that are typically easy to understand including "Yes", "No", etc., may be broadcast at a higher rate than complex words like some medical diagnosis, multi-syllable terms, etc.

In cases where the system generates text corresponding to both HU and AU voice signals, in at least some embodiments it is contemplated that during normal operation only text associated with the HU signal may be presented to an AU and that the AU text may only be presented to the AU if the AU goes back in the text record to review the text associated with a prior part of a conversation. For instance, if an AU scrolls back in a conversation 3 minutes to review prior discussion, ASR generated AU voice related text may be presented at that time along with the HU text to provide context for the AU viewing the prior conversation.

In the systems described above, whenever a CA is involved in a caption assisted call, the CA considers an entire HU voice signal and either generates a complete CA generated text transcription of that signal or corrects ASR generated text errors while considering the entire HU voice signal. In other embodiments it is contemplated that where an ASR engine generates confidence factors, the system may only present sub-portions of an HU voice signal to a CA that are associated with relatively low confidence factors for consideration to speed up the error correction process. Here, for instance, where ASR engine confidence factors are high (e.g., above some high factor threshold) for a 20 second portion of an HU voice signal and then is low for the next 10 seconds, a CA may only be presented the ASR generated text and the HU voice signal may not be broadcast to the CA during the first 20 seconds while substantially simultaneous HU voice and text are presented to the CA during the following 10 second period so that the CA is able to correct any errors in the low confidence text. In this example, it is contemplated that the CA would still have the opportunity to select an interface option to hear the HU voice signal corresponding to the first 20 second period or some portion of that period if desired.

In some cases only a portion of HU voice signal corresponding to low confidence ASR engine text may be presented at all times and in other cases, this technique of skipping broadcast of HU voice associated with high confidence text may only be used by the system during threshold catch up periods of operation. For instance, the technique of skipping broadcast of HU voice associated with high confidence text may only kick in when a CA text correction process is delayed from an HU voice signal by 20 or more seconds.

In particularly advantages cases, low confidence text and associated voice may be presented to a CA at normal speaking speed and high confidence text and associated voice may be presented to a CA at an expedited speed (e.g., 3 time normal speaking speed) when a text presentation delay (e.g., the period between the time an HU uttered a word and the time when a text representation of the word is presented to the CA) is less than a maximum latency period, and if the delay exceeds the maximum latency period, high confidence text may be presented in block form (e.g., as opposed to rapid sequential presentation of separate words) without broadcasting the HU voice to expedite the catchup process.

In cases where a system processor or sever determines when to automatically switch or when to suggest a switch from a CA captioning system to an ASR engine captioning system, several factors may be considered including the following:

1. Percent match between ASR generated words and CA generated words over some prior captioning period (e.g., last 30 seconds);
2. How accurate ASR confidence factors reflect corrections made by a CA;
3. Words per minute spoken by an HU and how that affects accuracy;
4. Average delay between ASR and CA generated text over some prior captioning period;
5. An expressed AU preference stored in an AU preferences database accessible by a system processor;
6. A current AU preferences as set during an ongoing call via an on screen or other interface tool; and
7. Clarity of received signal or some other proxy for line quality of the link between any two processors or servers within the system.

Other factors are contemplated.

In at least some cases a speech recognition engine will sequentially generate a sequence of captions for a single word or phrase uttered by a speaker. For instance, where an HU speaks a word, an ASR engine may generate a first "estimate" of a text representation of the word based simply on the sound of the individual word and nothing more. Shortly thereafter (e.g., within 1 to 6 seconds), the ASR engine may consider words that surround (e.g., come before and after) the uttered word along with a set of possible text representations of the word to identify a final estimate of a text representation of the uttered word based on context derived from the surrounding words. Similarly, in the case of a CA revoicing an HU voice signal to an ASR engine trained to the CA voice to generate text, multiple iterations of text estimates may occur sequentially until a final text representation is generated.

In at least some cases it is contemplated that every best estimate of a text representation of every word to be transcribed will be transmitted immediately upon generation to an AU device for continually updated presentation to the AU so that the AU has the best HU voice signal transcription that exists at any given time. For instance, in a case where an ASR engine generates at least one intermediate text estimate and a final text representation of a word uttered by an HU and where a CA corrects the final text representation, each of the interim text estimate, the final text representation and the CA corrected text may be presented to the AU where updates to the text are made as in line corrections thereto (e.g., by replacing erroneous text with corrected text directly within the text stream presented) or, in the alternative, corrected text may be presented above or in some spatially associated location with respect to erroneous text.

In cases where an ASR engine generates intermediate and final text representations while a CA is also charged with correcting text errors, if the ASR engine is left to continually make context dependent corrections to text representations, there is the possibility that the ASR engine could change CA generated text and thereby undue an intended and necessary CA correction.

To eliminate the possibility of an ASR modifying CA corrected text, in at least some cases it is contemplated that automatic ASR engine contextual corrections for CA corrected text may be disabled. In this case, for instance, when a CA initiates a text correction or completes a correction in text presented on her device display screen, the ASR engine may be programmed to assume that the CA corrected text is accurate from that point forward. In some cases, the ASR engine may be programmed to assume that a CA corrected word is a true transcription of the uttered word which can then be used as true context for ascertaining the text to be associated with other ASR engine generated text words surrounding the true transcription. In some cases text words prior to and following the CA corrected word may be corrected by the ASR engine based on the CA corrected word that provides new context. Hereinafter, unless indicated otherwise, when an ASR engine is disabled from modifying a word in a text phrase, the word will be said to be "firm".

Figure 39:
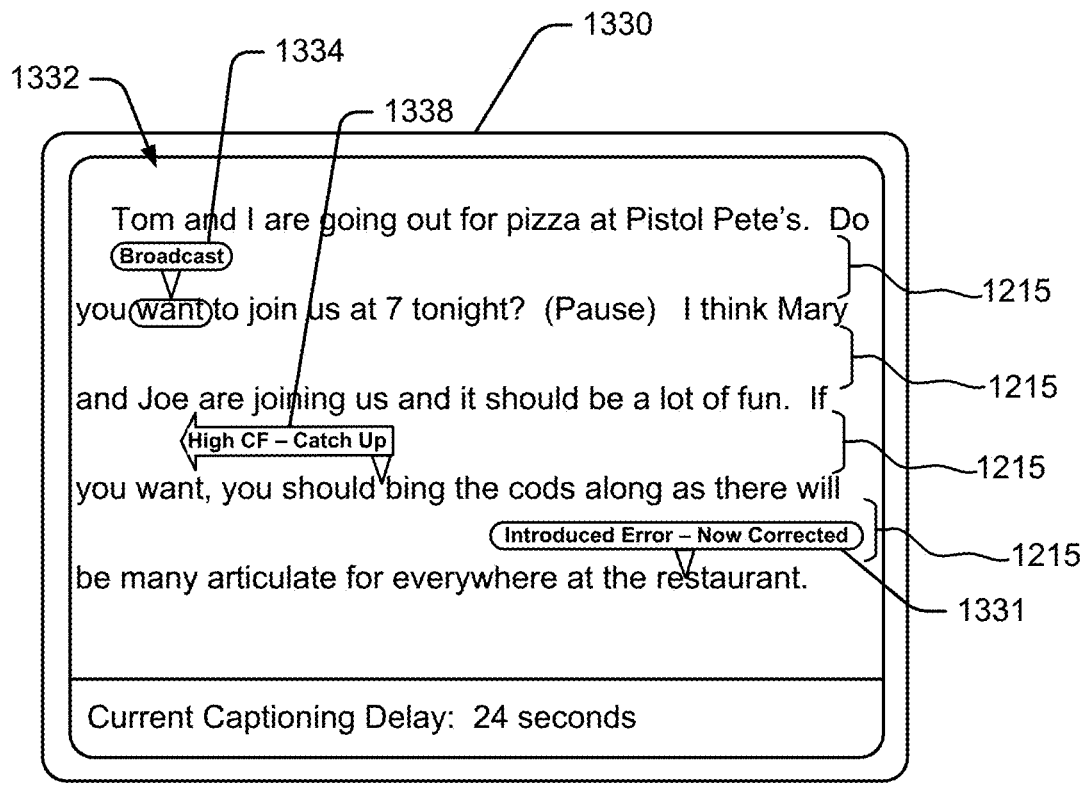
FIG. 39 is a screen shot showing a CA interface where various inventive features are shown.
Figure 43:
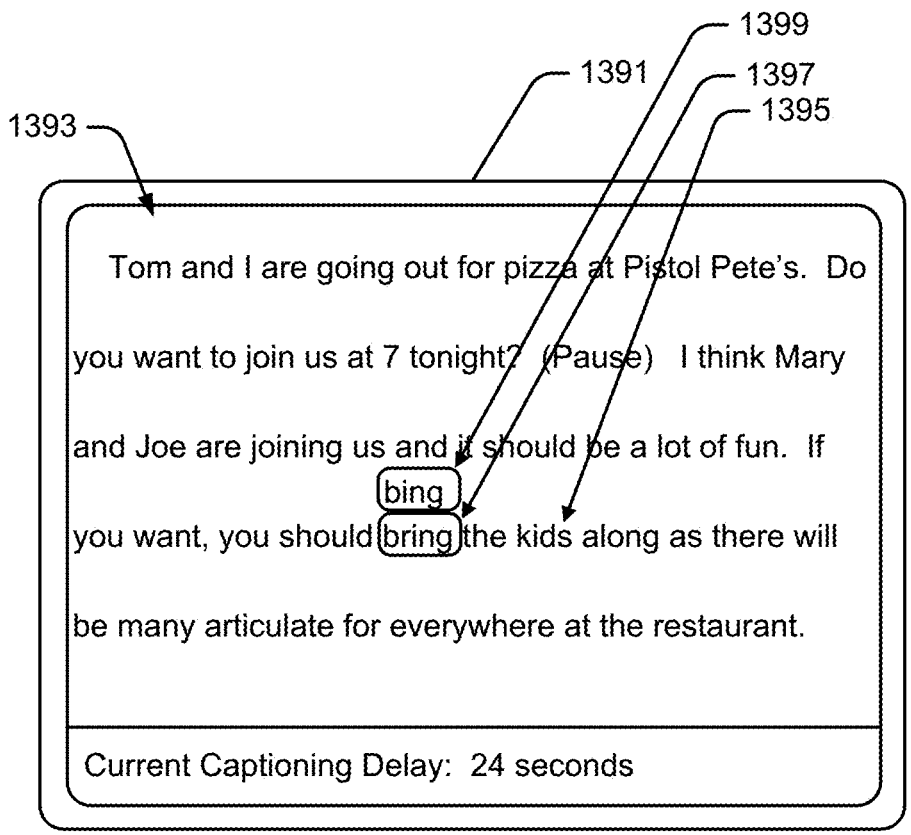
FIG. 43 is a screen shot illustrating yet another CA interface.

In at least some cases it is contemplated that if a CA corrects a word or words at one location in presented text, if an ASR subsequently contextually corrects a word or phrase that precedes the CA corrected word or words, the subsequent ASR correction may be highlighted or otherwise visually distinguished so that the CA's attention is called thereto to consider the ASR correction. In at least some cases, when an ASR corrects text prior to a CA text correction, the text that was corrected may be presented in a hovering tag proximate the ASR correction and may be touch selectable by the CA to revert back to the pre-correction text if the CA so chooses. To this end, see the CA interface screen shot 1391 shown in FIG. 43 where ASR generated text is shown at 1393 that is similar to the text presented in FIG. 39, albeit with a few corrections. More specifically, in FIG. 43, it is assumed that a CA corrected the word "cods" to "kids" at 1395 (compare again to FIG. 39) after which an ASR engine corrected the prior word "bing" to "bring". The prior ASR corrected word is highlighted or distinguished as shown at 1397 and the word that was changed to make the correction is presented in hovering tag 1399. Tag 1399 is touch selectable by the CA to revert back to the prior word if selected.

In other cases where a CA initiates or completes a word correction, the ASR engine may be programmed to disable generating additional estimates or hypothesis for any words uttered by the HU prior to the CA corrected word or within a text segment or phrase that includes the corrected word. Thus, for instance, in some cases, where 30 text words appear on a CA's display screen, if the CA corrects the fifth most recently presented word, the fifth most recently corrected word and the 25 preceding words would be rendered firm and unchangeable via the ASR engine. Here, in some cases the CA would still be free to change any word presented on her display screen at any time. In other cases, once a CA corrects a word, that word and any preceding text words may be firm as to both the CA and the ASR engine.

In some cases there may be restrictions on text corrections that may be made by a CA. For instance, in a simple case where an AU device can only present a maximum of 50 words to an AU at a time, the system may only allow a CA to correct text corresponding to the 50 words most recently uttered by an HU. Here, the idea is that in most cases it will make no sense for a CA to waste time correcting text errors in text prior to the most recently uttered 50 words as an AU will only rarely care to back up in the record to see prior generated and corrected text. Here, the window of text that is correctable may be a function of several factors including font type and size selected by an AU on her device, the type and size of display included in an AUs device, etc. This feature of restricting CA corrections to AU viewable text is effectively a limit on how far behind CA error corrections can lag.

Figure 40:
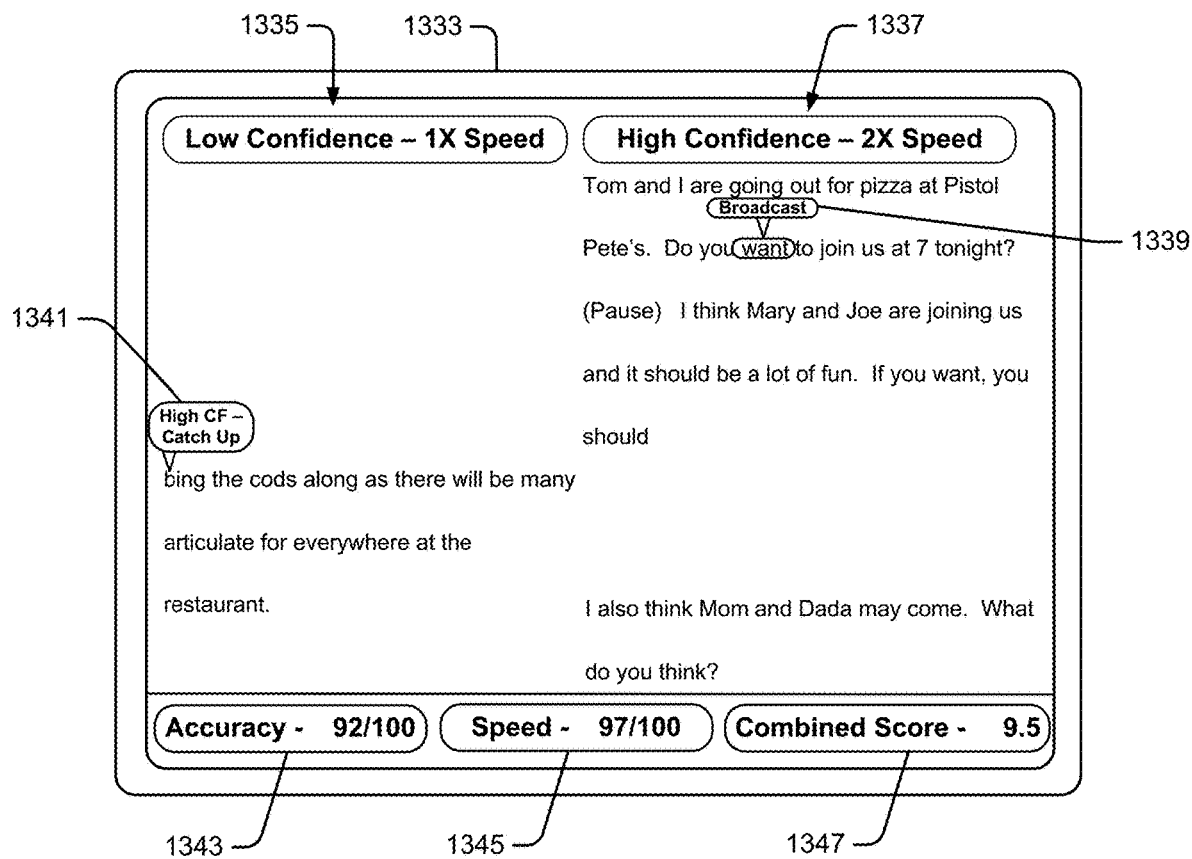
FIG. 40 is a screen shot illustrating another CA interface where low and high confidence text is presented in different columns to help a CA more easily distinguish between text likely to need correction and text that is less likely to need correction.

In some cases it is contemplated that a call may start out with full CA error correction so that the CA considers all ASR engine generated text but that, once the error correction latency exceeds some threshold level, that the CA may only be able to or may be encouraged to only correct low confidence text. For instance, the latency limit may be 10 seconds at which point all ASR text is presented but low confidence text is visually distinguished in some fashion designed to encourage correction. To this end see for instance FIG. 40 where low and high confidence text is presented in difference scrolling columns. In some cases error correction may be limited to the left column low confidence text as illustrated. FIG. 40 is described in more detail hereafter. Where only low confidence text can be corrected, in at least some cases the HU voice signal for the high confidence text may not be broadcast.

In some cases, only low confidence factor text and associated HU voice signal may be presented and broadcast to a CA for consideration with some indication of missing text and voice between the presented text words or phrases. For instance, turn piping representations (see again 216 in FIG. 17) may be presented to a CA between low confidence editable text phrases.

In other cases, while interim and final ASR engine text may be presented to an AU, a CA may only see final ASR engine text and therefore only be able to edit that text. Here, the idea is that most of the time ASR engine corrections will be accurate and therefore, by delaying CA viewing until final ASR engine text is generated, the number of required CA corrections will be reduced appreciably. It is expected that this solution will become more advantageous as ASR engine speed increases so that there is minimal delay between interim and final ASR engine text representations.

In still other cases it is contemplated that only final ASR engine text may be sent on to an AU for consideration. In this case, for instance, ASR generated text may be transmitted to an AU device in blocks where context afforded by surrounding words has already been used to refine text hypothesis. For instance, words may be sent in five word text blocks where the block sent always includes the 6th through 10th most recently transcribed words so that the most recent through fifth most recent words can be used contextually to generate final text hypothesis for the 6th through 10th most recent words. Here, CA text corrections would still be made at a relay and transmitted to the AU device for in line corrections of the ASR engine final text.

In this case, if a CA takes over the task of text generation from an ASR engine for some reason (e.g., an AU requests CA help), the system may switch over to transmitting CA generated text word by word as the text is generated. In this case CA corrections would again be transmitted separately to the AU device for in line correction. Here, the idea is that the CA generated text should be relatively more accurate than the ASR engine generated text and therefore immediate transmission of the CA generated text to the AU would result in a lower error presentation to the AU.

While not shown, in at least some embodiments it is contemplated that turn piping type indications may be presented to a CA on her interface display as a representation of the delay between the CA text generation or correction and the ASR engine generated text. To this end, see the exemplary turn piping 216 in FIG. 17. A similar representation may be presented to a CA.

Where CA corrections or even CA generated text is substantially delayed, in at least some cases the system may automatically force a split to cause an ASR engine to catch up to a current time in a call and to firm up text before the split time. In addition, the system may identify a preferred split prior to which ASR engine confidence factors are high. For instance, where ASR engine text confidence factors for spoken words prior to the most recent 15 words are high and for the last fifteen words are low, the system may automatically suggest a split at the 15th most recent word so that ASR text prior to that word is firmed up and text thereafter is still presented to the CA to be considered and corrected. Here, the CA may reject the split either by selecting a rejection option or by ignoring the suggestion or may accept the suggestion by selecting an accept option or by ignoring the suggestion (e.g., where the split is automatic if not rejected in some period (e.g., 2 seconds)). To this end, see the exemplary CA screen shot in FIG. 39 where ASR generated text is shown at 1332. In this case, the CA is behind in error correction so that the CA computer is currently broadcasting the word "want" as indicted by the "Broadcast" tag 1334 that moves along the ASR generated text string to indicate to the CA where the current broadcast point is located within the overall string. A "High CF-Catch Up" tag 1338 is provided to indicate a point within the overall ASR text string presented prior to which ASR confidence factors are high and, after which ASR confidence factors are relatively lower. Here, it is contemplated that a CA would be able to select tag 1338 to skip to the tagged point within the text. If a CA selects tag 1338, the broadcast may skip to the associated tagged point so that "Broadcast" tag 1334 would be immediately moved to the point tagged by tag 1338 where the HU voice broadcast would recommence. In other cases, selecting high confidence tag 1338 may cause accelerated broadcast of text between tags 1334 and 1338 to expedite catch up.

Referring to FIG. 40, another exemplary CA screen shot 1333 that may be presented to show low and high confidence text segments and to enable a CA to skip to low confidence text and associated voice signal is illustrated. Screen shot 1333 divides text into two columns including a low confidence column 1335 and a high confidence column 1337. Low confidence column 1335 includes text segments that have ASR assigned confidence factors that are less than some threshold value which high confidence column 1337 include text segments that have ASR assigned confidence factors that are greater than the threshold value. Column 1335 is presented on the left half of screen shot 1333 and column 1337 is presented on the right half of shot 1333. The two columns would scroll upward simultaneously as more text is generated. Again, a current broadcast tag 1339 is provided at a current broadcast point in the presented text. Also, a "High CF, Catch Up" tag 1341 is presented at the beginning of a low confidence text segment. Here, again, it is contemplated that a CA may select the high confidence tag 1341 to skip the broadcast forward to the associated point to expedite the error correction process. As shown, in at least some cases, if the CA does not skip ahead by selecting tag 1341, the HU voice broadcast may be at 2× or more the speaking speed so that catch up can be more rapid.

In at least some cases it is contemplated that when a call is received at an AU device or at a relay, a system processor may use the calling number (e.g., the number associated with the calling party or the calling parties device) to identify the least expensive good option for generating text for a specific call. For instance, for a specific first caller, a robust and reliable ASR engine voice model may already exist and therefore be useable to generate automated text without the need for CA involvement most of the time while no model may exist for a second caller that has not previously used the system. In this case, the system may automatically initiate captioning using the ASR engine and first caller voice model for first caller calls and may automatically initiate CA assisted captioning for second caller calls so that a voice model for the second caller can be developed for subsequent use. Where the received call is from an AU and is outgoing to an HU, a similar analysis of the target HU may cause the system to initiate ASR engine captioning or CA assisted captioning.

In some embodiments identity of an AU (e.g., an AU's phone number or other communication address) may also be used to select which of two or more text generation options to use to at least initiate captioning. Thus, some AU's may routinely request CA assistance on all calls while others may prefer all calls to be initiated as ASR engine calls (e.g., for privacy purposes) where CA assistance is only needed upon request for relatively small sub-periods of some calls. Here, AU phone or address numbers may be used to assess optimal captioning type.

In still other cases both a called and a calling number may be used to assess optimal captioning type. Here, in some cases, an AU number or address may trump an HU number or address and the HU number or address may only be used to assess caption type to use initially when the AU has no perceived or expressed preference.

Referring again to FIG. 39, it has been recognized that, in addition to text corresponding to an HU voice signal, an optimal AU interface needs additional information that is related to specific locations within a presented text string. For instance, specific virtual control buttons need to be associated with specific text string locations. For example, see the "High CF-Catch Up" button in FIG. 39. As other examples, a "resume" tag as in FIG. 36 or a correction word (see FIG. 20) may need to be linked to a specific text location. As another instance, in some cases a "broadcast" tag indicating the word currently being broadcast may have to be linked to a specific text location (see FIG. 39).

In at least some embodiments, a CA interface or even an AU interface will take a form where text lines are separated by at least one blank line that operates as an "additional information" field in which other text location linked information or content can be presented. To this end, see FIG. 39 where additional information fields are collectively labelled 1215. In other embodiments it is contemplated that the additional information fields may also be provided below associated text lines. In still other embodiments, other text fields may be presented as separate in line fields within the text strings (see 1217 in FIG. 40).

In many industries it has been recognized that if a tedious job can be gamified, employee performance can be increased appreciably as employees work through obstacles to better personal scores and, in some cases, to compete with each other. Here, in addition to increased personal performance, an employing entity can develop insights into best work practices that can be rolled out to other employees attempting to better their performance. In the present case, various systems are being designed to add gamification aspects to the text captioning process performed by CAs. In this regard, in some cases it has been recognized that if a CA simply operates in parallel with an ASR engine to generate text, a CA may be tempted to simply let the ASR engine generate text without diligent error correction.

To avoid CAs shirking their error correction responsibilities, in at least some embodiments it is contemplated that a system processor that drives or is associated with a CA interface may introduce periodic and random known errors into ASR generated text that is presented to a CA as test errors. Here, the idea is that a CA should identify the test errors and at least attempt to make corrections thereto. In most cases, while errors would be introduced to the CA, the errors would not be presented to an AU and instead the correct ASR engine text would be presented to the AU. In some cases the system would allow a CA to actually correct the erroneous text without knowing which errors were ASR generated and which were introduced. In other cases, when a CA selects an introduced text error to make a correction, the interface may automatically make the correction upon selection so that the CA does not waste additional time rendering a correction. In some cases, when an introduced error is corrected either by the interface or the CA, a message may be presented to the CA indicating that the error was a purposefully introduced error.

Figure 41:
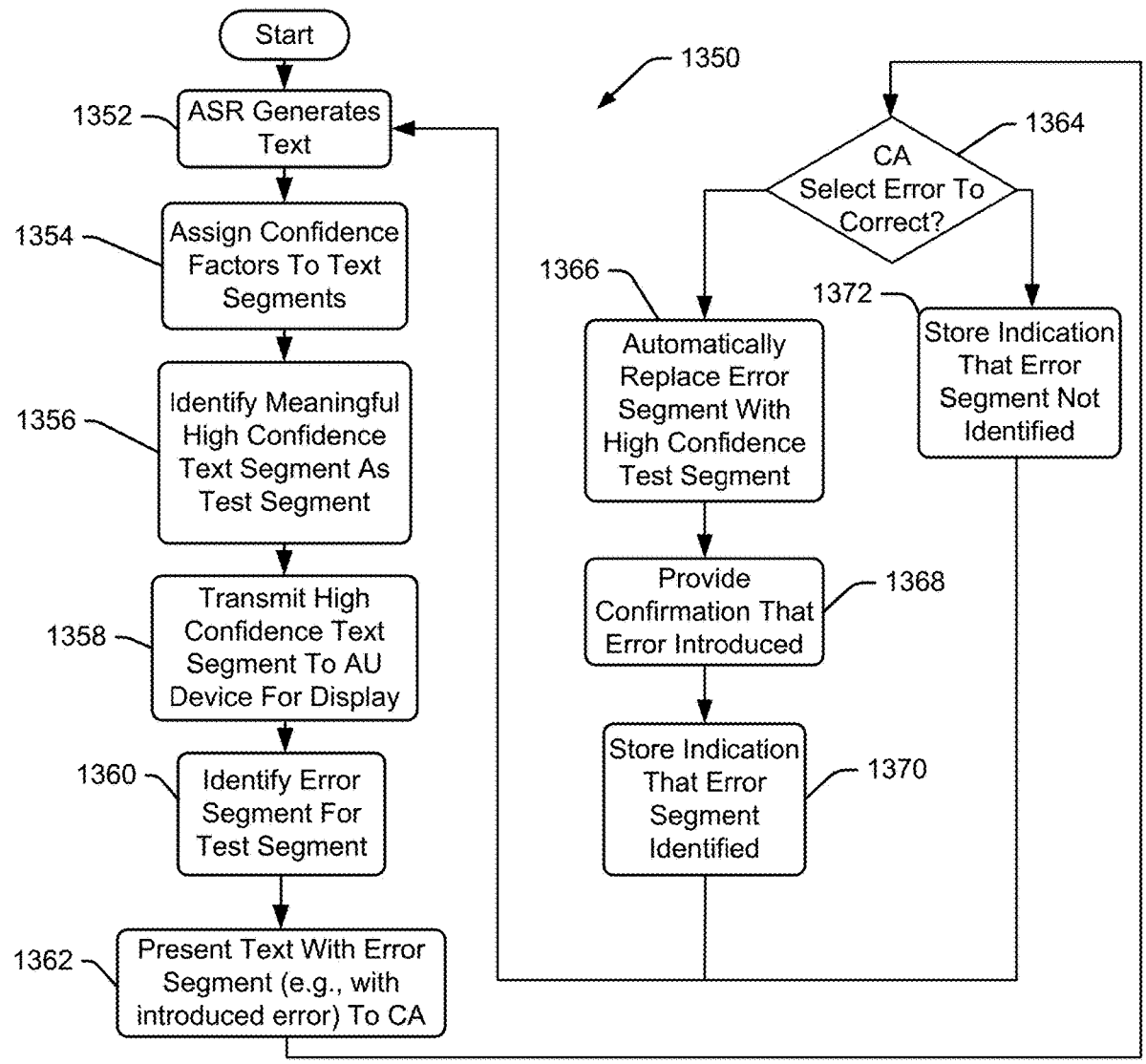
FIG. 41 is a flow chart illustrating a method of introducing errors in ASR generated text to text CA attention.

Referring to FIG. 41, a method 1350 that is consistent with at least some aspects of the present disclosure for introducing errors into an ASR text stream for testing CA alertness is illustrated. At block 1352, an ASR engine generates ASR text segments corresponding to an HU voice signal. At block 1354, a relay processor or ASR engine assigns confidence factors to the ASR text and at block 1356, the relay identifies at least one high confidence text segment as a "test" segment. At block 1358, the processor transmits the high confidence test segment to an AU device for display to an AU. At block 1360, the processor identifies an error segment to be swapped into the ASR generated text for the test segment to be presented to the CA. For instance, where a high confidence test segment includes the phrase "John came home on Friday", the processor may generate an exemplary error segment like "John camp home on Friday".

Referring still to FIG. 41, at block 1362, the processor presents text with the error segment to the CA as part of an ongoing text stream to consider for error correction. At decision block 1364, the processor monitors for CA selection of words or phrases in the error segment to be corrected. Where the CA does not select the error segment for correction, control passes to block 1372 where the processor stores an indication that the error segment was not identified and control passes back up to block 1352 where the process continues to cycle. In addition, at block 1372, the processor may also store the test segment, the error segment and a voice clip corresponding to the test segment that may later be accessed by the CA or an administrator to confirm the missed error.

Referring again to block 1364 in FIG. 41, if the CA selects the error segment for correction, control passes to block 1366 where the processor automatically replaces the error segment with the test segment so that the CA does not have to correct the error segment. Here the test segment may be highlighted or otherwise visually distinguished so that the CA can see the correction made. In addition, in at least some cases, at block 1368, the processor provides confirmation that the error segment was purposefully introduced and corrected. To this end, see the "Introduced Error-Now Corrected" tag 1331 in FIG. 39 that may be presented after a CA selects an error segment. At block 1370, the processor stores an indication that the error segment was identified by the CA. Again, in some cases, the test segment, error segment and related voice clip may be stored to memorialize the error correction. After block 1370, control passes back up to block 1352 where the process continues to cycle.

In some cases errors may only be introduced when the rate of actual ASR engine errors and CA corrections is small. For instance, where a CA is routinely making error corrections during a one minute period, it would make no sense to introduce more text errors as the CA is most likely highly focused during that period. In addition, if a CA is substantially delayed in making corrections, the system may again opt to not introduce more errors.

Error introductions may include text additions, text deletions and text substitutions in some embodiments. In at least some cases the error generating processor or CA interface may randomly generate errors of any type and related to any ASR generated text. In other cases, the processor may be programmed to introduce meaningful errors calculated to change the meaning of phrase so that a CA will be particularly motivated to correct the text error when presented. To this end, it has been recognized that some errors have limited effect on the meaning of an associated phrase while others can completely change the meaning of a phrase. Because ASR engines can understand context, they can also be programmed to ascertain when a simple text change will affect phrase meaning and can therefore be used to drive an interface as suggested here. For instance, in some cases introduced errors may only include meaningful errors. In other cases, introduced errors may include both meaningful errors and other errors that do not change the meaning of associated phrases and which would likely be recognized by an AU view the error and different statistics may be collected and stored for each of the error types to develop metrics for judging CA effectiveness.

In some embodiments gamification can be enhanced by generating ongoing, real time dynamic scores for CA performance including, for instance, a score associated with accuracy, a separate score associated with captioning speed and/or separate speed and accuracy scores under different circumstances such as, for instance, for male and female voices, for east coast accents, Midwest accents, southern accents, etc., for high speed talking and slower speed talking, for captioning with correcting versus captioning alone versus correcting ASR engine text, and any combinations of factors that can be discerned. In FIG. 40, exemplary accuracy and speed scores that are updated in real time for an ongoing call are shown at 1343 and 1345, respectively. Where a call persists for a long time, a rolling most recent sub-period of the call may be used as a duration over which the scores are calculated.

CA scores may be stored as part of a CA profile and that profile could be routinely updated to reflect growing CA effectiveness with experience over time. Once CA specific scores are stored in a CA profile, the system may automatically route future calls that have characteristics that match high scores for a specific CA to that CA which should increase overall system accuracy and speed. Thus, for instance, if an HU profile associated with a specific phone number indicates that an associated HU has a strong southern accent and speaks rapidly, when a call is received that is associated with that phone number, the system may automatically route the call to a CA that has a high gamification score for rapid southern accents if such a CA is available to take the call. In other cases it is contemplated that when a call is received at a relay where the call cannot be associated with an existing HU voice profile, the system may assign the call to a first CA to commence captioning where a relay processor analyzes the HU voice during the beginning of the call and identifies voice characteristics (e.g., rapid, southern, male, etc.) and automatically switches the call to a second CA that is associated with a high gamification score for the specific type of HU voice. In this case, speed and accuracy would be expected to increase after the switch to the second CA.

In addition, in some cases it is contemplated that in addition to the individual speed and accuracy scores, a combined speed/accuracy score can be generated for each CA over the course of time, for each CA over a work period (e.g., a 6 hour captioning day), for each CA for each call that the CA handles, etc. For example, an exemplary single score algorithm may including a running tally that adds one point for a correct word and adds zero points for an incorrect word, where the correct word point is offset by an amount corresponding to a delay in word generation after some minimal threshold period (e.g., 2 seconds after the word is broadcast to the CA for transcription or one second after the word is broadcast to and presented to a CA for correction). For instance, the offset may be 0.2 points for every second after the minimal threshold period. Other algorithms are contemplated. The single score may be presented to a CA dynamically and in real time so that CA is motivated to focus more. In other cases the single score per phone call may be presented at the end of each call or an average score over a work period may be presented at the end of the work period. In FIG. 40, an exemplary current combined score is shown at 1347.

The single score or any of the contemplated metrics may also be related to other factors such as, for instance, how quickly errors are corrected by a CA, how many ASR errors need to be corrected in a rolling period of time, how many manufactured or purposefully introduced errors are caught and corrected, once a CA is behind, how does the CA respond, how fast an HU is speaking (WPM), how clear a voice signal is received (perhaps as measured by the ASR engine), ASR confidence factors associated with text generated during a call (as a proxy for captioning complexity), etc.

In at least some of the embodiments described above an AU has the option to request CA assistance or more CA assistance than currently afforded on a call and or to request ASR engine text as opposed to CA generated text (e.g., typically for privacy purposes). While a request to change caption technique may be received from a CA, in at least some cases the alternative may not be suitable for some reason and, in those cases, the system may forego a switch to a requested technique and provide an indication to a requesting AU that the switch request has been rejected. For instance, if an AU receiving CA generated and corrected text requests a switch to an ASR engine but accuracy of the ASR engine is below some minimal threshold, the system may present a message to the AU that the ASR engine cannot currently support captioning and the CA generation and correction may persist. In this example, once the ASR engine is ready to accurately generate text, the switch thereto may be either automatic or the system may present a query to the AU seeking authorization to switch over to the ASR engine for subsequent captioning.

In a similar fashion, if an AU requests additional CA assistance, a system processor may determine that ASR engine text accuracy is low for some reason that will also affect CA assistance and may notify the AU that the a switch will not be made along with a reason (e.g., "Communication line fault").

In cases where privacy is particularly important to an AU on a specific call or generally, the caption system may automatically, upon request from an AU or per AU preferences stored in a database, initiate all captioning using an ASR engine. Here, where corrections are required, the system may present short portions of an HU's voice signal to a series of CAs so that each CA only considers a portion of the text for correction. Then, the system would stitch all of the CA corrected text together into an HU text stream to be transmitted to the AU device for display.

Figure 45:
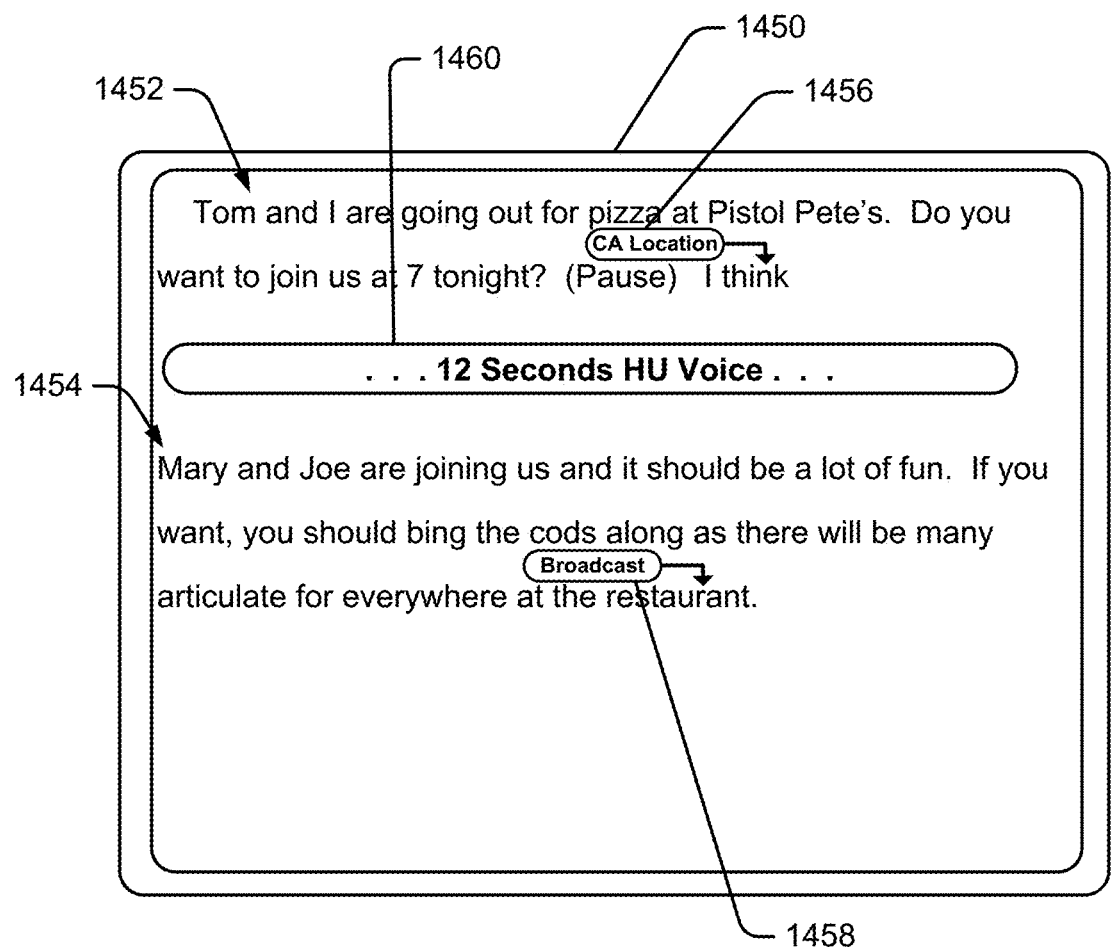
FIG. 45 is another CA interface screen shot showing a CA correction field, an ASR uncorrected text field and an intervening time field that is consistent with at least some aspects of the present disclosure.

In some cases it is contemplated that an AU device interface may present a split text screen to an AU so that the AU has the option to view essentially real time ASR generated text or CA corrected text when the corrected text substantially lags the ASR text. To this end, see the exemplary split screen interface 1450 in FIG. 45 where CA corrected text is shown in an upper field 1452 and "real time" ASR engine text is presented in a lower field 1454. As shown, a "CA location" tag 1456 is presented at the end of the CA corrected text while a "Broadcast" tag 1458 is presented at the end of the ASR engine text to indicate the CA and broadcast locations within the text string. Where CA correction latency reaches a threshold level (e.g., the text between the CA correction location and the most recent ASR text no longer fits on the display screen), text in the middle of the string may be replaced by a period indicator to indicate the duration of HU voice signal at the speaking speed that corresponds to the replaced text. Here, as the CA moves on through the text string, text in the upper field 1452 scrolls up and as the HU continued to speak, the ASR text in the bottom field 1454 also scrolls up independent of the upper field scrolling rate.

In at least some cases it is contemplated that an HU may use a communication device that can provide video of the HU to an AU during a call. For instance, an HU device may include a portable tablet type computing device or smart phone (see 1219 in FIG. 33) that includes an integrated camera for telepresence type communication. In other cases, as shown in FIG. 33, a camera 1123 may be linked to the HU phone or other communication device 14 for collecting HU video when activated. Where HU video is obtained by an HU device, in most cases the video and voice signals will already be associated for synchronous playback. Here, the HU voice and video signals are transmitted to an AU device, the HU video may be broken down into video segments that correspond with time stamped text and voice segments and the stamped text, voice and video segments may be stored for simultaneous replay to the AU. Here, where there are delays between broadcast of consecutive HU voice segments as text transcription progresses, in at least some cases the HU video will freeze during each delay. Similarly, if the HU voice signal is sped up during a catch up period as described above, the HU video may be shown at a faster speed so that the voice and video broadcasts are temporally aligned.

Figure 42:
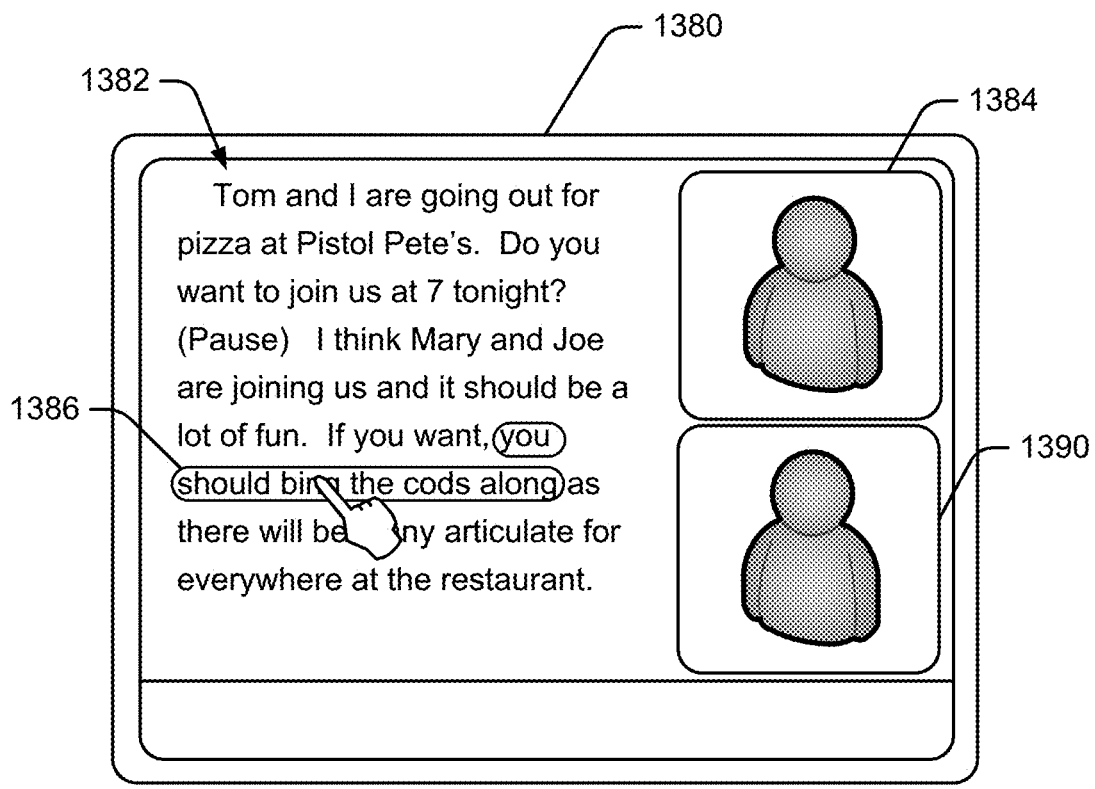
FIG. 42 is a screen shot illustrating an AU interface including, in addition to text presentation, an HU video field and a CA signing field that is consistent with at least some aspects of the present disclosure.

FIG. 42 shows an exemplary AU device screen shot 1308 including transcribed text 1382 and a video window or field 1384. Here, assuming that all of the shown text at 1382 has already been broadcast to the AU, if the AU selects the phrase "you should bing the cods along" as indicate by hand icon 1386, the AU device would identify the voice segment and video segment associated with the selected text segment and replay both the voice and video segments while the phrase remains highlighted for the user to consider.

Referring yet again to FIG. 33, in some cases the AU device or AU station may also include a video camera 1125 for collecting AU video that can be presented to the HU during a call. Here, it is contemplated that at least some HUs may be reticent to allow an AU to view HU video without having the reciprocal ability to view the AU during an ongoing call and therefore reciprocal AU viewing would be desirable.

At least four advantages result from systems that present HU video to an AU during an ongoing call. First, where the video quality is relatively high, the AU will be able to see the HU's facial expressions which can increase the richness of the communication experience.

Second, in some cases the HU representation in a video may be useable to discern words intended by an HU even if a final text representation thereof is inaccurate. For instance, where a text transcription error occurs, an AU may be able to select the phrase including the error and view the HU video associated with the selected phrase while listening to the associated voice segment and, based on both the audio and video representations, discern the actual phrase spoken by the HU.

Third, it has been recognized that during most conversations, people instinctively provide visual cues to each other that help participants understand when to speak and when to remain silent while others are speaking. In effect, the visual cues operate to help people take turns during a conversation. By providing video representations to each of an HU and an AU during a call, both participants can have a good sense of when their turn is to talk, when the other participant is struggling with something that was said, etc.

Fourth, for deaf AU's that are trained to read lips, the HU video may be useable by the AU to enhance communication.

In at least some cases an AU device may be programmed to query an HU device at the beginning of a communication to determine if the HU device has a video camera useable to generate an HU video signal. If the HU device has a camera, the AU device may cause the HU device to issue a query to the HU requesting access to and use of the HU device camera during the call. For instance, the query may include brief instructions and a touch selectable "Turn on camera" icon or the like for turning on the HU device camera. If the HU rejects the camera query, the system may operate without generating and presenting an HU video as described above. If the HU accepts the request, the HU device camera is turned on to obtain an HU video signal while the HU voice signal is obtained and the video and voice signal are transmitted to the AU device for further processing.

There are video relay systems on the market today where specially trained CAs provide a sign language service for deaf AUs. In these systems, while an HU and an AU are communicating via a communication link or network, an HU voice signal is provided to a CA. The CA listens to the HU voice signal and uses her hands to generate a sequence of signs that correspond at least roughly to the content (e.g., meaning) of the HU voice messages. A video camera at a CA station captures the CA sign sequence (e.g., "the sign signal" and transmits that signal to an AU device which presents the sign signal to the AU via a display screen. If the AU can speak, the AU talks into a microphone and the AU's voice is transmitted to the HU device where it is broadcast for the HU to hear.

In at least some cases it is contemplated that a second or even a third communication signal may be generated for the HU voice signal that can be transmitted to the AU device and presented along with the sign signal to provide additional benefit to the AU. For instance, it has been recognized that in many cases, while sign language can come close to the meaning expressed in an HU voice signal, in many cases there is no exact translation of a voice message to a sign sequence and therefore some meaning can get lost in the voice to sign signal translation. In these cases, it would be advantageous to present both a text translation and a sign translation to an AU.

In at least some cases it is contemplated that an ASR engine at a relay or operated by a fourth party server linked to a relay may, in parallel with a CA generating a sign signal, generate a text sequence for an HU voice signal. The ASR text signal may be transmitted to an AU device along with or in parallel with the sign signal and may be presented simultaneously as the text and sign signals are generated. In this way, if an AU questions the meaning of a sign signal, the AU can refer to the ASR generated text to confirm meaning or, in many cases, review an actual transcript of the HU voice signal as opposed to a sometimes less accurate sign language representation.

In many cases an ASR will be able to generate text far faster than a CA will be able to generate a sign signal and therefore, in at least some cases, ASR engine text may be presented to an AU well before a CA generated sign signal. In some cases where an AU views, reads and understands text segments well prior to generation and presentation of a sign signal related thereto, the AU may opt to skip ahead and forego sign language for intervening HU voice signal. Where an AU skips ahead in this fashion, the CA would be skipped ahead within the HU voice signal as well and continue signing from the skipped to point on.

In at least some cases it is contemplated that a relay or other system processor may be programmed to compare text signal and sign signal content (e.g., actual meaning ascribed to the signals) so that time stamps can be applied to text and sign segment pairings thus enabling an AU to skip back through communications to review a sign signal simultaneously with a paired text tag or other indicator. For instance, in at least some embodiments as HU voice is converted by a CA to sign segments, a processor may be programmed to assess the content (e.g., meaning) of each sign segment. Similarly, the processor may also be programmed to analyze the ASR generated text for content and to then compare the sign segment content to the text segment content to identify matching content. Where sign and text segment content match, the processor may assign a time stamp to the content matching segments and store the stamp and segment pair for subsequent access. Here, if an AU selects a text segment from her AU device display, instead of (or in addition to in some embodiments) presenting an associated HU voice segment, the AU device may represent the sign segment paired with the selected text.

Referring again to FIG. 33, the exemplary CA station includes, among other components, a video camera 55 for taking video of a signing CA to be delivered along with transcribed text to an AU. Referring also and again to FIG. 42, a CA signing video window is shown at 1390 alongside a text field that includes text corresponding to an HU voice signal. In FIG. 42, if an AU selects the phrase labelled 1386, that phrase would be visually highlighted or distinguished in some fashion and the associated or paired sign signal segment should be represented in window 1390.

In at least some video relay systems, in addition to presenting sign and text representations of an HU voice signal, an HU video signal may also be used to represent the HU during a call. In this regard, see again FIG. 42 where both an HU video window 1384 and a CA signing window 1390 are presented simultaneously. Here, all communication representations 1382, 1384 and 1390 may always be synchronized via time stamps in some cases while in other cases the representation may not be completely synchronized. For instance, in some cases the HU video window 1384 may always present a real time representation of the HU while text and sign signals are 1382 and 1390 are synchronized and typically delayed at least somewhat to compensate for time required to generate the sign signal as well as AU replay of prior sign signal segments.

In still other embodiments it is contemplated that a relay or other system processor may be programmed to analyze sign signal segments generated by a signing CA to automatically generate text segments that correspond thereto. Here the text is generated from the sign signal as opposed to directly from the voice signal and therefore would match the sign signal content more closely in at least some embodiments. Because the text is generated directly from the sign signal, time stamps applied to the sign signal can easily be aligned with the text signal and there would be no need for content analysis to align signals. Instead of using content to align, a sign signal segment would be identified and a time stamp applied thereto, then the sign signal segment would be translated to text and the resulting text would be stored in the system database correlated to the corresponding sign signal segment and the time stamp for subsequent access.

Figure 44:
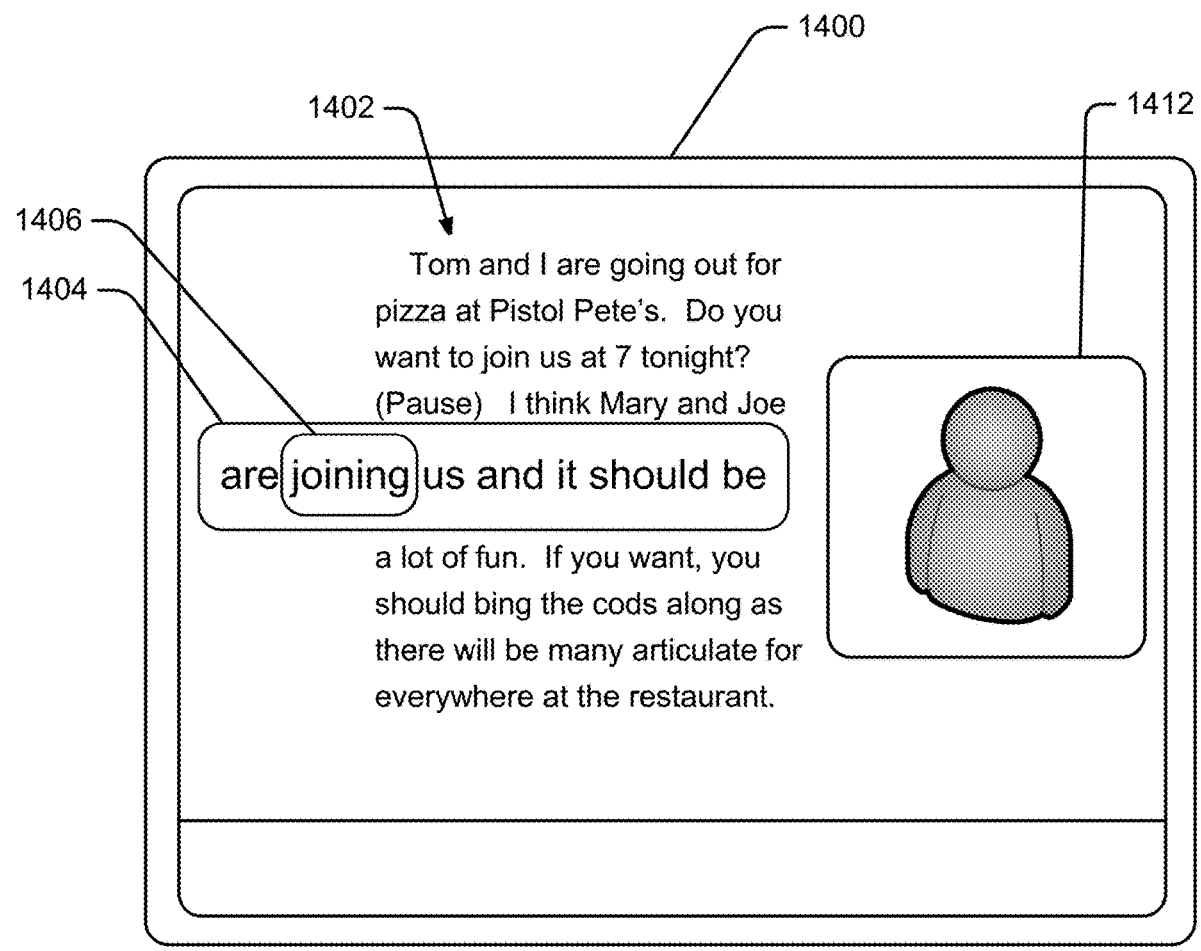
FIG. 44 is another Au interface screen shot including scrolling text and an HU video window.

FIG. 44 shows yet another exemplary AU screen shot 1400 where text segments are shown at 1402 and an HU video window is shown at 1412. The text 1402 includes a block of text includes a set of text lines where the block is presented in three visually distinguished ways. First, a currently audibly broadcast word is highlighted or visually distinguished in a first way as indicated at 1406. Second, the line of text that includes the word currently being broadcast is visually distinguished in a second way as shown at 1404. Other text lines are presented above and below the line 1404 to show preceding text and following text for context. In addition, the line at 1404 including the currently broadcast word at 1406 is presented in a larger format to call an Au's attention to that line of text and the word being broadcast. The larger text makes it easier for an AU to see the presented text. Moreover, the text block 1402 is controlled to scroll upward while keeping the text line that includes the currently broadcast word generally centrally vertically located on the AU device display so that the AU can simply train her eyes at the central portion of the display with the transcribed words scrolling through the field 1404. In this case, a properly trained AU would know that prior broadcast words can be replayed by tapping a word above field 1404 and that the broadcast can be skipped ahead by tapping one of the words below field 1404. Video window 1412 is provided spatially close to field 1404 so that the text presented therein is intuitively associated with the HU video in window 1412.

In at least some embodiments it is contemplated that when a CA replaces an ASR engine to generate text for some reason where the CA revoices an HU voice signal to the ASR engine to generate the text, instead of providing the voice signal re-voiced by the CA to an ASR engine at the relay, the CA revoicing signal may be routed to the ASR engine that was being used prior to convert the HU voice signal to text. Thus, for instance, where a system was transmitting an HU voice signal to a fourth party ASR engine provider when a CA takes over text generation via re-voicing, when the CA voices a word, the CA voice signal may be transmitted to the fourth party provider to generate transcribed text which is then transmitted back to the relay and on to the AU device for presentation.

To apprise the public of the scope of the present invention the following claims are made.

What is claimed is:

1. A method to transcribe communications, the method comprising:
obtaining an audio message originating at a first device during a voice communication session between the first device and a second device, wherein the second device includes a display screen;

providing the audio message to a first speech recognition system to generate a first transcript of the audio message;

making the first transcript available to the second device for presentation on the display screen;

in response to obtaining an indication that indicates a quality of the first transcript is below a quality threshold, providing the audio message to a second speech recognition system to generate a second transcript based on the audio message while continuing to provide the audio message to the first speech recognition system to generate the first transcript and continuing to make the first transcript available to the second device for presentation on the display screen; and in response to occurrence of an event that indicates the second transcript is to be made available to the second device instead of the first transcript, making the second transcript available to the second device for presentation on the display screen instead of the first transcript.

2. The method of claim 1 wherein the first speech recognition system and the second speech recognition system are automated speech recognition systems that work independent of human interaction.

3. The method of claim 2 wherein the quality indication is obtained from the second device.

4. The method of claim 1 wherein the first speech recognition system is an automated speech recognition system that works independent of human interaction and the generation of the second transcript by the second speech recognition system includes:
  (i) broadcasting the audio message; and
  (ii) obtaining a second audio message based on a re-voicing of the broadcast audio message, wherein the second transcript is generated based on the second audio message.

5. The method of claim 1 further comprising obtaining a confidence score of the first transcript from the first speech recognition system and obtaining the indication of quality based on a comparison of the confidence score to the quality threshold.

6. The method of claim 1 wherein the event includes the second transcript including at least one captioned word based on the audio message.

7. The method of claim 1 further including, in response to the event, ceasing providing the audio message to the first speech recognition system.

8. The method of claim 1 wherein the event includes passage of a short delay.

9. The method of claim 8 wherein the delay is a predefined delay duration.

10. The method of claim 1 wherein the first device provides the first speech recognition system.

11. The method of claim 10 wherein a remote relay provides the second speech recognition system and wherein the step of providing the audio message to the second speech recognition system includes transmitting the audio message to the remote relay.

12. The method of claim 1 wherein the second device presents a portion of at least one of the first and second transcripts for each portion of the audio message via the display screen.

13. The method of claim 12 wherein the audio message is also presented to the second device and wherein the second device controls a speaker to broadcast the audio message.

14. The method of claim 1 wherein the second device presents the first transcript as captions via the display screen during a first portion of the voice communication session and presents the second transcript as captions via the display screen during a second portion of the voice communication session.

15. The method of claim 14 further including presenting an indication via the display screen that the first speech recognition system generated the first transcript when the first transcript is presented on the display screen and presenting an indication via the display screen that the second speech recognition system generated the second transcript when the second transcript is presented on the display screen.

16. The method of claim 15 further including presenting a first on screen icon on the display screen that is selectable to switch from the first speech recognition system to the second speech recognition system while the first transcript is presented on the display screen and presenting a second on screen icon on the display screen that is selectable to switch from the second speech recognition system to the first speech recognition system while the second transcript is presented on the display screen.

17. The method of claim 1 wherein the second device provides the first speech recognition system.

18. The method of claim 17 wherein a remote relay provides the second speech recognition system and wherein the step of providing the audio message to the second speech recognition system includes transmitting the audio message to the remote relay.

19. The method of claim 18 wherein the second device presents a portion of at least one of the first and second transcripts for each portion of the audio message via the display screen.

20. The method of claim 1 wherein a remote relay provides each of the first and second speech recognition systems and wherein the audio message is transmitted to the relay.

21. The method of claim 1 wherein the step of providing the audio message to a first speech recognition system includes:
  (i) broadcasting the audio message to a call assistant; and
  (ii) obtaining a second audio message based on a re-voicing of the broadcast audio message by the call assistant, wherein the first transcript is generated based on the second audio message.

22. The method of claim 21 wherein the second audio message is provided to a first automated speech recognition system that is trained to a voice of the call assistant.

23. The method of claim 22 wherein the second speech recognition system includes a second automated speech recognition system.

24. The method of claim 23 wherein the second speech recognition system trains during the voice communication session to a voice of a user speaking the audio message.

25. The method of claim 1 wherein the first transcript is presented via the display screen prior to occurrence of the event and the second transcript is presented via the display screen subsequent to occurrence of the event.

26. The method of claim 25 wherein the second device includes a speaker and wherein the audio message is provided to the second device and is broadcast as a voice message via the speaker.

27. The method of claim 26 wherein transcript captions presented via the display screen lag the voice message, the method further including presenting an indication via the display screen indicating a magnitude of a lag period between a most recently broadcast voice message and a most recently presented transcript caption.

28. The method of claim 27 wherein the lag period is expressed in seconds.

29. The method of claim 1 wherein the audio message is a first audio message and wherein the method further includes obtaining a second audio message originating at the second device during the voice communication session and providing the second audio message to a speech recognition system to generate a third transcript associated with the second audio message.

30. The method of claim 29 further including presenting one of the first and second transcripts as well as the third transcript via the display screen.

31. The method of claim 30 wherein the first and second transcripts are presented in a first column on the display screen and the third transcript is presented in a second column spaced from the first column on the display screen.

32. The method of claim 1 wherein the second device includes an audio device separate from the display screen, at least one of the transcripts presented as captions via the display screen and the audio message broadcast via the audio device.

33. The method of claim 1 wherein a remote relay provides the first speech recognition system and the second speech recognition system, the step of providing the audio message to the first speech recognition system and the step of providing the audio message to the second speech recognition system including transmitting the audio message to the remote relay.

34. The method of claim 33 wherein the step of transmitting the audio message to the remote relay includes receiving the audio message at the second device and transmitting the audio message from the second device to the remote relay.

35. At least one software program configured to store instruction that when executed by at least one processor cause a system to perform the method of claim 1.

36. The method of claim 1 wherein the first speech recognition system is an automated speech recognition system.

37. The method of claim 36 wherein the first speech recognition system is provided by the second device.

38. The method of claim 37 wherein the second speech recognition system is provided by a remote relay, the step of providing the audio message to a second speech recognition system including transmitting the audio message to the remote relay.

39. The method of claim 38 wherein the second device transmits the audio message to the remote relay.

40. The method of claim 39 further including the step of, in response to obtaining the quality indication that indicates a quality of the first transcript is below a quality threshold, further transmitting the first transcript to the remote relay.

41. The method of claim 40 wherein the remote relay corrects errors in the first transcript to generate the second transcript.

42. The method of claim 1 wherein the second speech recognition system is an automated speech recognition transcription system.

43. The method of claim 1 further including presenting a first on screen icon on the display screen that is selectable to switch from the first speech recognition system to the second speech recognition system while the first transcript is presented on the display screen.

44. A method to transcribe communications, the method comprising:
obtaining an audio message originating at a first device during a voice communication session between the first device and a second device, wherein the second device includes a display screen;
providing at least a portion of the audio message to a first speech recognition system to generate a first transcript of the audio message;
making the first transcript available to the second device for presentation on the display screen;
providing at least a portion of the audio message to a second speech recognition system to generate a second transcript of the audio message; and
in response to obtaining an indication that indicates a quality of the first transcript is below a quality threshold, making the second transcript available to the second device for presentation on the display screen instead of the first transcript.

45. The method of claim 44 wherein the first speech recognition system is an automated speech recognition system that works independent of human interaction.

46. The method of claim 45 wherein generation of the second transcript by the second speech recognition system includes:
(i) broadcasting the audio message; and
(ii) obtaining a second audio message based on a re-voicing of the broadcast audio message, wherein the second transcript is generated based on the second audio message.

47. The method of claim 44 wherein the step of providing at least a portion of the audio message to a second speech recognition system occurs in response to obtaining an indication that indicates a quality of the first transcript is below a quality threshold.

48. The method of claim 44 further including the second device presenting at least a portion of at least one of the first and second transcripts for each portion of the audio message.

49. The method of claim 44 further comprising obtaining a confidence score of the first transcript from the first speech recognition system and obtaining the quality indication based on a comparison of the confidence score to the quality threshold.

50. The method of claim 44 wherein the quality indication is obtained from the second device.

51. The method of claim 44 wherein the second device provides the first speech recognition system.

52. The method of claim 51 wherein a remote relay provides the second speech recognition system and wherein the step of providing the audio message to the second speech recognition system includes transmitting the audio message to the remote relay.

53. The method of claim 52 wherein the first speech recognition system is an automated speech recognition system that operates independent of human interaction.

54. The method of claim 53 wherein the second speech recognition system includes a call assistant that performs at least some activities to generate the second transcript.

55. The method of claim 54 wherein at least a portion of the audio message is simultaneously provided to each of the first and second speech recognition systems.

56. The method of claim 44 wherein the audio message is also presented to the second device and wherein the second device controls a speaker to broadcast the audio message.

57. The method of claim 44 wherein the second device presents the first transcript as captions via the display screen during a first portion of the voice communication session and presents the second transcript as captions via the display screen during a second portion of the voice communication session.

58. The method of claim 57 further including presenting an indication via the display screen that the first speech recognition system generated the first transcript when the first transcript is presented on the display screen and presenting an indication via the display screen that the second speech recognition system generated the second transcript when the second transcript is presented on the display screen.

59. The method of claim 44 further including presenting a first on screen icon on the display screen that is selectable to switch from the first speech recognition system to the second speech recognition system while the first transcript is presented on the display screen.

60. The method of claim 44 wherein a remote relay provides each of the first and second speech recognition systems and wherein the audio message is transmitted to the relay.

61. The method of claim 60 wherein the second device transmits the audio message to the relay.

62. The method of claim 44 wherein the audio message is broadcast as a voice message via a speaker and wherein transcript captions are presented via the display screen and lag the voice message, the method further including presenting an indication via the display screen indicating a magnitude of a lag period between a most recently broadcast voice message and a most recently presented transcript caption.

63. A method to transcribe communications, the method comprising:
  obtaining an audio message originating at a first device during a voice communication session between the first device and a second device, wherein the second device includes a display screen;
  providing at least a portion of the audio message to a first speech recognition system to generate a first transcript of the audio message;
  making the first transcript available to the second device for presentation on the display screen;
  in response to obtaining an indication that indicates a quality of the first transcript is below a quality threshold and while continuing to provide the audio message to the first speech recognition system to generate the first transcript and continuing to make the first transcript available to the second device, the method further including:
  providing the audio message to a second speech recognition system to generate a second transcript of the audio message;
  broadcasting, by the second speech recognition system, the audio message;
  obtaining, by the second speech recognition system, second audio message based on a re-voicing of the broadcast audio;
  generating, by the second speech recognition system, a second transcript using the second audio message; and
  in response to occurrence of an event that indicates the second transcript is to be made available to the second device instead of the first transcript, making the second transcript available to the second device for presentation on the display screen instead of the first transcript.

64. The method of claim 63 further comprising, obtaining at least one confidence factor associated with the first transcript from the first speech recognition system and obtaining the indication of quality based on consideration of the at least one confidence factor.

65. The method of claim 63 wherein the quality indication is obtained from the second device.

66. The method of claim 63 wherein the first speech recognition system is an automated speech recognition system.

67. At least one software program configured to store instruction that when executed by at least one processor cause a system to perform the method of claim 63.

68. A system comprising:
  at least one processor; and
  at least one computer readable media coupled to the at least one processor and configured to store one or more instruction that when executed by the at least one processor cause the system to perform operations comprising:
  obtaining an audio message originating at a first device during a voice communication session between the first device and a second device, wherein the second device includes a display screen;
  providing the audio message to a first speech recognition system to generate a first transcript of the audio message;
  making the first transcript available to the second device for presentation on the display screen;
  in response to obtaining an indication that indicates a quality of the first transcript is below a quality threshold, providing the audio message to a second speech recognition system to generate a second transcript based on the audio message while continuing to provide the audio message to the first speech recognition system to generate the first transcript and continuing to make the first transcript available to the second device for presentation on the display screen; and
  in response to occurrence of an event that indicates the second transcript is to be made available to the second device instead of the first transcript, making the second transcript available to the second device for presentation on the display screen instead of the first transcript.

69. The system of claim 68 wherein the first speech recognition system is an automated speech recognition system that works independent of human interaction.

70. The system of claim 69 wherein the generation of the second transcript includes operations comprising:
  broadcasting audio based on the audio message; and
  obtaining second audio message based on re-voicing of the broadcast audio wherein the second transcript is generated based on the second audio message.

71. The system of claim 68 wherein the second speech recognition system includes an automated speech recognition system.

72. The system of claim 68 further comprising, obtaining at least one confidence factor associated with the first transcript from the first speech recognition system and obtaining the indication of quality based on consideration of the at least one confidence factor.

73. The system of claim 68 wherein the indication of quality is obtained from the second device.

74. The system of claim 68 wherein the operations further comprise in response to occurrence of the event, ceasing providing the audio message to the first speech recognition system.

75. A system comprising:
  at least one processor; and
  at least one computer readable media coupled to the at least one processor and configured to store one or more instruction that when executed by the at least one processor cause the system to perform operations comprising:

obtaining an audio message originating at a first device during a voice communication session between the first device and a second device, wherein the second device includes a display screen;

providing at least a portion of the audio message to a first speech recognition system to generate a first transcript of the audio message;

making the first transcript available to the second device for presentation on the display screen;

providing at least a portion of the audio message to a second speech recognition system to generate a second transcript of the audio message; and in response to obtaining an indication that indicates a quality of the first transcript is below a quality threshold, making the second transcript available to the second device for presentation on the display screen instead of the first transcript.

\* \* \* \* \*